United States Patent [19]
Rossides

[11] Patent Number: 6,131,085
[45] Date of Patent: Oct. 10, 2000

[54] ANSWER COLLECTION AND RETRIEVAL SYSTEM GOVERNED BY A PAY-OFF METER

[76] Inventor: Michael T Rossides, 3666 Upton St., NW., Washington, D.C. 20008

[21] Appl. No.: 08/706,762

[22] Filed: Aug. 28, 1996

Related U.S. Application Data

[63] Continuation-in-part of application No. 08/640,132, Apr. 30, 1996, abandoned, which is a continuation-in-part of application No. 08/526,497, Sep. 11, 1995, abandoned, which is a continuation-in-part of application No. 08/389,405, Feb. 16, 1995, abandoned, which is a continuation-in-part of application No. 08/327,704, Oct. 24, 1994, abandoned, which is a continuation-in-part of application No. 08/072,386, May 21, 1993, Pat. No. 5,359,508.

[51] Int. Cl.[7] .................................................. G06F 15/00
[52] U.S. Cl. .............................. 705/1; 705/400; 707/1; 707/3
[58] Field of Search ...................... 705/1, 400; 379/112, 379/114, 121, 126; 707/1, 3, 104

[56] References Cited

U.S. PATENT DOCUMENTS

| | | | |
|---|---|---|---|
| 4,725,977 | 2/1988 | Izumi et al. | 711/115 |
| 4,992,940 | 2/1991 | Dworkin | 705/401 |
| 5,247,575 | 9/1993 | Sprague et al. | 705/53 |
| 5,410,598 | 4/1995 | Shear | 705/53 |
| 5,984,054 | 9/1999 | Nielsen | 709/200 |

*Primary Examiner*—Eric W. Stamber
*Assistant Examiner*—Jason W. Rhodes

[57] ABSTRACT

The invention is a set of processes for improving the interface of a self-organizing database. This type of database stores both questions and answers. The improved interface processes enable a user who has found a (first) question in the database to enter a new (second) question and label that second question as "more specific" than the first. When a user presses an "enter more specific question" command, the system enables the user to enter a question and then stores the question and labels it as more specific than the first, and links the two questions in the database. Then, when any user has found the first question, the system enables him to "go to" the linked, more specific question by entering a "go to more specific question" command. Further, when a user has found a question, the system can present a list of all the more specific questions linked to that question. The system also enables a user to find a first question and then enter a new (second) question and label it as a synonym of the first. The system then links the two questions as synonyms in its database. Further, when any user has found a question, the system can present a list of all the linked "synonym" questions and can enable the user to "go to" a linked synonym question by selecting it.

2 Claims, 54 Drawing Sheets

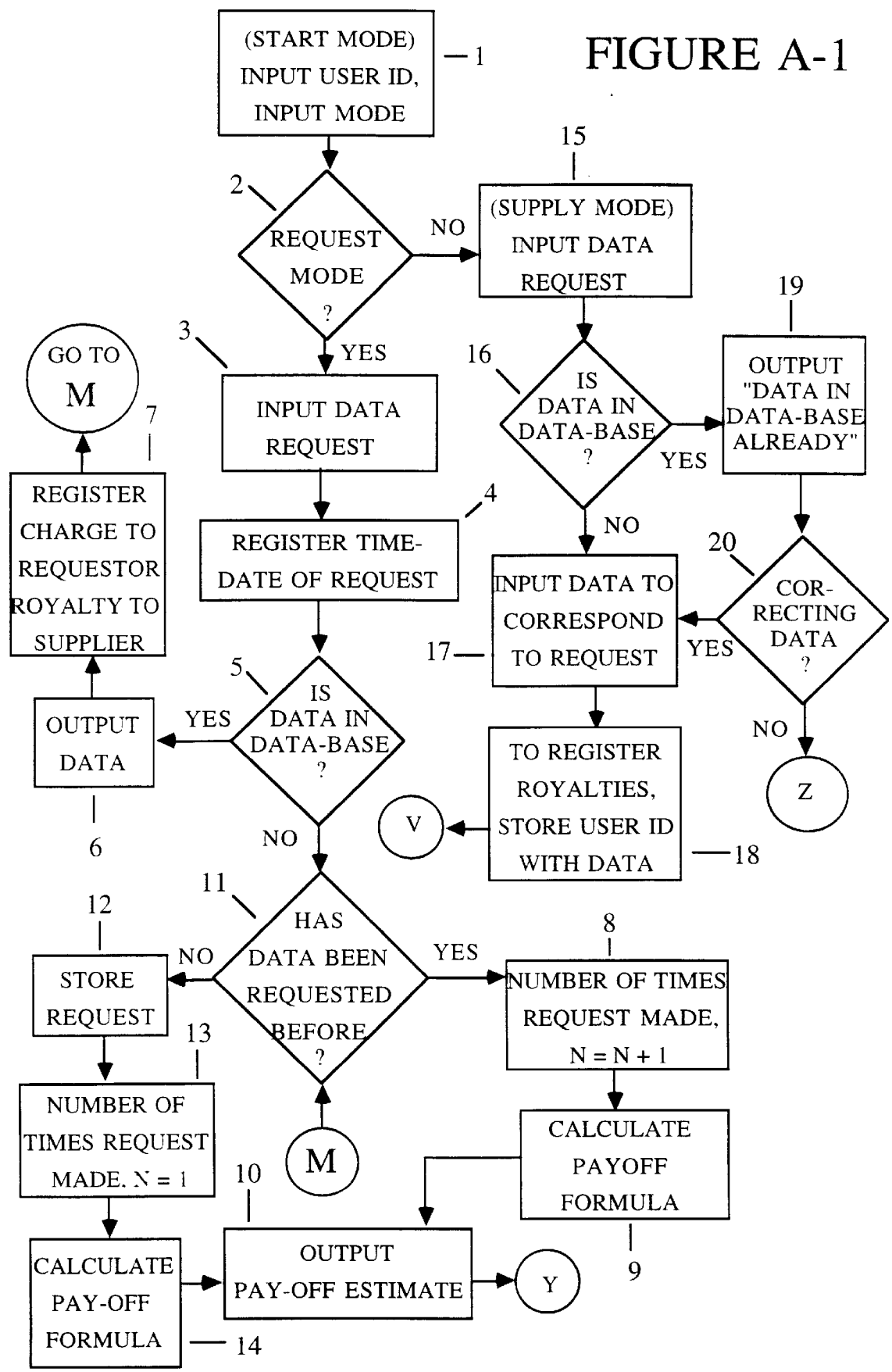
FIGURE A-1

FIGURE A-2a
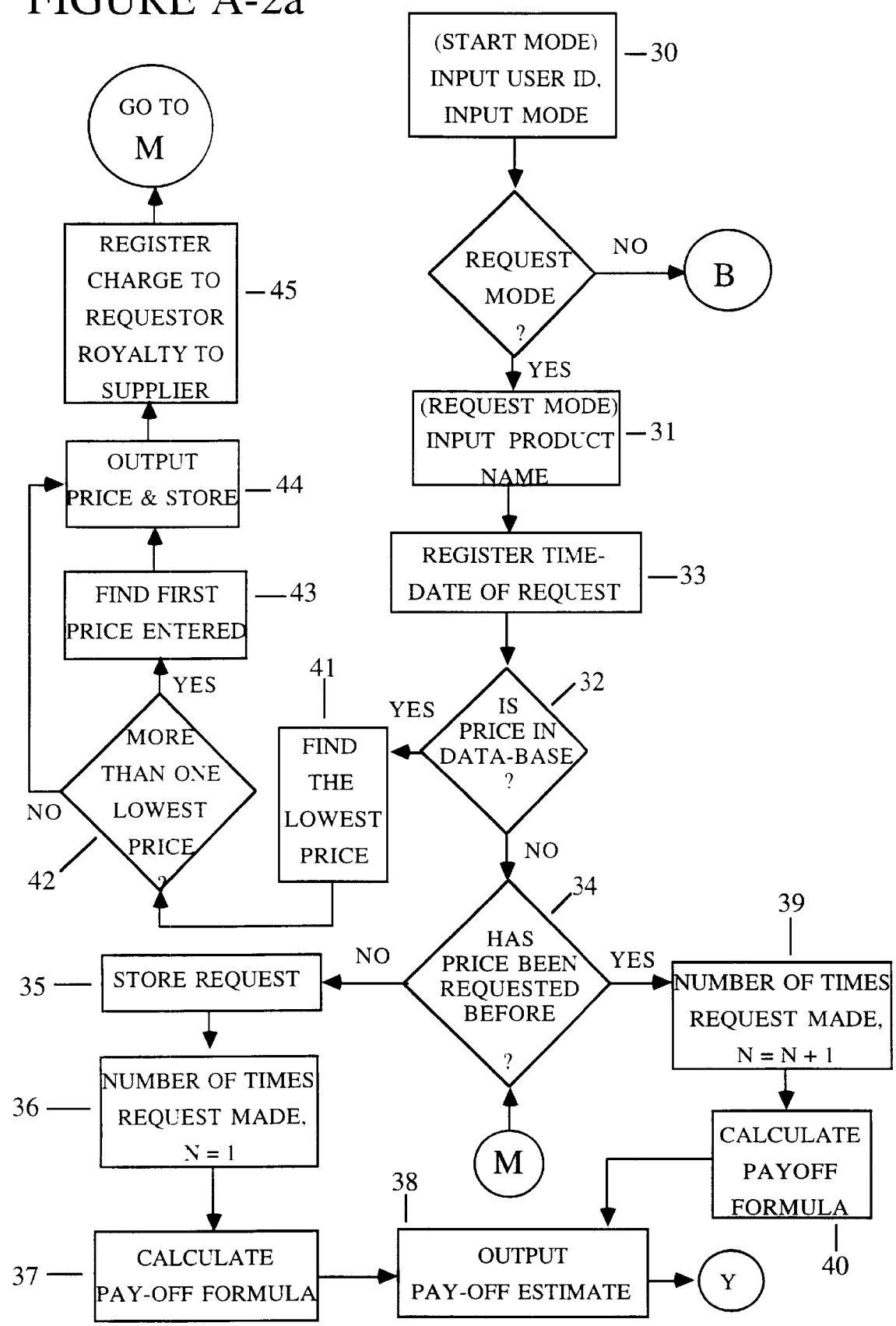

FIGURE A-2b
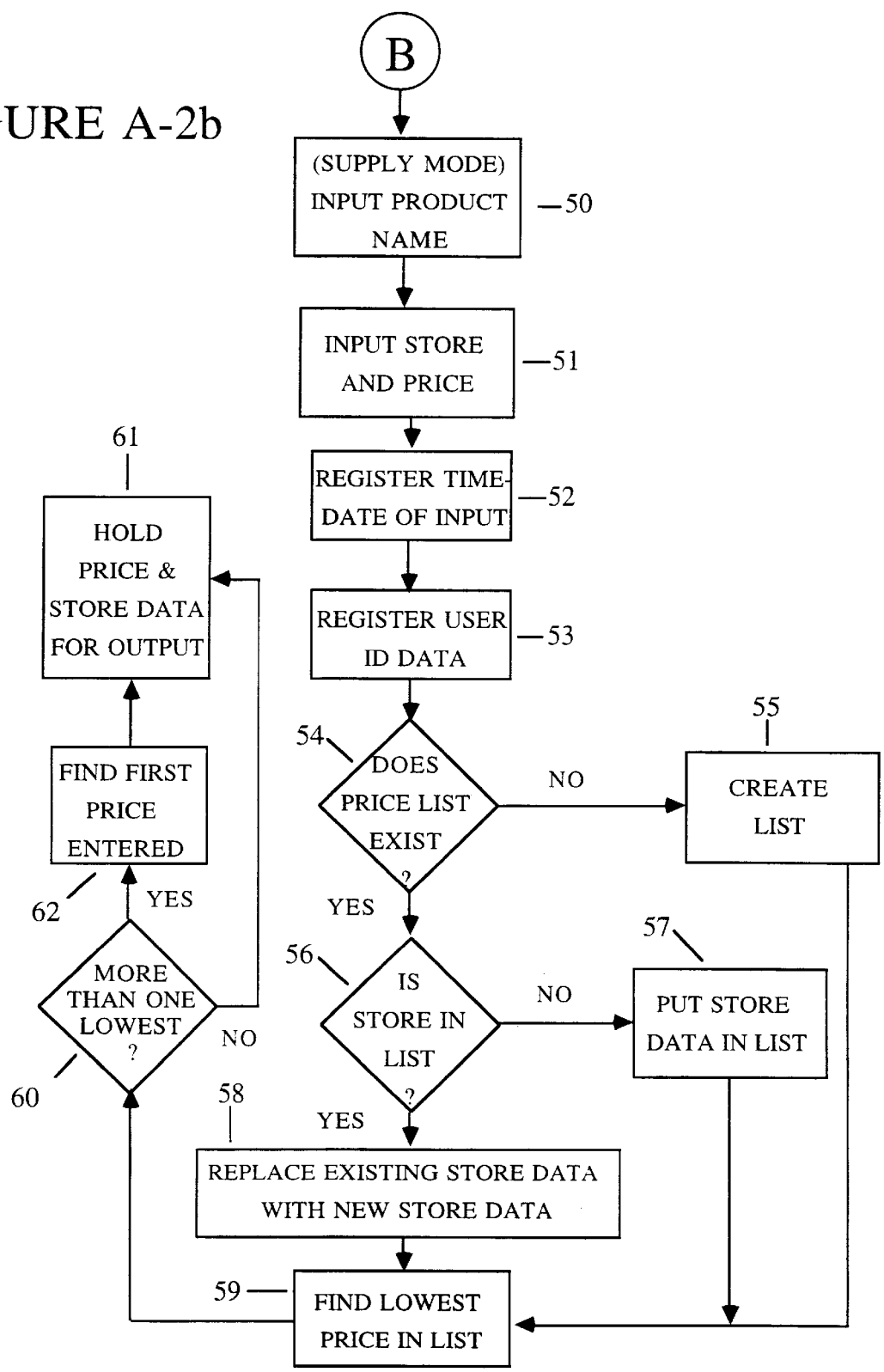

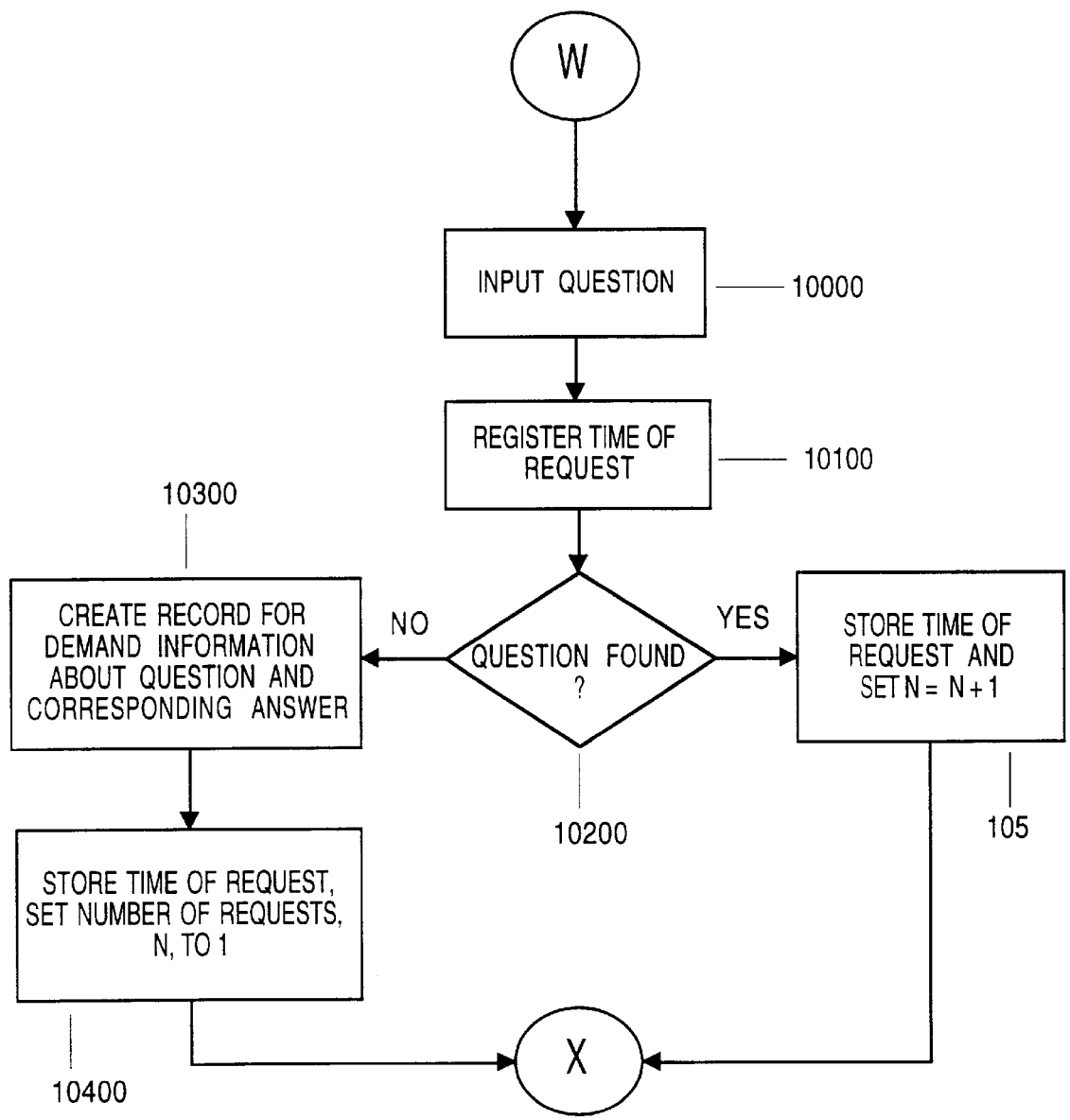
FIGURE A-3

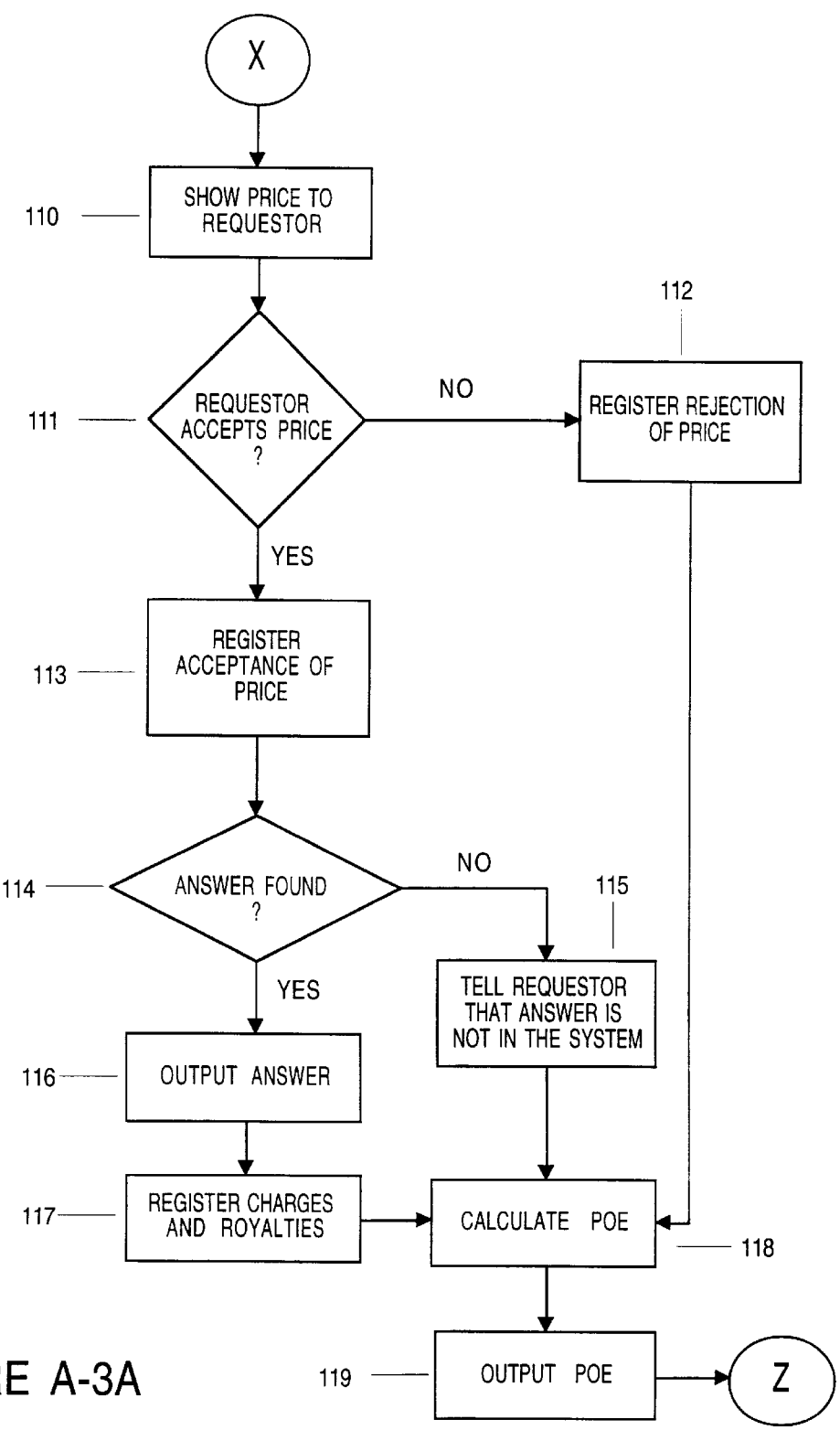
FIGURE A-3A

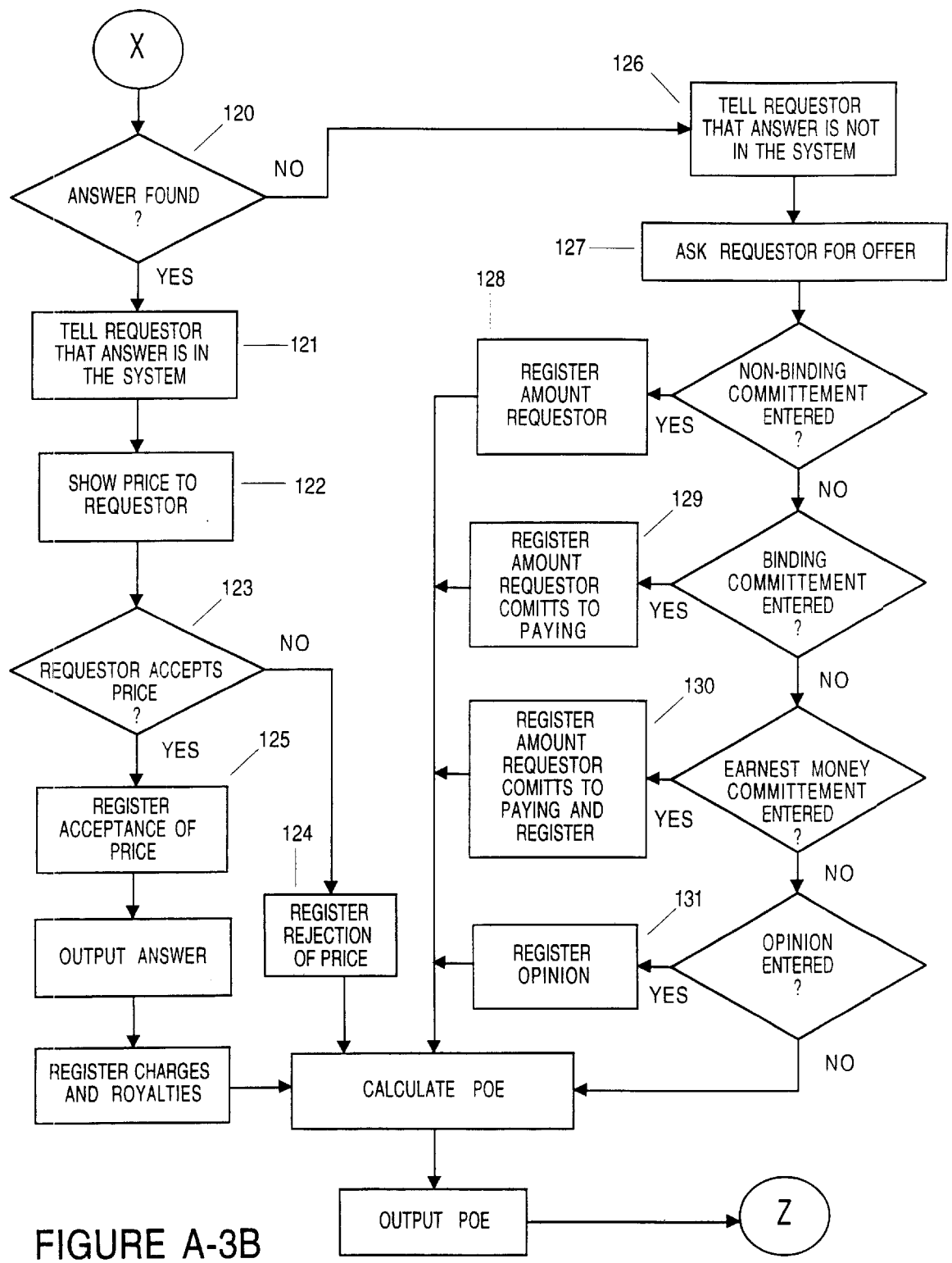
FIGURE A-3B

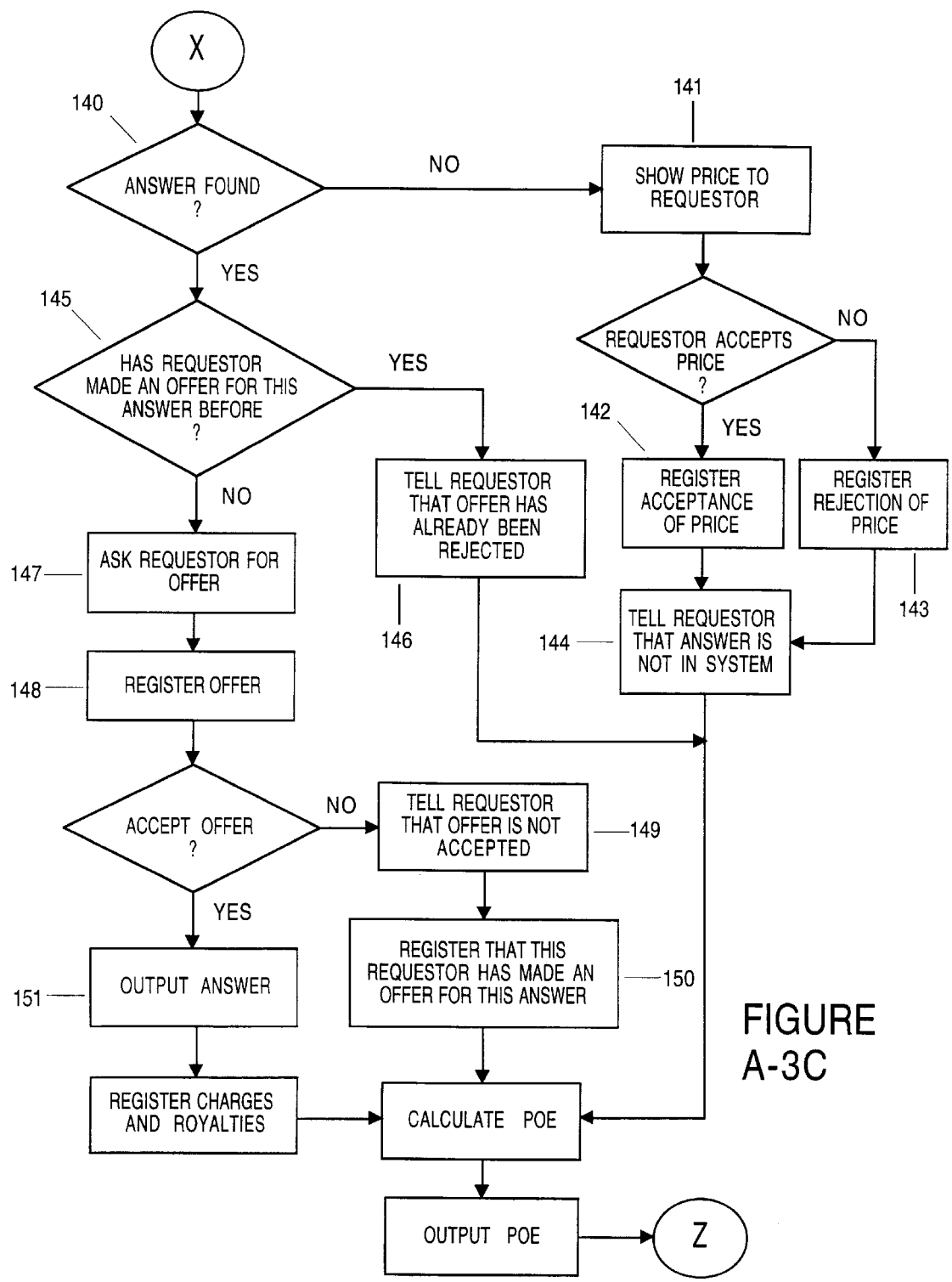
FIGURE A-3C

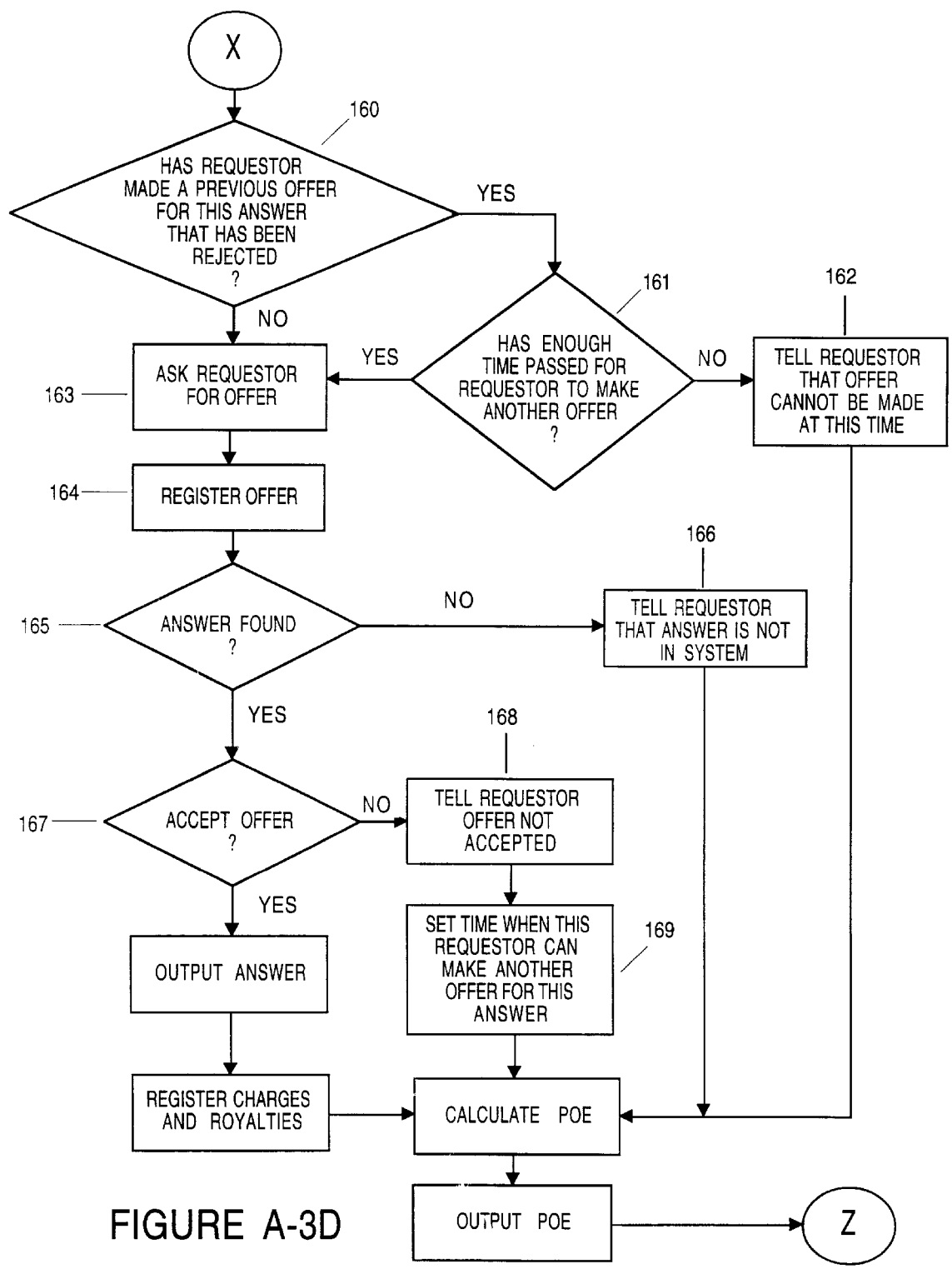
FIGURE A-3D

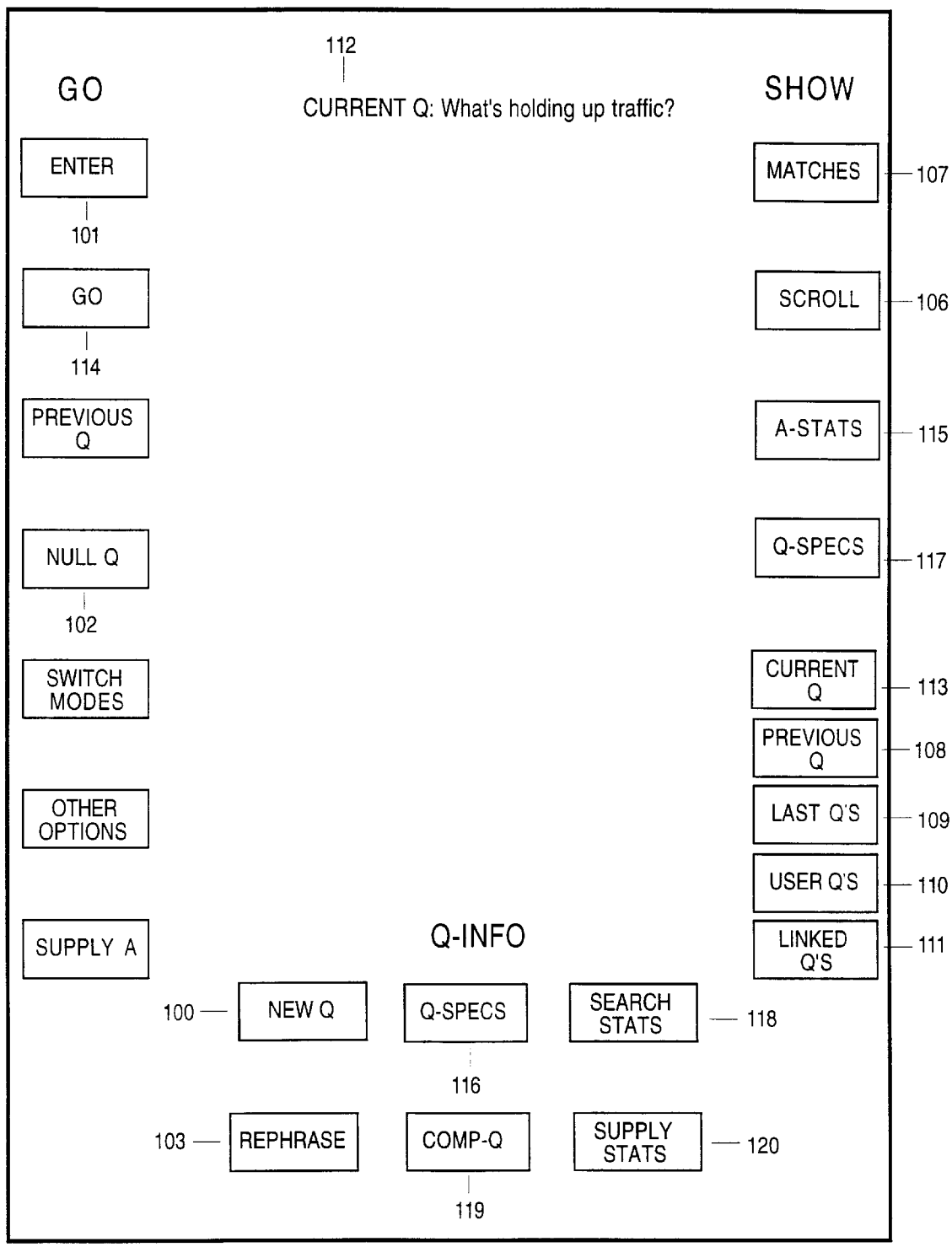
FIGURE 5.10

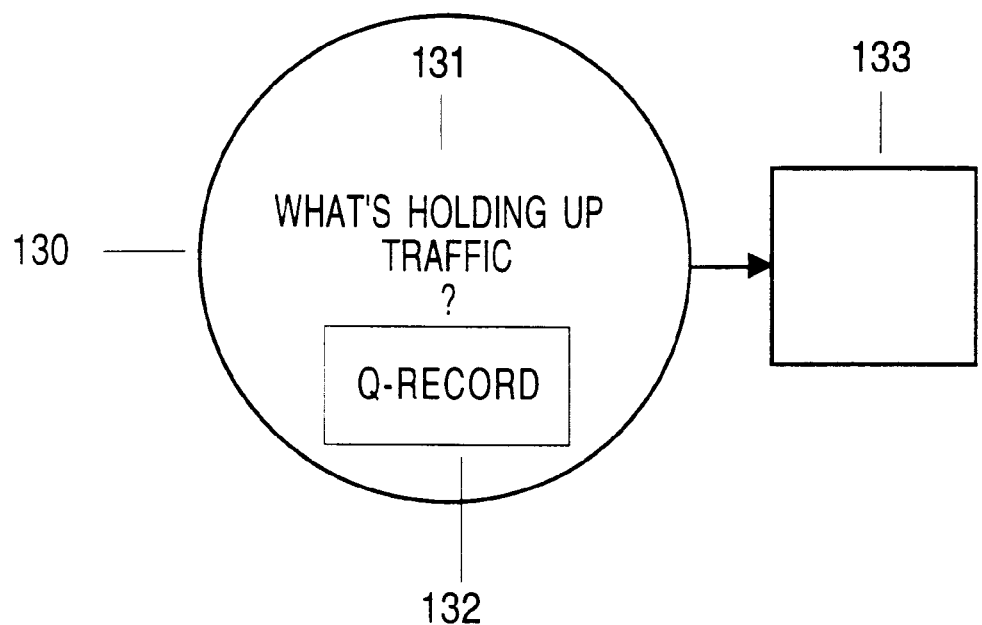
FIGURE 5.11

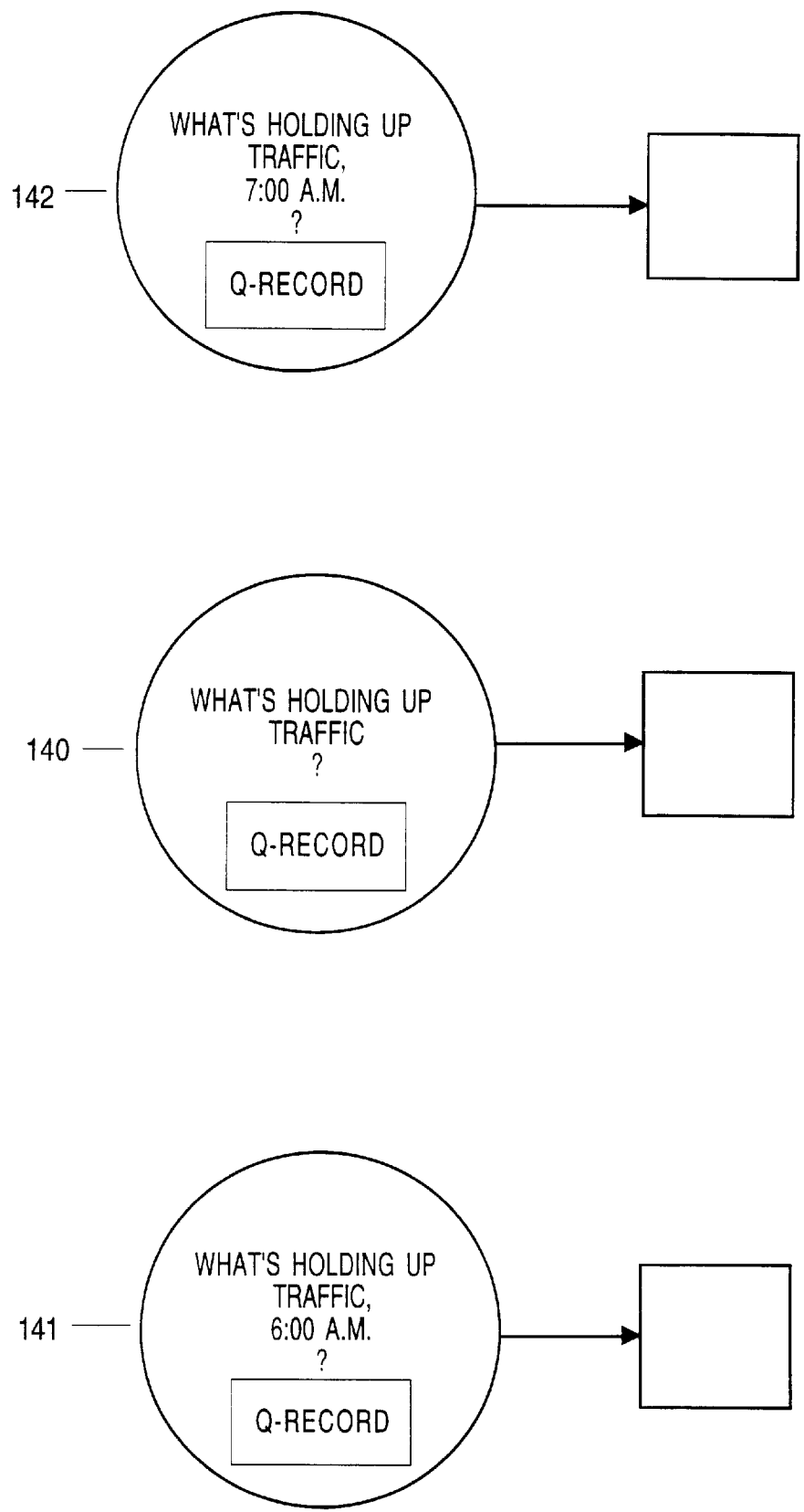
FIGURE 5.12

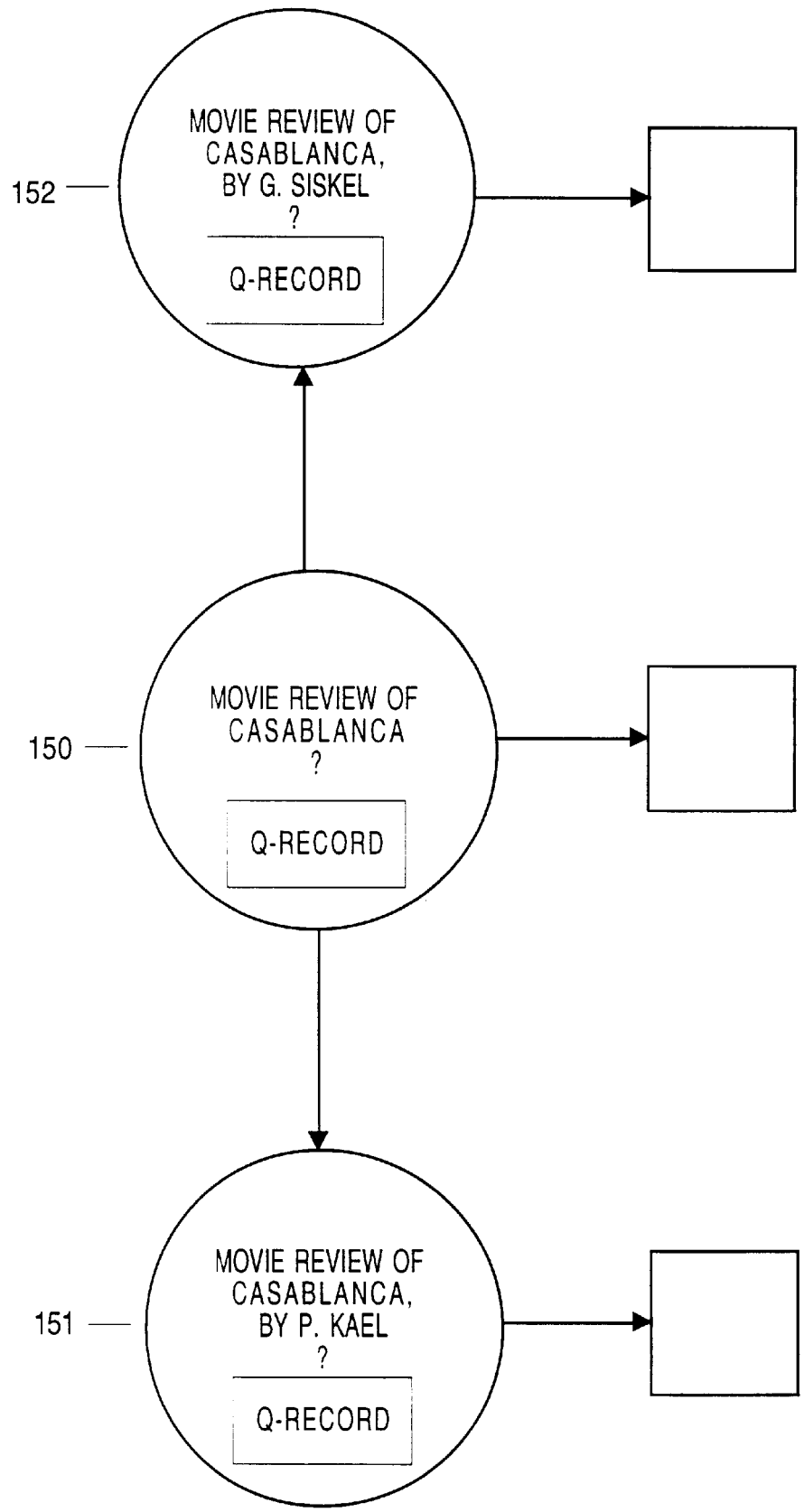
FIGURE 5.13

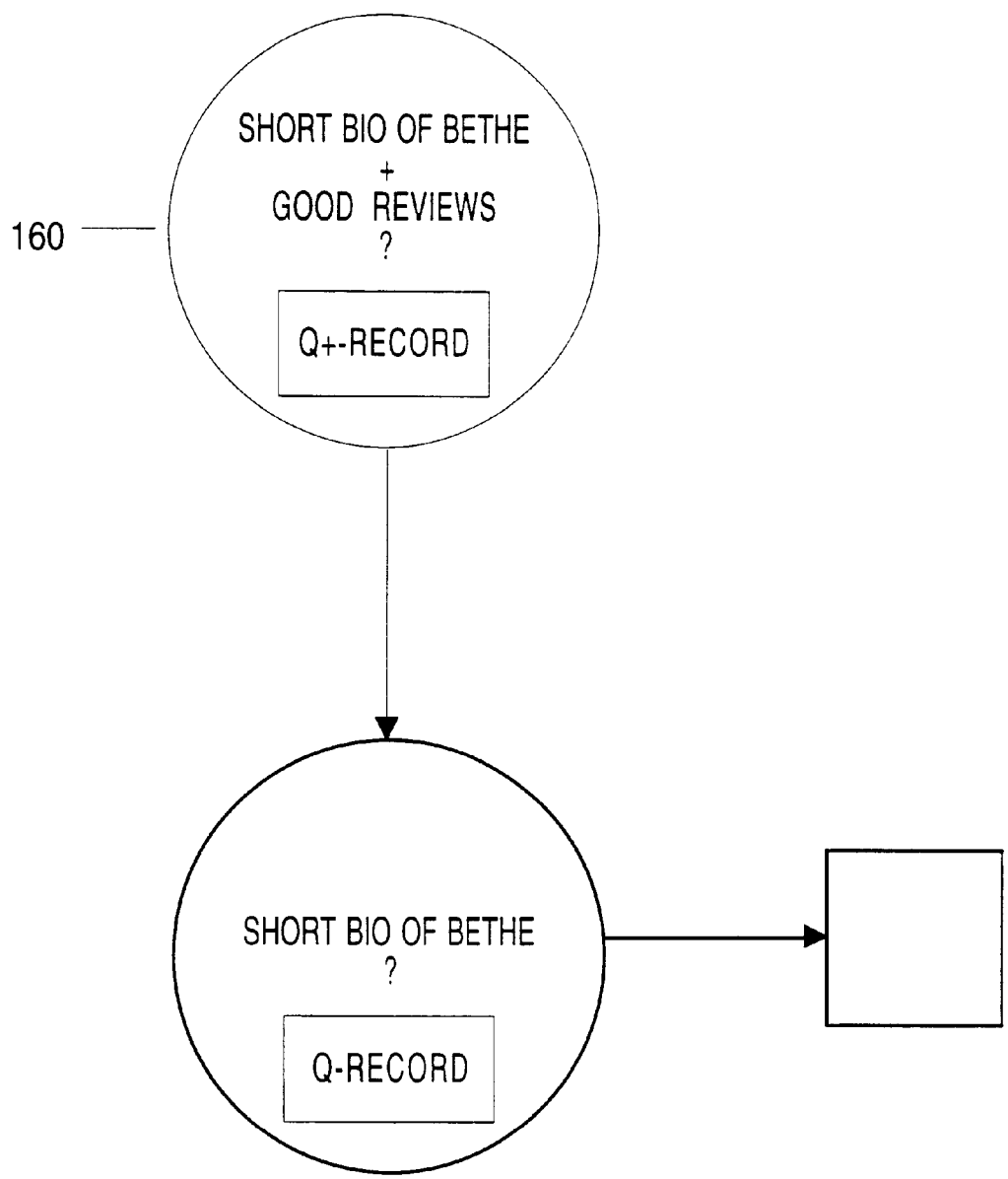
FIGURE 5.14

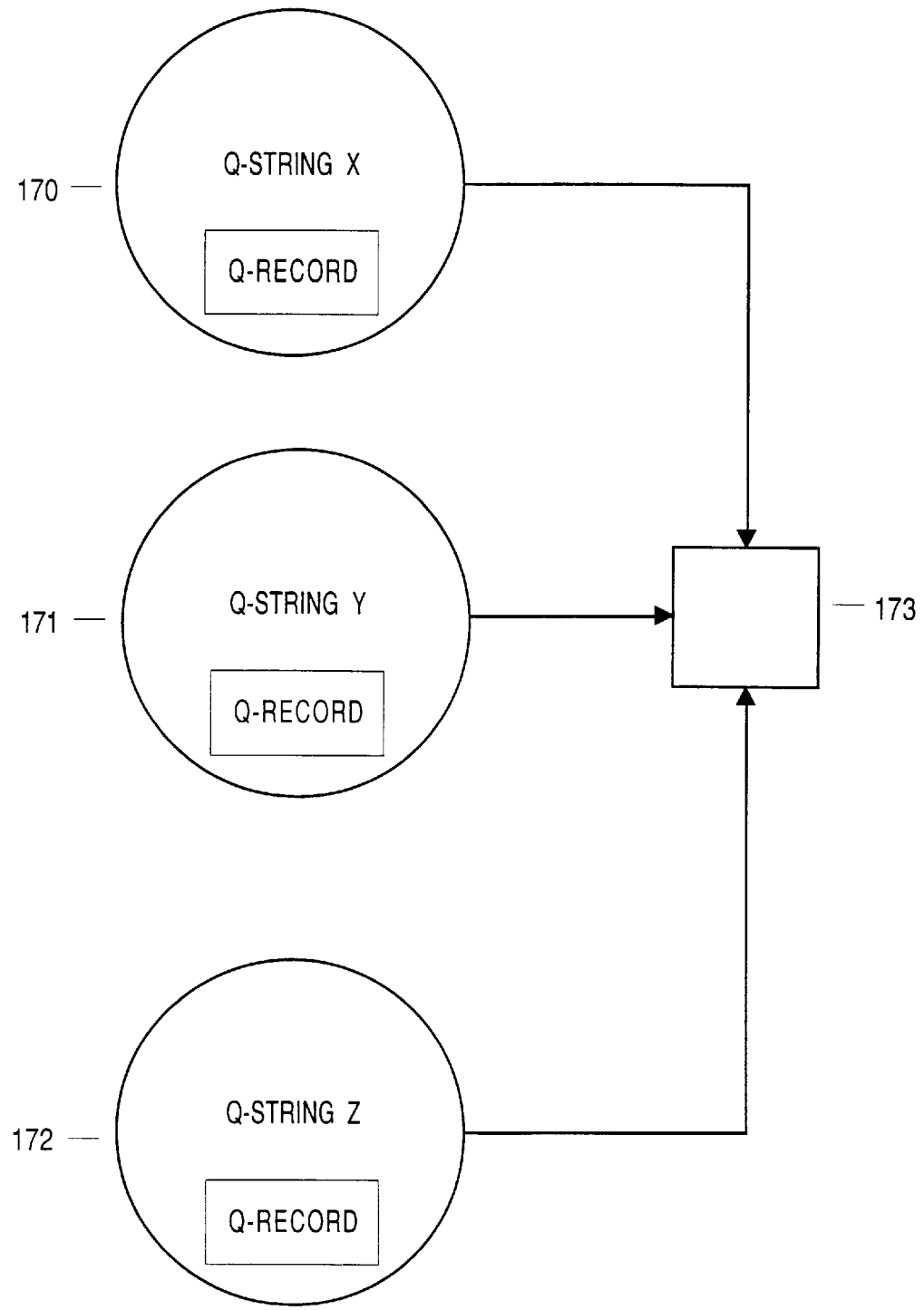
FIGURE 5.15

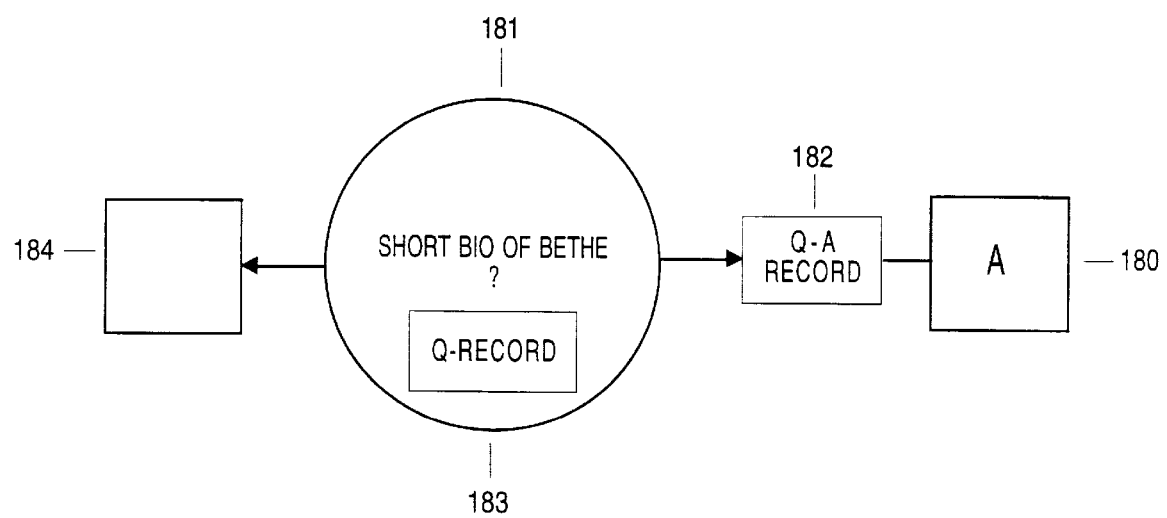
FIGURE 5.16

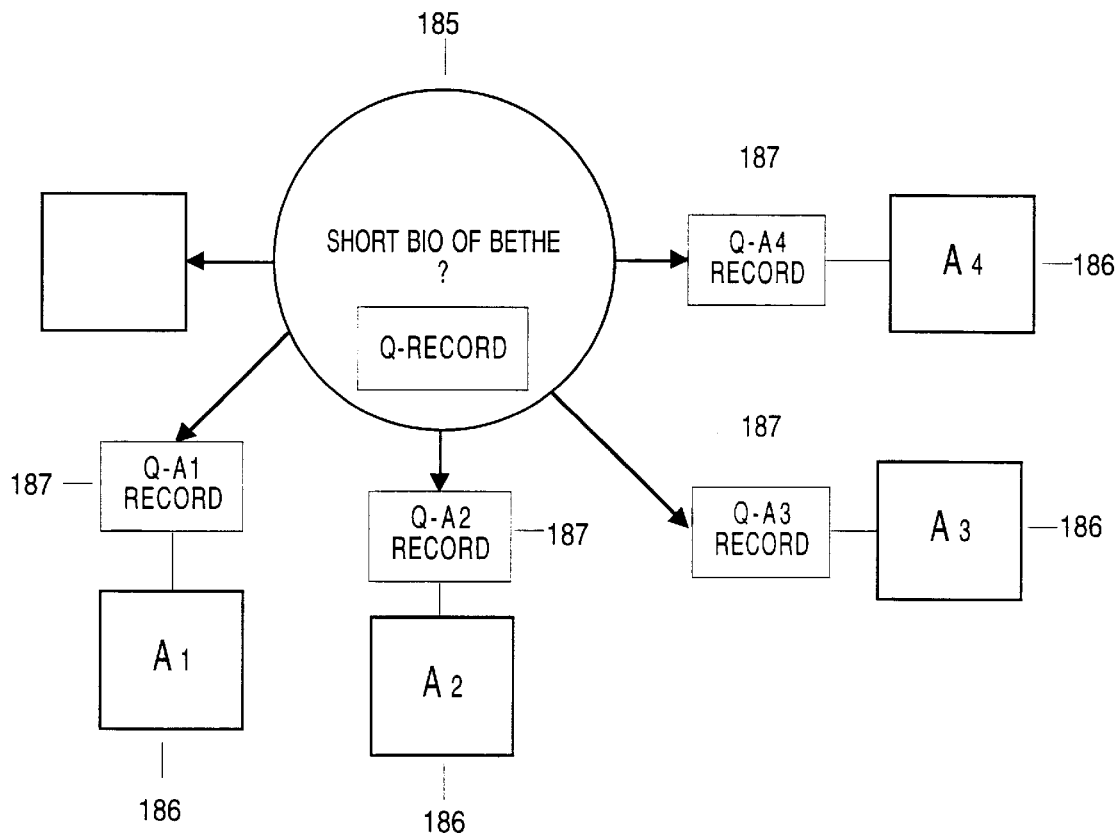
FIGURE 5.17

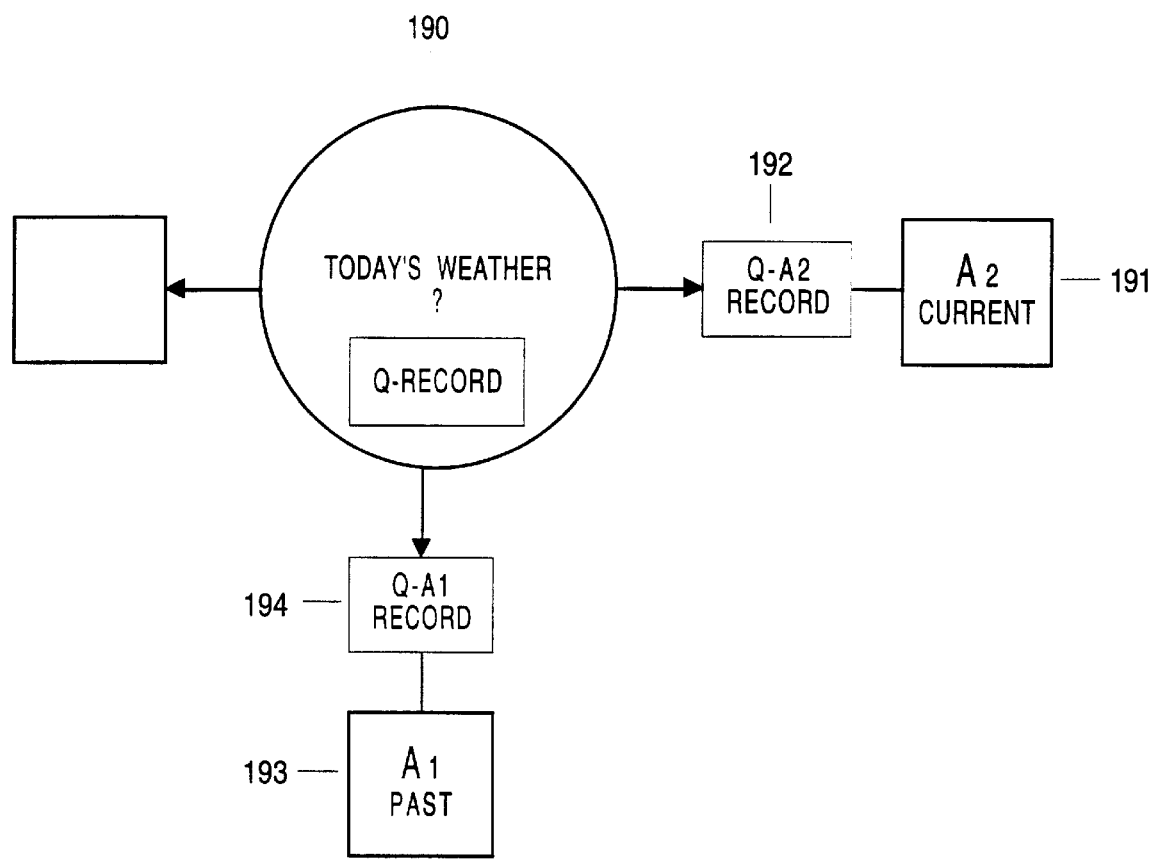
FIGURE 5.18

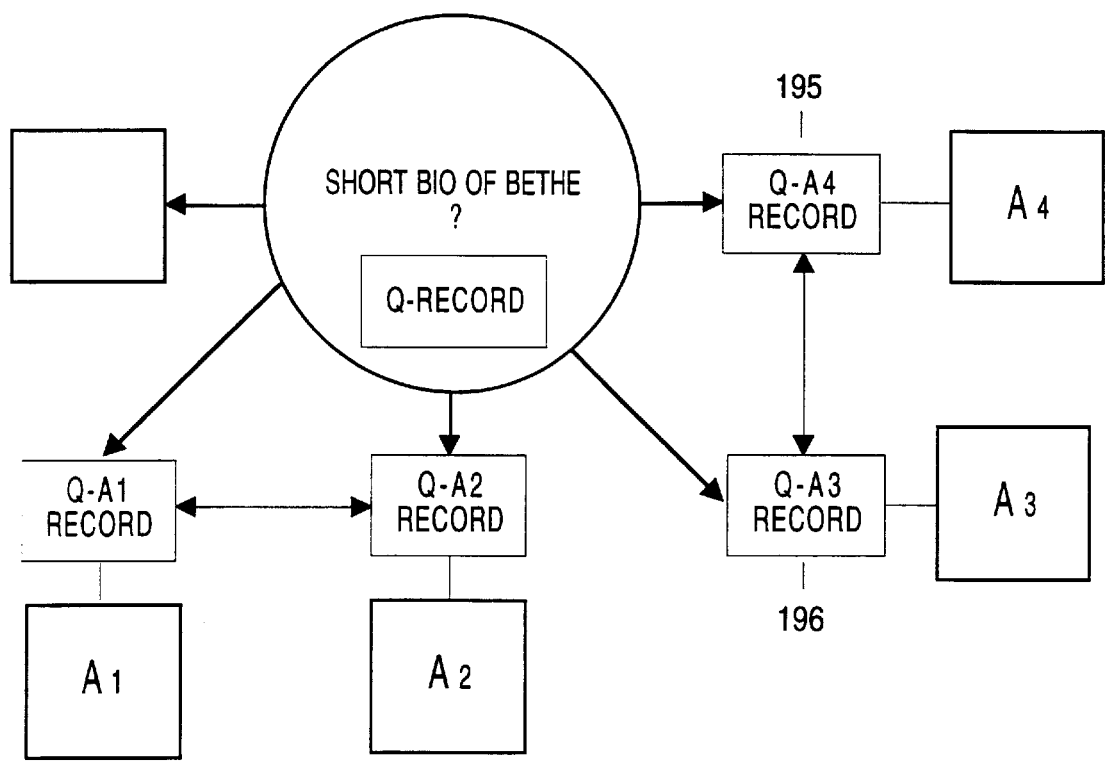
FIGURE 5.19

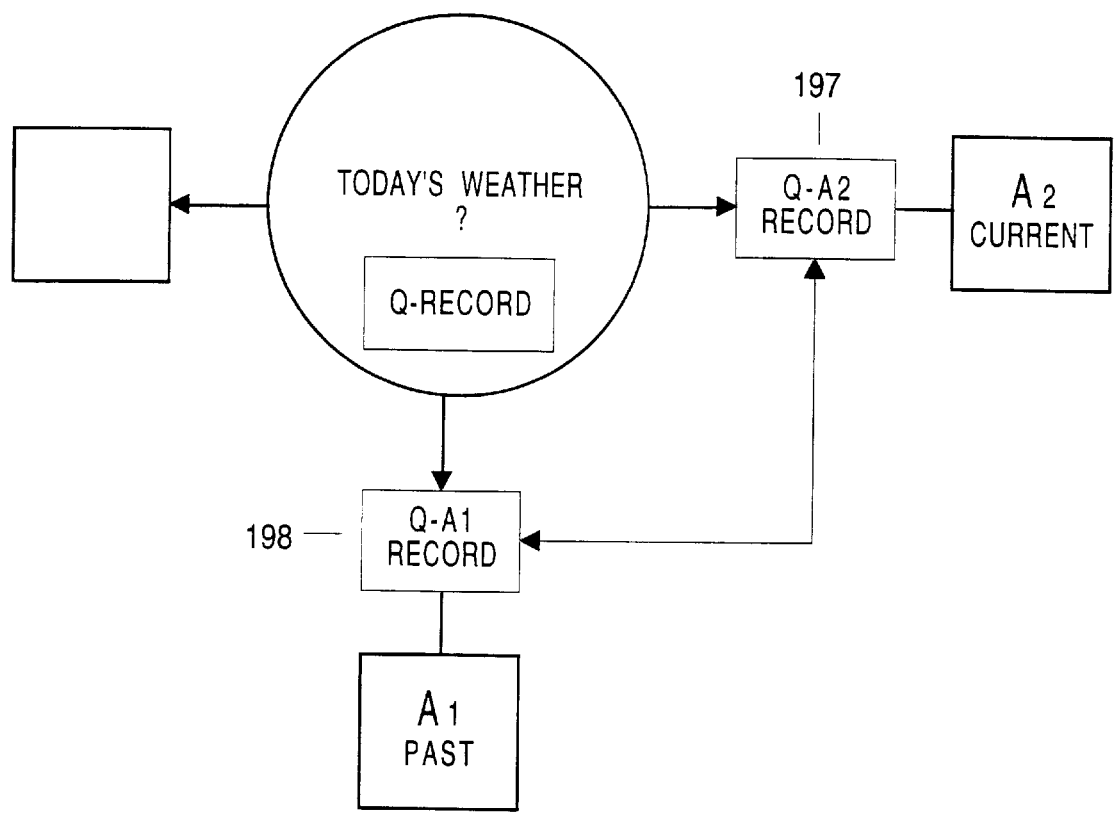
FIGURE 5.20

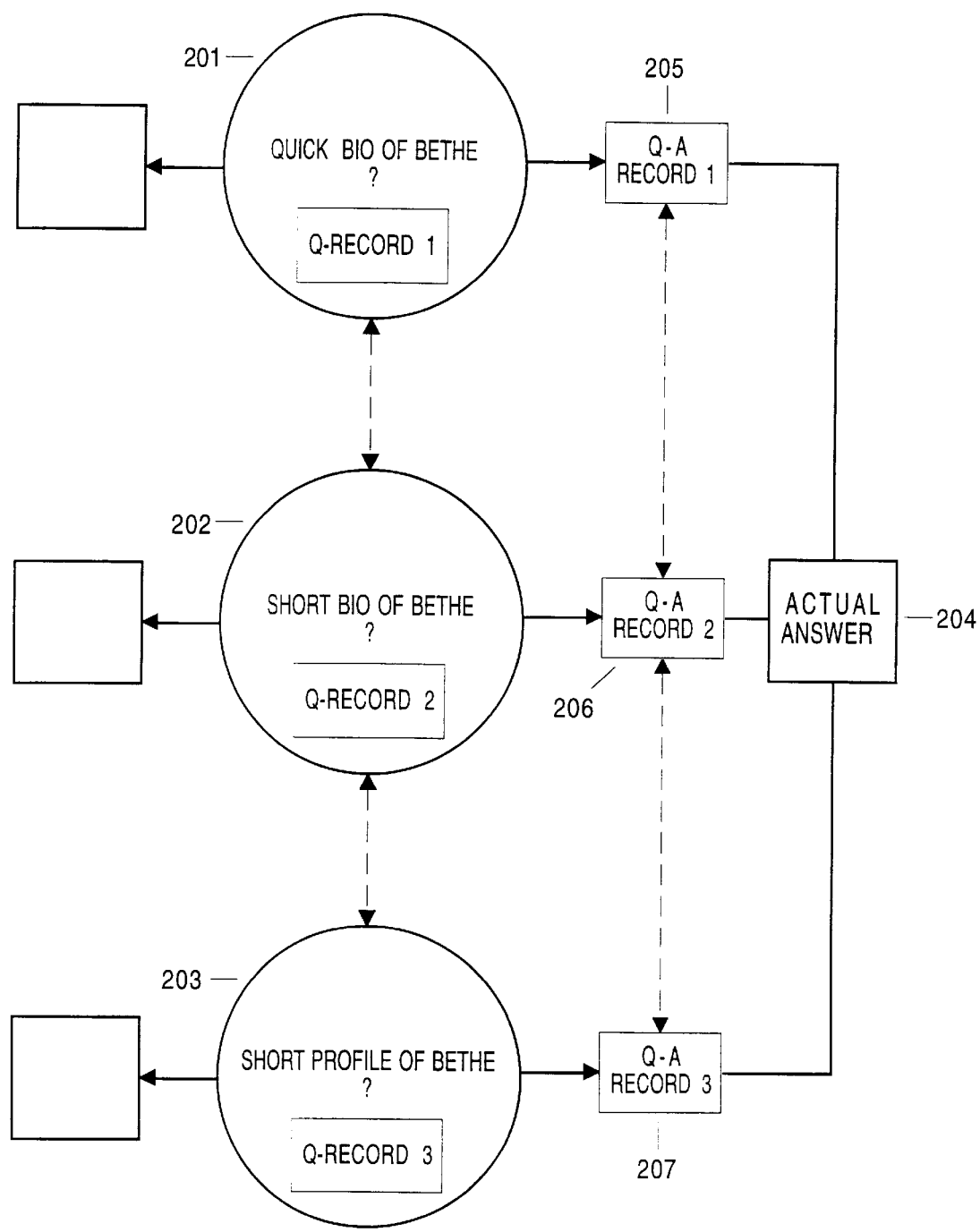
FIGURE 5.21

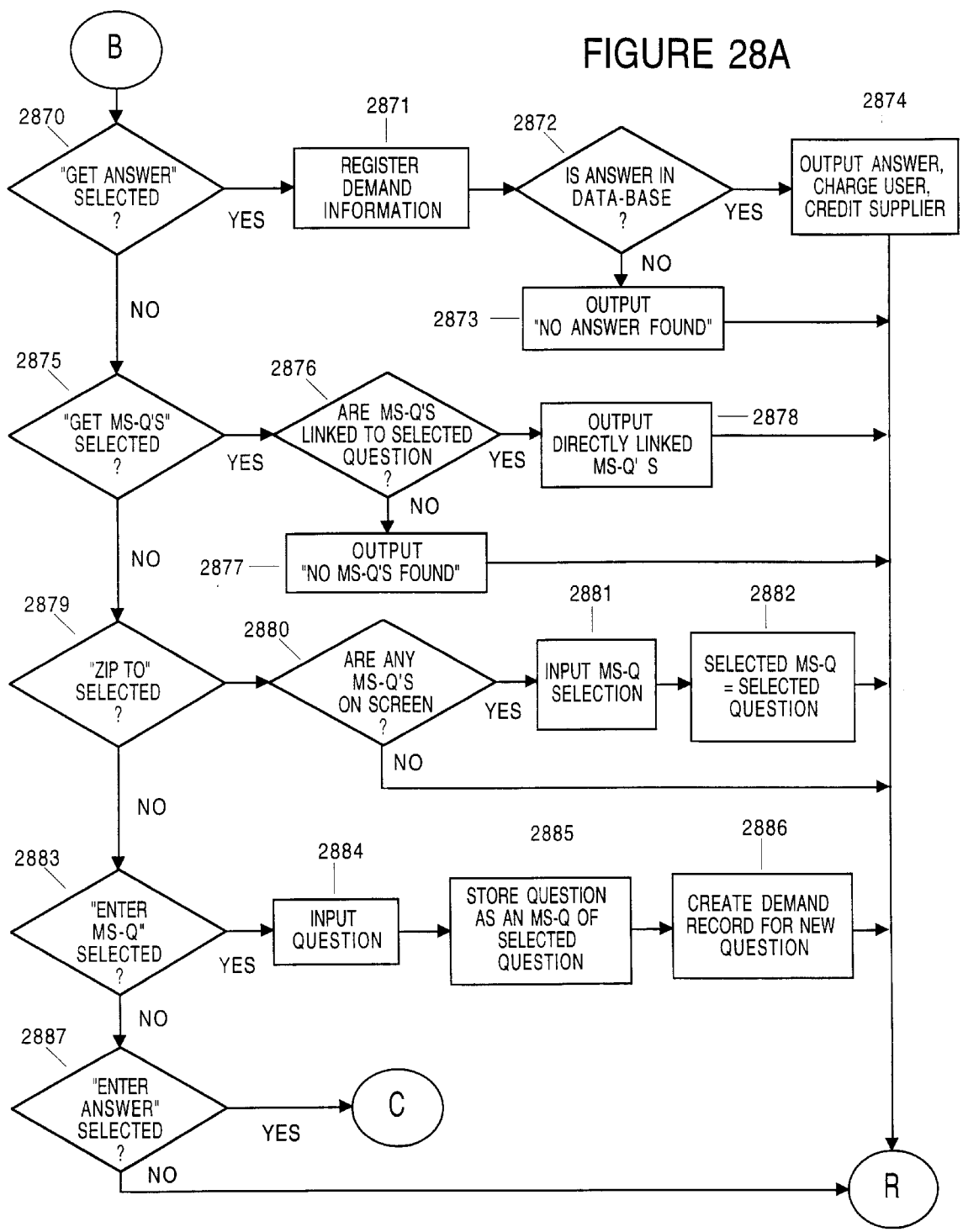

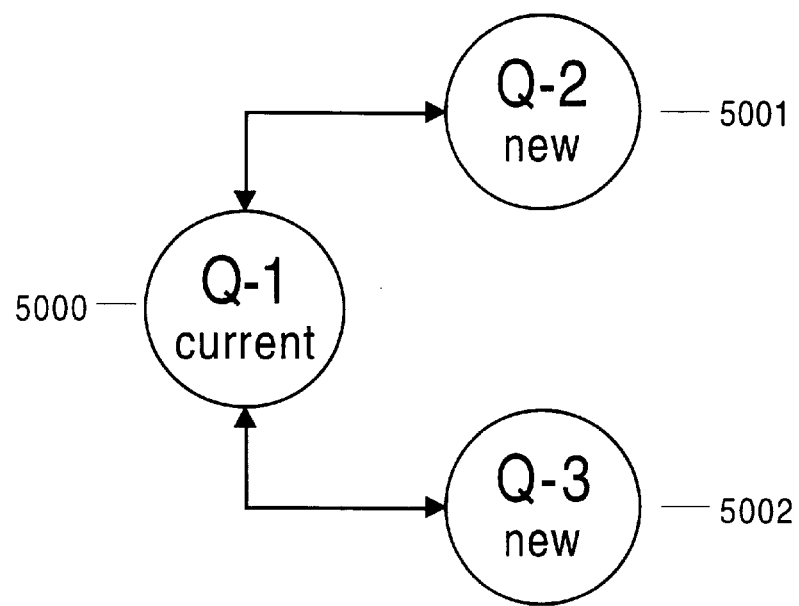
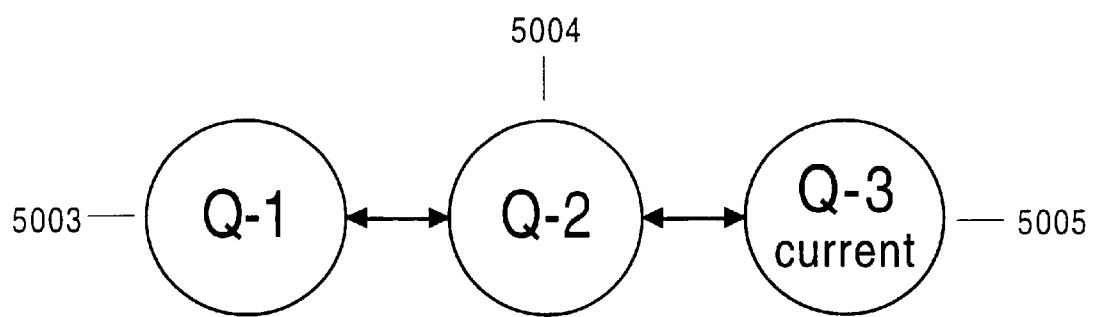
FIGURE 32

ANSWER COLLECTION AND RETRIEVAL SYSTEM GOVERNED BY A PAY-OFF METER

CROSS-REFERENCE

This application (hereinafter referred to as CIP 5) is a continuation-in-part of application Ser. No. 08/640,132 (hereinafter referred to as CIP 4), filed Apr. 30, 1996, now abandoned, which is a continuation-in-part of application Ser. No. 08/526,497 (hereinafter referred to as CIP 3), filed Sep. 11, 1995, now abandoned, which is a continuation-in-part of application Ser. No. 08/389,405 (hereinafter referred to as CIP 2), filed Feb. 16, 1995, now abandoned, which is a continuation-in-part of application Ser. No. 08/327,704 (hereinafter referred to as CIP 1), filed Oct. 24, 1994, now abandoned, which is a continuation in part of application Ser. No. 08/072,386, filed May 21, 1993 now U.S. Pat. No. 5,359,508 issued Oct. 25, 1994.

BACKGROUND

1. Field of Invention

This invention relates to a fee supported data base system for community use.

2. The Prior Art

The primary prior art is U.S. Pat. No. 5,359,508, which describes a new type of online data base system. The system disclosed in this patent provides an economic solution to two critical problems of online data bases: what answers (data) to collect and how to collect them. The solution of the invention is to estimate the reward for supplying a given answer, and then report this reward to users who might be in a position to supply the answer. The estimate is based on how many people request the answer. Basically, the system tells users, "Hey, enter this answer and I project you will make x amount of money." Then, if the answer is supplied and used, those who used it are charged and the supplier is paid. This sequence can be viewed as a sort of economic feedback loop, and the system can be viewed as an economy where the products are answers. The point is not to summarize the original patent, but to say that it is a pioneer type patent that takes a sharp departure from previous approaches to data base system design.

The main goal of this patent was to describe the basic loop of this answer economy. The loop can be built upon. CIP 1 added new matter in three areas. First, it described a new feature for displaying the pay-off estimates of certain kinds of answers. Second, it described the collection of more information about the demand for an answer, particularly price information. Third, it described a form of the invention in which the system does not actually collect and output answers but collects and outputs information about the answers, including reference information telling where the answers can be found.

CIP 2 added more new matter, the most important being an interface and data storage procedure that lets people "talk" to the system in natural language.

CIP 3 added new matter including procedures for entering and displaying questions and answers, for registering demand for answers, and for granting property rights to users.

CIP 3 was also a rewrite of CIP 2 in order make the reading easier and better explain how the system could be adapted to collect and sell a wide variety of answers. In the rewrite several terms were changed in the interest of clarifying concepts. For example, in CIP 2 the term data request was often used for question. And the term data was often used for answer. CIP 3 kept more to the natural terms, question and answer. While the shift is semantic, rather than essential, there are reasons for avoiding the term data. Thinking about questions and answers is more natural than thinking about data-requests and data. We know a lot about questions and answers. We know that most questions are ambiguous. We know that some answers are permanent and some are not. We know that credibility counts. We know that people make mistakes when asking questions and giving answers. We know that many questions and answers are improvable. We know that the meaning of questions is subject to interpretation. We know that certain answers are mere suggestions while others are nearly certain facts. We know a lot more than this.

It's not a surprise that we know these things because questions and answers are what we use to communicate with each other and find out about the world. And so a system that lets us use these naturally can be a boon. That is what the invention is designed to do; it is an economic system that provides answers in response to questions. Thus, the change in terminology clarifies things and signifies a break from traditional data base systems which, of course, emphasize data.

While all the key methods and functions of the U.S. Pat. No. 5,359,508, CIP 1 and CIP 2 remain in CIP3, large parts of the CIP 2 are copied in an appendix, for legal reasons of maintaining disclosure continuity for priority purposes. Some of the "additional functions" described in CIP 2 are superseded by functions in CIP 3. Most all remain but are improved or elaborated on.

CIP 4, takes up where CIP 3 left off, mainly by continuing to describe how the system can handle natural language.

This application, CIP 5, takes up where CIP 4 left off, adding new material about how the system can handle natural language (Chapter 26). It adds material concerning quality control (Chapter 13), translation (Chapters 15 and 27) and the pay-off meter (Chapters 9 and 25).

Book Form, With Missing Chapters

This application is written in the form of three books. In order to adapt the invention to handle a wide variety of questions and answers, numerous features can be added to the basic system. These are conveniently explained in chapters.

Book I concerns the basic system and features that can be added to it. Book II concerns adapting the basic system to handle natural language questions and answers. The books are incomplete though. Many chapters are left unwritten. Others that are written can be expanded. Thus, while a table of contents is given, the reader will find several chapters missing.

Future continuing applications are planned that will expand both Books I and II. It should be noted that in many instances in Book I, we say things like, "as will be seen in Book II," or "this topic will be taken up in Book II." Often, those parts of Book II have yet to be written or expanded. We make these statements in this application because we intend to fill in those parts in a future application.

Book III concerns adapting the system to handle a variety of jobs.

SUMMARY OF THE INVENTION

The invention is an online system for collecting and selling answers. The system charges users who receive answers and pays users who supply those answers. The key to the system is a feedback mechanism, called the Pay-off Meter, that tells users what the estimated royalty value is for supplying a given answer. The Pay-off Meter keeps track of the rate of requests for an answer and from this rate projects an estimate of future sales of the answer if the answer is supplied. From this estimate of sales the Pay-off Meter calculates the projected royalties the answer will generate. Usually, the more requests in a period of time the greater the projected pay-off.

One crucial feature of the system is that the projected pay-off is shown to requestors of an answer. The beauty is that, if the answer is not in the system, a requestor may have to find the answer anyway elsewhere. To collect the pay-off, a requestor then has only to "call" the system back and input the answer. A sensitive feedback loop is created such that the more an answer is requested the more likely, on average, it will be supplied by a requestor or by someone a requestor tells of the pay-off. Moreover, this pay-off is an incentive to correct or update faulty answers.

BRIEF DESCRIPTION OF DRAWINGS

FIG. 5.10 shows a another view of a question display menu.

FIG. 5.11 shows a question location.

FIG. 5.12 shows a question location and question specifiers.

FIG. 5.13 shows form linked question locations.

FIG. 5.14 shows a Q+ leading to a question location.

FIG. 5.15 shows three question locations with the same missing answer.

FIG. 5.16 shows a question location with an actual answer.

FIG. 5.17 shows multiple Q-A-locations as part of a question location.

FIG. 5.18 shows a question location with a current and a past answer.

FIG. 5.19 shows two links between Q-A-locations.

FIG. 5.20 shows a link between Q-A-locations.

FIG. 5.21 shows multiple Q-A-locations for the same actual answer.

FIG. 32 shows diagrams of basic steps for growing question networks.

APPENDIX FIGURES

Figure 1:
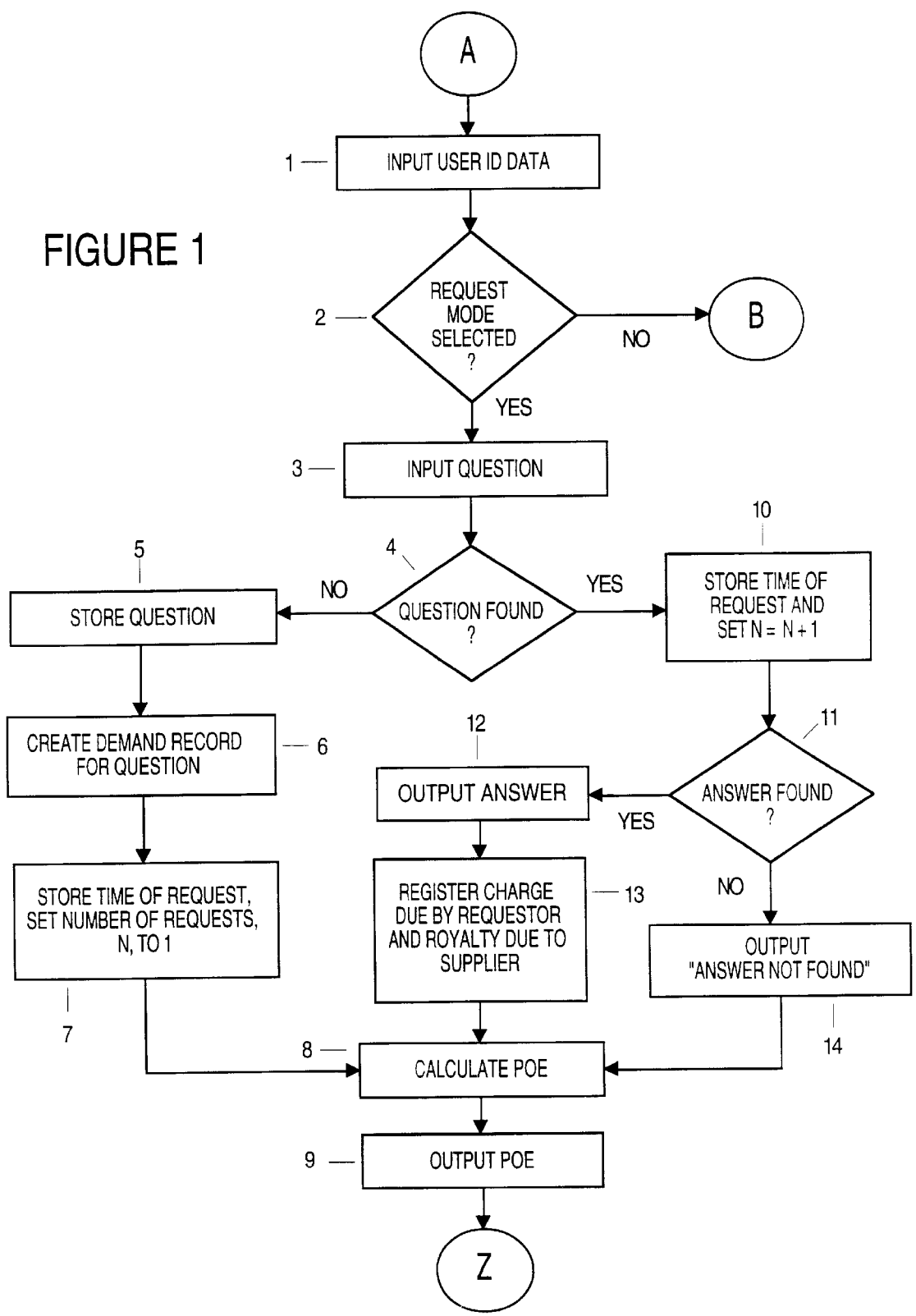
FIG. 1 shows a flow chart of the basic system.

FIG. A-1 shows a flow chart of the basic system.

FIG. A-2*a* shows a flow chart of the Request Mode of a lowest price locator.

FIG. A-2*b* shows a flow chart of the Supply Mode of a lowest price locator.

FIG. A-3*a* shows a flow chart of steps for gathering of information on what users are willing to pay for given answers.

FIG. A-3*b* shows another set of steps for gathering of information on what users are willing to pay for given answers.

FIG. A-3*c* shows another set of steps for gathering of information on what users are willing to pay for given answers.

FIG. A-3*d* shows another set of steps for gathering of information on what users are willing to pay for given answers.

DESCRIPTION OF THE INVENTION

INTRODUCTION

Goal of the Invention

The goal of the invention is straight out of science fiction. It is to make a computer system that will answer any question posed to it. Of course this goal will not be reached, but why not? What's the problem? Well, there are lots of problems. But is there a main problem?

Yes. The problem is, to find answers requires labor. One may pose a question fairly easily, but someone has to expend effort to find the answer.

Now certain questions may be meaningless, such as, Do blobs have livers?. Certain questions have answers that are not very suitable to put in a computer, such as, What does a hamburger taste like?. And certain questions may be impractical to answer, such as, How many grains of sand are there exactly on the Earth?. The universe of such questions seems far vaster than the universe of questions whose answers can be found and put into a computer. That is beside the point though. There is a great universe of questions whose answers are conveyable by computer, provided people can and want to make the effort to find those answers and then enter them.

Even the labor involved in entering answers can be a crucial obstacle. For example, there currently is no good, central, international directory of phone numbers or E-mail addresses. Why not? People know their own numbers and addresses. The information is simple. Why not enter it into some central data base? The cost seems small, yet it is enough to prevent the formation of just such a central directory.

And so, we see that the main thing stopping us from having our science fiction computer is the labor required to find (and sometimes enter) the answers.

How then do we get the answers in? In general, to get people to expend their labor, we must pay. So how does the system get answers in? Well, it pays for them.

But with an infinity of questions and answers, which answers does it pay for and how does it decide how much to pay?

Which Answers? That Depends on the Questions

The system is designed to store answers that users ask for. The way people ask for answers is by posing questions. So the process begins with questions not answers. Thus the invention is not just a system that stores answers and outputs them in response to questions, it is a system that stores the questions themselves. It might be called a question base, as well as an answer base.

When we say that the process begins with questions we mean that the first step to getting an answer into the system is for a user to enter the corresponding question. For example, a user might enter What is Leona's telephone number?. If the question has not been asked before, the question is stored. Presuming Leona's number is eventually entered, it will be stored to correspond to the question.

How Much to Pay?

Still, how much should the system pay for answers that have been requested?

Well, the payment offer must be economically sensible, meaning that the income that the answer generates should equal or exceed the amount paid to get the answer. In other words, the system should not pay more for an answer than it will receive from users who find that answer.

An Agent and a Market

But the system cannot know in advance how much will be paid for an answer and so the system does not actually buy answers. It lets users who provide the answers take the risk that the answers will be bought. Then it pays these suppliers royalties on actual sales. Thus the system acts as an agent and a market, but not as a middleman who buys an answer and then resells it. How much does the system pay then? It pays a share of sales.

Now the system can also act as an owner of answers. Once the supplier of an answer is paid off, the system may take ownership. And the system may also act as a trustee, putting an answer in the public domain. The system may or may not charge for answers in the public domain.

Projecting Sales, the Critical Thing

So the key idea is to try to find out how much buyers are willing to pay, in total, for a given answer. The system must try to project the total sales of an answer in order to give the supplier a realistic idea of how much he will get for supplying the answer.

Therefore, the critical thing the invention does is estimate the sales that an answer will have. The invention does not solve this problem perfectly but well enough to serve in a broad number of cases. (As will be seen later, because of the difficulty of estimating sales, the invention may not necessarily give a sales estimate. It may only give demand information so users can estimate the sales themselves).

Among other things, the invention registers how many users are interested in an answer, when they are interested, how much they are willing to pay, and other demand information. Then it converts this information into a projection of total sales. From this sales estimate the system can then estimate the reward, the royalties, a person will get for finding and entering the answer into the system.

We call this estimate the Pay-off Estimate (POE) because it signifies the pay-off for supplying an answer. The POE is a projection of income though, not a guaranteed offer. The system pays royalties on the actual income generated. For example, let's assume that 40 people a week request the Smithsonian's general information number and that that telephone number is not yet in the system. From this weekly tally of requests the system might estimate that there will be 2,000 requests a year, and the system outputs a POE based on that estimate. Then let's say a user supplies the telephone number and that the actual tally of requests is 2,500. Further let's say that the system charges 10 cents for the Smithsonian's number. Then the total income is $250 for the year. The supplier would get a share of that. But if by chance the Smithsonian's number changed immediately after the supplier entered it, the supplier would probably get nothing (the payment depends on the rules that apply).

We give the name Pay-off Meter to this machine implemented process that outputs a POE. We use the term "meter" because the process is like that of any meter. For example, a meter that measures electricity usage collects information about the flow of electricity through a line. Then, using mechanical or algorithmic means, it converts this information into a number. And then it displays the number. The number provides useful feedback about the electricity usage. Likewise, the Pay-off Meter collects information about an answer, converts this information into a number and, displays the number, which provides useful feedback about the answer. In this case, the number tells the projected reward for providing the answer.

A Crucial Trick

But who should the POE be shown to? The system cannot broadcast the POE to all users because most every one would be uninterested. Who then to show it to?

Here we come to another crucial trick of the invention. The system shows the reward to the requesters themselves of the given answer. Requestors have the greatest interest in finding the answer, and are often in the best position to find it or to tell others who may be able to find it. For example, if someone asks for a phone number that is not in the system, she would see (or hear) the POE for that phone number. As mentioned, to collect the pay-off, any requestor has only to "call" the system back and enter the answer.

To see the feedback loop created, pretend one users asks, What is the boiling point of jello? and is willing to pay 5 cents for the answer. The system might announce a projected pay-off of, say, 4 cents for providing the answer. Given this small pay-off prospect, the answer may not be supplied. But if fifty people have the same question, each willing to pay a nickel, then the pay-off estimate may be, say, $2.00. Given this higher pay-off prospect the answer will probably have a higher chance of being supplied. (And might also, in general, cost less per person.)

Of course, this reasoning does not hold for all answers. For example, everyone on the planet may want to know how to cure all cancers and stop all wars, but that does not mean that there is a good chance that the answers will be provided.

In general, if people are willing to pay more in total than the cost of finding and entering an answer, then there is a reasonable chance that the answer will be found and entered. That's why the system can be called a self organizing data base.

It can also be considered a self-correcting data base in the sense that users are also rewarded for correcting, updating, adding to, and otherwise improving answers that are in the system.

The system is "Governed by a Pay-off Meter" in the sense that the system's essential feedback mechanism is the part that produces a pay-off estimate, the signal that tells which answers are worth finding and entering. The term governed is used because it is reminiscent of the Watt governor, the critical feedback mechanism of the Watt steam engine.

A New Name

In U.S. Pat. No. 5,359,508, and CIP's 1 & 2 the invention was called a Self Organizing Data Base and abbreviated as SODB and sometimes SOD. While that name is still apt, from here on the invention will be named AC instead. Why? Because it's easier to say than "SODB" and because it pays tribute to Isaac Asimov, who told the tale of AC, a computer that answered every question (in the story The Last Question).

The Range of the System?

What is the range of questions and answers that AC can accommodate? No one can say because questions are general tools for probing the world, both the real world and the world of abstractions. What is the range of the real and abstract world? It is too broad to understand, no less describe. All the inventor can say is that the system can be adapted to handle most of the types of questions we ask each other.

These types include questions that call for answers that are true, answers that are guesses, answers that contain probability estimates, answers that are suggestions, answers that are opinions, answers that require audio or visual information, answers that are a few characters long, answers that are volumes long, and so on. To give just a handful of examples, questions like: What is Lincoln's Birthday?, What is the best way to make a toll-house chocolate chip cookie?, What might be the directions to the nearest 7–11?, What is the best guess as to who will win the next Presidential election?, Who is the best candidate?, Was Joan of Arc framed?, What is the text of Moby Dick?, How do you change a tire, a video tutorial please?, How do you cure leukemia?, Why is the top quark so heavy?, What's a picture of an arterial plaque?, How about an atheroma?, What is the definition of entropy?.

Variety of Possible Features

These examples can only hint at the range of questions and answers we commonly use. To handle such a range, many problems need to be overcome. There is no single solution to these problems. And so the system can include numerous features for handling the wide variety of questions and answers that we deal with.

As an analogy, we can think of the wide variety of systems that people have come up with for selling products: from vegetable stands, to vending machines, to grocery stores, to department stores, to catalogues, to movie theaters, to travel agencies, to auction houses, to brokerages, to stock markets, and on and on. All these have certain essential elements in common: a product, two parties, and a payment. There is great variety because the variety of products is great. All kinds of agreements and descriptions of the products can be added to the selling situation, for example, advertising, product guarantees, deposits, anti-theft penalties, product reviews, package labeling and more, of course.

Likewise with answers as products. Because the variety of answers is great, a system for selling the answers can include a variety of different features. And so, the invention can be seen as a basic system that can have many options added to it, depending on the particular type of answers involved and the needs of users.

Menu and Sub-Menu Approach

We will describe numerous useful features that the invention can include. After the basic system is described, we will often show these options in a menu form, though given implementations of the system may not include an actual menu. We present them this way for clarity's sake, to show what the users can do, what the invention does for users, and how it does it. Which options a designer chooses to include in an actual implementation depends on the application. The variety is simply too great to say that there is a preferred embodiment.

For convenience, we show the options as they could, in a limited way, appear on a screen display (the illustrations are crude and are meant to get the key ideas across). We do not show voice input and output means, though we realize that these means are very useful. Some of the options disclosed are not suited to voice output.

The goal then is to describe the key steps and functions that the invention can include. Numerous modifications and adaptations will be apparent to those skilled in the art without departing from the spirit and scope of the present invention.

Notes on Style

The description will include colloquial expressions that, hopefully, will make the description clearer. AC will often be referred to anthropomorphically, though it is understood that AC is a computer system that must include computer based means for executing its tasks.

Thus, when we say, for instance, that AC does something, we mean that AC includes functions for performing that something. These functions are readily implementable by persons skilled in the art. When we say that AC asks the user to do something we mean that AC prompts the user in some way to enter information. When we say AC enables the user to do something, we mean that AC includes means for enabling to the user to do that something. Again, these means are readily implementable by persons skilled in the art. When we say the user does something, we also mean that AC includes functions for enabling the user to do that something. And so on and so forth. The essential parts of these means will be described, unless those parts are obvious to persons skilled in the art. The aim, of course, is to describe what is new.

Part I

The Basic System

Chapter 1

The Necessary Functions

Below are basic explanations of the functions that the system requires. By function we mean a set of steps that the system's computing means execute. Another term we will use for a set of steps is a procedure.

The explanations below are not comprehensive. They get the main ideas across but most concern subjects that can be delved into at length. Several of the subjects will be discussed in more detail as the need arises to show how AC can be adapted to collect and sell a wide variety of answers.

Some Definitions and Comments

Question: A set of information corresponding to another set of information called the answer.

Answer: A set of information corresponding to another set of information called the question.

Rules Concerning the Correspondence Between Questions and Answers: There really is no such thing as the correspondence. When we say correspondence we may be referring to many things, most of which we don't understand well, if at all. For our purposes right now, we will be referring briefly to two senses of the word. One, there is a correspondence between questions and answers inside AC. AC includes internal rules, embodied in functions, for storing answers to correspond to questions, for finding answers in response to questions and, for outputting answers in response to questions. Two, there is a correspondence in the minds of users. For AC to succeed, users must understand what is considered a satisfactory answer to a question and what answers can replace other answers. And so AC must have external meta-rules that define what answers satisfy questions. No set of rules, internal or external, will perfectly define what answer best satisfies a question, which means that disputes can arise. These can be mediated by a System Manager. (The correspondence rules for questions and answers are fundamental in designing given implementations of AC, therefore this issue is discussed further in several places in the description (see chapters 4 and 5).

Sub-Answer: Depending on the correspondence rules of a particular AC, the system may enable users to enter answers that can be called sub-answers in the sense that they are used in combination with other answers to form another answer. For example, if the question is, Who are the major steel producers in the US.?, different users may supply the names of different steelmakers and these sub-answers can be combined into a list of steelmakers.

Request: A question entered by a requestor who wants to buy the corresponding answer. (Classifying requests can be tricky, see chapter 6).

Answer-Use: When AC uses an answer, especially when AC charges for the use.

Classifying Questions and Answers: There are potentially infinite types of answers and answer uses. Presuming AC collects different types of answers and enables different types of answer-uses, it must distinguish between them for the purpose of registering demand information and charges and royalties. For example the use of $\pi$ may be given a different royalty value than the use of the date of Lincoln's birth or the use of a passage from Shakespeare. Moreover, the use of a sequence of $\pi$ in a formula may be classified differently than the answer to the question, What is the value of $\pi$ to ten decimal places?. The classification possibilities are infinite.

Request Mode: The procedure AC executes to register demand information for answers, and to provide answers and/or Pay-off estimates to users. A user selects Request Mode in order to find an answer or express interest in an answer. The user enters (or selects) a question. If the question is new, AC stores it. If the question is already in the system, entering it causes AC to search for the corresponding answer. If the answer is not found, a Pay-off Estimate is outputted. If the answer is found, the answer is outputted along with the Pay-off estimate and a Charge is registered to the user. (Depending on the implementation of the system, the user may have to confirm that he wants an answer before AC outputs it). Whether the answer is in AC or not, AC registers demand information about the answer.

Supply Mode: The procedure AC executes to allow users to enter answers. User identification data is registered along with an answer so that the user can be credited with royalties each time the answer is used. Most simply, in supply mode a user enters (or selects) a question and AC then enables the user to enter a corresponding answer. If the question itself is new to the system, AC first stores the question.

(Note: the term mode is used as a convenient way to describe separate paths of steps. It is not meant to have any special, technical connotations beyond that. The system can enable users to switch easily between modes, with a single command.)

Requestor: User who accesses request mode seeking an answer. The requestor normally owes a charge if the answer is found and outputted.

Supplier: User who accesses supply mode to enter an answer. The supplier gets paid a royalty each time the answer is used as determined by the royalty rules of AC.

User Record: The user record is where AC stores various information about a user, including at minimum, payment information. AC can store a wide variety of information about a user's use of the system.

Charge: The amount owed by a requestor who receives an answer from AC.

Charge Rules: The rules, embodied in functions, that determine the amount an answer will cost a requestor.

Royalty: The amount owed to a supplier of an answer for the use of the answer.

Royalty Rules: The rules, embodied in functions, that determine the amount due to a supplier of an answer each time that answer is used (either outputted to a requestor or processed to yield another answer).

Payments Register: The function AC executes to register payments owed by requestors and payments due suppliers. When an answer is outputted, AC registers who is owed a royalty and who owes a charge. The payments due depend on the charge and royalty rules of AC. The point of the register is not that it is a distinct storage entity necessarily but that the system must have steps for registering charges and royalties. Payment records can be kept in user account files and in the Demand Record for an answer, as well as in a credit record for an answer. AC also has it own account where the system's books are kept.

Pay-off Meter (POM): The POM is the function that is the heart of AC. The POM has three aspects: Demand Records, the Pay-off Formula and the Input Signal.

1) Demand Records (D-record). A D-record is kept for each answer in AC. The D-Record, as the name implies, is where AC stores demand information about the answer. The information in the D-Record can be quite varied. At the least, a D-record will store the number of requests for an answer, the times of those requests, and the actual sales, if any, of the answer. Because an answer often will not be in AC, the D-record for an answer actually corresponds to a question. The question then corresponds to the given answer. So demand information about an answer is actually stored under the question that corresponds to the answer. (If an answer answers multiple questions, there can be a different D-record for each question). The D-record can thus be looked at as the D-record for a question. The process of collecting demand information under a question may seem straightforward. What is not necessarily straightforward, is what answer corresponds to the question.

2) The Pay-off Formula (POF). The information in the D-record for an answer is plugged into the POF for that answer. The POF calculates a Pay-off Estimate (POE) of the income a user will get for entering the answer. The POF can be highly varied.

3) Input Signal (I-Signal). The I-Signal is a name for the step(s) of outputting the POE and, if necessary, outputting instructions on how to enter an answer.

The POM works most simply when AC's answers are stored under questions and AC can find the answers by simple lookup. For example, a requestor may enter the question, What is Lincoln's date of birth?. AC will do a lookup. If the question is not in AC, AC will store it and create a D-record for it. Initially, the answer will not be in AC. Each time the question is entered, AC will register the request in the D-record for that question. AC will also register the time of each request so that the rate of requests over time can be calculated. This demand information will be fed into the POF to yield the POE. The I-Signal can output this POE to every requestor. Since answers are listed under questions, the I-Signal need not tell what answer needs inputting nor how to input it. It is assumed that requesters implicitly know that to enter an answer they simply access Supply Mode, enter the question, and then enter the answer. Once the answer is entered, AC continues to collect demand information in the D-record because the answer may need correcting or improving. The POM thus also provides requesters with the POE for correcting the answer.

Aspects of the POM functions are discussed a little more below.

Demand Record. As mentioned, the D-record for an answer is stored under the question that corresponds to that answer. However, since the correspondence between questions and answers is often unclear and unpredictable, the answer that the D-record applies to may be unclear. Thus, as mentioned, AC will include rules for dealing with the relationship between questions and answers, in order to make the demand information more reliable. We will give a short example to illustrate the trickiness of questions and answers.

Assume the question entered by a requestor is, What store has the lowest price on Sony Camcorder #1239?. Say there are 1,000 requests. Now it may be that ten stores have the same lowest price. What then is the demand for the name of a given store? That depends on how AC classifies the answer. AC will have default assumptions built into it to limit the size and number of answers outputted. For example, AC may have a rule that only the first store with the lowest price can be outputted as the answer. This store becomes the answer and all royalties go to the supplier of this store's name. Therefore, all other stores, even though they have the same lowest price are only potential answers (the first store may change its price so that another store takes its place).

On the other hand, AC can have a rule, for example, that all stores with the same price are equally part of the answer so the answer then has ten components. The demand rate for the store with the lowest price can then, for example, be divided by the number of components to arrive at a demand rate for each component.

And so the information in the D-record applies to the answers that the system outputs and charges for, but that in turn depends on the internal and external correspondence rules of the system.

These issues will be discussed in various parts of the description, especially in chapters 4 and 5 and in various chapters of Book II.

(Note: CIP 1 used the term "Demand Meter" to name the parts of the POM that keep track of demand information and calculate a "demand rate." Here we use the term demand record to name the part where demand information is stored. As for the part that calculates a demand rate, we now incorporate that into the POF).

Pay-off Formula (POF). The POF is the function that calculates a Pay-off Estimate (POE) for a given answer. The POF projects future sales for an answer based on the demand it has had in the past. Thus two variables are critical: the number of times the answer has been requested and, the times those requests took place. Based on the rate of requests for an answer the POF estimates how many future requests the answer will have. The POF factors in the price of the answer and the royalty rate to arrive at the POE. There are, of course, many other factors that can be used as well.

Like any equation for a projection, the Pay-off formula can be infinitely diverse based on historical data and other factors. For example, the formula could include a historically based assumption of when demand for an answer would end. The POF may contain estimates based on answers that are similar to a given answer. Also, the POF must have an arbitrary value for the POE when an answer has been requested zero times or one time. This value could be an amount or simply a message, "You are the first to ask this question."

There will be multiple POF's applied to different types of answers. There may even be multiple POF's for a single answer. These could give different types of POE's, for example a conservative POE or an optimistic POE.

Not only can the POF be infinitely variable but the information it yields can be of different types. Ideally the POF would yield a reliable cash POE. But that is not always practical for given answers. And so the POF might only process information in the D-record to come up with information that can help users arrive at their own POE's. In given AC's, the POF may allow users to manipulate different factors, such as the price of an answer, in order to arrive at a POE.

I-Signal. The I-signal is the function that is the output part of the POM, the signal that tells requesters what answer is needed, what the value is of supplying it and how to supply it. When a requestor requests an answer not in AC, AC outputs the POE. When a requestor requests an answer that is in AC, AC outputs the answer and the POE for correcting, updating or improving it. (The POE may be outputted only upon request rather than automatically). Usually, the answer needed is implicit from the question asked, though special input rules or restrictions may apply that the user is not aware of.

The I-Signal can include many other features for giving users POE information. For example, the I-Signal may include an alert function whereby a user can "ask" to be told if the POE for an answer rises above a threshold amount. The I-Signal can then send an alert to the user's E-mailbox if the threshold is exceeded.

Chapter 2

The Elements and Procedure for a Basic AC

AC Hardware Elements

AC is an online network of computers with terminals that feed into a central computing unit that stores and processes questions, answers and other information of the kind described above. When we say "central computing unit" we mean that users communicate with the same body of data, though that data may be physically located in different places. The terminals can be a variety of types from telephones to supercomputers. The network includes E-mailboxes for users.

AC Procedure

Figure 1A:
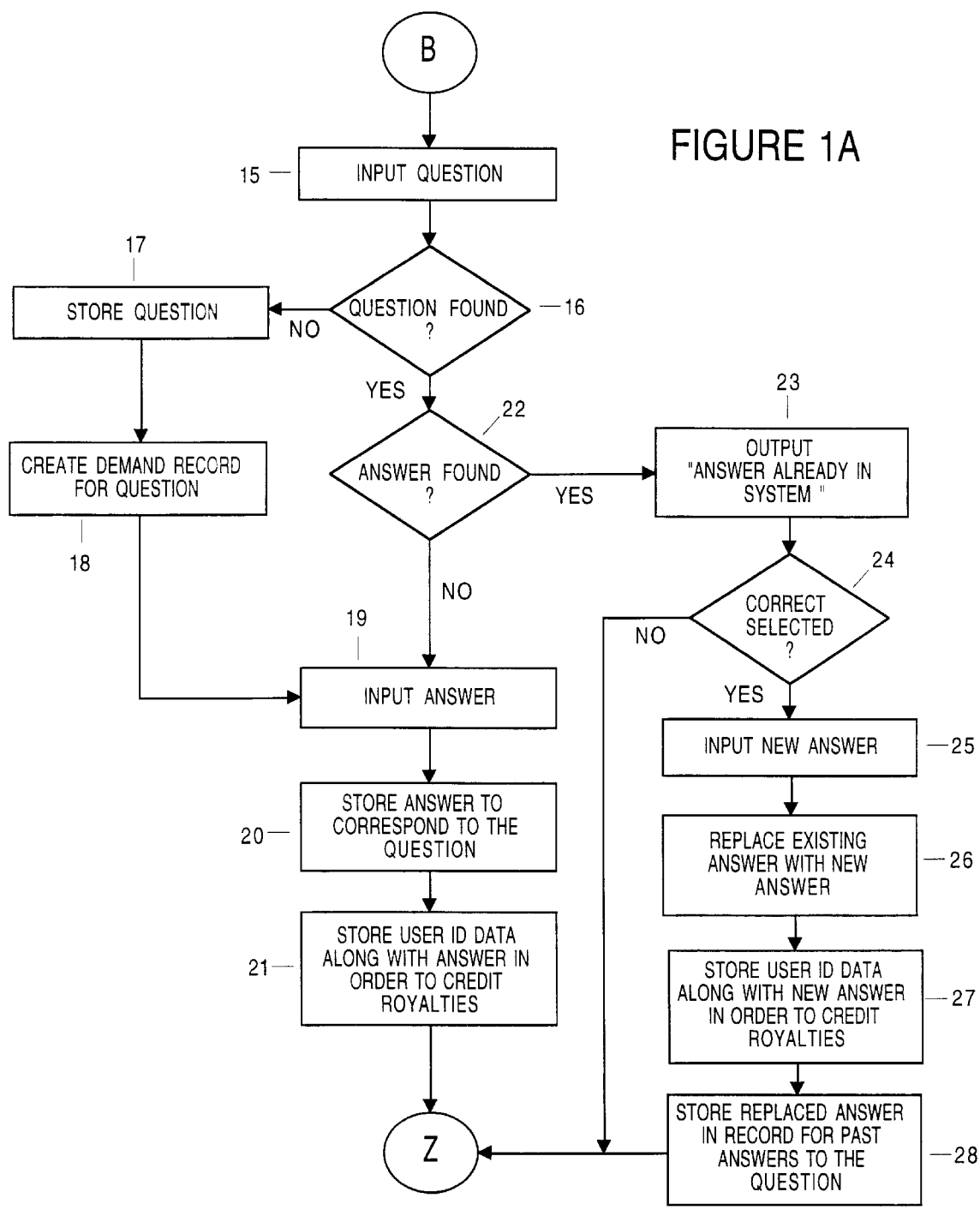

FIGS. 1 and 1a show the procedure that a basic AC follows, as explained below.

Start

User enters identification data, AC stores it 1.

User enter supply or request command 2, AC accesses the appropriate mode.

Request Mode

Requestor enters a question, AC inputs 3 the question and checks 4 if the question is already in memory, If the question is not in memory, AC stores 5 the question, creates 6 a demand record for the question, sets 7 the request tally in the demand record to one and, registers 7 the time of the request in the demand record, calculates 8 the POE using the POF, outputs 9 the POE.

If the question is in memory, AC adds 10 one to the request tally, registers 10 the time of the request in the demand record, checks 11 if the corresponding answer is in memory, If the answer is in memory, AC outputs 12 the answer, registers 13 a payment due by the requestor, registers 13 a royalty due to the supplier, calculates the POE using the POF, outputs the POE.

If the answer is not in memory, AC outputs 14 a message saying the answer is not in the system, calculates the POE using the POF, outputs the POE.

Supply Mode

Supplier enters a question, AC inputs 15 the question, checks 16 if the question is already in memory, If the question is not in memory, AC stores 17 the question, creates 18 a demand record for the question, inputs 19 the answer, stores 20 the answer to correspond to the question, stores 21 the supplier's ID data with the answer, in order to credit royalties.

If the question is in memory, AC checks 22 whether the corresponding answer is in memory, If the answer is not in memory, AC inputs 19 the answer, stores 20 the answer to correspond to the question, stores 21 the supplier's ID data with the answer, in order to credit royalties.

If the answer is in memory, AC outputs 23 a message saying the answer is already in the system, If the supplier enters a command 24 to correct the answer, AC inputs 25 the supplier's answer, replaces 26 the current answer with the supplier's answer, stores 27 the supplier's ID data with the new answer, in order to credit royalties, stores 28 the replaced answer, along with information stored specifically for that answer, in a record for past answers to the question.

This procedure is the basic loop of AC. AC can include many other useful sets of steps (functions). Before describing some of them, an embodiment is described, a self-filling telephone directory (the SFTD). Then an embodiment is described that does more than just look up answers under questions.

A Self-Filling Telephone Directory

1. The SFTD includes a list of names and corresponding telephone numbers, a computer for storing the list and functions for inputting information into the list, outputting information from the list and looking up information in the list.

2. The SFTD also has a sign-on function that allows users to identify themselves for billing and payment purposes. The SFTD stores this ID data.

3. Users access the SFTD by terminal connected to the SFTD central computer. The SFTD enables users to choose Request mode or Supply Mode.

Request Mode

4. Using the Request mode, a requestor accesses the SFTD list by entering a name (a question). The SFTD inputs the question and the does a lookup to see if it has a telephone number corresponding to the name.

5. If the SFTD has a number corresponding to the name, it outputs the number and registers the charge due by the requestor and the royalty due to the supplier. One is added to the POM tally of requests, the time of the request is registered, and a new POE is calculated and outputted along with the number.

6. If the SFTD does not have a number corresponding to the name, it:

a) it registers the time of the request, b) it checks if the request has already been stored in the POM register, b1) if not, it sets the request tally to 1, stores the request and defaults the POE to the message "Insufficient Data to Estimate Pay-off,"

b2) if the request is already stored, the POM advances the request tally by one and then calculates the POE using the POF, c) outputs the POE.

Supply Mode

7. Using the Supply Mode, a supplier accesses the SFTD list by entering a name (a question). The SFTD does a lookup to see if the name is in the list.

8. If the name is not in the list, the SFTD stores it in the list and then allows the supplier to enter the number. The SFTD stores the number to correspond to the name and stores the supplier's ID data along with the number in order to credit royalties.

9. If the name is in the list, the SFTD does a lookup to see if there is a corresponding telephone number. If there is no corresponding number, the SFTD stores it in the list and then allows the supplier to enter the number and stores the Supplier's ID data along with the number in order to credit royalties.

9. If there is a corresponding number already in the list, the SFTD outputs a message, "Number is already in directory." If the number needs correcting, the supplier then enters the command, CORRECT. The SFTD then allows the supplier to enter the number. The SFTD stores the number to correspond to the question, to the name that is, and also stores the supplier's ID data with the number, in order to credit royalties. The SFTD also stores the previous number and previous supplier ID data in a record of past numbers.

A Lowest Price Locator

Figure 2:
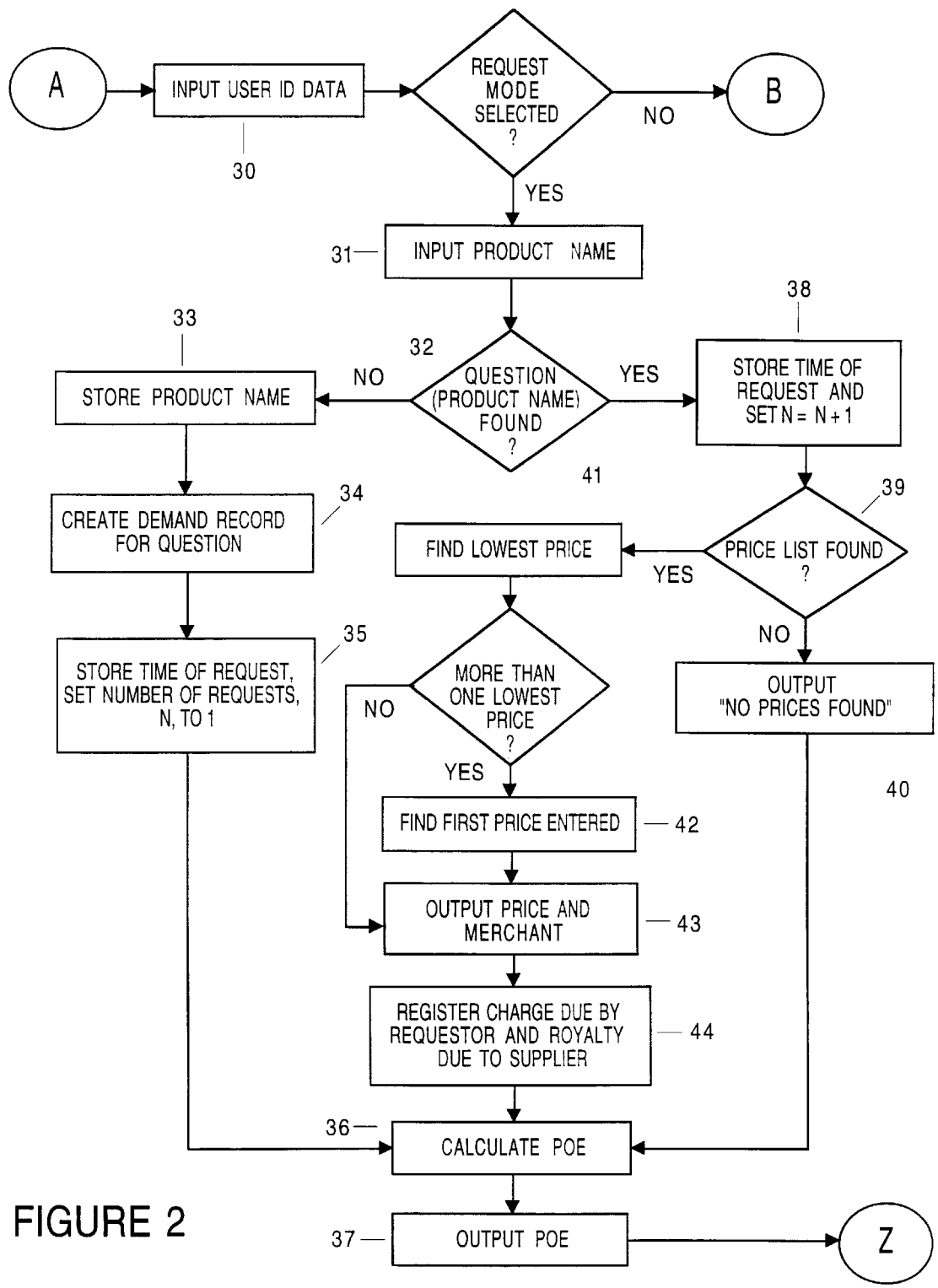
FIG. 2 shows the flow chart of the Request Mode of a lowest price locator.
Figure 2A:
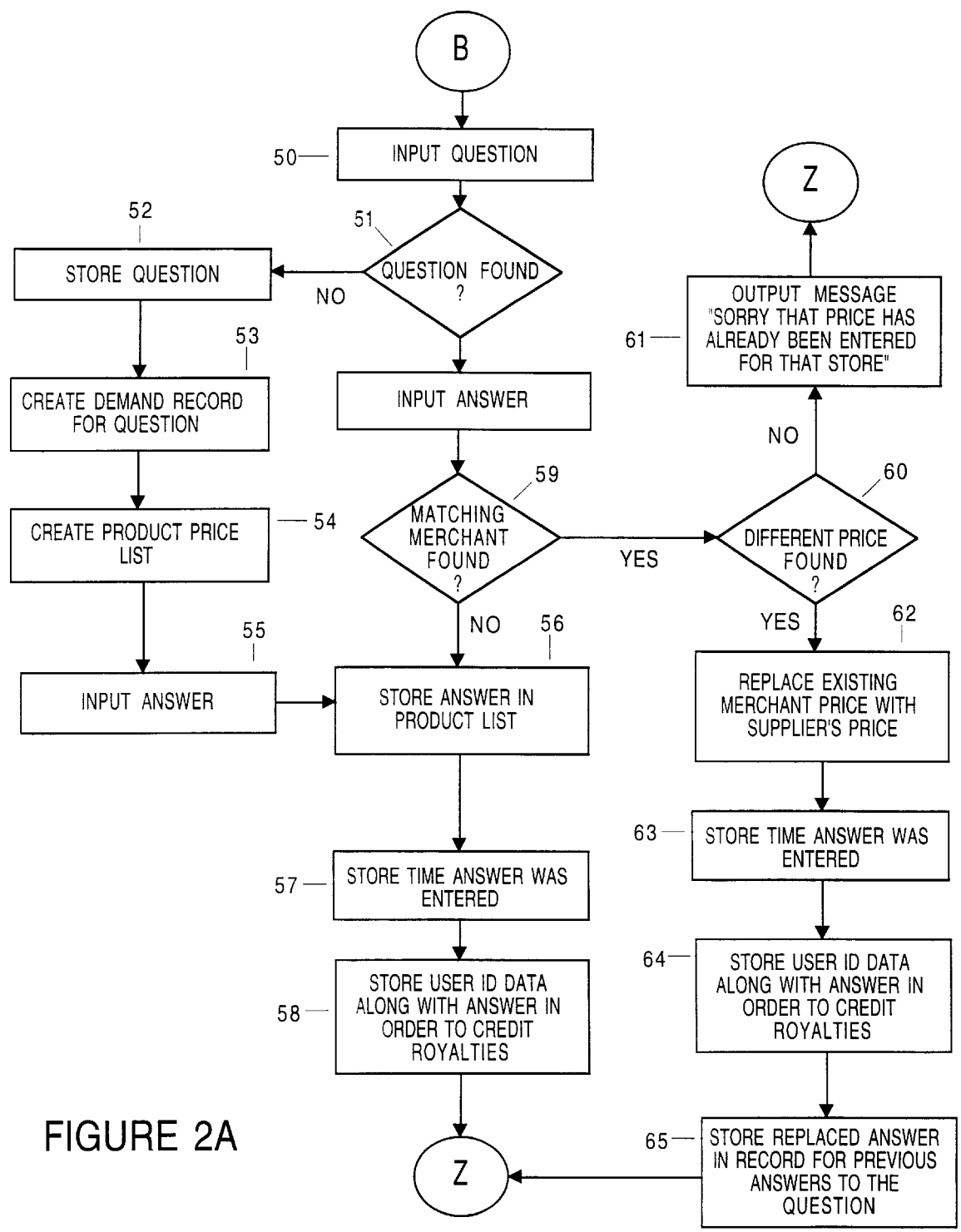
FIG. 2A shows the flow chart of the Supply Mode of a lowest price locator.

Let us look at another embodiment, a lowest price locator, as shown in FIGS. 2–2a.

1. A lowest price locator (LPL) is an AC that includes a central computer for storing a list of product names (questions) and merchants and prices (answers). An LPL includes a network of terminals from which users can enter questions and answers. The central computer includes functions for creating price lists, looking up answers in the list and processing answers in the list and, outputting answers from the list.

2. The LPL has a sign-on function 30 and a Request and Supply mode.

Request Mode

3. Using the Request mode, a requestor enters a product name. The LPL inputs 31 the question and checks 32 to see if the question is already stored.

If the question is not stored, LPL
stores 33 it,
creates 34 a demand record for it,
sets 35 the number of requests to one,
registers 35 the time of the request,
calculates 36 the POE (which in this case would normally result in a message such as, "You are the first person to ask for a price on this product") and, outputs 37 the POE.

If the question is stored, LPL
adds 38 one to the number of request,
registers 38 the time of the request and
checks 39 to see if the corresponding price is in memory.
If there is no price in memory, LPL outputs 40 "No Prices Found", and calculates and outputs the POE.
If there is a list of prices and merchants under the product name, LPL checks 41 for the lowest price.
If more than one merchant has the same lowest price, LPL finds 42 the merchant whose lowest price was entered first and outputs 43 that merchant's name and the price.
If there is only one lowest price, LPL outputs 43 the name of the single lowest priced merchant and the price.
LPL then registers 44 the charge owed by the requestor and the royalty owed the supplier. It then calculates and outputs the POE.

Supply Mode

4. Using Supply Mode, a supplier enters a product name (question) into the LPL. The LPL inputs 50 the question and checks 51 to see if the question is already stored.

5. If the question is not stored, LPL
stores 52 it,
creates 53 a demand record for it,
creates 54 a price list for the product,
enables the supplier to enter a merchant and price (answer) into the list,
inputs 55 the answer,
stores 56 the answer in the list to correspond to the question,
stores 57 the time the answer is entered and
stores 58 the supplier's ID data in order to credit royalties.

6. If the question is already stored, LPL
enables the supplier to enter a merchant and price (answer) into the list,
inputs the answer,
checks 59 to see if the merchant entered matches any merchant in the list,
If the merchant does not match any merchants in the list, LPL
stores 56 the merchant and price in the list,
stores 57 the time the price is entered,
and stores 58 the supplier's ID data along with the answer in order to credit royalties.
If the merchant does match a merchant in the list, LPL checks 60 to see if the price entered is the same as the existing price,
if the price is the same, outputs 61 a message that the price has already been entered,
if the price is different, puts the supplier's price in the list in place 62 of the price stored with the matching merchant,
stores 63 the time the price is entered,
and stores 64 the supplier's ID data along with the answer in order to credit royalties,
stores 65 the displaced price, along with other information stored specifically for that price, in a record for past prices.

The Option of Having an Answer Delivered When It Comes In

Rather than have a user constantly checking AC to find out if an answer is in the system, AC can enable the user to "place an order" in the sense that if an answer is not in the system, it can be delivered when it arrives. A simple way is sending the answer to the user's E-mailbox, though there are other places the message can be posted. However, since the requestor is paying for an answer, it is usually better to send a message alerting the user that the answer is in and asking him if he still wants it. If the requestor responds "yes" then the answer is sent and a charge and royalty are registered. As will be seen in chapter 6, a user can place various types of orders, involving various commitments.

As will be seen, many different types of messages can be sent to a user's E-mail box.

Part II

Adapting the System to Collect and Sell a Wide Range of Answers

In part II we describe ways that AC, as seen in part I, can be adapted to collect and sell a wide range of answers. Core principles that guide the design of any adaptation are laid out in chapter 3. In saying that the system is made to collect answers we do not forget questions, for no answer can be collected without a corresponding question being asked, and stored, first. Answers must correspond to questions in AC. Before discussing this issue, we discuss, in chapter 4, how questions and answers correspond to each other in the minds of people. We need to do this to see the problems involved in trying to create a workable correspondence in AC. Then in chapter 5, we describe basic ways that questions and answers can correspond to each other in AC.

In chapters 6 through 18, we elaborate on the Pay-off Meter and other functions described in Part I, showing how these functions can be adapted to suit a variety of questions and answers. We also introduce new functions, such as those for setting prices and for registering people's interest in supplying answers.

However, we wait until Book II to describe how the system can be adapted to handle the kinds of questions we normally ask each other, questions in everyday language that is. The functions described in book I are necessary for building a system that can accommodate a wide range of answers, but these functions are not sufficient for building a system that allows users to ask natural language questions.

Lands of AC

AC can be a big system with various ways of handling questions and answers. The system can have numerous sub-AC's where different rules and functions apply. We call these sub-AC's lands. For example, one land might be a lowest price locator where questions and answers are entered in a strictly defined form. Another land might be an encyclopedia where all answers are under 100 words long and cost five cents. Another land might be a photo album where all the answers are photos. The point is, AC does not necessarily have one set of rules that applies to all questions and answers in the system.

Most Rules Are Inherently Variable

Throughout the description we will be discussing numerous kinds of rules that AC requires. Most of these are highly variable. For example, AC requires royalty rules, and these can, of course, vary widely. AC's rules determine what kind of functions and formulas AC has, so these in turn can vary. As another example, formulas for calculating royalties and functions for registering royalties can vary depending on the royalty rules.

Evolution of Rules and Formulas

While AC requires various kinds of rules and formulas, their specific forms cannot be given satisfactorily. Not only are the specific forms design decisions, but no designer can tell what is best in advance. He or she can only guess.

However, a system designer can set concrete goals for the rules and formulas and can conduct tests. The pay-off formula provides the best example because it has the clearest goal: to provide accurate projections of royalty income. Thus a designer can test to see how accurate a given formula is over a series of answers. There will be numerous pay-off formulas designed for different circumstances, and there will be numerous kinds of statistics that can be developed about user behavior. All these can be tested against the goal of accurate projections. Thus the formulas can evolve.

AC's matching rules are another example. AC matches questions that users enter with questions already in AC. Users confirm whether the matches are satisfactory or not. Thus, designers can strive to increase the rate of satisfactory matches.

Rules for property rights provide another key example. The goals here are vague though, and so designers must choose what to test for. Despite the vagueness, devising measures and tests is possible and thus, rules for property rights can evolve as well. In fact this testing is the only alternative concerning most rules and formulas, because situations are diverse and experience is scant.

It is also possible to do auto-variation, in the spirit of genetic algorithms, where AC itself makes variations in the formulas. Because AC can become quite large, there can be enough answers and enough time to conduct such tests.

Thus when we say that AC's rules and formulas are variable we mean it in two senses: one, designers can come up with different rules that suit different situations; and two, designers usually cannot come up with the best rules and formulas but must test their guesses and let the rules and formulas evolve.

Testing Device, a Laboratory

Not well appreciated is the great need for a device that enables people to test the effects of rules on the economy.

AC is both a device and a real economy. As such, it provides means for testing rules under real conditions in a variety of circumstances. Rules tested in AC can then be tried in the larger economy. And so AC can also be thought of as a testing apparatus, an economic laboratory.

For example, it allows us to test property rights. Property rights, including royalty rules, are feasible to test because an experimenter can see various effects of changing property rights. These effects can range from whether answers are provided or not, to the speed with which answers are provided, to the price of answers, to the number of people who have tried to supply answers, and more.

Further Notes on Style

For convenience, we will often use Rex to represent a requestor and Sue to represent a supplier.

Also for convenience, example questions are usually kept short, though in practice questions can be quite long.

When we say that AC includes a given option, we also mean that AC includes the necessary functions for carrying out the purpose of the option.

When we say "enter a command," we mean that the user activates an option. And when we say AC "includes a command," we usually mean that it includes the corresponding option.

"Question" will often be abbreviated as "Q" when it is preceded by certain names, for example, a "Current-Q."

Chapter 3

Core Design Principles

Before describing various ways questions and answers can correspond to each other in AC and various types of functions that can be added to the basic system, we will first step back and describe eight core principles that guide the design of any AC.

Principle 1

AC is a Marketplace for Answers and Potential Answers

AC is a medium that enables people to ask for and offer to pay for answers. It is a medium that enables people to supply those answers. It is a medium that enables people to find and pay for answers that have been supplied. It is a medium that pays suppliers of answers a percentage of the sales of those answers. In other words, it is a marketplace for answers.

It is more than a conventional marketplace though because it enables people to offer to pay for answers that do not yet exist in the marketplace. And it enables people to evaluate whether providing these answers will pay enough to be profitable. Thus it is also a marketplace for potential answers.

Principle 2

The Organizing Goal is to Make Good Sales Forecasts

Every AC will have the same organizing goal in the sense that the success of the system depends on the goal being achieved and in the sense that many of the system's functions are designed to achieve the goal. The goal is to give the user a good guess as to the income she will receive for supplying a given answer. Another way of putting it is that the goal is to arrive at a good guess of the total sales that an answer will have once the answer is in the system. From these sales the supplier's share (the POE) is easily calculated according to the royalty rules. The royalty rules may be complicated, but generally the calculation is simple and the real task is to come up with a good sales estimate from which the royalty estimate is taken. So the organizing goal is to arrive at good sales forecasts for answers.

Principle 3

The Foundation Task is to Count How Many People Want an Answer

The goal of good sales forecasts leads to what we might call the foundation task of the system. The foundation task is to count all the people who want to buy a given answer. (These people include those who actually do buy). It is from this count that AC builds an estimate of the future sales of that answer.

There are, of course, many other variables that are critical to making a sales estimate. For example, the prices at which people are willing to buy are key. Nevertheless, functions for gathering information on other sales variables are not central to the design of AC. By contrast, many of the key functions and rules of AC are designed for counting how many people want given answers.

Counting how many people want an answer is tricky for many reasons and can lead to a variety of different features being included in the system. Above all, counting is tricky because identifying which answers are wanted is tricky. This trickiness will be discussed later.

For now let's point out one problem that is not about identifying answers. The problem is that people must offer to buy an answer at some particular time. Different people will make offers at different times. So when we say that AC must count how many people want an answer that is misleading, for the count can only be based on past offers; there is no such thing as counting exactly how many people want an answer in the present or future. That is just one limitation of any effort to forecast sales.

Principle 4

Questions Identify and Represent Answers

In order to count how many people want an answer, the answer must be identified. Actually, answers have to be identified for more reasons than that. Having emphasized the pay-off estimate aspect of AC, let us not forget that AC is a system where people request answers, find answers and supply answers. To do all these things the answers must be identified. The way answers are identified is with questions.

We don't normally think of questions that way. If we think about the matter at all, we think of questions as "asking" for answers. But asking for an answer means describing, identifying the answer. With questions we can ask for (identify) a great range of answers: facts, guesses, predictions, solutions, inventions, explanations, suggestions, treatises, opinions, critiques, and on and on.

Because they are how we identify answers, questions are central to how AC works:

People identify the answer they want by entering a question.

People identify the answer they have supplied by entering a question.

AC identifies where an answer is with a question. (This means that a person can find an answer by entering a corresponding question.)

And AC identifies which answers people want according to what questions people enter. (This means that AC collects information about an answer under the corresponding question).

Of course the way humans use questions is different from the way AC uses questions, and that can be confusing. For humans, a question is a statement in human language that describes an answer. For AC, a question is a question string, a set of search parameters, and instructions for finding an answer.

Once a question is entered into AC and stored, AC creates a question record (Q-record). AC registers various information in this record that it gathers from users who enter the question. This information is about the answer that the question corresponds to. The question record can contain many sub-records, the most important of these being the demand record.

Thus the question identifies not only an answer but also information that describes the answer. In other words, AC uses a question string to create a location in memory for information about the answer.

We might say that a question represents an answer because this term gets the plan across. If no answer has been supplied, the question represents what we call a potential answer or a missing answer.

(That does not mean that there is only one possible answer. We can use the plurals, potential answers and missing answers. Singular or plural in this case is really a matter of taste, for there is no good existing term for the idea of a potential answer).

If an answer has been supplied, we call the answer an actual answer. If there is an actual answer, the question represents that answer and any potential improvements or changes in the answer. So even if there is an actual answer, the question still represents potential answers.

(Now, if more than one answer in AC is identified directly by a question, the answers need to be distinguished. They can be distinguished by information that is distinct to each of them. Thus, each actual answer will have a separate record that includes information unique to that answer. We call such a record a Q-A record because it is identified by the question and by information about an actual answer).

If more than one question corresponds to an answer, AC collects information in each Q-record and can combine that information.

If more than one answer corresponds to a question, the information in the Q-record can apply to the multiple answers. The principle remains; questions are used to represent answers.

In AC, as perhaps in reality, there is no such thing as an answer without a question.

Principle 5

Question String Information Can Be Conveniently Split Into Two Kinds

As discussed above, a question string (Q-string) represents and describes an answer. It is what a requestor enters to describe the answer he wants, and what a supplier enters to describe the answer she provides. An example is: What's the treatment for first degree burns?

While questions are, on average, shorter than answers, they can vary considerably in length. A Q-string can be anywhere from as short as a name to as long as a book. Naturally, few questions will be that long but common questions often do involve paragraphs of description when people describe situations in detail. For example, a requestor who has just been burned might ask,
What's the treatment for a first degree burn when you've been burned with water coming out of an espresso machine and the burn is on the back of your hand and you don't have any bandages around and you're not sure how hot the water was and you see a blister starting to form and the blister is about a quarter the size of a dime and it hurts like hell and it's been five minutes since you were burned . . .

Two Kinds of Question String Information

AC can divide question string information into two kinds called the main question string (main string) and the question specifiers (Q-specs). Q-specs are not mandatory and in certain lands of AC there may be no such thing as Q-specs, only main strings.

Usually, when we say question string or question we will mean the combination of these two kinds of information. However, if there are no Q-specs, then a question simply refers to the main string.

Question Specifiers (Q-specs)

AC can enable both requestors and suppliers to enter question specifiers. Specifiers can be thought of as standard adjectives that modify the main string and thereby further describe an answer. They are part of the overall question string but are distinguished from the main string. They are distinct entities in memory in the sense that they are part of the question string but have their own place in memory, as does the main string. There are a few reasons for separating Q-specs.

First, it is helpful to have a set of standard specifiers that can be used separately from the main string. For example, a user may enter the main string, A Biography of Hans Bethe?. The user may then specify, under 500 words. Thus the user can fiddle with the main question by adding and subtracting specifiers.

Second, specifiers contain standard information that can apply to wide ranges of main questions. For example, the length of an answer is a standard specifier. By contrast, the information in the main strings can vary tremendously.

Third, specifiers really are like adjectives. Without the subject, the main string, they are practically meaningless. A person can ask to see a sleek plane but a person cannot ask to see a sleek. Likewise, a person can ask for A Biography of Hans Bethe?, but cannot ask for under 500 words.

AC can enable users to create their own standard specifiers. Below is a partial list of the key Q-specs AC can enable users to enter:

Type of Question. AC can include certain basic types of questions. These direct AC to do different things. They are described in chapter 5.

Land of the Question. As noted, AC can have numerous sub-parts which we call lands. Each land has different characteristics in the sense that the questions and answers conform to certain rules.

Subject. An answer might be about a certain subject area and this can be specified in advance. For example, the employees of a company might ask various questions having to do with the company. All these questions can be specified by the name of the company.

Place. An answer might be about a certain "local" situation, and so a location specifier can be useful. For example, a question might be about a particular traffic jam, which can be specified by a given location. However, the idea of location is broader than just geography; it is the general idea of place.

Time. A user may specify various time aspects of an answer. For example, the time that a question is asked might matter. For instance, the time that a question about a traffic jam is entered can be key. Likewise, the time of the answer is found can be key. Obviously, time, like place, is a fundamental specifier.

Format of the Answer. A user may specify the format of an answer: text, audio, video or multi-media.

Length of the Answer. A user may specify the length of an answer by word count or by time.

Price of the Answer. A user may specify the price category of an answer.

Language of the Answer. A user may specify the original language of an answer.

The Supplier of the Answer. A user may specify the supplier of an answer.

The Source(s) of the Answer. A user may specify the source(s) of an answer.

Quality. A user may specify certain quality aspects of an answer. This is discussed in chapter 13 on quality control.

It is important to note that the main string might specify all these things. Standard specifiers are not mandatory; they are just a useful feature.

Principle 6

AC can Collect, Process and Display Lots of Information about Answers

We don't normally think of an answer as a product, like a TV, yet in AC that is what an answer is from the point of view of requestors. We don't normally think of an answer as an investment, an income producing property, like an office building, yet in AC that is what an answer is, from the point of view of suppliers.

Thus AC collects, processes and displays all kinds of product and investment information about an answer. This includes information about demand, projected income, price, quality, property rights, supplier competition, alternative answers, and more. In each of these broad areas, AC can collect lots of specific pieces of information. For example, in the area of the quality of an answer, AC can register the primary source of the answer, probability estimates of the answer being true, reviews of the answer, and more. What and how much information is registered, processed and displayed depends on the answer and can vary.

We will call all the information that is registered question information (Q-info). And we will call the information that AC displays about the answer, answer statistics (A-stats). AC uses the Q-info to come up with A-stats. In some cases the information will be the same in the sense that AC will not process a given piece of Q-info but just display it as an A-stat. The Q-info is normally stored in the Q-record.

Now it may seem strange that the information registered is called question information when it is supposed to be about an answer. However, this term is reasonable for several reasons.

One, the information is registered under a question. Some of it is registered automatically when a user enters a question string. The rest is registered "at" the question. By that we mean that after the user enters a Q-string, AC presents the user with a display, which we call the question display (Q-display). The Q-display shows the question and includes a menu of options that the user can select from in order to enter and see various kinds of information about the answer that the question represents. This information is entered into and gotten from the Q-record. An illustration of a Q-display is given in FIG. 3 (though it should be noted that this figure is incomplete, and is intended only to show some of the key kinds of options that the Q-display includes).

Two, since the question string represents the answer, the information stored in the question record can be considered to be about the question string and about the actual answer or missing answer.

Three, it is often not clear what answer the question string refers to, or represents. And so, the Q-info might apply to many answers. Thus it really is Q-info that then corresponds in some way to one or more potential answers. As a consequence, Q-records (which contain the Q-info) can exist without ever corresponding directly to an actual answer.

Answer Statistics (A-Stats)

We call the information that AC shows about an answer by the name A-stats to get across the idea of AC processing and keeping track of a variety of useful information about an answer, the answer's "vital statistics." Not all the stats are numerical; many are qualitative. For example, AC can store and show an abstract of an answer and a sample of an answer. As another example, AC can store and show who has rights to supply an answer and for how long.

Much of the rest of this patent specification will be spent describing functions and options that AC can include for gathering, processing and displaying various kinds of Q-info and A-stats. Below we give a partial list of some of the key kinds of A-stats that AC can create from the Q-info. Many of these kinds are discussed in depth in the chapters ahead because they are subjects in and of themselves.

The POE (and related demand information).
Whether the answer is in the system or not.
Who the supplier is.
The price of the answer.
The original language of the answer.
The date and time the answer was entered.
The length of the answer.
The format of the answer (text, audio, graphics, video, multi-media).
Peoples' interest in supplying the answer.
Property rights concerning the answer.
The popularity of the answer (more demand information).
Quality information about the answer.
How users found the answer.
History of past answers.
Key words of the answer.

The Difference Between Q-specs and A-stats

As the list above shows, Q-specs and A-stats are categories that include some of the same kinds of information. The length, price, and format of an answer, to name a few, can all be Q-spec information and A-stat information. But that does not mean that Q-strings and A-stats are the same things. While they both describe an answer, the difference is how the information is used by AC.

AC uses the Q-string to create a memory location, a question record, where answer statistics belong. The Q-string represents the answer and that is why the A-stats are stored in the Q-record. A main string is like a baseball player's name, while a Q-spec is like the player's team, and a set of A-stats are like the player's stats. This is not a perfect example because a player's team might change, but it gets the idea across. A-stats can be used to differentiate question records and answers in memory. But they are not used to create a question that then has a question record.

At a question display, AC may show Q-specs and A-stats that have the same kind of information. For example, say a question string is: What's treatment for a first degree burn?. And say a Q-spec is under 500 words. Now, say an answer is supplied, and say it is 408 words. AC can register the length and then show the A-stat of 408 words. If the answer is later changed, this A-stat might change.

Most A-stats are created by the collective actions of users entering information and are compiled by AC. Most A-stats can change whereas Q-string information basically cannot. Whether an answer is in the system or not, the A-stats tell the current story of the answer. This story changes as new information about the answer is registered. For example, the POE is an A-stat that can change with each request.

Sometimes the dividing line between Q-string information and A-stat information is not clear. That's because both kinds of information describe an answer and can be used to differentiate an answer in memory. Whether a user chooses to enter the information as Q-spec or A-stat or both depends on the user and the choices AC gives with the particular question.

The key litmus test is this:

Users enter Q-string information in the expectation that other users can supply an answer that will match the Q-string conditions, that will fit the question.

Users enter A-stat information to describe an answer but they do not expect other users to supply an answer that will fit the A-stat conditions.

Operationally this means that AC enables users to enter Q-string information through different input forms than A-stat information. Users are expected to know the difference. AC then uses the Q-string information to create questions and Q-records. AC puts the A-stat information in the Q-records.

Principle 7

A Question is a Location where AC and Users do Business

A question identifies an answer but is it more than that in AC. It is a location in AC's memory that users (with AC's help, of course) create. The first time a given question string is entered into AC, it is stored.

Once that happens, all kinds of other information can be attached to the string, as described above. And so, AC creates a location made up of a Q-string and Q-record.

And once the question is stored, other users can "go to" that question, go to the location created by the question string and Q-record that is.

In other words, a question string is a location. And it is a place where users and AC interact, where users can see and find and enter information that corresponds to the string. Thus the actions of users and of AC revolve around questions. That's because questions represent answers, which is what people are looking to buy and looking to supply.

We are going to elaborate on this idea of a location. As we extend the idea we are no longer thinking just of a Q-string but of the Q-string and Q-record and Q-display. We are thinking of all the A-stats that AC might display along with the main string and of all the options that AC can present to users for entering and getting information, and for buying and supplying answers. In other words, we are thinking of a question as a location in AC where users and AC can do business.

Figure 3:
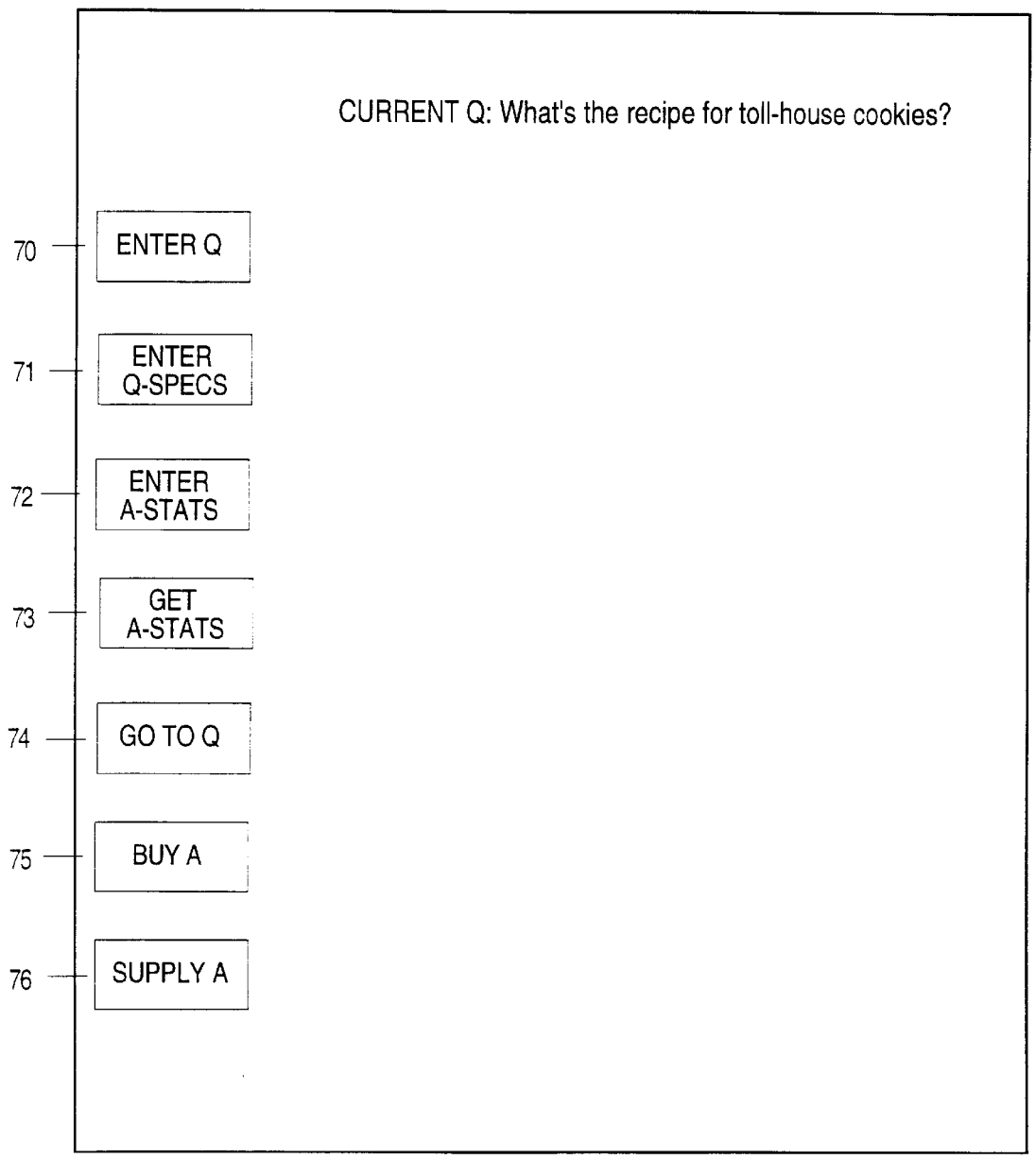
FIGS. 3 shows part of a question display menu.

FIG. 3 gives an illustration of the Q-display with a menu of options for: entering questions 70, selecting questions 74, entering A-stats 72, seeing A-stats 73, buying answers 75, and supplying answers 76. The figure is abbreviated for it does not show all the options the Q-display can have. And it cannot show the functions that AC executes automatically and invisibly to register information and show information.

We might think of the Q-display as a generic storefront with nothing in the window until a Q-string is put there. Once the Q-string is there, the Q-display becomes a display for a particular store—for a Q-location—that is made for selling the answer that corresponds to the Q-string. The Q-string is like a sign advertising the answer.

But the metaphor of a store falls very short because a Q-display has many more functions than any ordinary store. A Q-display with a Q-string is more a multi-purpose sign than a store. And yet it is more than that.

The CIP 3 used the made up term signomat to name the multiple functions that AC builds around a question. Why that? Well, first it is supposed to get across the idea that AC turns each question into a multi-purpose sign for an answer. Second it is supposed to get across the idea of a vending machine (it comes from the term Automat, which was the name of vending machine system for food). We can think of AC as creating a virtual vending machine around each question that is stored in the system. Unfortunately, the term signomat comes up short in getting across the third main idea, which is the idea of gathering and storing information. AC has many functions for gathering information that few, if any, machines in the real world seem to have.

We do not want to think of a user going to a Q-display, for the Q-display is a generic thing with no content. We want to think of a user going to a question located in AC and shown on a display, a display with options that enables a user to act regarding the question and the answer that the question represents. Information registered about the user's actions is stored in the Q-record, is stored at the Q-location, in other words. And information about the question and answer is pulled from the Q-record, from the Q-location, in other words.

And so we will think of a question, for now, in terms of a signomat. We can think of AC as a vast bazaar of signomats. And we can think of AC as creating signomats for new questions strings, and of AC as taking users from one signomat to another, and of users traveling to and arriving at signomats. We elaborate below.

1. A Signomat as an Interactive, Commercial Sign

The signomat's question string and A-stats describe an answer. We can think of all this displayed information as a multi-purpose sign. AC presents certain A-stats automatically, and the user can ask to see more. Thus the signomat includes option buttons for getting A-stats. The A-stats can be quite detailed, depending on the type of stat. For example, AC may gather extensive POE information for a given answer. Anyway, the point is that the signomat is an interactive sign.

It is also a commercial sign, in several senses:

a. It's a buyer ad. When a requestor enters a question, AC stores it and the question advertises that the requestor wants the corresponding answer. When additional requestors enter the same question this fact is registered and reflected in the POE, and that advertises that multiple people want the answer.

b. It's a seller ad. When a person supplies an answer she supplies it to the corresponding question. Thus the signomat describes the answer that the supplier has entered.

c. It's an address sign for locating an answer. This simply means that to find an answer people enter the corresponding question. If the answer is there it will be found. This scheme seems simplistic but it is a fundamental, people friendly way of finding answers. (Even in the cases where the system processes answers to come up with other answers, a question is still an address as far as users are concerned).

d. It's a tote board. As with a tote board at the track, AC collects information and processes it and then displays it for users to see. In the case of a tote board, of course, the subject is usually a horse race. In the case of AC, the subject is an answer. While a signomat can display a lot more information than a tote board can, the general idea is the same.

2. A Signomat as an Information Gathering Apparatus

The term "information gathering apparatus" does not tell us much because there are so many of these kinds of machines. However, there is no simple machine to compare a signomat to in regards to how AC gathers information. That is because AC collects many different types of information about a product, about user interest in the product, and about the sales of a product. In the sense of AC collecting demand information, we might look at a signomat as a polling station where users cast their votes for a particular answer. However, AC collects a lot more than polling data. As a minor example, when a user supplies an answer, AC automatically registers how long the answer is.

As noted, AC gathers some information automatically. It also presents users with option buttons for entering information, which are shown on screen. A user selects a button and then AC enables him to enter the corresponding information. AC also gathers information by prompting users.

3. A Signomat as a Vending Machine

A signomat is a vending machine in the sense that when people arrive there AC enables them to buy the answer that is stored there. Like a vending machine, it must be stocked with an answer. Thus a supplier must provide a product to the signomat.

The answer may be outputted automatically once a user arrives. Or AC can include a variety of possibilities for having the user make a price offer. The signomat may even negotiate with the user.

If a user buys, AC registers charges, just as a vending machine would. It also registers royalties (which few vending machines do).

Now people may or may not buy when they arrive at a signomat; they may see information there that gets them to decide one way or another. But the point is that people can offer to buy—press a button and agree to pay some money—at the signomat and can receive the product if it is there.

(Note: Vending machines might be linked such that a user at one vending machine can actually get an answer from another machine, but that is beside the point here).

A Question Centered System

By now we have seen that questions play various roles: as strings of symbols, as descriptions in language, and as places of business. Questions have multiple roles because AC is a question centered system. The effort to find answers is organized economically around questions. That is AC's plan and it is fundamental.

Principle 8

Everything Depends on People Understanding Each Other Well Enough

The most important process that AC depends on is actually outside AC. It is the process by which people understand what questions mean. It is the process whereby we can ask a person a question and she has a decent chance of understanding the conditions that an answer will have to meet to satisfy us.

This correspondence process is not well understood but it is the basis of the system. So AC must be adapted to the way people understand questions.

This issue is taken up next.

Chapter 4

Problems Concerning the Correspondence Between Questions and Answers in the Minds of People Questions and answers correspond to each other in some strange way in people's minds. The point of this chapter is to lay out some of the problems that are faced in adapting AC to the way people think about and use questions and answers.

We will not be able to illuminate these problems very well, of course, for they are large mysteries. And we do not give our solutions for them here, but save those for rest of this application, particularly chapter 5 and Book II.

Here we are concerned with meaning: What does a question refer to, correspond to? And how do people use questions to refer to, correspond to, answers?

When we say we are concerned with meaning, we are not trying to get bogged down in a philosophical swamp. We do have a fairly concrete task in mind, making AC operate successfully, fulfilling the principles of the previous chapter. In accomplishing the task, it is obviously helpful to know some of the key problems.

Problem Number One

As discussed in the previous chapter, AC is a communication system that is built around people's ability to understand each other. The whole system depends on people having a good chance of knowing what answer will satisfy someone who asks a question.

But there is a big problem with this plan because people often do not know what answer will satisfy a person asking a question. The correspondence between questions and answers is not one-to-one. The problem is that many answers can correspond to a question, and there are no clear rules as to what a satisfactory answer even is. We might call this the multiple answer reality or the endless answers problem.

Apart from the necessity of having people answer a question satisfactorily, recall that the foundation task of AC is to count how many people want a given answer. Since questions represent answers, AC bases its request count for an answer on the number of times people enter the corresponding question string. Of course, if we are not sure what answer corresponds to a string then we are going to have a problem counting based on question strings.

Problem Number Two

There is a second big problem in making a count based on questions strings. The problem is that there are multiple ways to ask for an answer. In other words, multiple questions can correspond to the same answer.

Now if people ask for the same answer with different question strings then there is obviously a problem in counting up how many people want the answer. Thus AC requires ways to match up the different questions where the same answer is involved. We might call this the endless questions problem or the matching up questions problem.

Let us look at why we have this problem then we will return to problem number one. Why are there multiple ways to ask for the same answer? Who knows. We very superficially point to four reasons below:

The Flexibility of Language

A question is a kind of description. It describes the answer a person is looking for. Language allows multiple ways to describe things including, of course, answers. Different words can refer to the same idea and word order can be changed without changing meaning. For example: What was the precipitation last night?, What was the rainfall last night? and, The rainfall last night was what? can all be considered the same question. There are practically infinite ways to pose the same question in the sense that the different question strings ask for the same answer.

The Incompleteness of Language

Usually there is no to way to describe the answer one wants with complete precision, in the sense of a unique, complete description. That just seems to be the nature of language and reality. It seems that we cannot describe any piece of reality with complete precision. For example, if we ask a question that sounds fairly precise such as, How much does John weigh in pounds?, we see that we leave out many things. To what decimal do we want to go? At what time. At what place? With what scale? And so on. We find we can keep adding details. The process never ends and so there is no unique, complete way to describe or ask for something. There are only multiple, incomplete ways.

Ignorance

We often don't know exactly the answer we are looking for so we pose questions in various ways trying to describe what we are looking for. For example, say you have just spilled very hot coffee on your hand and you feel a burn. You want to know the answer to the question, What should I do to treat my hand?, but you don't quite know how to describe the situation exactly because you don't know much about burns. You might ask, How do you deal with a first degree burn? or How can you tell how badly burned you are? or What should you do when you spill really hot coffee on your hand?. You'd probably ask all these kinds of questions and more.

You have no exact thing in mind, and yet you have the "same" answer in mind, a description of what to do about your burned hand. There is no such thing in your mind as the answer. The same answer really means similar answers, and this notion is not well understood.

Now the various questions we ask looking for an answer might not describe the same answer at all. They may be very different. We have no good theory of the relationships between questions. But we do know that in seeking an answer we may ask a variety of "related" questions, some of which, at least in our minds, describe (refer to) the "same" answer. In other words, if we are ignorant about what we want, we will not be able to describe it well, and will use various descriptions.

Multiple Paths to an Answer

We live in a clue reality, where different pieces of information might lead us to the same answer. This also means that very different questions can all lead to the same answer. For example, let us say we are looking for an actor's name. We can ask, What actor starred in The Graduate and Marathon Man?, What actor has a big nose and looks sort of like Al Pacino and is not Robert DeNiro but is considered a really good actor?, What actor has created lots of cool roles like Lenny and Ratso Rizzo?, and so on. We are looking for the same answer, the same object if you will and yet we can ask different questions. These questions are not synonyms. If we compare them they do not appear to describe the same thing. And yet they do correspond to the same thing because they describe different aspects of that thing (Dustin Hoffman in this case). This may seem to be just a philosophical point but it is important for the organization of AC because in our minds, and therefore in AC, very different questions can correspond to the same answer.

Why a Problem and What to Do?

Given that practically an infinite number of questions can correspond in our minds to the "same" answer, we have a problem because AC bases its request count for an answer on the number of times people enter the corresponding question string(s).

What do we do when different questions are entered that correspond to the same answer. And how can the system "know" that the questions correspond to the same answer? As noted, we might call this the matching up questions problem.

To deal with it, AC needs ways to combine the request counts (and other question information) of those different question strings. In the next chapter we discuss some methods for accomplishing this task, and in Book II we discuss more methods.

Back To Problem Number One

Before we need to be concerned about matching different question strings, we must be concerned about what the questions mean. Users need to know what answer to expect when they enter a question, and they need to know what answer to supply to a question. And yet the fact is that, in the minds of users, more than one answer can almost always satisfy a question. That is a fundamental fact and AC needs rules and procedures for dealing it.

Why do multiple answers correspond to a single question? Again, who knows. We very superficially point to six reasons below:

The Incompleteness of Language

Words are something we use to refer to things. As mentioned above, we cannot refer to anything with perfect precision, meaning we cannot refer to anything that is completely unique. (Depending on your point of view, there may be exceptions in the ideal world of math). The things that we refer to actually have so many details that our language can only get us to a point where we generally agree on what is being referred to. There is no exact description, only good enough.

Words express (refer to) ideas. Ideas refer to similar patterns. But we don't know what similar means, how it works. All we know is that any idea refers to innumerable things that we call similar. For example, the word house refers to an innumerable slew of similar configurations and we can't say what that slew is.

Even when we say something that seems unique, such as, that house right there, we might be referring to the house now, in the future, in the past, and there are other possibilities. When it is "clear" what a statement refers to, that is because we have unconsciously agreed with each other about the correspondence scheme in a way that we do not understand. Some questions, such as, Who was the first President of the United States of America?, do seem to have a unique, obvious answer because of the unconscious, collective rules we have agreed on. However, most questions we ask each other do not describe unique, mutually agreed upon answers. Take, for example, What's the best way to make some money? or How do you get to the nearest mailbox?. Like all descriptions, our question descriptions are incomplete.

Now a question describes an answer. And an answer itself describes something. So a question is a description of a description. That does not change the fundamental situation, which is that we cannot describe things with perfect precision.

We can think of the classic example of a map. If we ask someone, What is a map of Brooklyn?, what details should she draw in the map? Even if we describe the map we want more specifically, our description of the map we want will be incomplete. When our cartographer looks at the real world, she will reflect various details of the real world that we did not specify. The same principle holds for more conventional answers. When we describe an answer, by asking a question, someone trying to answer the question, even ourselves, will find when we look at reality (or whatever system we are looking at) that many answers might match the conditions we have set forth in the question.

The Economics of Language

Usually in our first attempt to describe something we are less precise than we could be. For example, we might ask, Where's the store? rather than, Where's the grocery store? rather than, Where's the grocery store that's within walking distance? rather than, Where's the grocery store that I can walk to in less than five minutes?. Why do we start out being less precise than we could be? Because, on average: (the cost of being less precise +the cost of correcting confusion) is less than (the cost of being more precise +the cost of correcting less confusion). In other words, it pays to be vague at first because people usually understand what we are saying even when we are vague. When they don't understand, we clarify. The cost of clarifying is less than the cost of stating more details in the first place. That is a beauty of how we use language. It also means that we naturally ask questions in a way that leaves much room for various possible answers.

The Flexibility of Language

To repeat, there are many ways of stating (making) a description. An answer is a description of something and therefore can be stated in virtually countless ways.

Ignorance

Since we are often ignorant about what we want when we ask a question, we will not ask it very precisely and so leave open many possible answers. For example, say we ask, What is the patent office's form for a continuing application? Let's say we don't know that there multiple types of continuing applications and multiple forms. And so, multiple answers are satisfactory. Even we who ask the question cannot say that one form satisfies the question better than another. As another example, say we ask, What is a durable pair of tennis shoes?. Since we do not really know what we are looking for (we are probably not experts on the durability of tennis shoes) and do not know what the possibilities are (the possible shoes), we will usually describe conditions in a vague way (durable shoes) that can be satisfied by multiple answers (the names of multiple brands of shoes).

Multiple Ways to a Goal

A question is the statement of conditions that an answer must match. Often we think of a question as stating a goal and of the answer as instructions on how to achieve that goal. In other words, a question states a problem and an answer is a solution. As we know there are usually innumerable ways to solve a problem, to get to a goal. How may ways are there to get from the East Coast to California, for instance? Well, there are a hell of a lot.

Different Minds

People have different minds and so the same statements, including questions, can mean different things to different people. Even when people agree that two answers satisfy a question, one answer might pop into one person's head while another answer will pop into the other person's head. These two people will not supply the same answer to the question. As an impractical definition, we might say that a question with a single answer is one in which everybody interested in the answer agrees on the best answer.

Why a Problem and What to Do?

Now if there can be multiple answers to a question then users may be confused as to what answer to expect and what answer to supply, and that will lead to the system failing—for why ask a question if one has very little chance of getting the answer one wants back, and why supply an answer if one cannot expect that it will satisfy users who ask the corresponding question?

There is never a guarantee that we will receive an answer that we are looking for or that we will supply an answer that others are looking for. But we can raise our chances. AC requires rules and procedures so that users can have a good chance of agreeing on what answers to expect and what answers to supply to given questions.

Basically there are two approaches that AC can use. One it can include rules that define what a satisfactory answer is in such a way that the possible answers are tightly constrained. The other is to include rules that allow people to enter multiple answers but to do so in a way that the answers are differentiated and labeled. We will describe such rules and procedures chapter 5, and then further in Book II.

Before doing that we note an important consequence of the multiple answer reality.

The Flip Side

The flip side of having multiple possible answers to a question is that a question does not represent one answer. Thus a person posting a question has a chance of getting an answer that satisfies him. And the person supplying the answer has a chance of supplying an answer that satisfies the requestor. Moreover, if there are multiple people asking the same question, there is a chance that different answers that will satisfy them; a single answer has a chance of satisfying a percentage of the requestors. We may guess at these chances and but we know that there is no certainty when a question does not represent a unique answer.

This also means that the information that is collected in a question record might or might not apply to the answer that is provided. Demand information, to take the most important example, then has to be discounted in some way, in the sense that it applies to only probabilistically to any answer that a supplier has in mind. Say 20 people have asked for the price of a gallon of gasoline at a certain gas station. But also say that the station has three grades of gas. How many people are asking for three prices? And how many are interested just in a single price, and which price? And so what is "the" answer? And what is the request count for "the" answer? There is no solid count; the demand record contains a count that can be used statistically in arriving at a guess about the interest in a likely answer or answers.

Demand information is only one kind of information that is collected about an answer. The same principle applies to all Q-info. What answer does the Q-info correspond to? There is no solid, single answer.

Note on Terminology

Since questions can have more than one answer, it seems that we should stay away from the term the answer. But it will be used frequently for three reasons. First, it is convenient. "The answer" is easier to say than "an undefinable, infinite set of potential answers." Second, in many contexts it is apt (for example, if there is one answer in AC to a question then that answer is the answer in AC). Third, force of habit. The reader should apply common sense when seeing the term the answer.

The term an answer can also be misleading. For example, it is misleading to say that a question describes an answer. And yet for the reasons above, we will often use the term an answer. Again, the reader should be careful.

Likewise the reader should use common sense when seeing the terms the same answer and the same question. Usually there is no such thing as the exact same thing, except where we are thinking of question strings that exactly match each other and answer strings that exactly match each other.

Chapter 5

How Questions Can Correspond to Answers in AC 5.0 Organization of this Chapter

Having discussed the correspondence between questions and answers in the minds of people, let us now discuss it in AC. Questions and answers must correspond to each other within AC in some concrete way. There are various possible ways, which we'll call correspondence paths. By these we mean how questions and answers are related to each other within AC, and how answers get in and out of the system.

To get questions and answers in and out of AC requires the actions of users, so in describing correspondence paths we also describe how users and AC interact.

The place to start is with questions, for they precede answers in AC. Questions are inputted and outputted. And they are the starting point of the input and output of answers because answers are stored to correspond to questions, and answers are outputted in response to questions.

Therefore, in section 5.1, we discuss various aspects of questions: how they are entered into the system and stored, how users can "travel" to them, what can be done "at" them, and how they can be linked to one another. In this section, we also elaborate on the idea of a question location (Q-location).

AC enables users to enter different types of questions. The way answers are inputted and outputted depends on the type of question involved. However, in terms of creating a location in memory, a question type can be thought of as a Q-spec, as described in chapter 3. We list the basic types of questions here. They will be elaborated on in this chapter.

a. Plain Old Questions. By these we mean questions that users can answer. These are the staple questions of the system. They predominate by far.

b. Combo-Questions. By these we mean questions that users answer by contributing separate answers that AC combines into a larger answer.

c. Function Based Questions. By these we mean questions that activate special search and processing functions that operate on questions and answers that are in AC. Usually users cannot supply answers to these questions. Further, these questions do not really have questions strings, they have what we call subject information.

d. Auto-Questions. By these we mean questions that are created by AC based on questions that users have entered. Users can answer auto-questions.

In section 5.2, we discuss answer input paths, how answers are gotten into AC to correspond to questions.

In section 5.3, we discuss answer output paths, how answers are gotten out of AC in response to questions.

The discussion in sections 5.2 and 5.3 applies to plain old questions, combo questions and auto questions.

We wait until section 5.4 to discuss function based questions.

In section 5.5 we briefly discuss how to combine question information, particularly demand information, when an answer is requested from multiple questions.

The example questions in this chapter are colloquial and are suited for a system that can handle natural language. We use colloquial questions because they are easier to think about and because they prepare for Book II, where methods for handling natural language are described. Still, the discussion in this chapter applies to questions and answers whose grammar is highly constrained as well.

5.1 Creating, Finding, and Traveling to Questions

In this section we describe how AC enables users to create, find and travel to questions. AC presents options for doing these things at the Q-display. The options are presented to users in all modes. There are some differences in what happens depending on the mode the user is in. We will be discussing request and supply modes primarily (there are other modes which are described later).

In FIG. 5.10, the options are grouped in three areas: Q-info, Show and Go. They are grouped this way for illustration's sake, not because this way is best. In illustrating these options we ignore the many other options that AC presents at the Q-display, for they are not the concern of this section.

5.1a Seven Definitions

Definitions are given here of some key features and processes of AC that are discussed in this chapter. Other features and processes are defined along the way. The first three definitions below are basically repeated from chapters 1 and 3.

1. A Question

In this chapter, when we say a question we usually mean it in the sense of a Q-string that a user enters. The Q-string may be made up of a main string and question specifiers. Or, it may be just a main string. (See chapter 3).

2. A Question Record (Q-record)

The record AC creates to store information about a question and about the answer(s) that the question represents.

3. A Question Display (Q-display)

The interface AC presents to users. It shows a question and numerous options and sub-options. We call these Q-display options. As illustrated in FIG. 3, these include options for:

entering questions 70, 71,
  finding questions 70, 71, 72, 74,
  entering information into Q-records 72, 75, 76,
  getting information from Q-records 73,
  finding answers 70, 71, 72, 73, 74,
  buying answers 75, and
  entering (supplying) answers 76.

4. The Current Question

The main subject of the Q-display is called the current question (current-Q). When we say main subject we mean that the question is normally shown on screen and that the Q-display options apply to it and its Q-record. However, AC can show more than one question at a time, and several of the Q-display options can apply to these other questions as well. Thus, when we say the current-Q we mean the question that most of the options apply to. The current-Q is not necessarily shown on screen. This is because AC may instead display other questions, or an answer, or a sub-menu for a given option. If the current-Q is hidden, it can be called up by a Show Current-Q command.

5. Being At a Question

"Being at a question" is another way of saying that the user is presented with the current-Q and/or with the options that apply to the current-Q.

6. The Null Question

The null question (null-Q) means the absence of a current-Q or of any question. The user can enter a command, which we might call Null Q, in order to clear the screen of questions. The user is then at the null-Q. When there is no current-Q, fewer options apply. Those that do apply allow the user to enter a new question. They may also enable the user to call up past questions.

7. Traveling To (Going To, Arriving At) a Question

Traveling to a question means that a user enters a question, or selects a question on screen, to be the next current-Q, and that AC then makes that entry or selection the current-Q. When we say "makes" we mean the process by which AC finds the question and presents it to the user as the main subject of the Q-display, or, if the question does not exist already in AC, the process by which AC creates the question in memory and then presents it to the user as the main subject of the Q-display.

5.1b Entering a Question

At the Q-display, AC enables a user to enter a question string.

Because the user can enter various types of information besides a Q-string, AC can have the user first press a Q-string button 100 to identify the information. Or AC can simply let the user designate a Q-string area on screen and type the question in there. Or AC can default to assuming that the user is entering a Q-string.

After the user is satisfied with the question he presses an Enter 101 button to complete the entry. (In certain lands, AC might not have the user hit Enter, but we leave this possibility aside, for it only applies in special cases.)

AC enables the user to edit the question, if he so desires, in order to make a new question. After editing, he hits Enter again.

He can clear the screen by pressing Null Q 102.

Note: For illustration purposes, as we continue this discussion, we will use certain questions, such as, What's holding up traffic?. These have no special significance.

5.1c The Main Rule of Creation

When a user enters a question AC does a look-up to see if the question is already stored. If the question is not already stored, AC stores it and creates a question record to go along with the question in memory. That is the main rule of creation.

We call a question string and its question record a question location (Q-location). In FIG. 5.11 we picture a Q-location 130 as a circle with its Q-string 131 written inside and with its Q-record 132 as a rectangle within the circle as well. The missing (potential) answer is pictured as a blank square 133 connected to the circle. As we go along, we will add to this scheme.

AC stores the new question such that it can become a current-Q. In other words, it is a location in memory not just in the sense of storage but in the sense that the user can find it, be taken to it, and in the sense that the Q-display options apply to it and its Q-record.

Technically, any information the user enters can be stored and called up. The point here is that a location is created that users find when they enter a matching question—that AC finds for them, that is, when they enter a matching question. (We discuss matching questions in 5.1d, below.)

When the Rule Applies

So the main rule of creation is that a Q-location is made for each new question entered. However, this rule is not applied in all cases. Whether it applies depends on what mode the user is in and what the user's purpose is in entering the question. The idea behind the rule is that questions are created to enable people to express interest in and to find answers.

Thus, if the user is a requestor, then the rule holds because the user's purpose is to ask for an answer. That is what request mode means.

If the user is a supplier, the rule holds when the supplier also enters an answer to go along with the question.

(Note: What is registered in the Q-record at the time of creation differs depending on the user's mode. For example, when a supplier enters a question, AC does not register demand information).

If the user is in another mode, such as browse or check mode, the rule does not usually hold because users are not asking for or supplying answers.

A user can enter a new question for other reasons that require AC to create a Q-location. For example, a user in supply (or browse or check) mode may enter a question to test demand. In other words, a potential supplier may post a question not because she plans to supply the answer but to see if others will express interest in the answer. A potential supplier may also post a question because she intends to supply the answer in the future and wants to collect demand in the meantime, or because she wants to post a reservation message (see chapter 8). So AC can create Q-locations under more circumstances than a user being in request mode and entering a question, or a user being in supply mode and entering a question and an answer.

AC can include an option enabling a user to designate the purpose of a question.

But what if a user is in request or supply mode and is just browsing and/or checking POE's? Here we have a problem because AC cannot divine the user's intention and can only rely on the user telling it. Thus AC can have various default rules. For example, if a user is in supply mode, AC may create a question only temporarily. If the user does not then enter an answer, or does not designate some special purpose for the question, AC may erase the question. The default rules can vary.

Another important case where the main rule holds is when a user, in whatever mode, wants to enter a question in order to link it to another. Here, again, the purpose is to help people find an answer or express interest in an answer.

And as a variation on the main rule, AC may only store a question upon confirmation from the user that he wants the question to be stored.

Having said all this, it is possible, as a design decision, for the main rule of creation to always hold. AC can store all new questions and create locations for them. But it seems that better default rules can be created to fulfill the underlying idea of creating questions to enable people to express interest in and find answers.

In section 5.2 we elaborate on the notion of Q-locations.

5.1d Finding/Matching a Question

As discussed, when a question is entered, AC looks for a match. Here we elaborate on what happens.

First we must point out that in order to default to "best" matches, AC may also rely on A-stat information in the Q-records of potential matches. In other words, AC does not so much match questions as it matches Q-locations. The match seen by the user may only be a Q-string but still, AC may be using A-stat information as well to arrive at that match.

Now, AC may find no match. It may find an exact match. And it may find "best" matches which we will also call tentative matches.

Even if an exact match is found, AC still looks for tentative matches. These can be important because the user may want to see what similar questions have been asked by others. The similar questions might have answers the user is interested in. And they might have A-stats that the user is interested in.

How many matches are found is a design decision that depends on the defaults built into AC's matching rules.

(Note: In this section we are concerned with how a user finds a question with a Q-string. A user can also find an answer. We save that subject for the section 5.3.)

Rephrase Option for Finding Questions

AC can also enable a user to enter multiple versions of a question in search of a good match. Let's say the user enters, What's holding up traffic?, and AC finds no match. Therefore, he continues to rephrase the question:

What's the cause of all this traffic?
Why is the traffic all jammed up?
Traffic jam, basic info?

He can do this by erasing the current-Q, or by pressing Null Q and then entering a new question, until he finds a good match, if one exists.

AC can also give him the option of pressing what we will call a rephrase button 103. When he presses this, it means that the next question entered is a rephrase of the current-Q. This signifies to AC that AC should use information from both Q-strings to find a good match. There may be more than two questions involved because the user can hit the rephrase button before entering a third question, and a fourth, and so on. Combined information from multiple questions may result in a more successful search.

(We will see in Book II how AC link the different phrasings with a rephrase link).

Finding Matches to the Current-Q

We will be discussing, in 5.1g, how users can travel to a question by selecting it, rather than entering it. The reason we mention that here is to point out that AC can look for the matches to a current-Q, even though the user has gotten there by selecting it, rather than entering it.

AC may look for matches to the current-Q automatically, as it does when the user enters a question, or a user can ask to see matching questions.

As noted, the option of seeing matching question enables a user to see questions in AC that are similar to the current-Q.

Next we discuss how AC can show matches. But first we digress briefly on the subject of matching.

Digression on the Importance of "Best" (Tentative) Match Algorithms

Best match algorithms are essential to the operation of AC because, unless the grammar of the questions is highly constrained, people searching for the same answer will rarely enter the same question string. People will usually enter similar strings. Even if the grammar is highly constrained, people will still often enter similar questions, while looking for the same answer. For example, two people looking for the same phone number may enter different questions, such as: Daneel Olivaw's phone number? and R. Daneel Olivaw's phone number?.

A question that is entered into AC needs to be tentatively matched up against existing questions so that the user who entered the question has the option of finding and selecting a match. A user might not select any match. But, if there was no option of selecting matching questions, then users would not be able to see what similar questions other users have asked, and so there would be little accumulation of demand on questions—little accumulation of demand for answers, that is.

AC must do the tentative matching, of course, because users do not know what potential matches exist in AC.

Let's consider one more example. Assume that What's holding up traffic? has been asked in several languages and is translated into a common language. Yet this is a false assumption, for there is no single question in different languages that means What's holding up traffic?. There are similar questions. As noted in chapter 4, there is no single Q-string for any question. When we think of a question in different languages this fact is exposed.

If we are to match, say, two synonymous questions that have been stated in different languages, we need best match algorithms, for if we translate one question into the language of the other, the two Q-strings in the same language will rarely be exact matches.

Many techniques are known for enabling computers to find text matches. We do not go into them. We do note that while these techniques are essential, they are all deficient because no one knows how to program a computer to do a good job of recognizing similar things.

(We should note that people are often unable to decide what the best match is for a question because people do not know what best match means. Still, people are much better at matching than computers, as long as the set of potential matches is small).

Digression on the Inadequacy of Best (Tentative) Matching Alone

The problem of matching a question against existing questions goes beyond the difficulties of machine matching. A bigger problem is the fact that innumerable similar questions can describe the "same" answer. Thus users can, and will, create a profusion of similar questions, all potential matches. But if there are hundreds or thousands or millions or billions or trillions of similar questions, how to find and show potential matches to a given question? And how to decide which potential match is the "right" match for a given question?

Say Rex asks where he can find a certain T-shirt that he describes in his question. Rex can ask that the T-shirt have a certain price, that it be made in a certain country, that it be a certain percentage of cotton, that it be a certain color, that it be a certain size, that it be a certain thickness, and on and on. The possibilities are endless.

And say that 10,000,000 other people in the past have asked where they can buy a certain T-shirt and that each person has described a different shirt, though we might recognize many of the shirts as similar. Now, how can AC find the "right" match for Rex's question among the 10,000,000 possible matching questions in AC? How can a human find the right match? Well, no one can, for there is no right match. The reality is a profusion of similar questions. How then to match them up?

A solution to this problem is described in Book II and is previewed at the end of this section. Here, all we say is that AC's matching rules of course include defaults for limiting and selecting the matches shown to the current-Q.

5.1e Showing Matching Questions

If AC finds an exact match then it tells the user.

If AC cannot find an exact match it may find one or more tentative matches. These can be shown in an area on the Q-display for matching questions.

If AC cannot find an exact or tentative match, it shows a "no matches" message.

If AC finds an exact match, it still may show tentative matches. That is because, as noted, a user may want to see similar questions that other users have asked. AC enables users to press a scroll command 106 for scrolling through the matching questions.

How much of a matching question is shown is a design decision and depends on the situation.

AC can hide matching questions and enable the user to call them up by entering a command such as, Show Matches 107.

While tentatively matching questions are not current-Q's, AC can append certain key A-stats to them, such as whether they have answers. These statistics come from the Q-records of the questions involved.

Match Statistics

AC can show match statistics (match stats) for the question entered. By these we mean statistics about how many tentative matches AC can find for a question. Of course, there may be a large number of such matches. For example, What's holding up traffic? might have one exact match and billions of tentative matches. (In this situation the user would usually want to further specify the question).

(Note: AC can show match stats for a current-Q regardless of how a user got there).

Digression on Multiple Hits

In many conventional data base systems, there are search methods that yield "multiple hits" in cases where the search key is an exact subset of multiple targets in the data base. For example, let us pretend that a data base has the terms Yabba Dabba and Yabba Dabba Doo. Now let us pretend that the search key is Yabba. In many conventional data bases, a search would yield two hits.

But in AC, the search does not yield a hit in this sense. The AC procedure is:

Enter Yabba.

Do look-up to find Yabba.

Yabba found?

If no, create Q-location for Yabba.

Look for tentative matches.

(Yabba Dabba and Yabba Dabba Doo might or might not then be tentative matches).

The point is that AC creates a new Q-location for any new Q-string regardless if it is a subset of some other string. Little is different from Little Red is different from Little Red Schoolhouse and Little Red Riding Hood. Thus AC treats them differently.

Now having said all this, we note that AC can show conventional hit statistics so that if a user enters, for example, What's holding up traffic?, AC can show how many questions What's holding up traffic? is an exact subset of. Ideally, AC shows how many very similar questions there are, and similarity is not definable in terms of exact subsets.

5.1f Showing Other Questions

In addition to showing matching questions, or rather than showing matching questions, AC can enable the user to see other questions.

AC can enable the user to press a command 108 for seeing the previous question. By previous question we mean the previous current-Q. This option is a useful skip back command.

AC can keep a list of questions that the user has asked during a certain period of time. And AC can include a command 109 enabling the user to call up questions from this list, such as the last ten questions the user has entered.

AC can also enable the user to maintain a list of open questions, questions that have not been answered but that the user still wants answered. The list can be kept in the user record. AC can include a command 110 enabling the user to call up this list.

AC can also include a command 111 enabling a user to see linked questions of various kinds. We say various kinds because there are different kinds of links, which we will discuss later, especially in Book II.

5.1g Traveling to a Question

We use the colloquial term, "travels to" a question for the process by which a user identifies a question and AC makes the question the current-Q 112. We also use the terms "arrives at" and "goes to."

As noted, the current-Q is not necessarily shown all the time. For example, when an answer that corresponds to the question is shown, the user may not see the current-Q. The current-Q may be hidden for various other reasons. Thus AC includes a command 113 for showing the current-Q if it is hidden.

Before arriving at any question, a user is at no question. We call this being at the null question. The user starts his travels then by entering a question, or by calling up a question from his user record. (When we say "he," we do not only mean Rex; we mean a user in any mode).

As noted, there are two basic ways a user can travel to a question:

1. He can enter a question. AC then makes this question the current-Q.
2. He can select a question that is on screen. AC then makes this question the current-Q.

As discussed, a question on screen, other than the current-Q, may be a matching question, a question from a list of previous questions, a question from the user record, or a linked question. It may also be a comparison question, which we describe a little bit later.

When we say "select" here we mean that the user designates that he wants the question to be the current-Q that he wants to go to the question. He might designate this by selecting it and then hitting a Go 114 command, for instance.

The reason we distinguish the type of selection is that the user can select a question in order to have other options apply. (As noted, some Q-display options apply not only to the current-Q). For example, the user might select a question in order to see A-stats about it. In this case he might select it and hit a See A-stats 115 command.

AC may not show all of a question on screen. Partial information can be shown and the user can select that. Likewise, AC might have buttons for designating certain kinds of questions, such as the previous current-Q and the null-Q. The user can select one of these and hit Go as well.

Surveying the Scenery

A variation on the plan above is the following. AC can enable the user to choose an option whereby the user enters a question and AC only shows matching questions. By this we mean that if the user enters a question that is new, AC still creates a Q-location for it, but does not show all the usual options. The question is still the current-Q, but it is hidden. AC shows the user tentatively matching questions and options that apply to these. The reason for this travel option is that a user looking for an answer might not want to mess around with a new question that he might create. He might want to get an existing answer, or he might want to get to a question that others have asked. Thus AC can enable the user to choose an option whereby he does not see the usual options if his question is new. (Of course the user might want to see the current-Q and can enter a Show Current-Q command, in which case AC shows the usual Q-display options that apply to the current-Q.)

Tentative Current Question

As a further variation on the plan above, the user can ask AC to show the single best match AC can find, and the user can confirm whether this match is adequate. The difference here from showing multiple matching questions on an equal basis is that AC may show more A-stats about the "single best" match than it would ordinarily show about other match questions.

AC may show A-stats as if the best match was the current-Q. It may, for example, show matches of the best match. When AC does this, we might think of the single best match as the tentative current-Q.

If the user confirms the best match it becomes a real current-Q. This confirmation is another way of selecting a question on screen.

If the user does not confirm the best match or does not select any other matches to go to, he can continue entering questions until he is satisfied with a match.

Seeing Matching Questions to the Current-Q

As noted in sub-section 5.1d, AC can find matches for the current-Q regardless of whether the user got there by entering the question or selecting an existing question on screen. As noted, AC can include a Show Matches command. This command, when pressed, can signify that the user wants to see best matches to the current-Q. Enabling the user to see matches to the current-Q is a critical option because it allows the user to see and travel to questions that are similar to a given question. This applies not only to a new question that a user enters but to any question a user is at.

Travel Options

From the preceding we can see that a user can land in AC in various ways, and can continue on his travels once he lands. He can land at an entirely new question that he entered and that AC has created for him. He can land at a question that has already been created. He can land at no question, merely surveying what questions are similar to the one he entered. And he can choose to go to one of these similar questions. When at a question he can see questions similar to that question. And he can go to one of these as well. Or from where he is he can enter a new question and be taken there. Or he can ask to see some of the previous questions he has been at. And he can select one of these as well. Or he can ask to be taken back to the origin, to the null question.

Come-From and Go-To Questions

A user will often go to a tentatively matching question. When this happens, we will call the question that the user came from, the previous current-Q that is, a come-from question (come-from-Q). From the point of view of the question that becomes the previous current-Q, we call the new current-Q a go-to question (go-to-Q).

For a given question, AC can register what question a user arrives from and what question a user goes to. Naturally, when a user travels from one question to another, AC can register the fact in two question records, at the origination airport and the arrival airport if you will. We call this information arrival stats and destination stats. (Both kinds of information together will be called travel stats.)

Pseudo Traveling Using Want-it Marks

When Rex travels to a question it is often to express interest in the corresponding direct answer. AC can give Rex another way to express interest in a missing answer without having Rex actually travel to the corresponding question.

As discussed above, when Rex is at a question he may see one or more matching questions. He may be interested in the answer to one or more of these. As noted, when AC shows these matches, it can also show Rex that the questions do not have actual answers. Rather than have Rex go to these questions to express interest in their answers, AC can enable him to express interest by marking the questions with a want-it mark. AC may, for instance, have a check box next to each matching question whose answer is missing. If Rex checks the box it means he wants the corresponding answer.

Now AC may also enable Rex to make a price offer but that is beside the point here. The main thing is that AC can enable Rex to express interest in the answers to matching questions without traveling to those other questions. This option can be an important convenience. Not only can it save Rex time but can show AC what are good matches to a question and can help Rex pool demand on given questions.

For future discussions, particularly those about registering demand information, a want-it mark will be considered a kind of request, even though Rex does not go to the question that is marked.

5.1h Question Specifiers

As discussed in chapter 3, AC enables a user to enter standard question specifiers (Q-specs) that are a kind of Q-string information. As Q-string information, AC uses Q-specs to create Q-locations. It also uses them to find existing questions.

A user can enter Q-specs along with a main string. AC can include a Q-spec button 116 that a user selects to call up a Q-spec form, enabling him to enter the Q-specs.

He can also enter the Q-specs after he has entered the main string. For example, a user might enter What's holding up traffic?. There might be one exact match and 5,000,000,000 tentative matches for this main string. And so the user might then enter certain Q-specs to further specify his question. He might enter for example:

Time: 6:30 a.m.
Date: 6/6/96
Place: Ten Freeway, LA.
Source: California Highway Patrol Just as a user can edit the main string, the user can edit Q-specs, changing them and then entering the new question that is created. For example, the user can change the Q-spec above concerning the source of the answer to, say, Anyone Official. Or the user might erase the Q-spec entirely, leaving it blank, and implying that the source can be anyone at all. The Q-specs may be hidden. Thus, AC can include a command 117 for calling up the current Q-specs as well as one for entering them.

Match Instructions

AC can enable a user to designate Q-specs as optional or mandatory. This means that the mandatory conditions are preferably matched over the optional ones. (This also tells potential suppliers that an answer must fit the mandatory conditions.) For example, a user might designate the time and date as mandatory and the source of the answer as optional. AC can also enable a user to rank Q-specs in order of preference, to give AC guidance in selecting matches.

Now when we say "match" we mean it in the sense discussed previously of most similar matches that AC can find according to AC's internal match rules. Thus a Q-spec or any string information might not be matched exactly. A Q-spec, for instance, of 10 cents or under, might be matched by a Q-spec of 15 cents.

AC can also enable a user to designate a Q-spec to be a screen. By this we mean that the Q-spec must be matched in the sense of a true match. For example, if the Q-spec is 10 cents or under, then the matching question must also include a Q-spec that specifies a price of 10 cents or under. 7 cents will do. 11 cents will not do.

Repeat Use of Q-specs

Now a user may go to a matching Q-location that has different Q-specs than those he entered. As a convenience, AC can enable the user to have the last set of Q-specs entered kept in the background to be used for a future question entry. We will call these background Q-specs. By this we mean that the last Q-specs entered are kept temporarily in memory and hidden from view. AC can enable the user to call them up (and edit them possibly) and designate that they be used when he enters another main string. To let a user do this, AC might have, as options of the Q-specs menu, a command called Use Previous Q-specs and a command called Edit Previous Q-specs. Or, when the user calls up the Q-spec form to enter Q-specs, AC can assume that the Q-specs remain the same from the previous entry, until the user changes them. The point of these options is to save the user the time of re-entering Q-specs.

As another convenience, AC can enable a user to set Q-spec defaults such that a given set of Q-specs goes along with every main string the user enters, until the user cancels the default command. A Q-specs default can be quite useful. For example, Rex might have lots of questions about the traffic jam he is in. He might want to automatically preface them all with the same time and place Q-specs.

Matching Q-specs Against A-stats

As noted in chapter 3, certain Q-specs and A-stats can be about the same kinds of information. While AC treats the information differently with respect to memory locations, it can in certain cases match Q-spec information against A-stat information. Price information is an example. A Q-spec might be for 10 cents or under, and an A-stat might be 7 cents. Here there could be a match.

Automatically Creating Two Questions

A useful procedure AC can include is to automatically create two questions when a user enters a set of Q-specs. In this procedure, one question is made up of just the main string, and one question is made up of the main string plus the Q-specs.

In FIG. 5.12, we assume a user has entered, What's holding up traffic?, and has also entered a Q-spec, 6:00 a.m.. And so AC creates two locations, one for the main string 140 and one for the main string plus Q-spec 141. We also assume another user has entered the same main string but with a different Q-spec of 7:00 a.m.. And so AC creates a third Q-location 142.

Form Linking Questions

Not only can AC create these double questions but it can link them in memory, so that users arriving at the main string can then call up linked questions made up of the same main string plus different Q-specs.

We call this manner of linking questions form linking. And we call the link a form link. We use this name because the Q-specs are standard and can be entered in a form. When the difference between the two questions is a matter of the Q-specs, we might call the link a Q-spec link.

Form linking can be quite useful for several reasons. It can enable a user to see what similar questions other users have asked. This can help requestors find similar questions and locate similar answers.

Further, it can enable users to pool requests on particular questions, especially the main string. For example, if 100 people ask Movie review of Casablanca? but they all have different Q-specs, then there will be 100 different questions and there will be less chance that there is enough demand to answer any one of them. But the main string may show enough demand to be answered.

On the supply side, a potential supplier is in a better position to decide whether it is worthwhile to provide an answer that may satisfy some fraction of all the users who have entered that main string. Moreover, a supplier may find other similar questions worth answering.

For example, as seen in FIG. 5.13, a user might enter, Movie review of Casablanca? 150. Now we face the multiple answers problem discussed in the previous chapter. What answer is the user looking for? What answer should a user supply? One partial solution is a form linked question in which the main string is built upon with Q-specs to create a new question that differentiates the answer.

Say the user wants to enter only one Q-spec, the name of the author of the answer (the review). A requestor would enter a desired author, say P. Kael 151, whereas a supplier would enter the actual author, say, G. Siskel 152 (note: we do not picture the answer having been supplied). Thus AC can have numerous questions all starting with Movie review of Casablanca? but distinguished by the names of different authors. These questions are linked to the same main string.

5.1i Answer Statistics as Search Parameters

As discussed in chapter 3, AC collects, compiles and displays statistics (A-stats) about an answer. These are stored in the answer's Q-record and are accessed from the Q-display.

A-stats can also be entered by a user along with a Q-string as additional search parameters to find a question (and perhaps an answer). When used for this purpose, we will call them search stats. AC can include a command 118 that, when pressed, calls up a form for entering search stats.

We will call the combination of Q-string and search stat information a Q+.

AC matches a Q+ against existing Q-string+A-stat information in AC. In other words, it matches them against existing Q-locations.

For example, a user might enter the Q-string: Movie review of Casablanca?. There might be one exact match and 5,000,000 tentative matches. And so the user might then enter search stats to further specify his question. For example:

Popularity: Most popular answer by sales
Length: Less than 200 words
Price: Less than 50 cents AC then shows the user the Q-locations that best match this information. AC may show just the matching Q-strings. Or AC may show the A-stats that correspond to the search stats as well.

Now the A-stats that are shown may differ depending on whether a question has a missing answer or an actual answer. But we do not pursue this point right now. As noted, in this section we are concerned with how users find and arrive at questions. As discussed in sections 5.2 and 5.3, a user can also find an answer with a Q+. We wait until section 5.2 to discuss what A-stats are shown when a user arrives at a question with an actual answer or answers.

Just as a user can edit Q-specs, the user can edit search stats, changing them and then entering the new Q+ that is created.

Match Instructions

As with Q-specs, AC can enable a user to designate given search stats as optional or mandatory. This means that the mandatory conditions are preferably matched over the optional ones. AC can also enable a user to rank search stats in order of preference, to give AC guidance in selecting matches.

As before, when we say "match" we mean it in the sense discussed previously of the most similar matches that AC can find according to AC's internal match rules.

AC can also enable a user to designate given search stats as screens. As before, by this we mean that the search stats must be matched in the sense of a true match. For example, if the search stat is 10 cents or under, then the matching A-stat must also be equal to or less than 10 cents. 11 cents will not do.

Repeat Use of Search Stats

Now when a user arrives at a Q-location, the location has no search stats. It does have A-stats, but these are not search stats; they are not used to search for a question or answer that is.

As a convenience, AC can enable the user to have the last set of search stats entered kept in the background to be used for a future question entry. We will call these background search stats. By this we mean that the last search stats entered are kept temporarily in memory and hidden from view. AC can enable the user to call them up (and edit them possibly) and designate that they be used when he enters another Q-string. To let a user do this, AC can have, as options of the search stats menu, a command called Use Previous Search Stats and a command called Edit Previous Search Stats. Or, when the user calls up the form to enter search stats, AC can assume that the search stats remain the same from the previous entry, until the user changes them. The point of these options is to save the user time.

As another convenience, AC can enable a user to set search stat defaults such that a given set of search stats goes along with every Q-string the user enters, until the user cancels the default command. This default option can be quite useful. For example, returning to our traffic jam, Rex might have lots of questions about the jam. He might want to automatically preface them all with, say, the same price and quality information.

Matching Q-specs

In certain cases, search stats can be matched against Q-specs.

Little Digression

There are essential aspects of answers that cannot be supplied by any single individual. And there are essential aspects that have nothing to do with information in the sense of bits and bytes. This is a fascinating thing about answers. Aspects such as credibility and demand come from elsewhere.

And they are crucial to the value of answers.

Thus people want to know about these aspects and people ask for answers based upon them. For instance, people want credible answers. If Rex asks, How should I teach a blind person to walk across the street?, Rex will surely want to know that the technique supplied has been well tested. There are various ways of verifying answers. We do not have any perfect way. And yet the fact that an answer has been verified changes the answer (and can be reflected in A-stats).

Credibility is an obvious case of an aspect of an answer that is valuable though not well understood. Let's take a less obvious example that is quite important where AC is concerned, and that is the example of demand. Say a user wants to find an actual answer in AC and finds none that he is satisfied with. He might then want to find a missing answer that is similar and that also has a high POE. He might want to find such an answer in order to pool demand with other requesters. Indeed, the intentional pooling of demand will turn out in many cases to be a critical way that the POE is raised high enough for a given answer to be supplied. And if the answer is supplied, it can be found by its demand, its popularity that is. So demand is an aspect of a missing or actual answer that we do not understand but that can be critical to choosing the answer.

AC compiles statistics that enable people to differentiate answers based on many essential, though perhaps poorly understood, aspects of answers. This is a key feature of AC.

Imperfect Representation

As we have discussed, questions represent answers. The A-stats that come from the Q-record of a given Q-string are part of the representation of an answer, whether the answer is missing or present.

The A-stats also show us how imperfect any representation is, especially a representation that changes in time. For example, if an answer has no complaints registered against it one day and ten the next, is it a different answer? Yes, in the minds of potential buyers it is.

And yet we collect demand for an answer based on who arrives at the corresponding question. Why do we collect demand information based on what questions people arrive at rather than on what questions people arrive at and on what A-stats are showing at the times of arrival? Why not? Because the A-stats change. Therefore, we cannot say what answer is represented. We cannot collect enough demand. So we compromise and use questions as the static surrogates for answers.

Now it is possible to show what A-stats were showing at the times that each requestor arrived at a question and made an offer for the corresponding answer. AC can enable users to see this information. It can be important for deciding whether or not to supply an answer. Still, the problem remains; there is no perfect way to represent an answer, especially one that changes in time.

Q-Locations Created?

So does AC create a new Q-location using the A-stats that are entered along with a Q-string? No, not when A-stats are used as search parameters (search stats). Users in any mode can use A-stats as search parameters. To explain why Q-locations are not created with them, we will assume Rex is the one entering them. The same reasoning holds for users in other modes.

When Rex enters A-stats along with a Q-string, the purpose is to find a question (and possibly an actual answer, if one has been supplied). Like the Q-string, A-stats describe an answer, which may be actual or missing. As discussed in chapter 3, what makes A-stat information different from Q-string information generally is that A-stat information describes aspects of an answer that are not expected to be supplied.

Many important aspects of answers can be described by A-stats but cannot be supplied directly. We repeat some examples previously given because A-stats are important, and in many ways new.

For example, Rex can ask for the answer to the question: Biography of Hans Bethe?
Rex can specify an A-stat of: Good reviews.
Sue cannot supply an answer with good reviews.
Rex can specify an A-stat of: Most popular by sales.
Sue cannot supply an answer with high sales.
Rex can specify an A-stat of: No verified complaints.
Sue cannot supply an answer with no verified complaints.
Rex can specify an A-stat of: POE above $10.
Sue cannot supply an answer with a given POE level.
Rex can specify an A-stat of: Price under $1.
Sue may be able to supply an answer at a given price. But she may not be setting prices. Price is an example of information that can be Q-string and/or A-stat information. If the price is set by AC, then Sue, obviously, cannot supply an answer with a given price.

As noted, many A-stats can be phrased in terms of Q-string information. For example, Rex can specify in a Q-string that an answer is to be under a certain length. This information can also be specified as an A-stat. That does not affect the idea of A-stats. The user decides how to enter the information, as Q-string or A-stat or both. If the user decides to enter the information as an A-stat then it is understood that AC will not create a Q-location with the information.

The bottom line is that Rex can enter A-stats to find a question (and corresponding answer), by matching the A-stats in the question's Q-record.

If the Q-string that Rex is entering is new then AC creates a location for it. But AC does not create a new location for the Q-string+A-stats in the sense that has been previously explained: a place that AC takes users to when they enter a question, a place people select to find an answer, and a place people go to to supply an answer.

Pseudo Locations

As noted, a Q-string plus search stats is called a Q+. AC can store a Q+ in memory. Further, a Q+ can have a record that contains key facts about the Q+, such as who entered it and when and how many people entered it. We call a Q+ and its record by the name pseudo location.

A pseudo location is created in addition to normal Q-location, not in place of it. We use the term "pseudo" because AC does not take users to this location when it matches questions to Q-locations and when it matches Q+'s to Q-locations.

Why create a pseudo location then? The main reason is that it can be used as demand information. A Q+ can be stored as a come-from-Q, a come-from-Q+ that is. In other words, it shows what search stats a user entered in order to arrive at a given question. And it can show what search stats a user entered in order to get a given answer. For example, it can be valuable to know that 25% of people who bought the answer to Biography of Hans Bethe? included a search stat of Good reviews.

Now AC can keep statistics about what search stats were entered by people who arrived at a question in the Q-record of that question. And AC can enable users to call these statistics up from a given Q-record. Seeing what A-stats were entered in the search of an answer can be valuable demand information for suppliers. Let's pretend an answer is a certain kind of blender and that each buyer has to fill out a questionnaire about why he bought. Now if 43% of buyers listed as a reason for buying that the blender had gotten a good review in Consumer Reports, and 71% listed price as a reason, then that is valuable information. The same principle applies to answers.

Now no one buys anything for one reason. There are multiple factors and it can be useful to see which ones a given buyer lists. Using the metaphor above, it can be useful to see an individual questionnaire, as well as the combined statistics from multiple questionnaires. Thus it can also be valuable to enable users to call up the come-from-Q+'s of a given question. That way users themselves can see the Q+'s that led people to the question. And so, as an A-stat option, AC can enable users to call up come-from-Q+'s. We picture a Q+ in FIG. 5.14 as a thin-line circle 160.

5.1k Entering Multiple Questions to Correspond to a Single Answer

A user may want to enter more than one question to correspond to the same answer. For example, a user who enters Who is Spiderman's alter ego? might want to enter other similar questions, such as, In Marvel Comics, who is Spiderman's alter ego? or, Who's the man behind Spiderman's mask?.

(If Rex enters the additional question(s), his purpose can be to find a good matching question. He may also want to let other Rex's find his question in order to pool demand for the same answer. If Sue enters the additional question(s), her purpose can be to enable Rex's to find the answer that she puts in.)

Hence, AC can enable a user to designate that the next question to be entered corresponds to the same answer that the current-Q corresponds to. AC can include a command that might be labeled Synonym Question which the user selects to designate that the next question entered is a synonym of the current-Q. As explained in Book II, AC can create a direct link between these questions called a synonym link. As seen in FIG. 5.15, it is also possible for AC to link the questions 170, 171, 172 indirectly through the actual answer or missing answer 173.

5.1l Comparison Questions

AC can enable users to enter what we will call a comparison question (comp-Q). A comp-Q is shown along with the current-Q. It can become the current-q if the user selects it to be.

AC can also enable the user to select a question on screen and designate it a comp-Q.

The purpose of the comp-Q, as the name implies, is to be compared with the current-Q. For example, the current-Q might be: What's causing this traffic jam?

and the comp-Q might be: What's going on, goddamnit, on the Ten?.

AC can include a comp-Q button 119 that the user selects before entering a Q-string. After pressing this button he enters a question just as he enters a question to be the new current-Q. The comp-Q is shown on screen and, as with a new current-Q, AC searches for a match.

AC can then show certain key match stats and A-stats about the comp-q or the user can ask to see these stats.

Upon seeing these, the user can then decide if he wants to make the comp-Q the current-Q. If so, he can select it and enter Go.

Now if he is dissatisfied with the comp-q he can erase it and enter another. As with the current Q, he can edit it and hit Enter after the editing. AC can also enable him to copy the current-Q into the comp-Q area on screen and then edit the question to create the comp-Q.

The comp-Q option can be quite useful for it enables a user to easily compare the key stats of two questions.

AC can also enable the user to link the current-Q and the comp-Q in various ways, but we save this possibility for Book II.

Now in the matter of creating a Q-location for the comp-Q, AC does so by the main rule of creation discussed above, even though the user might not go to the comp-Q. For example, if the user is a requestor and the question is new, AC still creates a location, complete with Q-record. However, what is registered in the Q-record may be different than what is registered when the user goes to the question.

5.1m Auto-Questions

AC can include a type of question that when entered causes AC to create more questions based on the information in the original question. We call questions that are created in this way auto-questions (auto-Q's). And we call a set of these questions an auto-set. A question that causes AC to create an auto-set is a seed question.

For example, say a user enters, Jim's phone number?. From this AC can create numerous questions about Jim: Jim's address?, Jim's age?, Jim's job?, and so on. AC creates a Q-record for each of the auto-questions and for the auto-set altogether.

Now we assume that the user has designated a land where this first question is a seed question. To enter a seed question, a user has to enter subject information into a given named field. The subject information is used to create the auto-set. This is illustrated in tables.

Tables

Tables of answers can be very useful to have in AC. A table can be made up of answers entered to correspond to auto-sets. The key feature of tables in AC is a potential auto-set of questions, more conveniently thought of as a blank row. A blank row is made up of a set of blank named fields. For example:

Product_____ Store_____ Price_____

A row will have at least one subject field. In the case above, we will say that the subject field is the product field.

Once the subject field is filled in, it implies—and AC creates—an auto-set of actual questions. For example, if product field is filled in:

Walkman X Store_____ Price_____ we have a set of questions:

Where is a Walkman X sold? and

What is the price of a Walkman X?.

Of course, more than one field can be filled in, which can make for different questions. For example:

Walkman X Circuit City Price_____

Walkman X Luskins Price_____ are different questions:

What is the price of a Walkman X at Circuit City? and,

What is the price of a Walkman X at Luskins?.

As more fields are added to a row, more individual questions are created. For example, if we add a phone number field above, we have the questions:

What is the phone number of the Circuit City that sells Walkman X?

What is the phone number of the Luskins that sells Walkman X?

Questions are defined by the information in a row that is missing from blank fields and by the information that is present in filled fields.

In order to enter an answer, Sue can name the table or enter a seed question. AC then presents her with a blank row that she can enter her answers into.

Though questions can look like answers—because they both can have the same information—AC does not use the same table for questions and answers. AC stores questions and answers distinctly from each other.

A Multitude of Questions

A multitude of questions can be used to search a table and process the answers in a table to yield other answers. There are plain old questions, where answers are asked for and outputted by direct lookup, for example, finding the price of a given product. And there are function based questions (FB-Q's), for example, finding the five lowest prices in a list of prices. Regardless of the great variety of particular questions, they all use the same named fields as are in the table.

AC creates Q-locations for all these questions, using the information that is filled into the fields. The rules of creation are the same as discussed before. (The creation of FB-Q Q-locations is discussed in section 5.4.)

(Note: Table structures and the meta-rules of their operation are set up by system operators. AC can also enable users to set up their own tables.)

5.1n Entering and Linking Questions

AC can enable questions to be entered and linked to one another. There are two categories of links which we'll call form links and named links. A question can be linked to others by form link and by named link.

Linking questions is a big topic because linking questions in certain ways can provide solutions to the problems raised in the previous chapter. As noted, Book II is devoted to the linking of questions and so we do not dwell on the topic here.

The main point to make now is that questions can correspond to each other and not only to answers.

Entering Name Linked Questions

We have discussed form links above. The second type of link is what we call a named link. Here a user can enter a question and link it to an existing one with a link that is named to reflect the semantic relationship between the two different question strings. For example, a synonym link means that the user considers two linked questions to be synonyms of each other. Named links are a broader category than form links. In fact, form links can be considered special cases of named links.

Preview of What Will Be Described in Book II

As discussed above in sub-section 5.1d on the matching of questions, there can be a profusion of potential matches to a given question. How then to match a question against existing questions?

The solution of Book II is a semantic-economic one, using links between questions. We preview the solution here because we refer to linked questions throughout this chapter, and it is useful to have some context as to how they are used. We use the small example of just two similar questions:

1. Daneel Olivaw's phone number? and,
2. R. Daneel Olivaw's phone number?.

As noted, AC enables users to link pairs of questions by naming the semantic relationship between the questions involved. For example, a user might enter both of the questions above and link them with a synonym link. Or a user might enter one of these questions and AC might tentatively match it to the other that, say, is already in the system. The user, seeing the tentative match, can then link the two questions with a synonym link.

Assume then that both questions are in the system and are linked with a synonym link. And assume that a user arrives at Daneel Olivaw's phone number?. He can ask to see synonym questions. AC then shows him, R. Daneel Olivaw's phone number?. He can then travel to that question. At each question he travels to he can express interest in the answer.

Linked questions have their own separate demand records, but of great importance, the information in the demand records can be combined. For example, say that 7 people have landed on the first question and that 5 people have landed on the second. There are 12 different arrival requests. Some of the same people who landed on the first question might also have landed on the second. And so a combined tally will not have the value of 12 requests by 12 different people. We cannot give any universal rules for how demand information is combined, but we do recognize that it can be combined in useful ways.

Thus our "net" of two questions has a combined amount of demand. A person who might want to enter the answer to the first question knows that there may be extra demand from people who arrived at the second question.

Let us say then that someone enters an answer to the first question. (She might also enter the same answer to the second, but we disregard that possibility here.) Now, when someone is at the second question, which we assume has no answer, he can ask to see an answer to a synonym question. AC can then take him to the first question and show him that the first question has an answer. Or, AC might just output the answer to the first question, depending on the output rules in that situation, and on what he has asked AC to do.

Now in this simple example, we have used the only two questions and so the linking is simple. What if there were thousands of potential match questions. Would we connect them all to each other directly? If we did we would not be solving our problem. We do not need to link them all directly but can do so indirectly. The links are a kind of match.

We then allow users to find questions and answers by traveling along links or "jumping around" question nets. As users travel they can express demand for answers at different questions.

Now this idea alone will not work for we will have networks of linked questions but with no question having more matches (no greater expression of demand) than another in general. And so we add economic signals. For example, we allow people to see which questions have more demand than others. And we allow people to specify travel destinations according to economic information, according to the most popular destinations, for example.

People can then intentionally pool demand on given questions. A question may be favored for no good reason initially, but people can join in because it pays to pool efforts rather than only express interest in one's own question. If the pay-off rises high enough, an answer may be supplied. This answer can then be found through linked questions.

Another thing that can happen is that no question may have much more demand than another. Yet a supplier may enter an answer to a given question, seeing the combined demand of a "net." The answer can then be found through other, linked questions that make up that net.

Of course, the situations can get more complicated than this. The use of demand information as a specifier to find a question and/or answer is just one example of the ways people can find questions and answers in a question net.

The point we make here is that we do not need to find the "best" match for a given question out of a large set of potential matches. "Best match" is a mirage in most cases. If we link the questions in certain ways and allow people to find the questions through the links in certain ways, we can solve our matching problem well enough.

5.2 The Q-A Input Path, Entering and Storing Answers

There is one basic input path for entering and storing answers in AC. We will call it the Q-A input path. We say basic because while the details of entering answers may differ the essential idea remains: a question is identified and an answer is entered to correspond directly to that question in memory.

The details of the Q-A input path will vary depending on the land of AC and on the answer involved. For example, in certain lands, AC might assume by default that Sue wants to supply an answer to the question she has entered, simply because she has selected supply mode. The particular series of steps for inputting a given answer can be called an input structure. Because answers vary greatly, input structures can vary greatly. For example, the steps for entering a phone number, an article, a blueprint, and a video tutorial will likely be different.

More importantly, the rules for storing answers can vary widely regarding how the stored answers are found and sold.

Thus, "basic input path" refers to numerous variations on a single theme.

5.2a The Q-A Input Path

Entering an Answer to Correspond Directly to a Question

To enter an answer Sue must be at a question other than the null question. She may have created the question in order to enter her answer. Or she may have arrived at a question someone else has created.

Once she is at a question, she selects the option AC includes for entering an answer. Once she selects this Enter Answer option, AC enables her to enter an answer. She then enters an answer, and AC stores it and links it directly to the question in memory. We might also say that AC stores the answer directly under the question.

This answer is a direct answer to the question. And the question is a direct question to the answer.

Direct answer in a sense is defined by the inverse operations of finding the answer and getting the answer for output. We can think of a dictionary where words are questions and definitions are answers. A definition can be found directly under a word; it corresponds directly to the word. It is in this sense that we mean a direct linkage or direct correspondence between a question and answer.

As we know from any dictionary, there can be many different definitions stored under a word. In a conventional dictionary, definitions are ordered.

Like a conventional dictionary, AC can have multiple answers for a question. However, unlike a conventional dictionary, AC's rules for presenting answers can vary widely and are not usually a visual ordering, as in a conventional dictionary. (Note: we use the term "conventional" dictionary because AC can be considered, among other things, a new, unconventional dictionary.)

We discuss the issue of multiple direct answers a little later below. For now our point is that an answer is stored under a question so that a user who arrives at the question can ask to get the direct answer.

For example, say a question is:

What is a two word weather report for the summer in Washington, DC?

Sue arrives at this question. She then enters her answer: Hot, Swampy.

Then when Rex arrives at the question, he can get the answer: Hot, Swampy.

Let us make a few notes about terms. When we say that a question has an answer, we mean that a direct answer has been supplied and stored for that question. When we say that an answer is at a question, we mean that a direct answer has been supplied and stored for that question. When we say that an answer is missing, we mean that no direct answer has been supplied and stored for that question. When we say that a question has a missing answer, we mean that no direct answer has been supplied and stored for that question. Sometimes, we will use the terms direct actual answer, and direct missing answer. Usually it should be clear from the context whether we are referring to an actual or a missing answer or both.

5.2 b The Q-A-Record

To store Q-info (A-stat information) about Sue's actual answer, AC creates a new record, which we call a Q-A-record. This record is a sub-record of the Q-record.

We sometimes call the information in the Q-A-record by the name Q-A-info. But this name can be misleading because the Q-A-record is a subset of the Q-record. So Q-A-info is also Q-info. We use the term Q-A-info because it is simpler than saying "Q-info about an actual answer."

Most all the A-stats that apply to a missing answer also apply to an actual answer. Thus much of the information registered for missing answers is registered for actual answers as well. For example, the Q-A-record will have a demand record pertaining to Sue's actual answer.

However, numerous additional A-stats are registered about an actual answer that cannot be registered about a missing answer, such the length of the answer, the price of the answer, sales of the answer, complaints about the answer, and so on.

Sometimes we will use the term actual-answer statistics (A-A-stats) to refer to A-stats that are registered about an actual answer. Usually we let the context dictate whether the A-stats are about all the answers to a question or mainly about a particular actual answer.

There are three main purposes for storing information about an actual answer:

1. to describe the actual answer,
2. to keep track of royalties owed, and
3. to give information about potential other answers to the actual answer's question.

It is because the Q-A-record is used to provide information about potential answers that the Q-A-record is a sub-record of the Q-record. We elaborate on this point later.

Since one of the purposes of the Q-A-record is to store royalty information for Sue's answer, the Q-A-record includes a credit record where royalties are registered. The credit record may include citation information pertaining to answers that get a share of the royalties from Sue's answer. We discuss this point later as well.

When we say that A-A-stats describe an actual answer we mean it in two senses. One, is user's point of view. They tell about the actual answer. The other is AC's point of view. The A-A-stats distinguish the actual answer in memory from other actual answers to the same question. Why not then call the Q-A-record just an actual answer record? Because, an answer is not alone in AC. It corresponds to at least one question. And, information about it can indirectly tell about other answers.

How is information registered in the Q-A-record? Most information is registered when users, especially Rex's, react to Sue's answer. (How users react to her answer depends on how it is presented. And there are various ways AC can present an answer. We will discuss this topic later as well.) Some information is registered automatically when Sue enters her answer. Examples are Sue's ID data, the time of entry, and the length of the answer. Other information can be entered by Sue. We discuss this kind of information next.

5.2c Entering Supply Stats

Certain A-stats (A-A-stats) can be entered by Sue along with her answer to describe the answer. When A-stats are used this way, we call them supply stats. Examples of supply stats are the source of her answer, quality assertions about her answer, the price of her answer, and so on.

For example, she may supply the answer to the question,

Short Biography of Hans Bethe?.

As supply stat information, she might enter certain keywords, such as physics great, Los Alamos, Cornell, Longest active career, etc.

Keywords are a small example of supply stats, but they illustrate well that supply stats can describe various aspects particular to Sue's answer.

To enter supply stats, Sue selects a command 120 that AC includes for supply stats, and AC then presents her with a form for entering them. Or, AC automatically provides her with a supply stat form when she enters an answer.

The supply stat form may be broken into many sub-forms: a form for price, a form for quality assertions, a form for keywords, and so on.

AC stores the supply stats she enters in the Q-A-record for her answer and displays them when necessary. They are seen by others as A-A-stats for her answer.

Depending on the rules of the land that Sue is in, she may be required to enter certain supply stats. For example, she may be required to set a price for her answer.

(Note: Price can be considered a special kind of supply stat because it can change and vary in many ways, more so than other supply stats in general. Another thing that separates price from other supply stats is that it involves transaction procedures, sales that is. Still, while price does have a special role, we put it in the category of supply stats because it does describe an actual answer, and because Sue can enter it. We explain the role of price more fully in Chapters 6 and 7.)

Supply stats are different from other A-stats in that they can, in theory, have been asked for in a Q-string. Unlike many kinds of A-stats, they describe aspects of answers that can be supplied by a user.

Sue can change supply stats. Price is the most obvious case, but other stats are changeable as well. For example, Sue may change quality assertions that she makes about her answer. In order to change the supply stats, she must identify her answer, and press the supply stat command. AC then presents her with the supply stat form which she can use to change given supply stats.

5.2d A Q-A-record Is a Subset of a Q-record

As noted above, one purpose for collecting Q-A-info is to create A-stats that describe that answer. These can enable Rex to decide whether he wants to buy the answer. They are product information. The A-stats also enable Sue to monitor her answer. Through A-stats, she sees reaction to her answer. She may then decide to change it in some way, or to change the price. Of course, A-stats also enable AC to differentiate between multiple direct actual answers to the same question.

While these purposes for gathering Q-A-info are obviously essential, there is another essential purpose: to provide information for helping users decide whether to enter another answer to the question (for example, an improved answer).

Thus the demand information in the Q-A-record does not just apply to the actual answer. It also applies to potential answers. It applies to answers that might replace the actual answer. It applies to answers that might improve on the actual answer. It applies to answers that might be completely different from the actual answer.

Demand information is not the only Q-A-info that is useful for a potential supplier to know. She must answer two key questions about a potential answer:

1. What answer should I supply? and
2. How much will I get for supplying it?

AC can provide a POE for telling her what she might get, but AC cannot tell her what answer to supply. This she needs to figure out from common sense. Seeing A-stats (e.g., quality control comments) about an actual answer and seeing the actual answer itself can obviously help her make guesses about these two questions.

We see this principle with most any physical product, of course. The sales of a product give us the best clues about what the sales of similar products will be. And the product itself gives clues as to what an improved product should be like.

Information gathered about a single actual answer is not the only information that is relevant to deciding whether to enter an another answer to the direct question. First of all, there is information that was gathered before any actual answer was supplied. Second of all, there may be multiple direct answers supplied. Q-A-info from all these is collected in the master record, the Q-record. Third of all, even when an answer is supplied to a question, AC may not initially present that answer to a user who arrives at the question, and may not initially register information in the Q-A-record. AC may only register information in the Q-record. Thus, while a Q-A-record is differentiated within its Q-record, it is just part of the combined set of information in the Q-record that enables users to evaluate potential new answers.

(Note: The exception to this rule occurs when Sue enters a question and answer and no other direct answer has been entered. Then the only information that is registered may be about that actual answer. As mentioned, what is registered depends on how AC presents the answer and how AC registers information in the Q-record and Q-A-record.)

We can see why a Q-A-record is a subset of a Q-record by taking the example question: What is today's weather report?.

Assume that there are 10 requests for the missing answer to this question.

Now assume someone supplies an answer, and assume that there are 10 more requests from different people. And so we have a total of 20 requests for the answer, half when it was missing and half when it is present. The combined tally may help make a more accurate POE for a potential updated answer than one of the tallies alone.

Demand for today's actual weather report might apply to demand for tomorrow's potential weather report. And the demand for the past 100 actual weather reports might apply to the demand for tomorrow's weather report. Each past report is a distinct answer to the direct question, while tomorrow's potential report can have a POE based on the sales of the past reports. The demand records of all the past reports are combined in the Q-record.

As shown in FIG. 5.16, when we picture an actual answer 180 being supplied to a question 181, we show a Q-A-record 182 along with the actual answer. We also show the Q-record 183, for it is the master record. And we also show a blank box 184 signifying a missing, potential answer. A potential answer always exists.

(Unfortunately, the idea that the Q-A-record is a sub-record does not come out well in the figure because the Q-A-record looks totally separate from the Q-record. Later we will introduce the idea of a Q-A-location. So the figure is a compromise.)

Now it is easy to say that the Q-A-record is a subset of the Q-record, but what does that mean? How is the information used? Well, we cannot say. The best we can say here is that it is combined. The ways it can be combined and used are far too various to describe, or even know much about. There is little experience in this area.

As discussed above, the key questions that Sue wants to answer for herself are: 1) What answer should I supply? and 2) How much will I get for supplying it? (There are many other things Sue may want to find out about, such as what price she should set for her answer, but the two key questions are the ones above.)

We cannot say much more than that the Q-A-record is a subset of the Q-record because we cannot say much about how the combined information will be used to make guesses about these two questions. That is because there is far too much variety in potential answers to a given question, and far too much variety in the way answers can be sold, and far too much variety in the way royalties can be shared. We will take up these issues briefly next.

5.2e The Endless Answers Problem Revisited

When we consider how AC might enable users to enter more than one direct answer to a question, we run right into the endless answers problem. Endless answers reality is another term for it. The reality is: If we take a question and supply an answer, we find that endless other answers can also satisfy the question.

There are numerous sub-problems posed by this reality. We have discussed some of them in Chapter 4, especially those regarding the collection of demand information. Regarding the storing of more than one direct answer, the problems posed are:

a. How to present an answer for sale?

b. How to assign royalty credit when it is sold?

That's because, in AC, a storage procedure for an answer is defined in terms of how the answer is found, and sold, and credited with royalties.

For example, if there are 2,000 answers to the question, Movie Review of Casablanca?, how is AC to present them to Rex?

And let us say that many of the answers borrow from other answers. How then is royalty credit to be split, given paraphrasing and perhaps verbatim copying?

Let us give some example questions to see the problems. We will just give questions and imagine that someone has already supplied an initial answer.

What is today's weather?

Now, what if someone enters an "updated" weather report that changes just a few facts? How shall we give credit to the first answer? What if the updated report is very different, a "new" weather report?

How high is Longs Peak?

Now what if someone enters a "corrected" figure? What if there is a debate on the definition of height? What if there are hundreds of measurements?

What is the price of Walkman X?

Now what if someone enters the same price as the initial price? The second price might be considered a useless repeat of the first, but then we might also call it a valuable confirmation.

What's a photo of Old Faithful?

Now let's say someone provides a second photo which many people prefer to the first photo? Should the first photographer be paid? What if the second photo isn't that much different from the first? What if it is very different? Of course we don't know what different means in any definite sense, so that poses a problem in deciding what to do.

Short Biography of Hans Bethe?

Now what if someone enters a second biography that adds to but does not change the first? What if the new biography only differs in that it corrects some mistaken footnotes in the first biography? What if the new biography is a translation? What share of royalties should the translator get paid?

How do you get to Chicago fastest from Washington, DC, by car?

What if someone enters an answer that copies the first but changes a just a 5 mile stretch going into Chicago? What if the two answers share only one road?

These examples are a very meager selection. For most any question one can think of a fantastic variety of different kinds of answers. We have not even discussed the difference in efforts to arrive at different answers, or ways of evaluating how much people care about the differences.

We know so little about classifying the differences between answers, and we know so little about paying for improvements, that we certainly cannot say at this time what are the best ways to present and give credit to answers. There are no universal rules that hold. Yet, we can say that AC requires certain kinds of rules and functions for any scheme of enabling users to enter more than one answer to a question.

Before, discussing these, we should mention that users can enter answers under different questions rather than under the same question. Using different questions is a fundamental way of differentiating answers. This does not completely solve our problem, for the basic issues remain: how to present the answers and how to credit answers. Moreover, we still need rules for how more than one answer can be supplied to a given question, because even when we use different questions, we still need to accommodate the possibility of a better answer to a given question. Generally, it will not work to reserve for eternity one answer to a given question.

5.2e Rules and Functions for Storing Multiple Answers to a Question

There are numerous ways AC can store multiple direct answers to a question. The variety comes from the various kinds of rules there can be for presenting the answers and for crediting the answers with royalties. While we cannot give any specific rules, we can say that AC requires four kinds of rules and functions.

(Note: When we say rules, we mean both meta rules that users understand and internal system rules that are required for implementing the meta rules. Often we call internal rules functions because they involve sets of steps for carrying out the meta rules.)

1. A Second Rule of Creation, Creating a Q-A-record

AC creates a Q-A-record for each actual answer supplied. This rule was discussed above. We may call it the second rule of creation, in contrast with the main rule of creation, which is to create a Q-record for any new question. Thus, different actual answers to the same direct question are all stored under that question and are differentiated by their A-A-stats. (Another way of looking at the situation is that AC creates a Q-A-location for each answer. We discuss this idea later.)

(Now, in certain cases, where changes are made to an answer, AC may not create an entirely new record, but that is not really to the point. We will assume that AC creates a new Q-A-record whenever Sue changes the content of an answer.)

2. Copy/Credit Rules

If Sue uses another answer in her answer, which can happen in a great variety of ways, then AC needs rules for enabling Sue to give royalty credit to that other answer. These rules are also discussed in Chapter 14 on property rights.

Copy/credit rules illustrate how AC operates by meta rules and internal rules. By meta rules here we mean rules that tell Sue when to give credit to other answers. By internal rules we mean functions that AC has for enabling Sue to enter citation information and functions for automatically crediting another answer with a share of Sue's royalties, when Sue's answer is sold.

For example, if Sue uses a long quote in her answer, then she may have to assign a share of her royalties to the owner of the quote. It is by AC's guidelines for the sharing of credit that Sue understands what to do. It is by AC's credit functions that the royalty payments are transacted.

Copy/credit rules are the hidden regulators of the answers that are supplied to AC. Why is that? Because a person will enter an answer based upon how much she thinks she will make when it is sold. How much she will make depends on how much she has to pay to other answers and on how much people who copy her answer will have to pay her.

Thus, AC's rules for defining copying are fundamental aspects of the system. One hesitates to call them part of the system in that they are almost always meta rules. But still, they are fundamental in determining what answers get entered.

When we say copy we do not mean in the narrow sense of a copyright infringement, we are thinking more in terms of patent infringement, and yet we are thinking of more. It is an area that needs exploration. We need to discover better rules for paying for improved answers, while giving enough credit to the original answers that the improvements are based on (see Chapters 8 and 14).

We cannot give any rules and say only that experimentation seems to be the best policy.

In some cases, AC can have "what the market will bear" rules in which Sue's answer is compared to another answer. Rex can choose between two answers and explicitly pay for a given improvement. For many reasons, such a scheme is hard to execute and there is no time to go into the problems involved.

3. Challenge Rules and Functions

AC's meta rules are rules that users need to follow in order for the system to work. For example, Sue may be expected to properly cite a given answer as deserving a share of the royalties that her answer gets. The meta rules tell her when to do this.

Where meta rules are concerned, there must be ways for determining whether users have violated the rules. There can obviously be disputes, for money is involved. And so, AC needs means for enabling users to alert system judges to problems. And AC needs means to allow system judges to rule on matters.

AC has its traffic rules; it's right of way rules, so to speak. Instead of police roaming the streets, users themselves spot infractions. They can complain to system judges. Unlike many traffic situations on the streets, evidence is available and can be evaluated. In other words, AC needs rules and functions that enable users to challenge the actions of other users. This is especially evident where users supply competing answers.

These points, of course, apply to any meta rules and not just those involving the supplying of answers. The need for challenging procedures is discussed in various places, especially in Chapter 14.

4. Show and Sell Rules

If more than one direct answer can be supplied to a question, AC must have rules for how the answers are shown when a user arrives at a question, and rules for which answer is sold when the user requests one for output.

(When we say that an answer is shown, we mean that A-A-stats for the answer are shown. When we say that an answer is sold, we mean that it is outputted.)

To repeat a previous point, these rules are part of storage rules, because how an answer is shown and sold is part of how it is stored. While the name does not seem to have anything to do with storage, we will call these rules show and sell rules.

The importance of show and sell rules in AC can be seen by analogy when we think of a printed product catalogue. In a catalogue for, say, office supplies we see headings for various kinds of products. Under a heading for Pens there might be descriptions of a dozen different kinds of particular pens. Obviously, it is crucial to the sales of a given kind of pen how the pens are displayed, and more important, whether they are shown at all in the catalogue. We can presume that many manufactures might want to get their pens in the catalogue but cannot because of the catalogue company's show and sell rules.

AC is different than a static print catalogue of course, but the problem of presenting choices remains. While AC can show partial A-stats for more than one answer at a time, the number of answers whose A-stats can be shown at once is severely limited. Thus AC needs rules for selecting which answer(s) to show A-stats about.

AC also needs selection rules for which answer to output. (AC can output more than one answer at a time, but for simplicity, we will assume that only one answer is outputted per output request.) The user may choose the answer, or AC may choose the answer. When AC chooses the actual answer, then AC obviously needs rules for selecting the answer out of a set of possible answers.

While show and sell rules mean selection rules that apply to direct answers already in AC, they can also mean rules for restricting what answers are allowed to be stored for a given question. In other words, show and sell rules can include meta rules that define a satisfactory answer to a given question. Let us discuss this point briefly because it is a basic way of handling the endless answer problem.

One way to handle the endless answer problem is to narrowly restrict the meaning of questions. By tightly restricting definitions, users can have a good chance of knowing what answer to expect and what answer to supply. That does not mean that only one answer satisfies a given question, but that any answer entered has to match the conditions of the meta rules. For example, a rule in certain lands can be that an answer has to be true. Sometimes AC can judge whether a condition has been met. For example, a rule can be that an answer has to be under 100 words long. AC can judge whether this condition is met. Other times, as with a rule about the truth of an answer, AC cannot judge; and so AC enables users to file complaints about answers with a system judge. The judge may then rule that an answer is unsatisfactory and may penalize the supplier or take various other actions, such as allowing a different answer to replace the offending one.

As noted, AC can include numerous lands where different meta rules apply and where the same questions mean different things. Say questions are names. One land might then be a phone directory where each name corresponds to a phone number. Another might be an encyclopedia where each name corresponds to a subject. Another might be a geographical locator where each name corresponds to a GPS number. And so on.

Now rules for defining the boundaries of answers to a given question need not be highly restrictive. But highly restrictive conditions are necessary when questions are not linked to one another. If definitions are not restricted—so that users can have a good idea of what answer to expect—then the endless answers reality will swamp the system because no one will have a good guess as to what answer to expect, or what answer to supply, to a question.

Aside: Avoiding Many Constraining Rules by Linking Questions

As described in Book II, many of the problems caused by the endless answer reality can be greatly ameliorated by linking questions in certain ways. By doing this we can input and output as many answers as we want, but they will correspond indirectly to a given question. We separate the answers by giving them different question-labels but connect the question labels so that an answer can be found from more than one question. Though certain meta rules remain, they do not really limit the number and kind of answers that can be entered to correspond indirectly to a question.

However, as noted, storing answers under different questions does not solve all our problems. Thus, show and sell rules also apply to direct answers to linked questions.

What's Next

We will now discuss two general approaches to storing multiple answers to a question. These are just approaches, with no specific rules attached to them. One we call the unlimited answers approach. The other we call the current answer approach. In a sense they represent two poles of a spectrum of ways that multiple direct answers can be stored. One way is sort of a free for all. The other way is restrictive. In between these two approaches are countless others that vary according to the particular rules used to show and sell answers.

After discussing these two approaches, we will explain a general method for making comparisons between direct answers to the same question.

In all approaches, a central element is a Q-A-location, so we discuss that first.

5.2f Q-A-Location

Another way of saying that AC creates a Q-A-record is to say that AC creates a Q-A-location. By this we mean that AC creates a record and enables users to access (interact with) this record, just as a Q-location means both a Q-record and that AC enables the user to access the Q-record.

The term location here can be confusing though because the Q-A-location is not separate from the Q-location. A Q-A-record, as noted, is part of the Q-record. Thus a Q-A-location is part of the Q-location.

Recall, a Q-location is made up of a question and a Q-record. When Q-record information is shown on the Q-display, we say that the user is at a Q-location. The Q-display shows options pertaining to that Q-location.

The Q-display also includes options for accessing a given Q-A-record, and for getting the actual answer that the Q-A-record corresponds to. When the Q-display options apply to a particular Q-A-record, we say that the user is at a Q-A-location. We can also use the term current Q-A-location.

Thus the Q-A-location is both a distinct location in memory and part of the Q-location. If we think of the Q-location as an area, we can think of a Q-A-location as sub-area within the area. But this picture isn't very good because the sub-area leads to an actual answer, which isn't very clear visually. As a better picture, we might think of a question as a potentially vast, multiplex movie theater and a Q-A-location as a theater within this multiplex. The theater shows a movie, an actual answer. Outside this theater a patron can see various information about the movie and then decide whether or not to pay for and see the movie. But this picture is not that good either. It falls short because AC may take a patron right into the movie without stopping in the "lobby" to see Q-A-info. Let us just realize that a Q-A-location is a new thing that is hard to compare to existing things. It is a sub-record of a Q-record, and its subject is an actual answer.

When we say that AC finds or matches a Q-A-location, we mean that AC matches a Q-A-record. When we say that a user arrives at a Q-A-location, we mean that AC presents him with options for accessing the Q-A-record, and for getting the corresponding actual answer. A user does not so much go to a Q-A-location as a given Q-A-location is presented to him as part of the larger Q-location.

When a user arrives at a Q-A-location he sees A-A-stats for an actual answer. He can "react" to the answer, for example by making an offer for the answer, or entering a complaint about the answer. In other words, when a user is at a Q-A-location, AC registers information in that actual answer's Q-A-record.

When a user is at a Q-A-location, he is still at the Q-location, and so information is still registered in the Q-record. AC still shows options that pertain to the current-Q, and to potential answers, and to finding other Q-A-records, if any, that are at that Q-location.

Thus, the term location is a bit confusing for the process by which AC creates a record for an actual answer and allows users to access that record, while the users are at a larger record, the Q-record. Still, we use the term location because it is convenient to think of a user going to a record. We can then think of the linking of records, for example the linking of Q-A-records, of Q-A-locations. We can think of a user going to a given Q-A-location to see A-A-stats about a given actual answer.

How does a user arrive at a Q-A-location then? That depends on AC's show and sell rules, which we are going to discuss further below.

First let us discuss what we mean by being at an actual answer. We do not think of an actual answer as having its own location. We might say that there is an actual answer location, but in fact, when an answer is outputted, the user is still at the Q-A-location for that answer. That is because AC can still register information about the actual answer and can still output information about the actual answer from the Q-A-record. So, the actual answer is directly connected to the Q-A-location. It is never entirely alone; it must have a Q-A-record that goes along with it.

However, we should distinguish between being at a Q-A-location and not seeing the actual answer, and being at a Q-A-location and seeing the actual answer. Perhaps we should say that when an answer is shown that means that the user is at the actual answer location. Instead, we will just say that an answer is outputted or seen. That will mean that the user is at the actual answer, and that the user is simultaneously at the Q-A-location for that answer.

Now let us return to the topic of how a user gets to a Q-A-location.

5.2g The Unlimited Answers Approach

When the unlimited answers approach is employed, Sue arrives at a question and enters her answer. AC creates a Q-A-record for it. The Q-A-record is differentiated from other Q-A-records by the A-A-stats for Sue's answer. We picture this in FIG. 5.17 where a question 185 has four actual answers 186 and Q-A-records 187.

What characterizes the unlimited answers approach is the ways users arrive at a Q-A-location, the ways an actual answer is presented, in other words. The main idea is that no location is preferred over another, at least not at the time of storage. Given AC's matching rules, and given the various search instructions entered by users, there will be Q-A-locations that are preferred, but we cannot say which ones in advance. (This is in contrast to the current answer method below where a single answer is preferred.) There are two general ways that users can arrive at Q-A-locations given the unlimited answers approach.

1. Arriving at a Question That Has No Q-A-location Showing Initially

AC can enable the user to arrive at a question and AC can show no Q-A-location initially. In other words, AC does not show any A-stats from any Q-A-record. AC instead enables the user to enter a command for scrolling through the Q-A-records at that question. Alternatively, AC can enable the user to enter further search stats to specify a Q-A-location that AC can then match and present.

For example, say that the question Rex arrives at is Short Bio of Bethe?. And say that there are 100 direct answers to this question. Say also that Rex enters a search stat of 5 cents. AC will then take Rex to a Q-A-location for a bio that costs 5 cents. Of course, AC may need other search stats in order to narrow down the selection to one Q-A-location. AC may will also have defaults for taking users to given Q-A-locations. For example, one default may be that AC takes the user to the more popular of two given Q-A-locations (of course, popularity can be defined in various ways, and we are just giving an example). It all depends on AC's matching rules.

2. Arriving at a Q-A-location Initially

The second way that a user can arrive at a Q-A-location is for AC to take him to the Q-A-location that best matches the question or Q+ that the user has entered. In other words, AC matches questions and Q+'s against Q-A-locations and picks the best one it can find at that question. AC can present more than one match at a time. And AC enables the user to use the options for finding another Q-A-location. The only difference from above is that AC does present a Q-A-location initially. Of course, there must be a Q-A-location at the question in order for this to happen.

Automated Output

When Rex asks AC to pick an actual answer to output, AC chooses the best matching Q-A-location it can find. However, it may not find one because there may be no Q-A-records with adequately matching A-A-stats (see 5.3c).

5.2h The Current Answer Approach

The idea behind the current answer approach is simple: when a user arrives at a question, AC defaults to showing him A-stats about one answer out of a set of possible direct answers. We call this favored answer the current answer.

The current answer is defined by meta rules which we call displacement rules. When Sue enters an answer to a question that already has a current answer, her answer is allowed to become the current answer if it meets the displacement rules. In other words, meta rules define what answers can displace the current answer. If there is no existing current answer, Sue's answer becomes the current answer.

Displacement rules can vary widely. The idea is that they are designed so that a displacing answer is deemed "better" than the answer it displaces. Though better is very vague, it gets the idea across. A simple example of a displacement rule is that the current answer should be correct. If it is not correct, it can be displaced. For example, if a price is out of date, a new, correct price can become the current answer.

Now AC cannot know about conditions in the real world and so Sue must say whether her answer deserves to be the current answer according to the meta rules. AC assumes she is right, while allowing others to challenge her judgment.

Sue enters a new answer by pressing a New Current Answer command that AC includes for enabling her to enter an answer. After she enters her answer, AC makes it the current answer, and the displaced answer becomes a past answer. (AC can alert the supplier of the displaced answer, who may want to challenge the displacement.)

The current answer approach is an important way of restricting the answers that can be stored for a question. The approach can be used to enable a given Sue to "reserve" an interpretation of the question for her answer, blocking out various other interpretations. That does not mean that a single answer fits the question but that only a "better" version should fit (we have not escaped the endless answer reality, only narrowed interpretations).

For example, assume that the current answer can only be displaced if it is found incorrect. Then, if a user desires to enter an answer to a question that already has a correct answer, the user has to enter the answer under another question. For example, if Sue intends to supply the answer to Russell Marker's phone number?, and there already is a correct phone number in AC for that question, Sue would have to enter a different question, though one that still describes her answer. She might enter, Russell E. Marker's phone number? (presuming of course that the Russell she has in mind has the middle initial of E) to store her answer under.

So the first Sue who entered the phone number for Russell Marker "reserved" the meaning of Russell Marker as referring to a particular Russell Marker. The new Sue who wanted to use that question has to pick another question, Russell E. Marker? That's because her answer was no better than the first Sue's answer. We might say that they are equally valid. And so the first answer remains undisplaced.

Thus, by the current answer approach:

Sue arrives at a question 190 and presses Enter Current Answer, she enters her answer 191, AC stores her answer and creates a Q-A-record 192 (a Q-A-location) for it which AC makes the Q-A-location that people see when they arrive at the question.

The previous current answer becomes a past answer 193, whose Q-A-record 194 remains and differentiates it from other past answers and the current answer.

Past Answers

Past answers have their own Q-A-locations, differentiated by the A-A-stats that are particular to their Q-A-records. When a user arrives at the Q-A-location for the current answer, AC can enable him to enter a See Past Answer command for seeing Q-A-locations of past answers. AC can then enable him to scroll through A-A-stats for particular past answers. Or AC may enable him to enter search stats for finding a given past answer Q-A-location.

Therefore, even though a question has a current answer, users can still find past answer Q-A-locations, and can transact business there as well.

How many past answers should be kept is a design decision. To limit the number kept, AC can charge Sue a storage fee for keeping her past answer or can keep only those that generate enough revenue to justify their storage.

5.2i Labeling the Differences Between Two Direct Answers to the Same Question In many cases, when Sue wants to enter an answer, what she wants to do is change or improve on an existing direct answer. There can be so many ways that Sue can "change" or "improve on" an answer that these words cannot get the possibilities across. Instead let us just say that Sue's answer is different from a given answer.

Now Sue may want to point out how her new answer differs from an existing answer. And AC may, in certain cases, require her to do so.

(In Book II, we will discuss how AC can enable Sue to name the relationship between answers that correspond directly to different questions. Here we are not concerned with that. We are concerned with how Sue can express the relationship between two direct answers to the same question.)

We give a method below that AC includes to enable Sue to express the difference between her answer and an existing answer to the same direct question. While there can be great variety in the details of this method, it is just a small variation of the basic input path. The difference is that, rather than arriving at just a Q-location, Sue arrives at a Q-A-location for the answer that she wants to compare her answer to. AC then enables her to describe the relationship between that answer and her new, different answer. Thus:

1. Sue arrives at the Q-A-location of the answer she wants to compare her answer to.
2. She presses a Change command that AC includes to enable her to signify that her new answer has a relationship with the answer at the current Q-A-location.
3. AC enables her to enter her answer. She enters her answer. AC stores it under the question she is at and creates a new Q-A-location for it.
4. AC takes her to the new Q-A-location. AC presents her with a form for entering a description of the difference between the answer she has entered and the answer at the previous Q-A-location she was at.
5. She enters a description of the difference.
   a. Her description can be taken from a list of standard descriptions that AC includes, for example: update, improve, add to, validate, more complete answer.
   b. AC can enable her to enter a description in her own words in which she compares her answer to the answer at the previous Q-A-location.
6. AC stores her comparison as an A-stat for both answers. In the new answer's Q-A-record, AC tells which answer the comparison refers to. For example AC might store, "an update of the answer with so and so A-stats." In the Q-A-record of this other answer, AC also stores the comparison and tells which the new answer is. For example, "updated by the answer with so and so A-stats."

In addition, AC can create links between two Q-A-records, as shown in FIGS. 5.19 and 5.20. By links we mean that when a user is at one of the Q-A-locations 195, 197 he can travel on the link to the other 196, 198.

Answer History

Using the method above AC can keep a history of "changes" that have been made to an actual answer. The history is a chain of differences recorded in the Q-A-records of each answer in that chain. This is especially appropriate where the current answer approach is employed. Thus if the current answer has displaced another answer, the current answer can have an A-stat indicating what change was made. Each answer then, except the first, has a record of how it differs from the answer it has displaced.

Insert/Delete Option

AC can also include a command that enables Sue to edit an existing answer. She presses this Edit Answer command, and AC enables her to edit the answer of the Q-A-location she is at. As above, AC still creates a new Q-A-record for her edited answer. In this case, AC also saves the insertions and deletions she has made, so that there is a record of the change. The record can be kept as an A-stat in the Q-A-record of her revised answer.

Alerting the Original Supplier

When Sue wants to compare her answer to an existing answer by the method above, AC can automatically alert the supplier of that existing answer. The supplier may object to the comparison. The two suppliers may communicate about whether the comparison is appropriate. Also, Sue may want to contact the original supplier in order to get permission to make a comparison or to consult about a comparison.

Note on Quality Control Labels

One way that any user can "change" an answer is not by changing the content of the answer but making quality comments about it. These comments can be crucial. For example, a comment might say, "Out of Date" or "Incorrect." Of course there can be far more detailed reviews of an answer.

For now, the point is that answers can be substantially changed without actually changing their "content." A separate Q-A-record is not made in this case. Instead a comment is entered into the Q-A-record for the answer that is commented on.

Quality control labels (comments are one kind of label) can be very important A-A-stats (see chapter 13).

5.2j Brief Digression: What About the POE?

If there are multiple direct answers to a question, then how is a person to evaluate the POE for a new answer to the question. For example, if the question is Movie Review of Casablanca?, and there are already several reviews supplied, how is a potential supplier to decide what the POE is for a another review?

Of course, we cannot say generally. In this section what we have described are ways that AC can enable users to store multiple answers to correspond directly to a given question. The endless variety of potential answers remains.

Questions do not identify single answers and so a given Q-record and Q-A-record do not apply to only one answer. The records do not even apply just to answers that can be stored for their question. They apply to a slew of "similar" answers that can be stored under a slew of "similar" questions.

By the same reasoning, multiple Q-records can apply to the answer that Sue is considering entering for a given question.

Thus, Q-records can be linked so that users can make guesses about the demand for a given actual answer that might satisfy Rex's who have entered different questions. In other words, multiple Q-records, especially demand records, can be combined to yield combined demand for an answer. We then have demand based on a question net, but this demand still must be collected at individual questions.

When we think of question nets, which obviously have many differing questions, we can see that evaluating the demand collected in one Q-record is not necessarily the point. And whether one or more answers have already been supplied to a given question is not necessarily the point. There may be many alternative answers to consider, and they may be stored under different questions.

Why even have a demand record for a given question if it does not apply to a single answer? Well, questions are the only way we can identify answers. So we use them, while realizing their limits. Demand information stored under a given question many not apply to a single answer, but it can still help a potential supplier decide whether it is worthwhile to enter a given, actual answer.

How a user evaluates the demand information depends on the situation. The alternative answers that have been supplied to the current-Q obviously are a factor to consider. So are answers that have been supplied to similar questions. There are a host of factors to consider. They not only include considerations of what a question means but also of AC's rules, like show and sell rules and copy/credit rules.

A user must use common sense. But without AC's A-stats, especially demand information, common sense is blind.

5.2k Entering an Answer to Correspond Directly to Multiple Questions

As discussed in 5.1k, AC can enable users to enter more than one direct question to correspond to the same answer. We should note briefly, yet significantly, that when AC stores an answer to correspond to one of these questions, it can store the answer to correspond to the other questions as well. AC may have the user press a command for this to happen, or AC may do it automatically.

We leave aside this matter until section 5.5 where we discuss common Q-records.

5.2l Questions That Correspond to Answers with Multiple Parts

AC can include a type of question that allows multiple users to contribute sub-answers (sub-A's) to make up a "larger" answer. We will call this type of question a combo-Q and this larger answer a combo-A.

With combo-Q's the Q-A input path again remains essentially the same. However, AC requires procedures for putting together the sub-A's for output. In addition, AC needs to store each sub-A as a discrete entity that is tagged by Sue's ID data, so that she can be credited when her sub-answer is outputted. (Of course, AC requires royalty rules for defining how much credit each sub-answer gets.)

A sub-A corresponds directly to the combo-Q in memory and is entered in the same way as a single answer: Sue enters the combo-Q and then enters the sub-A. For example, say Rex enters, What are the major steel companies in the US.?, and designates this as a combo-Q. Then various Sues can arrive at the question and enter the names of different steel companies. Each entry is a sub-A and the full list can be outputted. The list can continue to grow and be updated.

As another example, say a certain Sue enters, What's the news in Angola?, and designates it as a combo-Q. Subsequent Sues can then contribute their accounts, which can be differentiated in various ways, such as by time of entry and by author.

A combo-Q can be seen as a question where the unlimited answers approach applies and where the multiple direct answers under that question are outputted together. However, by having a special category of combo-Q's, AC can enable particular rules to apply that would not normally apply with plain old questions. The particular rules concern making it easy for people to enter answers to be combined with other answers. Such rule include copy/credit rules and presentation rules. We cannot give any particular rules but just say that when answers are to meant to be combined that different rules will apply than apply for plain old questions.

Combo-Q's As Linked Questions

It is important to note that the sub-A's to a combo-Q can be differentiated by their own sub-questions. For example,
  the combo-Q might be: What's the news in Angola?,
  a sub-Q might then be: What's the situation with unexploded mines as of 6/6/96?
  another sub-Q might be: Dispatches by Flynn?

If sub-questions are included in the scheme, a combo-Q is really a kind of name linked question where the sub-Q's are linked to the combo Q. A sub-A is then a "full" answer to its sub-Q, while it is also a sub-A to the combo-Q.

5.2m The Q-A Input Path for Linked Questions

Regardless of whether a question is linked to another or not, the basic Q-A input path applies: Sue arrives at a question, and then enters an answer, and AC stores the answer to correspond directly to the question. She may have gotten to the question by traveling through other questions, but that is beside the point.

When a first question is linked to a second question and the second question has a direct answer, we call the answer an indirect answer to the first question. And we call the first question an indirect question to the answer.

5.2n Addendum: Invisible Test-Answers

As discussed in 5.1c, users may enter questions, Q-locations, just to test demand. We now consider a feature AC can include for enabling users to test demand for actual answers, rather than just answers represented by questions. In other words, we discuss how AC can enable Sue to create a fake Q-A-location for testing demand.

Now when Sue enters an answer she creates a Q-A-location. The response of Rex's is then tested as demand information is collected at this Q-A-location. The problem is that it is only tested with one set of A-A-stats, the set a that applies to her real, actual answer. If Sue sets a price for her answer, for example, then she only sees what the demand for her answer is at that price.

She may also want to see, hypothetically, who would have bought her actual answer if certain A-A-stats were different, such as product reviews and price. Thus AC can include a Test Answer command for enabling her to enter fake, hypothetical A-A-stats along with her answer to create an extra, invisible Q-A-location.

When we say invisible, we mean that Rex's do not arrive at the Q-A-location, but that AC still collects certain kinds of demand information. In particular, AC registers how may times the answer would have been outputted by the MMA path (see 5.3) based on the hypothetical Q-A-location.

To take a simple example, Sue can enter an answer and set a price of $5. She might also want to test demand at $2. So she presses Test Answer, and AC enables her to enter hypothetical A-A-stats to describe her answer. The A-stats can be supply stats and also A-stats that normally she cannot supply. In this example case she would enter a supply stat of $2 rather than the real, visible $5.

Sue need not even have entered an actual answer. AC can enable her to enter just hypothetical A-A-stats. She can thus do market research based on a completely hypothetical actual answer that is described by the invisible, fake A-A-stats.

5.3 The Main Paths for Outputting Answers

While there is one basic path for getting answers into AC, there are innumerable paths for getting them out and using them, especially if we consider function based questions. But here we ignore function based questions. They are discussed in the next section. Here we boil down the various ways into two basic output paths.

(We might point out here that, as with the basic input path, details of the output paths can vary depending on the kind of answer.)

Now when we say output path that does not necessarily mean that an answer is actually outputted. The answer may be missing. We are referring to the paths by which AC tries to get an answer to output. An attempt may or may not succeed.

In other words, when we say output path we mean how Rex declares that he wants an answer and what AC does in response to that declaration.

(Note: AC enables Sue to get answers as well. She will normally ask to see an answer in order to check the competition. AC does not register her declaration as demand information. AC may also have a special mode for users who want answers outputted for the purpose of checking the competition. We refer to Rex throughout because the output paths mainly concern Rex.)

5.3a Some Definitions

We call Rex's declaration an output request (o-request).

Output requests are obviously a kind of request information. In describing the basic system of part I (Chapters 1 and 2, that is) we did not worry much about differentiating request information. In this part (especially in Chapter 6) we do identify many different kinds of request information and request situations. We do not simply think in terms of "requests."

Request information encompasses many actions by users that do not involve a user actually asking to get a given answer. For example, when Rex arrives at a question the arrival alone is considered request information. Yet upon arriving, he may not ask to get the direct answer. He may just look at A-stats at that location.

In other sections, for the sake of convenience, we sometimes use the terms "to request" and "a request" too loosely. The noun form especially is a more general term that does not always mean that the user wants to buy an answer. Because "a request" can be ambiguous, we use the term "output request" in this section to signify that Rex asks AC to output a given answer—missing or actual.

And when AC attempts to output a given answer, we call that attempt an output request as well. That's because an output request implies an output attempt.

As with the word request, o-request will have a noun and verb form. So, to o-request means that Rex asks to have an answer outputted, and it means that AC tries to output an answer.

When a missing answer is found as a result of an o-request, we call that an o-miss.

When an actual answer is found as a result of an o-request, we call that an o-hit. We must be a little careful here. An o-hit does not necessarily mean that an answer is outputted. That's because Rex may not have offered to pay enough for the answer. Either way, AC registers an o-hit.

AC may treat price differently from other search stats because of its transactional aspects. Rex can be at a question that has a direct answer. If he does not offer enough for the answer, then he will not get it. That is not the case with other search stats. Thus, AC can distinguish between a successful o-hit and a failed o-hit.

However, since ways of making payment offers, and way of matching answers can vary greatly, AC may treat price like any other search stat.

5.3b The Human Matched Answer (HMA) Output Path

The human matched answer (HMA) output path is an awkward name. The path is so named because the user is the one who decides what answer is chosen for output.

This output path is the inverse of the basic input path. Rex arrives at a question (Q-location). The Q-display presents him with options for seeing A-stats about the direct answer and with options for making and accepting price offers for the answer. He then decides whether he wants the direct answer.

If he wants it he selects Get Direct Answer, the command AC includes for designating the HMA path. If no answer is there, AC registers a o-miss in the Q-record of the current-Q. If an answer is there, AC registers an o-hit in the Q-A-record. If Rex has offered to pay enough for the answer, AC outputs it.

(As discussed, an A-stat may tell Rex whether the answer is in or not before he presses Get Direct Answer. Even if he knows the answer is missing he may still press the command to express his interest in buying the answer. Expressions of interest are elaborated upon in Chapter 6.)

Here we ignore the commercial aspects of the transaction, such as price offers. The point is that Rex decides that the information at a Q-location indicates that the direct answer will satisfy him. We might call the direct answer the directly matching answer. And thus we say that Rex has decided on the matching answer.

Now, as discussed in section 5.2, a question may have multiple direct answers. In this case, AC potentially then can output multiple answers. But the simplest way is to output one. For simplicity, we assume then that AC outputs one answer per o-request (and that AC registers one o-hit per HMA o-request).

As discussed, there are a variety of ways that AC can present A-stats for actual answers. Regardless of the method used, if only one direct answer is to be outputted, we can generalize and say that Rex must be at a particular Q-A-location in order to use the HMA path. (How Rex arrives at a Q-A-location is discussed in section 5.2.) Get Direct Answer then applies to the answer at that Q-A-location. Digression on Output and Charge Rules (We do not mean to short shrift the issue of how many answers Rex sees per o-request. Because there can be numerous, similar answers to a question, AC may enable Rex to see more than one answer, while only charging him for one. The output and charge rules can vary so widely that we cannot go into the possible variations. For simplicity we assume that AC outputs and charges for only one answer per o-request. The same applies to the output path described below.)

5.3c The Machine Matched Answer (MMA) Output Path

The HMA output path is in contrast to the machine matched answer (MMA) output path. In the MMA path Rex determines the question and any search stats, but then leaves it up to AC to decide what answer best matches the question or Q+.

The MMA path involves more output attempt possibilities than the HMA path because the direct answer to the current-Q is not the only candidate for output. The best matching answer may be at another Q-location.

One of the key things that makes the MMA path different from the HMA path is that if AC finds that the best matching answer is missing, AC will look for the next best matching answer, and so on, until it finds an actual answer, or until it decides that there is no adequately matching actual answer.

In the HMA path, Rex makes one choice at a Q-location (or Q-A-location). If an answer is not there, he must go to another Q-location (or Q-A-location). In the MMA path, AC may find numerous o-misses before it finds an o-hit. All the misses are best matching answers; they are matches of missing answers.

Now there can be variations on this plan. AC can include defaults whereby, if the number of misses is greater than a threshold, AC will ask Rex to specify his question or Q+ better. Defaults may be helpful because missing answers will probably vastly outnumber actual answers in AC. In other words, questions will probably vastly outnumber actual answers.

A Few Definitions for Explaining the MMA Path

The source of an o-request means the question Rex is at, the current-Q, when Rex enters an o-request. Sometimes, we will also call it the primary source.

A direct o-request means that the source of the o-request is a direct question to the answer that is o-requested. (In the HMA path every o-request is a direct o-request. In the MMA path, o-requests can be direct and indirect.)

An indirect o-request means that the source of the o-request is a question other than a direct question to the answer that is o-requested. (Note: in section 5.2 we defined an indirect question and an indirect answer in terms of how questions are linked together. Here the term "indirect" has a broader meaning. While linked questions can be the sources of indirect o-requests, non-linked questions and FB-Q's can also be the sources of indirect o-requests.)

The secondary source of an o-request is the question that is matched by an indirect o-request. In other words, when an answer is o-requested, and the direct question to that answer is not the source of the o-request, then the direct question is called a secondary source. (If there is more than one direct question to an answer, it is only the direct question that is matched that is the secondary source.)

If AC finds an actual answer due to an indirect o-request, then AC registers an indirect o-hit in the Q-record of the secondary source. If AC does not find an actual answer then AC registers an indirect o-miss. We call these o-hits and o-misses "indirect" because the direct-Q was not the source of the o-request.

Sequence for the MMA Path

AC includes a command, which we call Get Best Answer, that designates the MMA path. (In certain lands, AC might default to the MMA path.)

For simplicity, we assume that Rex presses Get Best Answer after he has arrived at a question. (AC may enable him to press it before he enters a question.)

Search stats can be used along with the current-Q to search for an answer. Before hitting Get Best Answer, Rex can enter search stats or designate that background ones are to be used. As noted, we call the current-Q plus search stats a Q+.

(Again we ignore the commercial aspects, but we note that when Rex uses Get Best Answer, he must also set a price threshold for the answer he wants to buy, unless he is restricting his search to a land where prices are uniform. In other words, Rex must make a price offer along with his o-request.)

After Rex hits Get Best Answer, AC searches for the answer that best matches the current-Q or Q+. When we say AC searches for an answer, we mean that AC looks for the best matching answer whether it is missing or actual. In other words, AC searches for best matching Q-locations and Q-A-locations.

If AC finds a best matching Q-location without an answer, that means AC has found a best matching missing answer. AC then registers an o-miss in the Q-record of that question and then looks for another match (if the matched question is not the current-Q, AC registers an indirect o-miss). AC keeps going until it finds an actual answer at or below the price Rex has offered, or until it determines that there is no adequately matching actual answer.

If AC finds a matching actual answer, it registers an o-hit in the Q-record and Q-A-record of the matching question and answer. Thus, if the matching answer is not a direct answer to the current-Q, AC registers an indirect o-hit.

Now, where the MMA path is concerned, AC may treat price like a search stat screen in the sense that it will not register an o-hit unless the price of the answer is at or below Rex's offer. In this case, AC will only register an o-hit for one answer, the answer that is outputted.

The reason not to bother with actual answers that cost more than Rex's price offer is that Rex may have set such a low offer that AC has to match too many actual answers, register too many unsuccessful o-hits, to no effect. (The same problem can exist where there is no actual answer, and no price set for the missing answer. AC may match too many missing answers.)

On the other hand, AC may treat price specially, as discussed, and register an o-hit for every actual answer that matches Rex's question or Q+, except for the price search stat.

How AC treats price when looking for an actual answer to output can vary greatly. AC's matching rules can contain various ways for cutting down on unnecessary matching that can take place in the MMA path.

The Best Matching Answer Might Not Be at the Current-Q

Though Rex is at a current-Q when he hits Get Best Answer, AC will not necessarily find that the current-Q has a best matching actual or missing answer. Even if an actual answer is there, AC may not choose it as the best available answer. Any matching answer depends on what search stats, if any, Rex has entered, and on the alternative answers that exist, and on AC's matching rules.

(Off the point somewhat, we note that one important reason Rex may use the Get Best Answer command is because there is no direct answer to the current-Q.)

A Way to Pick From Among Multiple Direct Answers

As discussed, the current-Q may have multiple direct answers and no current answer. If so, Get Best Answer can be a way that Rex lets AC pick from among the direct answers to the current-Q. Thus, AC may also have a separate command, Get Best Direct Answer. This command applies in cases where there are multiple direct answers and Rex has decided that he wants one of these and not an answer at another Q-location. While Rex has picked a direct answer, we still consider this a machine matched answer.

Not Bothering to Show a Q-location

AC can enable Rex to enter a question or Q+ and then hit Get Best Answer without showing him the Q-location for that question. That's because Rex may not be interested in seeing anything at a Q-location. He may just want to see an answer.

In this case, unseen by Rex, AC makes the new question the current-Q as if Rex had entered the question without also hitting Get Best Answer. AC registers the necessary information, as discussed in section 5.1. For example, if the question is new to the system, AC creates a Q-location for it. AC still searches for the answer that best matches the question entered.

Rex will only see the answer, if any, that is found. If no answer is found, AC tells Rex and Rex can keep entering questions and Q+'s, until an answer is found.

In order to choose this option, Rex might enter a question and then two commands such as Get Best Answer and See Answer Only.

5.3d Registering O-requests

Registering an O-request in the Q-record of a Direct Question

When an answer is o-requested, AC registers whether the o-request is direct or indirect. And AC registers whether the o-request is a hit or a miss. And AC registers whether the o-request comes from the HMA or the MMA path. AC registers these things in the Q-record of the direct question to the answer that is o-requested.

In the case of an indirect o-request, AC also registers what the source of the o-request is. In other words, it registers the primary source of an indirect o-request in the Q-record of the secondary source.

Registering the sources of o-requests can be useful information that enables users to see what questions people have asked in order to buy, or try to buy, a given answer. For example, say the source of the o-request is: Movie Review of Casablanca?. And say the answer that is o-requested is the direct answer to the question: Movie Review of Casablanca by Kael?. Then the primary source of the o-request (Movie Review of Casablanca?) is registered in the Q-record of the second question.

AC can also register Q+'s as sources of o-requests.

Registering an O-request At the Source

In addition to registering an indirect o-request in the secondary source's Q-record, AC also registers the o-request, and it's result, in the Q-record of the primary source. For example, if Rex is at the question, Movie Review of Casablanca?, and presses Get Best Answer, then AC registers the o-request in the Q-record of that question and registers that the o-request is indirect, and registers that that question is the source.

Registering O-misses Due to the MMA Path

The MMA path can potentially lead to a great number of o-misses per o-request, as AC tries to find the actual answer that best matches Rex's question or Q+. Before AC finds a question that has an actual answer, it may find hundreds, thousands, millions of questions that are better matches, but whose answers are missing. That can be a problem because the value of each o-request can depend on how many other o-requests have gone along with it. For example, if someone expresses interest in 200 different hypothetical shirts, that does not mean that the person wants 200 shirts. He may only have interest in one shirt. The value of each expression of interest thus can depend on how many other shirts he has expressed interest in.

So what happens when there are multiple MMA o-misses? Well, as noted, AC may have default rules such that if there are too many o-misses for a given o-request, AC will ask Rex to further specify his question or Q+. That is beside the point though.

1. As discussed, AC registers each indirect o-request, including o-misses, in the Q-record of the matched questions, the secondary sources, that is.

2. Where the MMA path is concerned, for a given o-request, AC can also register with each o-miss the number of other o-misses associated with that o-request.

3. And further, for a given o-hit or o-miss, AC can also register what questions AC considered better matches.

5.3e Output Path Through Linked Questions

As noted, AC can enable users to link questions. When Rex arrives at a question that is linked to others, the question may possibly have a direct answer and/or an indirect answer. A net of linked questions can potentially be vast; thus a question may have a multitude of indirect answers.

Looking for an answer, Rex can travel from the current question to a linked question and keep going in this manner looking for an answer. Or, he may be tired of traveling and may just want to get an answer.

Rex can choose the HMA option or the MMA option. The HMA and MMA methods remain the same, though there can be minor modifications.

AC can enable Rex, for instance, to specify that an indirect answer is to be outputted. AC can enable Rex to specify what kind of indirect answer he wants. For example, he might specify an indirect answer that is linked by one or more synonym links to the current-Q. Link specifications are search stats actually, and so the essentials of output paths with linked questions are no different than with non-linked questions.

Linked questions mainly offer critical improvements in the ability to find answers and collect demand for answers. These topics are taken up in Book II.

5.4 Function Based Questions

As noted, AC can include function based questions (FB-Q's) that call special functions for finding answers. "Function based question" is a term that refers to a wide category of questions that find answers by processing existing questions and answers in AC.

This definition is inadequate. Actually, it is hard to define FB-Q's well because they cover a very broad spectrum of possible functions for finding answers. Examples will demonstrate, but a good definition is elusive.

An FB-Q has two parts:

1. a designated function and 2. subject information.

To enter an FB-Q, a user designates the function and enters the subject information (though not necessarily in that order). The function uses the subject information to find an answer in AC.

(Certain search stats can be entered as well to screen answers but we will ignore these for they are not essential to the discussion.)

In the discussion of FB-Q's we reverse the previous order of presentation. First we discuss output paths and then input paths and then the creation of Q-locations. It is easier this way because what distinguishes FB-Q's from plain old questions is how answers are gotten out of the system or are used to yield other answers.

5.4a Output Paths for Function Based Questions

To repeat, FB-Q's find answers by processing questions and answers that already exist in AC. (When we say "FB-Q's find," we mean, of course, that AC finds.)

An FB-Q can find an answer not only by working on the information in a Q-string and in a Q-record, but also in an answer itself. (For example, a keyword search might find a keyword in the content of an answer.)

Three Rough Types of FB-Q's

We can roughly divide FB-Q's into three types of functions: those that search through questions and answers, those that sort answers, and those that plug answers into formulas. Actually there is no clear dividing line, and all three kinds of functions can be combined in an FB-Q. Often there is no difference between searching and sorting. Still, the general ideas of searching, sorting and plugging into formulas can help explain how AC can use FB-Q's to find and output answers.

(Note: We use colloquial questions below as examples, though in actual implementation the syntax of FB-Q's may be quite constrained.)

FB-Q's That Find Answers By Searching Questions and Answers

AC can include a large range of search functions for locating an answer. The most important are keyword search functions. For example, an FB-Q might be: Find: "Deep Throat" within 10 words of "Alexander Haig"?. As noted, an FB-Q can search the content of both questions and answers. AC can also enable Rex to specify whether just questions or just answers or both are to be searched.

FB-Q's That Find Answers By Sorting Answers

AC can include a large range of functions for sorting answers to yield a resulting answer. For example, an FB-Q might be Find: Ten lowest prices of Walkman X?. If AC has a list of sellers of Walkman X and a corresponding list of prices. AC sorts the list and outputs the resulting answer.

FB-Q's that Find Answers by Plugging Answers Into Formulas

AC can include a large range of functions for plugging answers into formulas to yield resulting answers. For example, an FB-Q might be, Find: Average Temperature of Florida Cities?. The FB-Q can find the individual temperatures through their corresponding direct questions, which might be: Temperature Miami?, Temperature Daytona?, Temperature Boca Raton?, and so on. (AC might find the answers by some other indexing means, but that is beside the point here.) The FB-Q plugs the individual answers into an averaging formula, and outputs the resulting answer.

Use-Requests

In the previous section, we discussed o-requests. Here we add another kind of request, a use-request. By this we mean that AC tries to use an answer as part of another answer or that AC tries to use an answer to plug it into a formula to yield another answer. As with o-requests, the answer may be present or missing.

AC must register different kinds of use-requests where FB-Q's are concerned. The variety of possible uses is practically infinite.

Digression on Uses of FB-Q's

Many kinds of answers can only be found by processing other answers in a list or table. Often those other answers can only be collected efficiently by members of a community rather than by a central authority. For example, usually the most efficient way for an economy to find the lowest price on a given product is through a system that allows people to feed in prices to a central list where the prices are sorted to find the lowest ones. This way is more efficient than having a central authority call all the sellers of the product in order to check prices. With a feed-in system, only the low price sellers need feed in. AC is, of course, a feed-in system. AC registers the demand for "cell" answers (individual answers in the table) based on the questions, especially FB-Q's, that can be applied to those answers. Because it can collect this demand, AC is well suited to collecting and processing answers in tables.

HMA and MMA Output Path

FB-Q's require the MMA output path unless they take the user to a question.

Certain FB-Q's, such as keyword searches, can take users to questions. In these cases the user can designate the HMA output path.

For example, say a direct question is, What is the movie Singing in the Rain about?. The direct answer to this question might be a description of the movie. Now, let' say that our FB-Q is Find: "movie musical" within ten words of "most popular"?. This FB-Q might find these words in the direct answer. Rather than output the answer, the FB-Q can take Rex to the direct question, What is the movie Singing in the Rain about?., and from there Rex can decide whether or not to buy the answer.

Say the keyword is simply "Singing in the Rain". This will match the direct question. It will probably also match phrases in the answer. The point is simply that AC can take Rex to a question whether the FB-Q finds the answer through the question's content, or through the answer's content, or through both.

(Of course, keyword searches can find numerous matches and therefore AC can enable Rex to enter further search parameters in the form of more subject information and search stats.)

FB-Q's as Come-from-Q's

When an FB-Q takes a user to a question, the FB-Q is registered as a come-from-Q.

FB-Q's as Sources of Indirect O-requests

When an FB-Q o-requests an answer, the FB-Q is an indirect source of the o-request. That's because an FB-Q is not a direct question to the answer that it causes AC to find. For example, if the FB-Q is Find: Average temperature Florida cities?, AC o-requests the answers of various direct questions, such as Temperature Miami?, Temperature Daytona?, etc. to arrive at a resulting answer.

5.4b Function Based Questions Rarely Have Input Paths

As noted, it is hard to define FB-Q's well because they cover a very broad spectrum of possible functions for finding answers. One litmus test that helps define an FB-Q is the following: an FB-Q is a question that users usually cannot supply an answer to. That is because an FB-Q works on existing questions and answers in AC. Users cannot know the answer to an FB-Q because users do not know all the questions and answers in AC.

For example, an important kind of FB-Q is a keyword search. Now, a user can have no way of supplying an answer to such an FB-Q because she has no way of knowing all the questions and answers in AC that will match the keywords.

Another important kind of FB-Q is one that plugs existing answers into a formula, say a formula for finding the average temperature from a list of temperatures. Again, a user cannot supply the answer because the user does not know all the relevant answers (temperatures) in AC's list.

There are exceptions to the rule. Sometimes a user will know enough about what is in AC to give a direct answer to the FB-Q. Big exceptions are certain sorting functions where a user might know the highest or lowest value to supply to a list that AC sorts.

This example was seen in Chapter 2, with the lowest price locator. The user can compare the lowest price in AC against prices in the real world and might know of a lower price in the real world.

Even if the user knows the answer to an FB-Q, AC will normally have the user supply the answer as a direct answer to a direct question. The FB-Q will then find the answer through the direct question. For example, AC can enable the user to enter the answer to a direct question about the price of a product. The price then goes into a list which is sorted.

Despite the exceptions, FB-Q's generally cannot be answered by people and thus they do not have input paths and direct answers.

Showing Direct Questions

Still, AC can show a user the direct questions that correspond to the answers that an FB-Q causes AC to find. In other words, the FB-Q is a primary source of an o-request and AC can show the secondary sources of those o-requests.

AC can enable a user to ask to see these direct questions. Even without AC showing the direct questions, a user may be able to recognize which direct questions and answers are involved when an FB-Q searches for an answer.

A user can choose whether or not to enter direct answers to those questions.

5.4c Creating Question Locations

Though an FB-Q has no direct answer, AC can still create a Q-record (including a demand record) for an FB-Q. Demand information (and other information) gathered in the FB-Q's Q-record is fed into the Q-records of direct questions that correspond to the answers that AC outputs or tries to output as a result of the FB-Q.

Moreover, AC can show certain A-stats that apply to FB-Q's. The A-stats shown depend on the particular FB-Q. The cost of an answer, for example, is useful to see. POE information can be useful in rare, but important, cases. That's because, as mentioned, users can in certain cases know what answers will be used by the FB-Q.

How much information is kept in an FB-Q's Q-record depends on the FB-Q. Demand information is normally most important, but with FB-Q's it may not be necessary to keep. It depends on the situation.

For example, AC may not keep demand records of keyword search FB-Q's, but may instead simply register demand information in the Q-records of the direct questions that the keyword FB-Q's find. Let us take an FB-Q that does the following keyword search:

Find: "orange" within ten words of "karpousi"?

Let us assume that this question is only entered into AC once during a year. In a case such as this there may be no point in maintaining a demand record.

On the other hand, it may be quite useful to keep a demand record for an FB-Q. Let us take an FB-Q that does the following sort:

Find: Lowest price Walkman X, in US.?

Here, there may be hundreds of thousands of repeat requests and it can be quite useful to maintain a demand record.

There are no rigid rules, for the category of FB-Q's is too wide. Decisions in this area are design decisions.

5.5 Combining Information in Question Records

In the previous sections we saw how multiple questions can lead to the same answer being requested. When multiple questions can lead to the same answer being requested, AC needs to come up with a combined set of information to be fed into the POF. Recall, the organizing goal of the system is to come up with an estimate of total sales and royalties of an answer. If a question is a vending machine and an answer is a product, and if the product can be requested for sale through different machines, then it is obviously best to combine the sales records from each machine into a total count.

In this short section we have in mind mainly the combining of information in D-records because the main goal is to create a good POE for an answer and that depends primarily on the D-records. However, other parts of Q-records can also be usefully combined. This is especially so when there are multiple direct-Q's for an answer.

Registering Indirect O-requests

To repeat from section 5.3, an answer can be indirectly o-requested. As noted, AC registers an indirect o-request in the Q-record of the direct-Q of the answer that has been o-requested. AC also registers the source of the o-request. And so, AC registers and classifies all the indirect o-requests for an answer in the Q-record of the secondary source, the direct-Q to that answer. In this way AC can combine the request information from direct-Q's and the sources of indirect o-requests.

When Multiple Direct Questions Correspond to the Same Answer

When multiple questions are direct questions to the same answer, AC can automatically link their Q-records. (By linking records, we mean that information in a first record can be accessed from a second record, and vice versa.)

This principle applies whether the answer is missing or actual. FIG. 5.21 shows three questions 201, 202, 203 that correspond the same actual answer 204. We imagine that their Q-records are linked by showing dashed arrows between the questions. In addition, for each question there is a Q-A-record 205, 206, 207 that corresponds to the actual answer. The Q-A-record (Q-A-locations) are linked as well. Thus, if a user is at one of the Q-records and Q-A-records, AC can pull information from the other linked records. In this way, AC can combine Q-info and Q-A-info to present to the user, and to feed into the POF. If AC registers information in one of the Q-records, this information can also be registered in the linked Q-records. Q-info can be combined in a great variety of ways, of course.

Linking Question Records of Linked Questions

In Book II, we discuss how AC can directly link questions that are not necessarily direct questions to the same answer. As discussed in Book II, whenever AC links two questions it also links their Q-records, especially their D-records.

In Book II we will discuss how AC can combine demand information of indirectly linked questions (how AC and users can evaluate demand information combined from a net of questions). For now, we just say that AC can link the Q-records of directly linked questions. This implies that AC can combine the information in Q-records of indirectly linked questions.

Common Question Record

When there are multiple direct-Q's to an answer, AC can use information from their Q-records to create a common Q-record. The principle applies for actual answers and missing answers that have multiple direct-Q's in common.

This common Q-record can be created by feeding in information from the individual Q-records into the common record.

The common record contains information from each Q-record that applies to the answer that all the questions have in common (though the individual Q-records might contain demand information about answers not in common as well).

In the case of multiple direct-Q's to an actual answer, a common Q-A-record is created in addition to the common Q-record. The common Q-A record may be considered a sub-record of the common Q-record.

When a user arrives at one of the individual direct-Q's, he can see A-stats based on the common record, not just based on the individual Q-record.

What Location Is the User At?

When a user is at a Q-location, he is interacting primarily with the Q-record of that location. But, when a question is linked to other questions, the Q-info can be pulled from multiple Q-records. Or, the Q-info may be pulled from a common Q-record. So, when multiple questions correspond to the same direct answer we have two perspectives on a question location. From the user's perspective, he is at a single question. In other words, in general, AC presents a single location to the user. But, from AC's perspective, one can in sense think of the user being at multiple locations, at least that AC can pull information from multiple Q-records.

A more confusing situation can arise when the user chooses the MMA output path and asks AC to Get the Best Answer. AC then outputs an answer. Now, if the answer corresponds to more than one Q-A-record, which Q-A-location is the user at? Again, AC may pull information from the multiple Q-A-records, but in general, it presents the user with a single location. (Of course, it is possible to show the user that the answer corresponds to multiple direct questions and multiple Q-A-records. For simplicity, we can say that AC would default to one of the Q-locations and one of the Q-A-locations as the primary location.)

How to Use the Combined Information?

A general, and generally unsolvable, problem is how to apply the demand information that is combined from different Q-records. This problem is an extension of the problem of how to apply the demand information of a single Q-record. That's because, as discussed several times now, there is no single answer that the information should apply to. This problem is the same, and perhaps worse, when different questions are involved in identifying "an" answer.

Chapter 6

Registering Demand Information

As described in Chapter 2, AC collected two kinds of demand information about an answer. One was the number of requests for the answer and the other was the times of those requests. AC can collect other useful demand information. For example, AC can ask the user how much he is willing to pay for the answer.

As previously discussed, demand information is stored in a demand record (D-record) which is part of a Q-record. AC feeds the information in the D-record into the POF to yield sales forecast and POE information about an answer. In other words, the idea is to collect information that can be used to help potential suppliers answer the question, "What the hell am I going to make if I find and supply this answer?." Given the purpose of the record, it might be called the sales forecast record or the pay-off estimate record, but demand record seems more natural.

Whatever the name, a fat problem remains. Future demand cannot be measured. The problems involved are worse than just those inherent in making projections. In fact, demand cannot be measured at all. And yet, in order to come up with a good guess or guesses about future sales, AC needs to gather information on what we call demand. A brief digression is in order.

6.1 A Digression About Demand

The Meaning of Demand

Demand can refer to the idea of how many units of something are sold at a certain price over a certain period of time. For example, one can say that the demand for gasoline this year was 80 billion gallons at a price of $1 a gallon (never mind for the moment that prices fluctuate).

However, demand as we normally think of it means something more general. It usually refers to how much a group of people want a product or service or piece of information. Here we get into trouble, for how much one person wants something is a psychological state and we cannot measure that. Then if we consider multiple people, we have to add up their individual desires. Of course, if we can't measure one person's desire, we certainly can't add the desires of many people.

A "measure" we have of a person's demand (desire) for something is how much that person is willing to pay for the thing. But even here we are in trouble and we can see how sloppy the idea of demand is, for how do we measure how much an individual is "willing to pay" for something, say, a carton of milk, a lawnmower, a necklace, a house, a telephone number, a book? Well we cannot measure "willingness to pay" because we cannot read a person's mind. The amount a person does pay, the price at the time of purchase, does not measure how much that person is willing to pay. A person might buy a shirt at $40 but that doesn't mean that $40 is exactly what the person is willing to pay. He might have been willing to pay more. A person might pass up a shirt at $40 which he would have bought it at $35. Perhaps the highest he was willing to pay was $37.47. The seller will never know exactly. Even the buyer will never know an exact, static figure. He may be broke one day. He may be flush the next. A purchasing decision is a psychological state as well.

Then we add a further complication. With most goods and services we have an open market, meaning we usually offer everyone the same price and make that price public, as opposed to having individual negotiations with every potential buyer. But an open market doesn't tell us much about the total demand for an item. If the price of a shirt is $30 in the open market, how will we know how many people would have paid more and how much each person would have paid? And how will we know how many people are willing to pay for the shirt but not as much as $30, and how will we know how much each of these people would have paid?

So while we often might say that demand means how many units of something were sold at a given price, over a given period of time, that does not mean we are measuring demand. We see that there is no such thing as demand in the sense of something concrete we can measure.

Then let us add yet another complication. We would like to know about the total demand of a group of people, yet different people express interest in a product at different times. Moreover, prices fluctuate. How then can we measure the total demand at a given time? And at what point in time? We cannot. There is no such thing we can measure as demand in the present. All we can do is have one set of people, those who have expressed interest at different points in the past represent a set of people in the future, quite a dicey proposition.

We should not leave out one more major problem which is that alternatives change. While we collect information about an answer over a period of time, alternative answers, both missing and actual, may arrive in AC during and after that period. Say we have collected information about a given shirt. What is the relevance of the past information when new, competing shirts hit the stores? What is the relevance when new shirt designs are requested that may or may not be supplied? As with evaluating demand for any product, it can be hard to evaluate the demand for a given answer in light of new alternatives that keep popping up.

Despite all these problems, we can gather information—which we call demand information—that helps us guess at what sales of something may be during a given period of the future. Our guesses, on average, will be better with this information than without.

A Few More Things to Keep in Mind About Demand Information Collected by AC

AC registers demand information when a user selects request mode (or whatever we call the means by which AC enables users to declare their desire to buy an answer). When we say that a user declares his desire to buy an answer, we do not mean a particular answer, we mean the more general idea that the user is looking for an answer to get, rather than looking to accomplish other goals.

(As discussed, there are other modes that users can be in, such as supply mode and check mode. AC can include purpose (mode) buttons that a user can press to tell AC what his or her purpose is for going to a given Q-location or Q-A-location. The point is that AC enables users to differentiate between the desire to buy an answer, and the desire to accomplish some other goal.)

The demand information is collected (registered) at questions (Q-locations) because questions represent answers. Some of the information is collected automatically when the requestor enters a question and other information is registered by prompting him or enabling him to enter the information of his own accord.

The correspondence between questions and answers is strange. Therefore, how demand information applies to a given answer is not clear. We recall from Chapter 4 that demand information does not necessarily apply to a single answer. But we also recall that the best we can do is gather information under a question and then make assumptions about how that information applies to an answer or answers.

6.2 Introduction: Demand Information in AC

People can ask for all kinds of answers from a phone number, to a cure for malaria, to the contents of mayonnaise, to a blueprint of the Great Pyramid, to a video on changing a tire. In some cases, one person may be interested in an answer, in other cases thousands of people may be interested. In some cases people will be willing to pay 0.1 cent, in other cases a 1,000,000 dollars. The range of demand possibilities is wide and demand information (D-info) can be collected all along this range.

There are many kinds of D-info. Some is what we think of as "plain old information," such as the time that a request is made. But some is more than that because it involves a buying offer. If a user agrees to buy an answer at a given price this offer is D-info. And if the answer is in the system, and AC agrees to that price as well, then a sale is made. In other words, a buying offer involves more than just information. It involves a contract and possibly a transaction. Now very often an answer will be missing and no sale will be made. Whether an answer is missing or is present, the point remains that Rex intends to buy and this intention is made operational by AC. By that we mean that AC includes functions for registering Rex's offer and for executing whatever contractual obligations are involved, such as the delivery of the answer and the registering of charges and payments. So when we say D-info sometimes we have in mind plain old information, other times we have in mind more than that, for an offer and transaction operations may be involved.

We will show some of these transactional steps in this Chapter even though they are operations in addition to the storing of information in the D-record. The registering of D-info involves these activities so it is appropriate to discuss some of them here. However, we omit most of the transactional steps, taking them to be understood.

(We should note that AC can use information that might not be stored in the D-record to help in predicting sales. For example, complaints about an answer might help predict the sales of the answer. These are stored in the Q-record, though perhaps not in the sub-record we have called a D-record. However, if AC uses information to predict sales, we will consider that information to be D-info.)

In any projection of future sales and income there are too many factors to keep track of. Formulas for projections have been known to contain thousands of variables and still fail miserably. In the next sections of this chapter we discuss several types of D-info that can be useful in forecasting the sales of an answer. The list is not, and cannot be, exhaustive. (We do not describe how the information is used by a POF.)

For convenience, section 6.2 is divided into two parts. Part 6.2a describes the registering of what we might call request information, information that is registered along with a request. Part 6.2b describes the registering of price information. Both kinds of information are essential for characterizing a request but it is convenient to split the discussion into two parts because the registering of price information involves numerous sub-issues.

We note here that some of the D-info discussed can only be registered in the D-record of the current-Q. For example, when Rex makes a commitment to buy an answer, this commitment applies to a direct answer to the current-Q. In other cases, AC can register D-info in the D-records of questions that are not necessarily the current-Q. This can happen because of the MMA path, in which indirect o-requests can be registered in the D-records of questions other than the current-Q. This was discussed in section 5.3.

MMA o-requests can have many of the same things registered about them as HMA o-requests. However, it is hoped that it will clear from the context of the discussion that certain kinds of information do not apply to MMA o-requests.

Section 6.3 discusses the registering of buying situations. Instead of thinking of just a request plus additional information, it is better to think in terms of situations. These can be characterized by numerous factors, and we can only touch on some of the important ones.

Section 6.4 briefly discusses how AC can compile demand statistics and how it can use these in characterizing a request.

Section 6.5 touches on the central issue of evaluating a request in light of alternative requests.

Section 6.6 touches on how time can render D-info obsolete and how AC can adjust for this problem.

Section 6.7 discusses a few other considerations that might be thought of as miscellaneous points.

Sections 6.8 just mentions the important possibility of investment offers.

6.2A Some Useful Kinds of Demand Information
1. Requests

Request is a term that covers a range of actions that Rex can take and that AC can register information about. We can distinguish between innumerable different requests based on numerous situations that Rex can be in and numerous actions that AC can allow Rex to take. We will try to classify requests in a limited number of ways, while realizing that there are other ways, and that we can never be exhaustive.

Most broadly, we can divide requests into two generic kinds: arrival requests and output requests. We add information to these generic requests. The more basic of the two is the first.

1) Arrival requests (es-requests).

By arrival request we mean that Rex enters or selects a question. He thus arrives at a question, a Q-location (or a Q-A-location), that is. We call such a request an es-request for the terms Enter and Select. (We would use A-request, for Arrival, but that might be confused with Answer.) The arrival at a question is the base request that all other D-info is built on. Even output requests are built on es-requests because in order for Rex to make an output request he has to be at a question (though he may not see the information at the Q-location).

2) Output requests.

By output request we mean that Rex asks AC to output an answer. We abbreviate this as o-request. In section 5.3 we described two Get Answer commands, Get Direct Answer and Get Best Answer, that cause AC to register o-requests. However, there can be many other commands, and situations, that cause AC to try to output an answer. For example, AC can include an Accept Price command which, when pressed, signifies that Rex accepts AC's price offer and that he wants an answer to be outputted. As usual, we cannot give universal rules. But basically, if Rex has agreed to pay an amount of money for an answer, AC considers that an o-request.

Both es-requests and o-requests have been described in chapter 5. AC registers all the information discussed in chapter 5 about requests including:

Come-from-Q's and go-to-Q's, including Q+'s.

O-requests—o-hits and o-misses, and whether they resulted from the HMA or MMA path, and what their primary and secondary sources were.

As noted in chapter 5, in certain lands, arrival at a question implies an output request. But in most lands AC allows Rex to have more options than just buying, and therefore, Rex may have other motives when he arrives at a question. If we think of Rex as a shopper, we realize that he can have many motives and that they might change depending on what he sees at a question. Below we list some of the ways we can think of Rex's motives. These are colloquial terms though. How AC classifies a request depends on what Rex does at a question and on the situation Rex is in, and on the rules of the particular AC.

a. Wants to Buy. He may want to buy the direct answer to the current-Q.

b. Browsing. He might be browsing, seeing what the A-stats at the current-Q say.

c. Traveling Through. He might be looking for another question that matches the current-Q or is linked to the current-Q.

d. Buying Through. He might want to buy an answer that is not the direct answer to the current-Q (he can do this using the MMA path).

e. Free Riding. He might want an answer but does not want to pay for it. Answers may be free to certain users (see chapter 7 on price setting) and the requests of these users can be used as D-info to indicate the demand of paying users.

Recalling the foundation task of the system—to count how many people want an answer—the most important distinction between requests is whether or not Rex has any interest in buying the direct answer to the question he is at.

We can think of Rex as if he was in a consumer electronics store. He walks up to (arrives) at a sign (Q-string) that says Color TV. The sign also has a lot of other information (A-stats) describing the TV. The TV is not right there in front of him, only the description. In addition, the sign lists the names of some other TV's and directions to where their signs are. Rex can go to one of those signs as well. Now the key issue is: does Rex want to buy the TV described by the sign that he is at?

AC needs means and rules that attempt to characterize Rex's intentions. We discuss some of these means and rules after we discuss price tests. That's because guessing whether someone wants to buy something is often tied up with whether the person offers to pay for something.

In sub-sections 2–12 below, we describe some of the additional information AC can register along with a request. As noted, some of the information described only applies to es-requests and to HMA path o-requests. It does not apply to o-requests from the MMA path. Other information applies to all requests.

(The main reason some of the information described below cannot apply to MMA o-requests is that it requires a decision by Rex about a specific answer, as represented by the Q-location Rex is at. But with the MMA path AC may automatically search numerous locations without showing them to Rex. It is thus impractical for him to make a decision at each of these locations.)

2. Type of Use

An answer can be o-requested for various types of uses, in addition to straight output. For example, an answer can be used in a formula that leads to the output of a different answer. AC registers the type of use that is requested, because different prices and royalty rates can apply to different uses. This kind of information is an exception to most D-info in that it applies mainly to indirect MMA o-requests.

3. Actual Sales

Actual sales are an important type of request information. AC differentiates between requests when an answer is bought and when it is not. Further, AC keeps track of total sales which are important not only for predicting future sales but for calculating royalties. And, further, AC keeps track of refunds where buyers inform the system that an answer is inadequate and where buyers get their money back.

4. Time Information

AC registers the time of each request. This information is usually critical for calculating a POE and it is essential for numerous other purposes.

Another kind of time information AC can register is how long users will be interested in the answers they have requested. Answers are only valuable for certain periods of time. For example, AC might register dozens of requests for the score of a football game. From these requests, AC might project a large POE. However, AC does not know that few people will be interested in the score shortly after the game is over. Users must tell it in order for AC to reflect this fact in the POE. (Of course, declining demand will show up in the POE, but there will be a lag.) So AC can ask Rex to input the time period for which he is interested in an answer.

Furthermore, AC can ask Rex to guess how long he thinks others will be interested in an answer. This guess can may be useful for calculating a projection of future demand. Taking our football score example, Rex can input that he is interested in the score of the game up until, say, four o'clock. And he can input that he thinks demand for the score will taper off at eight o'clock.

5. Requestor Identity

It goes without saying that AC can register who has made a request. This information is necessary for collecting and using various kinds of D-info.

6. Prospect List

AC can maintain a list of all the people who have entered or selected a question. We might call this the prospect list for the answer that corresponds to the question.

If an answer is not in the system, all the people who have requested it are potential prospects. If an answer is in system, all those people who did not buy it because the price was too high are also prospects. If an answer is in system, all those people who bought it are also potential prospects, for the answer may change and these people might be interested in the new version.

AC can differentiate between these three types of prospects (there are many other ways to classify prospects as well).

AC can also store the price each prospect was willing to buy at or did buy at (see price tests below).

AC can enable potential Sue's to contact the prospects to see if they are still interested in an answer. A potential Sue can also ask the prospects if they are willing to pay more for it than they have offered.

AC can also contact prospects. Before the relevant answer is in the system, AC can check to see if they are still interested in the answer. Further, AC can recontact the prospects when the answer arrives in the system or when the price declines. Rather than contact every prospect, AC might sample the prospects to check reaction.

7. Placing an Order

If an answer is not in the system, AC enables Rex "place an order" in the sense of asking to be alerted when the answer arrives. (The order may include the price that Rex is willing to pay. See price tests below.) AC registers the order and then, when the answer comes in, sends Rex a message that the answer has arrived.

AC also enables Rex to cancel the order at any time, including when the answer arrives. The cancellation is also registered.

Note: when an answer arrives, the price may not be acceptable to Rex. Thus, Rex may not end up buying the answer, even if he wants it.

8. Making a Commitment

Now if an answer is not in the system, AC enables Rex to commit to buying the answer for a certain period of time at a certain price. The price may be set by AC at the time of the commitment, or Rex may make an offer (see price tests below).

Making a commitment is different than placing an order. In that case there is not a commitment to buy, just an expression of interest. Here Rex makes a binding commitment good for a certain period of time. AC registers the commitment and also registers when the time period expires.

If the answer arrives before the time period expires, AC alerts Rex. And if the price of the answer is equal to or below what Rex has committed to, then AC can automatically charge Rex. On the other hand, the price might be higher than Rex committed to and then he has to decide whether to buy or not at that price.

AC may enable Rex to retract a commitment (the retraction rules can vary widely and may, for example, involve the forfeiture of a deposit).

The option to make a commitment can be quite an important feature of AC because a commitment tells a potential Sue that she can be more sure of getting a given amount of money for supplying an answer. She can say to herself, "Well, at least I know that I'll get that much money."

9. Canceling an Order or Retracting a Commitment

When we say that AC registers the cancellation of an order, that does not mean that AC deletes the original order from the D-record. The original order no longer counts in the sense of selling Rex the answer (after a cancellation, AC does not alert Rex when the answer arrives). But the original placing of the order may still be useful D-info. For example, if a person orders a certain brand of cereal in the morning but then cancels the order in the afternoon, the person's order still may represent demand for the brand. It just may be that the person, not wanting to wait, found a less preferable brand for breakfast. Taking an answer example, a person might place an order for instructions on how to change a tire. The person might later cancel the order because, before the instructions arrive, he finds someone to show him how to change the tire. Still, the person's order for the instructions may represent (correlate with) other peoples' desire for the instructions in the future.

The same reasoning applies to the failure to renew a commitment when it expires, and also to the retraction of such a commitment. The original commitment can be useful D-info.

Recall, the idea is to forecast the sales of an answer and that depends on the situations of individual requestors and whether their situations represent (correlate with) other peoples' situations in the future. That is a highly variable, dicey proposition. We can make no general rules. Sometimes canceled orders and commitments will give us helpful hints about future sales, other times not.

Because the situations are so variable, it can help if AC gathers information on why Rex canceled an order or retracted a commitment or did not renew a commitment.

Thus, when Rex does any of these things, AC can ask him the following questions and register his responses:

Did you change your mind because:
  a. the requested answer is out of date?
  b. your needs changed?
  c. you found a better answer elsewhere?
    if yes, was the answer in AC?
      if yes, which answer was it
        (identify the answer by the question you found it through, please).

(Though it is not the point here, let's mention that AC enables a user to keep track of the questions he has asked. AC keeps the list in the user record, which the user can access. AC also maintains a sub-list of questions the user has asked and that have not yet been answered. A user can "clean up" this list by going through the questions and marking certain ones that he has no more interest in with a cancel mark. AC registers each mark and cancels the corresponding orders.)

10. Would've Bought (the Meaning of Direct O-misses)

When Rex is at a question and he knows the direct answer is not in, he can still make an o-request. We call this kind of request a direct o-request, and it's result is a direct o-miss. Now, if Rex does not place an order or make a commitment to buy the answer, a direct o-miss can be interpreted to mean, "I would've bought the answer if it had been in." Want-it marks, discussed in 5.1g, are another way of making a direct o-miss. AC can also enable Rex to make a price offer for the missing answer.

Rex has the option of not entering a direct o-request when he is at a question that has no direct answer. That is why such a request can be important D-info; it helps AC determine Rex's intentions. This topic is discussed further after the discussion of price offers.

(Another way that AC can enable Rex to make such a request is with separate "button" Rex can press to indicate, "I would've bought the answer if it was here." This button is equivalent to a direct o-request for a missing answer, but it may be easier to give Rex two different commands, one that applies when the direct answer is in, and one when it is not.)

11. Preventing Double Counting

One piece of information that can be useful to register is whether Rex has asked the same question previously. In many cases repeat requests lead to misleading double counting of requests. For example, Rex might ask for the final score of a football game ten times before getting an answer (because the answer has not been entered until the time of the tenth request). It can therefore be useful for AC to include steps for registering whether Rex is making a repeat request.

AC can identify repeats by keeping a list of questions arrived at by the user, and then checking against this list. Alternatively, AC can keep a list in a given question record of the users who have arrived at that question, and check against this list.

When a repeat request is not for a new answer, we call it a false request. AC requires rules for determining whether a repeat request is a false request. There are many factors that can come into play because the answer situations and requestor situations vary widely.

Whether a repeat is a false request can depend on whether an answer has changed. For example, Rex may ask, What's the weather gonna be like?, ten different times, and each time can be a true, new request where a new answer is sought or a new answer is provided.

Moreover, AC can register in the D-record whether Rex bought and received an answer and can check whether the answer has changed since Rex bought it.

Whether a repeat request is a false request can depend on whether Rex expects the answer to have changed. The answer might not be changed in AC, but Rex may know that the answer should change or might be changed. Conditions in the world may change or the answer may be improvable.

Therefore, AC can ask Rex whether the repeat request is for a new answer or not. Asking Rex can be important because he may know better than a machine rule whether a request constitutes double counting or not. For example, Rex might ask for a second time, What is the temperature of the ocean at Ocean City?. He will know whether his request is a false request or if he expects a new answer. In other words, if AC has an answer for the temperature, it may be out of date. AC will not know that it is out of date. If Rex then enters a request for the temperature, AC might treat it as a false request. But Rex can tell AC that his request is for a new answer. The point is that double counting depends on the situation and the user's common sense about the real world situation can better identify double counting than a machine rule.

(Note also, if AC does not store who has arrived a given question, then AC can ask the user if the request is for a new answer or not.)

12. Improvement Requests

When Rex gets an answer he might, for various reasons, be dissatisfied. For illustration's, say he enters:

Question: Temperature Miami? and receives, Answer: Mid 70's.

Now, assuming he is dissatisfied, AC can enable him to do three general things:

1. He can enter a new question better expressing the answer he wants.
2. He can use the quality control menu and enter the reasons for his dissatisfaction.
3. He can enter what we will call an improvement request (IR).

He can use one or more of these options.

The entering of another question has been discussed and will be further discussed in Book II. Quality control options are to be covered in chapter 13, so we will only mention them here. In the quality control menu, AC can enable Rex to enter a variety of different comments about the actual answer, and can enable Rex to ask for a refund as well. For example, Rex can ask that the existing answer be updated and he can claim a refund based on the existing answer being wrong.

As for IR's, the point to make here is that AC can register D-info for desired improvements in an actual answer. After Rex has seen an answer, AC can enable him to select an Improvement Request "button" and enter the improvement that he desires.

Improvements can be expressed in an endless variety of ways. AC can include a menu of standard descriptions, such as, "needs updating," "needs source," "needs date," "needs additional information," "needs major fix," "needs minor fix," and so on. In some cases, the improvement desired will be obvious, in others, elaboration will be needed. Thus, AC can enable Rex to enter a message expressing in his own words the improvement he wants. Where elaboration is needed, we might say that the IR is a custom IR.

An IR is like a question in that it describes, asks for, part of an answer. AC can create records, such as a D-record, based on an IR. But an IR is not a separate question. AC does not take a user to an IR, as it takes a user to a question, and an answer is not supplied to correspond to an IR. When an improvement is entered, it is supplied to the question that the actual answer was supplied to. It replaces the previous answer, or is made part of the previous answer. (Sue also has the option of entering the improvement under a different question.)

An IR can be useful because it can enable Rex to offer to pay a certain amount for an improvement. (In this task a new question may be a better way. Certain times though it may be more appropriate to enter a comment about an existing answer, rather than enter a whole new question, asking for an improvement.)

Rex's payment offer may be just for the improvement alone, meaning he will pay the amount in addition to what he is willing to pay for the rest of the existing answer. Or, Rex's offer may be for the whole answer, including the improvement. Thus, AC can enable Rex to identify whether the offer is just for the improvement or for the full answer along with the improvement.

AC can enable Rex to enter an IR when Rex see an answer. As discussed, it can enable him to press an IR button on screen and then choose from standard IR categories and also enter in his own words what is needed. In addition, he can also enter an offer to pay an amount for the improvement described. As three examples, Rex might enter:

Improvement Request: Update as of 2:00 p.m.
Payment Offer: $1
Improvement Request: Please give location where temperature was taken.
Payment Offer: $1
As another example, Rex might enter:
Improvement Request: Please give source of the answer.
Payment Offer: $1

AC can store the IR's under their standard category names. For example, under "Update," AC can show all the requests for updates. These requests may include elaborations.

In order to collect demand for an impovement that one Rex has requested, AC needs to enable other Rex's to state whether they want that improvement as well. Thus, AC can enable Rex's to see the IR's that have been stored, and confirm whether they want the same improvements that have been requested. The improvements may not even have standard labels, they may just be comments that are entered, along with payment offers. Thus demand for given improvements can be registered from multiple Rex's.

Now when a potential Sue see the IR's for an answer, she can see what improvements various Rex's want. Further, she can ask to see a POE for a given improvement. The POE can be based on the D-info collected for the corresponding IR. For example, she might see that ten Rex's have asked that the source of the answer be given, and that, in total, they are willing to pay $4 for seeing that improvement. She might then supply the source of the answer.

How can AC calculate a POE based on an IR, a POE for a requested improvement that is? A brief digression is in order (this digression should go in chapter 9 about the POE, however, that chapter is not yet written). This digression will not clear up the matter, but only point out some of the problems involved.

Brief Digression: The POE for an Improved Answer

Once an actual answer has been supplied to a question, the POE generated from D-info at that question is a POE for an improved answer, a different answer. But it is hard to define the differences between answers. What is the POE, then, for an improved answer? In other words, what is an improvement worth? That depends on a variety of factors, such as:

a. what the improvement is, b. how many people want it, c. how much are people willing to pay for it, d. what share of the royalties Sue is entitled to for supplying it.

Based upon her common sense and, perhaps, upon quality control comments by Rex's, Sue needs to determine what improvements, if any, are profitable to provide. It can help her, of course, if she sees how much dissatisfied Rex's are willing to pay for the improvement(s) they want. Thus, IR's can help her guess the potential profit. Essential to her guess though are the meta rules defining what royalty credit she will get for providing an improvement. As is discussed in subsection 5.2e and in chapters 8 and 14, AC must have rules to deal with apportioning credit for improvements—for giving credit, in certain cases, to the Sue of the answer that is improved upon.

The most clear-cut case is when an answer needs to be "completely replaced." But there are endless situations for making improvements without replacing an answer entirely. Because the possible improvements are so diverse, there are no general rules for how to pay for improvements, and therefore, there are no general rules for calculating the POE of a given improvement. Just as with the calculation of a POE for a completely new answer, the calculation of a POE for an improvement on an existing answer requires rules that are developed from experience and testing.

Generally, any POE will be based on all the D-info gathered in a Q-record, not just the D-info gathered for one actual answer. And, generally, the POE will be some percentage of the POE for a completely new answer.

6.2B Registering Price Information

Price

Now it is clear that the price of an answer is critical demand information. Yet, as discussed above, it is not so clear what a price means, at least in the philosophical sense of what it means in the minds of buyers. In the practical sense of how prices are implemented in AC, the definition of price is fairly clear: the price of an answer is the amount of money the answer sells for at a given time to a given user.

On the other hand, there is often no such thing as a fixed price, or even a single price for an answer. And in that sense, the meaning of price is different than what we normally think of. As explained in the next chapter on price setting, there can be a wide variety of pricing schemes. The price amount can differ from one point in time to another and from one user to another. Rather than think of a price as a price on, say, a box of cereal, we should think of price offers and acceptances of those offers. These can vary from moment to moment and from person to person (they can be fairly static as well, of course). Thus when we say "price" we often mean a price offer or a price threshold. So the term price can be a little confusing.

AC registers price offer information in the D-record of a given question. Obviously, if offers and acceptances change over time, there will be various selling prices and price offers for an answer in the record. (Note, when the price of an answer is basically static and users know it in advance, then it not need be in the D-record, for it can be assumed in the POF that applies to the answer.)

Static, Pre-Set Prices Often Impractical

As described in chapter 2, AC did not gather price information from requestors. It was assumed that the price of an answer was set and Rex could take it or leave it. Prices can be set for broad categories of answers, and thus a user can know the price in advance, as a person usually knows the charges involved when calling directory assistance or when using an online service that charges by the minute.

Often though, it is impractical set a price for a category of answers. Similar type answers may have very different values and prices. For example, the phone number of the President's barber might cost 5 cents while the phone number of the President might cost $5,000.

Moreover, the cost of finding an answer is often unknown in advance and so setting the price in advance is unreasonable. Then, after the answer is found, it is often impractical to set a static price because the amounts that various users are willing to pay is also unknown.

Often it is not desirable the let Rex know the price(s) others have paid for an answer. If Rex knows that some people have paid, say, two cents for an answer he might not want to pay more, even though he might have originally been willing to pay more. So when Rex is at a question, AC may not show him a price for the answer.

Price Tests

When the price of an answer is not known in advance by Rex, it is useful to gather information on what he is willing to pay for the answer because this information can be used to arrive at a POE. (The information can be used to set the price of the answer as well.)

Now since AC can't read minds, it must perform what we will call price tests. These will not reveal exactly what people are willing to pay, but they seem to be the best that can be done. There are two fundamental price tests.

One test is where the system (the seller) offers a price for an answer and Rex (the buyer) can accept or reject the price. We say price when the system makes an offer, for it is an amount that Rex can accept or reject.

The other is where Rex offers a price and the system can accept it, reject it, or simply register it. When Rex makes an offer, we say that AC has a price threshold in the sense that if Rex's offer is over the threshold, AC accepts Rex's price. If the answer is not in the system, AC usually does not need to accept or reject the offer but just record the offer in the D-record.

In both kinds of test AC registers Rex's identity so that follow-up actions can be taken, if called for. Some of these are seen in the price testing sequences described below. (As noted, AC registers Rex's identity for other reasons as well.)

The world of commerce has evolved a great variety of price offers and counter offers for sale situations. Earnest money can be pledged, time limits can be imposed, letters of intent can be written, discounts can be given, and so forth. Many of these aspects of offers can incorporated into price offers and into price testing sequences in AC. Here we will describe mainly the basics, in which either the system makes an offer or Rex makes an offer. We will include some additions, and will discuss counter-offers, but we realize that a great number of variations are possible.

Price tests must occur in a series of steps between two parties which we call price testing sequences. There are many commands AC can include for enabling Rex to make and accept price offers. The simplest is a Get Answer command, which can imply the acceptance of an offer, and which can be used in conjunction with making a price offer. However, there are numerous specialized commands that AC can include that are tailored for given price testing sequences. We do not describe these in any detail, but assume that AC includes command for executing the price testing sequences described.

We will describe some basic sequences, but before doing that, let us elaborate a little on the price tests themselves.

System-Offer Price Tests

To repeat from above, in a system-offer price test AC makes Rex an offer which he can accept or reject. When we say that AC makes an offer, we mean that the AC (or Sue using AC) presents a price to Rex.

Rex can accept or reject or even ignore the offer. AC requires means and rules for classifying Rex's behavior. The problem is that if Rex ignores the offer, AC cannot register whether Rex rejected the price or rejected the answer for some other reason. This issue is taken up after price tests. For now we assume that AC include means for enabling Rex to explicitly reject the offer, such as a reject button. Further, AC may include defaults for assuming that Rex has rejected the price.

AC's price or price threshold may be set by a price setting formula, by a system manager, or by a Sue. If Sue is setting the price, she is using AC as a medium. If AC is setting the price, it is acting as an agent for Sue. Whatever the method, we will, for convenience, say that AC has set the price. From the point of view of price testing sequences it is the same.

AC registers the total number of requests along with the acceptance/rejection rate at given prices, and of course actual sales, if there are any, at given prices.

AC can present different prices for an answer to different requestors, in order to experiment with the effect of those prices on the POE. Experimentation can be critical to doing a good job of setting the price of an answer and of estimating the income of an answer.

(Note: For simplicity, we ignore the fact that AC can present more than one price to a single Rex. AC can present more than one price because AC may include price plans that allow for this. As with prices for airline flights, the price for the same flight can vary, for example, depending on when one flies. The price of an answer can vary for many reasons. We do not go into this because it is beside the main point, yet we note that AC can present more than a single price to the same person.)

Requestor-Offer Price Tests

As noted above, a Rex-offer price test means that Rex makes an offer that AC can accept or not. (In this case AC will have set a price threshold.) The basic idea behind a Rex-offer test is simply that AC can register what each Rex says he will pay.

Rex's offer is not just talk. If the answer is in the system, and if the offer is accepted by AC, Rex is charged the amount offered and gets the answer. If the answer is not in the system, he can place an order at a certain price (see Placing an Order above). Further, he can commit to buying at a certain price for a certain period of time (see Making a Commitment above).

Apart from an actual price test, AC may also enable Rex to state his opinion of what is a reasonable price. This opinion is simply Rex's judgment and not an offer. It can be important D-info in certain cases. AC can enable Rex to both make an offer and state an opinion.

AC can enable Rex to do all of the above at the same time:

a. make a binding offer at a certain price in the present, b. place an order at a certain price, c. commit to paying a certain price, for a certain time period, and d. state an opinion as to a reasonable price.

AC can have an offer buttons that Rex selects to enter a price offer. When he selects this, AC presents him with a price offer form.

Digression About Having a Variety of Prices for the Same Answer

Let us digress for a moment to discuss the idea of selling an answer at different prices to different people. This idea is well known. However, it can be taken much farther in AC than it is normally taken, because users may not be told what other users have offered and paid for given answers. To give but a small example, imagine four people stuck in a traffic jam. One is a high-powered executive on the way to an important meeting. She might be willing to pay $50 to find out an official guess as to when the traffic will clear. Another person might just be hot and sweaty and damn frustrated, and willing to pay $5 to get good information about the jam up. A third person might just like to know when he'll get home but is not willing to pay more than 50 cents to find out. And a fourth might be a very calm naturally and a student of meditation. She might be willing to pay a nickel to find out about the traffic jam. The same answer can have a very different value to different people and AC can take advantage of this to get a much greater total amount offered for the answer than under a one price for all scheme. It is quite conceivable that one person would pay $50, another $5 cents, another 50 cents, and another 5 cents for the same answer, even at the same time, given that AC can accept all these offers. In effect, AC can conduct individual negotiations with each buyer.

Of course people would have an incentive to find out what other people have paid for an answer and so AC can include methods can to prevent this from happening (see Secrecy Issue below). But before an answer is in the system, even if a person knows that others have offered less for the answer, that person may want to offer more to increase the chances that the answer gets in the system.

6.2b1 Price Testing Sequences

Price tests must occur within a sequence of steps, for they are an interaction between two parties, Rex and AC (remember, AC means AC or a Sue using AC as a medium). We will describe some basic sequences in which Rex or AC make offers. Then we will describe some counter-offer possibilities. Before describing any sequences, some more context is helpful.

Whether Answers Are In AC or Not

For price testing, it can matter if the answer is in AC or not. For example, take the answer to the question, What time does "The Rockford Files" start tonight?. After this answer is in the system, AC might have a price set for it. But before it is in the system, AC might ask Rex to make an offer. Different price tests can be used before and after the answer is in AC. Or, the same price test can be used before and after. There are four possibilities:

|    | Before Answer Is In | After Answer Is In |
|----|---------------------|--------------------|
| 1) | AC makes offer      | AC makes offer     |
| 2) | AC makes offer      | Rex makes offer    |
| 3) | Rex makes offer     | AC makes offer     |
| 4) | Rex makes offer     | Rex makes offer    |

Whether Rex Knows If the Answer Is In AC

It can also matter if the price test is done before telling Rex whether or not the answer is in the system. That's because Rex may make a lower offer if he knows that the answer is in the system. Thus we double the number of possible sequences by which price tests can be done, if we include the fact that Rex is told or not told before the test whether the answer is in the system.

AC can register whether the price test was done before or after the answer was in the system. AC can also register whether or not Rex knew if the answer was in the system at the time of the test.

Price Setting Assumed But Not Shown

The price offers and price thresholds can be set in various ways: by the system manager, by Sue, by a price setting formula, or by some combination of these. We omit the setting of a price or threshold but assume that that step is taken at appropriate times (see Price Setting in the next chapter).

Feedback is inherent in the process. Price offers and price thresholds are set and then tests are done. The test results can then lead to the setting of new prices and new thresholds. Then new tests are done. And so on.

Changing Offer Assumed But Not Shown

We assume that if AC enables Rex to make an offer that it enables him to change an offer. Of course the rules for changing offers can vary. In the case of binding commitments, Rex can usually increase his offer, but he might suffer a penalty for decreasing it. The ability to make other changes is important too, such as lowering or raising the price of a non-binding offer.

Other Omissions

In the sequences described below we avoid repeating steps previously shown; the point is to show the new steps. So we assume that a given question location has already been created complete with D-record.

We also omit certain transactional steps that are taken to be understood. For example, where Rex commits to buying an answer, we do not show the system charging Rex when the answer arrives and we do not show what the system does when the commitment expires. Likewise, we do not show the canceling of orders or the expiration of commitments. The main point is to show the kind of price information AC can register. That said, it helps to remember that this information can involve transactions.

Some Price Testing Sequences

Below we describe some sequences that demonstrate the steps that AC can include for carrying out price tests and registering price information in the D-record. We illustrate enough to get the basic steps across, while we recognize that many other permutations are possible.

In the sequences, when we say that Rex does something, we mean both that he does something and that AC includes functions for enabling him to do so.

As mentioned, Rex is either told or not told before a price test whether or not the answer is in the system. In some of the sequences below he is told, in others not. It is of course an easy matter to do the sequences vice versa with respect to showing Rex whether the answer is in the system.

Figure 6A:
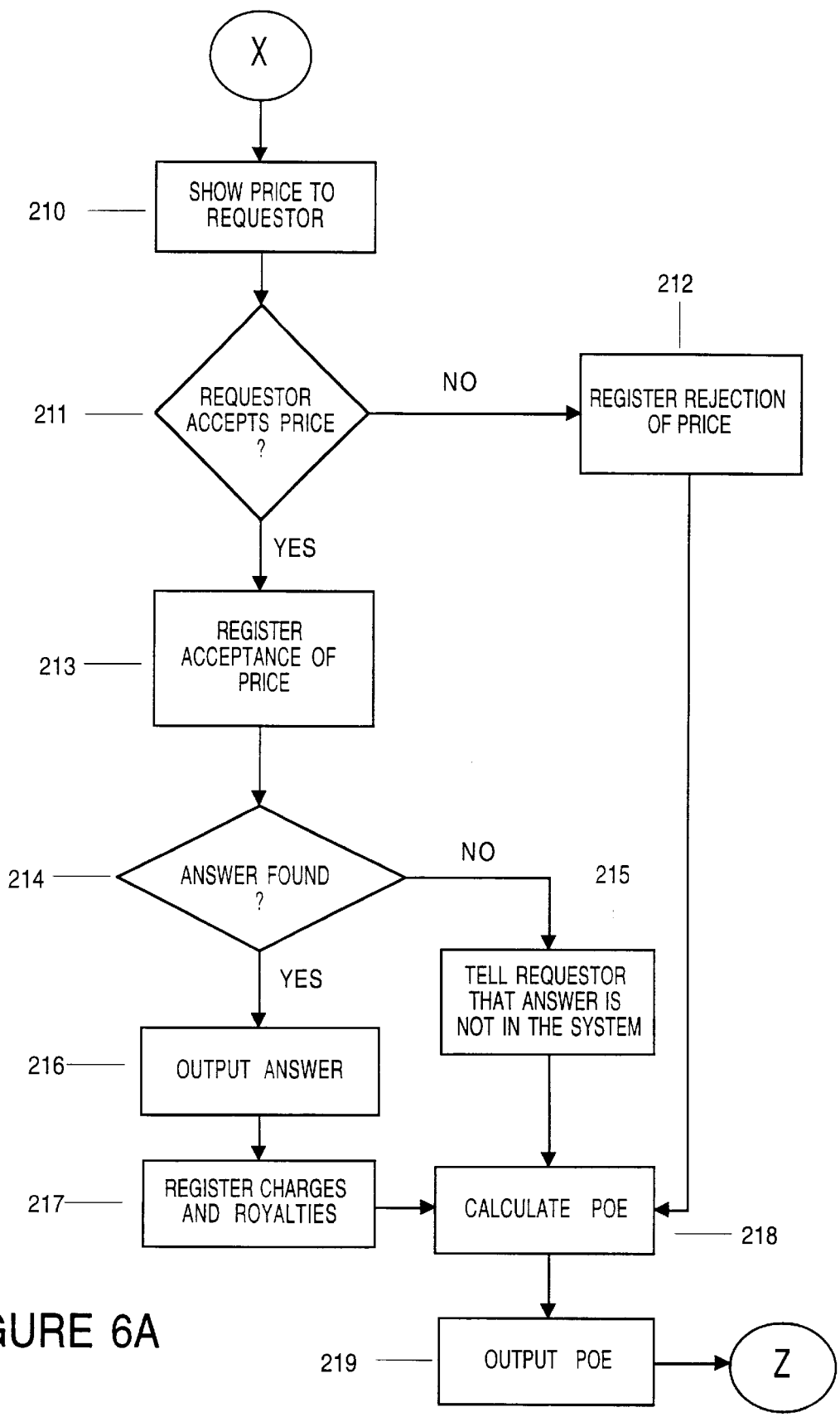
FIG. 6*a* shows a flow chart of steps for gathering of information on what users are willing to pay for given answers.

FIG. 6a shows a sequence in which only AC makes an offer and in which AC does not tell Rex whether or not the answer is in the system.

1) AC presents 210 a price to Rex.
2) Rex accepts 211 or rejects 211 the offer.
3) If Rex rejects the price, AC registers 212 the rejection at that price, calculates 218 the POE, and outputs 219 the POE.
4) If Rex accepts the price, AC registers 213 the acceptance at that price, and then checks 214 to see if the answer is in the system. If the answer is not found, AC tells 215 Rex and then calculates and outputs the POE. If the answer is found, AC outputs 216 the answer, registers 217 the charge due to Rex and the royalty due to the supplier and, calculates and outputs the POE.

Figure 6B:
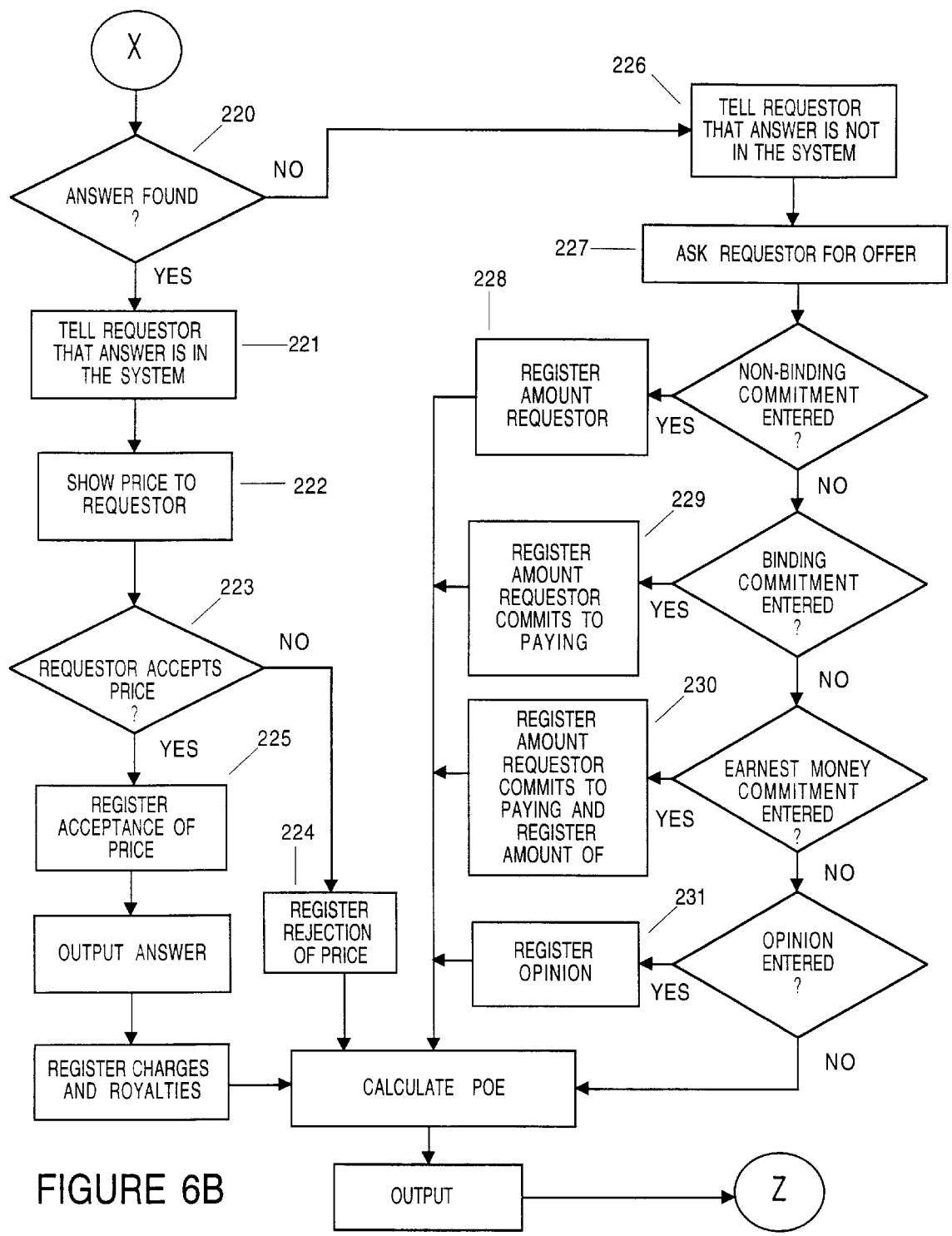
FIG. 6*b* shows another set of steps for gathering of information on what users are willing to pay for given answers.

FIG. 6b shows a sequence where Rex makes an offer before the answer is in the system and AC makes an offer after the answer is in. Further, before the price test, AC tells Rex whether or not the answer is in the system.

1) AC checks 220 if the answer is in the system.
2) If the answer is in, AC tells 221 Rex and presents 222 a price.
3) Rex accepts 223 or rejects 223 the price. If Rex rejects it, the system registers 224 the rejection at that price and calculates and outputs the POE. If Rex accepts the price, AC registers 225 the acceptance at that price, outputs the answer, registers charges and royalties and calculates and outputs the POE.
4) Now, if the answer is not in the system, AC tells 226 Rex that answer is not in. AC then asks 227 Rex to make an offer. Here, as shown, AC includes steps for enabling Rex to make various offers:
   a. AC can register 228 a non-binding offer. Here Rex expresses what he says he is willing to pay (places an order and states a price).
   b. AC can register 229 a binding offer to pay an amount up until a certain time. In this offer Rex not only states an amount he will pay but states a period of time his commitment is valid until.
   c. AC can register 230 binding offers that include a commitment of earnest money.
   d. AC can register 231 Rex's opinion as to a reasonable price for the answer.

As usual, once AC registers Rex's offer, AC calculates and outputs the POE.

Figure 6C:
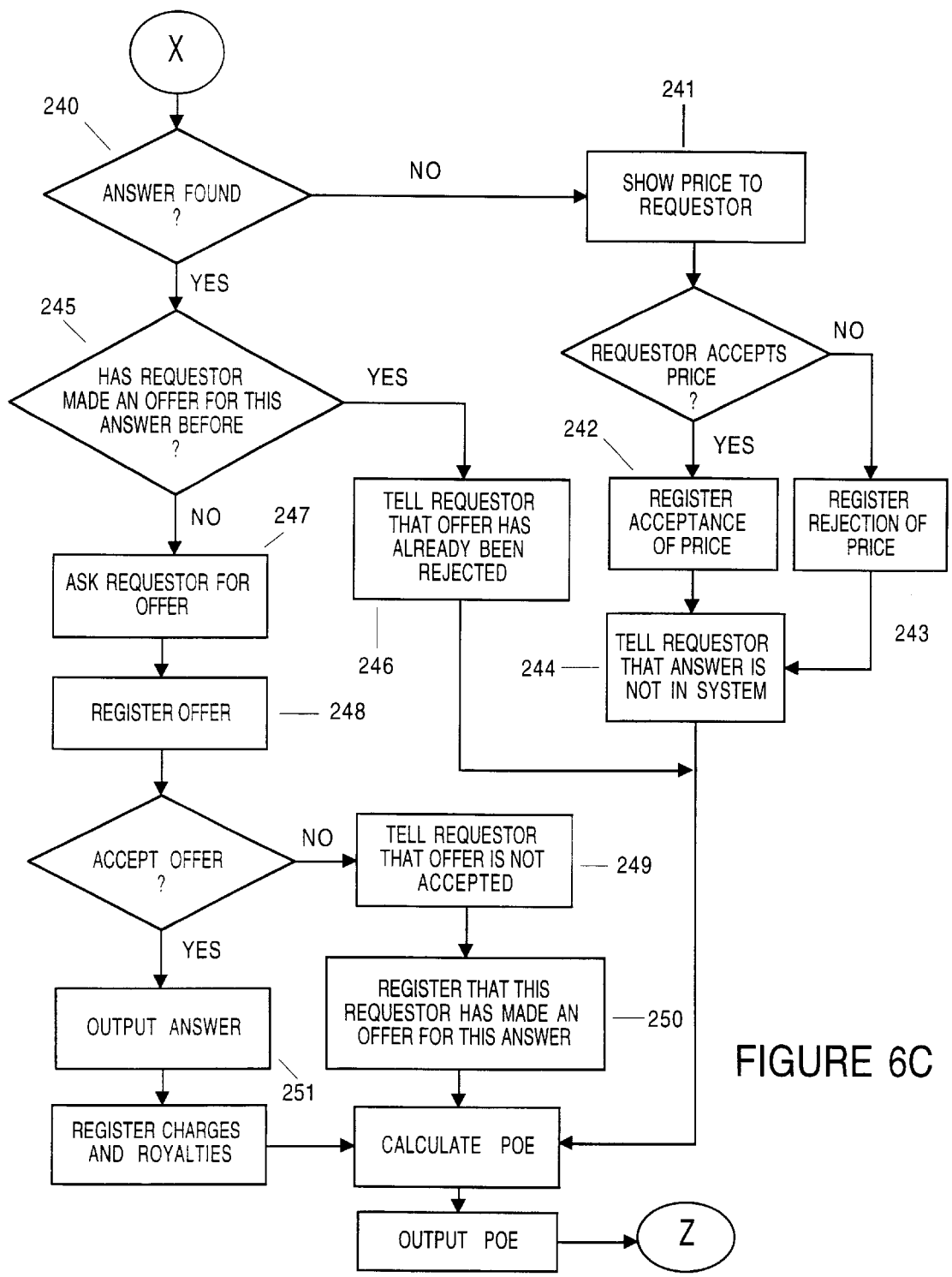
FIG. 6*c* shows another set of steps for gathering of information on what users are willing to pay for given answers.

FIG. 6c shows a sequence in which AC makes an offer before the answer is in, and in which Rex makes an offer after the answer is in. In this sequence Rex is not told before the price test whether the answer is in the system.

The main new feature here concerns Rex's offer. In addition to asking for an offer, AC includes steps for limiting the number of offers Rex can make. If Rex can make unlimited offers when an answer is in the system, Rex will start low and keep going up. Rex will try to discover AC's price threshold ("bottom line"). Thus, the system needs to limit the number of offers Rex can make. This concern does not apply usually when the answer is not in the system because then the answer may have no threshold attached to it.

The sequence in FIG. 6c limits Rex to one offer. (FIG. 6d shows a sequence for limiting Rex to one offer per a set period of time.)

1) AC checks 240 to see if the answer if found.
2) If the answer is not in the system, AC presents 241 a price to Rex.
3) Rex and accepts or rejects the price.
4) AC then registers 242, 243 whether the price is accepted or rejected and tells 244 Rex that the answer is not in the system and then calculates and outputs a POE (we note that, as usual, Rex's identity is recorded as well).
5) Now if the answer is in the system, AC checks 245 whether Rex has made a previous offer. If yes, AC tells 246 Rex that he is ineligible to make an offer and then, as usual, the system calculates and outputs a POE. In this case AC also tells whether the answer is in or not since Rex may want to supply it.
6) If Rex has not made an offer, AC asks 247 Rex to make an offer. AC then registers 248 the offer.
7) AC then accepts or rejects the offer. If the offer is rejected, AC tells 249 Rex that the offer is rejected and registers 250 that Rex has made an offer for this answer. Then, as usual, AC calculates and outputs a POE. If the offer is accepted, AC outputs 251 the answer, registers the charges and royalties due, and calculates and outputs the POE.

Figure 6D:
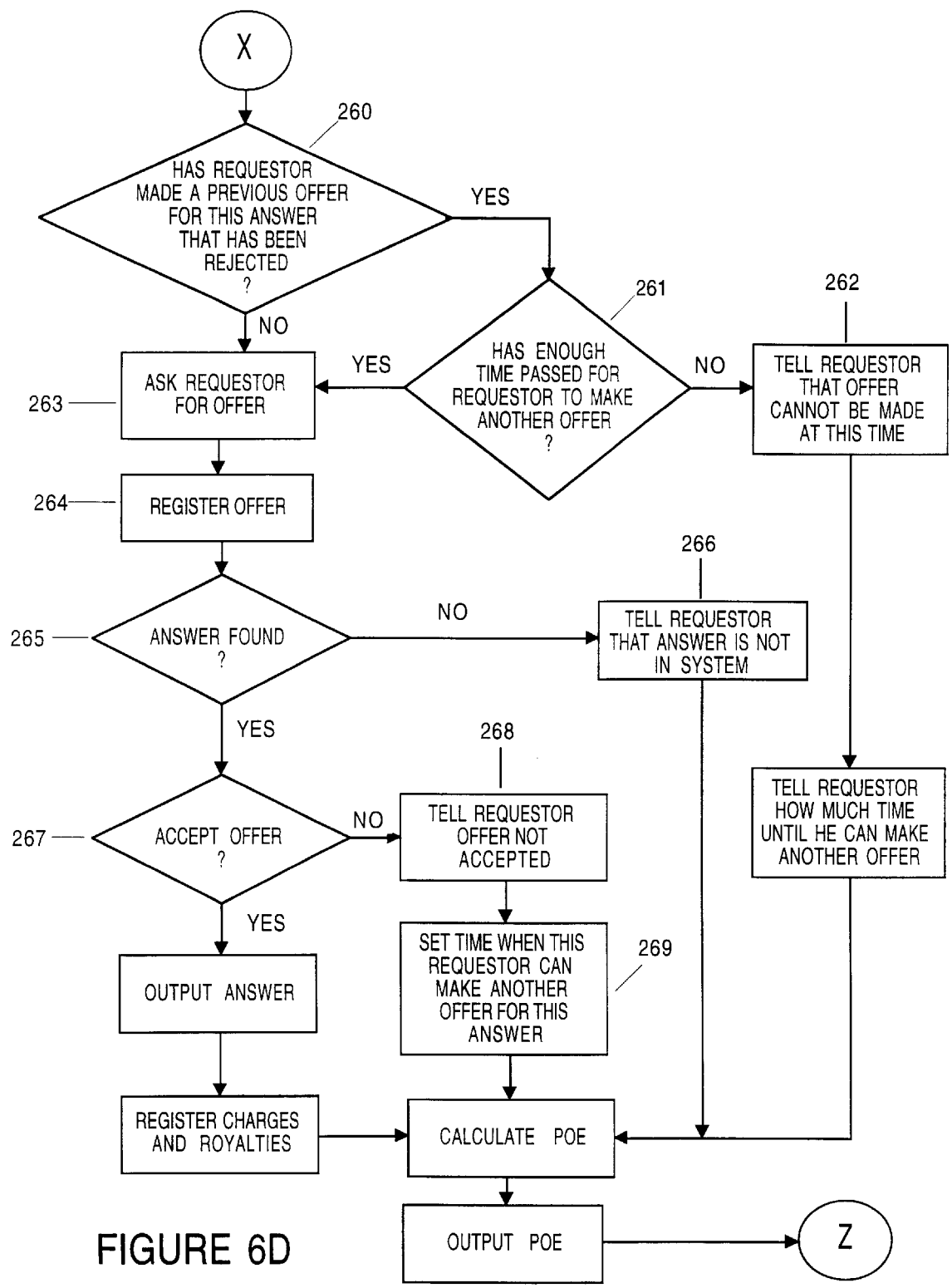
FIG. 6*d* shows another set of steps for gathering of information on what users are willing to pay for given answers.

FIG. 6d shows a sequence in which only Rex makes an offer. In this sequence Rex is not told before the price test if the answer is in the system. Here steps are shown that limit Rex to making one offer per period of time. The point, as mentioned previously, is to limit the number of offers that Rex can make in order to get Rex to make a higher offer. We note that, as shown, if Rex makes an offer before the answer is in the system then this offer is not subject to a time period prohibition. Rex is free to make a different offer once the answer is in.

1) AC checks 260 whether Rex has made an offer that has been rejected.
2) If Rex has never made an offer before that has been rejected, the system asks for an offer, registers the offer and checks to see if the answer is the system.
3) If Rex has made an offer that has been rejected, AC checks 261 to see if the pre-determined time period has expired.
4) If the time period has not expired, AC tells 262 Rex that he cannot make another offer and, as usual, calculates and outputs a POE.
5) If the time period has expired, AC asks 263 Rex to make an offer. The system registers 264 the offer. AC then checks 265 to see if the answer is in the system.

If the answer is not in the system, AC tells 266 Rex that the answer is not found and, as usual, calculates and outputs a POE.

If the answer is in the system, AC checks 267 the price threshold and accepts or rejects the offer. If the system rejects the offer, it tells 268 Rex that the offer is rejected and sets 269 a time period for when Rex can make another offer for the answer, and, as usual, calculates and outputs a POE.

If the system accepts the offer, it outputs the answer and registers charges and royalties and calculates and outputs a POE.

6.2b2 Counter Offers

AC can make counter offers and enables Rex to make counter offers. And, of course, AC registers these offers.

We will describe the basic counter offer situations below. Rather than repeat the sequences above, we will consider two general situations: one where Rex has rejected AC's offer and the other where AC has rejected Rex's offer.

We don't go into counter counter offers because the principles are the same, except that AC would place limits one how many rounds of offers there could be per period of time. (Note: if Sue is doing the price setting AC can leave it up to her to decide how to conduct the negotiations.)

Situation 1: AC Presents a Price and Rex Rejects It

If Rex rejects AC's price offer, Rex can make a counter offer. In fact, Rex can make a few offers:
a. He can make a counter offer good for that moment.
b. He can place an order, saying in effect, call me when you've lowered the price.
c. He can commit to paying a lower amount than AC's current price.

These are all offers that have been discussed above. Because of their place in a price testing sequence, a negotiation, they are called counter offers here.

AC can immediately accept or reject the counter offer. If AC rejects the counter offer, AC can call Rex back when AC's price drops.

A second kind of counter offer is actually one that AC can make. As noted, AC may have a reject button that Rex can select. By pushing this button, Rex simply indicates that the price is too high, but he does not make a counter offer. In this case, AC can make a counter offer (a second offer) by immediately lowering its price. If AC has this procedure, it must also have rules for making Rex take a risk (or assume some cost) for rejecting AC's initial offer. Otherwise, Rex will always reject AC's initial offer. For example, AC can have a rule whereby Rex has a chance of not being entitled to buy the answer for a period of time if he rejects the initial price.

Situation 2: Rex Offers a Price and AC Rejects It

If AC rejects Rex's offer, AC can make a two basic counter offers:
a. AC can present a price above Rex's offer.
b. AC can ask Rex to make a new offer.

Rex can accept the new offer. He can make a new offer. He can place an order. And he can make a commitment.

Re-Contacts

Now when Rex rejects AC's price when AC rejects Rex's offer AC can register Rex's identity in order to possibly recontact him when AC's price or price threshold drops (this possibility was noted above in the discussion of the prospect list). If AC recontacts Rex then both parties are can make new offers.

Real Time Negotiations

AC can be looked at as an agent for Sue but it can also be looked at as a medium. As such, it enables Rex and Sue to engage in real time negotiations. In other words, Rex and Sue can make offers and counter offers without significant delay. This just means that the process of offer and counter offer is in real time. It does not change the sequence. AC may enable users to see each other or talk to each other directly. (It also means that it is Sue, and not AC, who is setting the prices and price thresholds.)

6.3 Registering the Buying Situation of a Request

We return now to the issue of characterizing requests, with respect to whether Rex wants to buy or whether he has other intentions.

Let us back up for a moment and recall the prime goal of the system: to forecast sales. The central problem then is: what sales does a request foretell?

AC's approach is to register various D-info in addition to the fact of the request, and use that information in a POF. The point here is that Rex's request represents a potential sale to Rex, and it also may represent (correlate with) sales to potential future buyers.

The most important thing to determine then is whether Rex wants to buy the direct answer to the current-Q. Recall, the foundation task of the system is to count how many people want to buy an answer. Though other kinds of interest, such as browsing without the intention to buy, may be important to register, the intent to buy is usually the most important thing.

Because a large percentage—no one can say what percentage—of the requests are for answers that are not in the system, AC needs to differentiate, at least on a statistical basis, between the requests of window shoppers and live prospects.

And yet, we know that in many cases there will be no way to tell what Rex's intentions are, whether he wants to buy or not, at any price.

AC cannot read Rex's mind. It can only characterize a request according to facts that it registers about the request. What facts then?

Now we know that the significance of a request—what sales the request foretells—depends on the circumstances that the request is made in. For example, if someone walks into Tiffany's on Fifth Avenue and asks to see a silver necklace, that request has a different significance than if the same person asks to see a diamond necklace. And that request has a different significance than if the same person walks into Schraft's and asks for a malted milk. We know there are differences even though we cannot measure them. We can however register the facts of a large number of situations and then see if the facts foretell anything on a statistical basis.

More important than the type of merchandise (answer) usually is whether Rex is under an obligation to buy. If he is obliged to buy when the merchandise (answer) is in stock then that obviously has a different significance than if he is not obliged.

There are innumerable many factors that involved in a buying situation. We cannot list them all, and AC cannot register them all. But AC can register certain key facts that are common to such situations. We will look at some of these facts below. Before doing so, let us discuss the general idea of a buying situation, restricted to certain kinds of information: what Rex knows when he arrives at a question, what he sees, and what he does. We will then describe some features AC can include for getting Rex to declare his buying interest. And after that, we will list key "buying situation" facts that AC can register.

The Importance of the Buying Situation

Let's pretend Rex walks into a bookstore and tells the clerk the title (Q-string) of a book he wants. The clerk takes Rex to the book. Rex doesn't look inside the book but he reads the back cover (A-stat) information which, let's say, includes a price. Rex then leaves the bookstore without the book. Now did he leave without the book because the price was too high? Or because of something he read in the back cover? Or because he was just browsing with no real intention of buying?

What if the back cover has references to other similar books. And what if Rex doesn't leave but asks the clerk about one of those books? Again, why does he reject the first book?

For a variety of reasons, he may not want to buy the answer that corresponds to the question he is at. His intentions cannot be captured by any set of simple rules. If Rex does not indicate why he rejects an answer, no one can tell whether it was because of the price or for some other reason. (Even when Rex does tell, he may be lying.)

And things are stranger in AC than in a typical bookstore where one usually knows if a book is in stock. AC is vast Borgesian bookstore where the shelves are full of potential books with only a smattering of actual books sprinkled in.

The best AC can do is register the key actions that Rex takes and the key pieces of information Rex has seen when he takes those actions (what he did and what he knew at the time). For example, in the scenario above, AC would register that Rex left without buying the book and that the price of the book was presented to Rex.

Some Basic Buying Situations Rex Can Be In

We will illustrate some basic buying situations to show how the significance of Rex's request depends on Rex's situation. When we saying buying situation we mean what Rex does at a question and what he knows when he does it.

The focus here is on whether Rex has any interest in buying. We limit the discussion to a small set of factors while realizing that many others may indicate buying interest and may correlate with future sales.

How can AC tell if Rex has any interest in buying an answer? Sometimes it seems clear he has no interest, other times it seems clear he does, and other times it is unclear. We look first at the situations where Rex's interest in buying or not buying seems clear. Then we look at situations where his interest unclear.

Note: when we say below that Rex "knows" whether the answer is in the system, we mean that AC has shown him whether the answer is in. When we say he "does not know" we mean that AC has not told him one way or the other. Now, he may have a guess based on the real world aspects of the answer but we are not referring to this guess, only to what AC has shown Rex. Note also: we use the term seems because Rex's intentions are never certain, except perhaps when he actually buys.

It Seems Clear That Rex Does Not Want to Buy

When Rex arrives at a question and:

AC shows him that the answer is in the system, and

AC asks him to make an offer, and

He does not make an offer,

Then it seems clear that he has no interest in buying the answer.

(If the question is linked to another question or questions, Rex might make an offer for an indirect answer. That is another matter. But he still seems to have no interest in a direct answer to the question he is at.)

It Seems Clear That Rex Does Want to Buy

When Rex arrives at a question and:

He makes any kind of binding offer, whether it is for buying the answer immediately or whether it is a future commitment, Then it seems clear that he wants to buy (at least for the period of the commitment).

When Rex arrives at a question and:

He knows the answer is in, and

He accepts AC's price,

Then it seems clear that he wants to buy (after all, he does buy).

When Rex arrives at a question and:

He does not know if the answer is in (he thinks it may be in), and

He accepts AC's price,

Then it seems clear that he wants to buy.

It Is Unclear Whether Rex Wants to Buy or Not

When Rex arrives at a question and:

He knows the answer is not in, and

He does not make an offer or does not respond to AC's price,

Then we cannot be sure whether he is interested in buying the answer.

The problem here is that if Rex knows that an answer is not in the system, he may feel no incentive to make an offer or to reject or accept a price. He may feel it is a waste of his time to even bother. Like any shopper or bidder, he might want to know that a piece of merchandise is available before he bothers with the price.

When Rex arrives at a question and:

He does not know whether the answer is in, and

He does not make an offer or does not respond to AC's price,

Then we cannot be sure whether he is interested in buying the answer.

He might not want to bother making an offer or rejecting or accepting a price if he isn't sure the answer is available.

When Rex arrives at a question and:

He knows the answer is not in, and

He makes a non-binding offer (places an order),

Then we cannot be sure whether he is interested in buying the answer.

In this situation, he may be lying intentionally or unintentionally, like any buyer who expresses interest in a product that may arrive at some time in the future. His only cost is the time it takes to place the order.

When Rex arrives at a question and:

AC presents a price for Rex to accept, and

He does not respond to AC's price,

Then we cannot be sure if he is rejecting the answer or the price.

The problem here is that Rex may feel no incentive to explicitly reject the price and no incentive to make a counter offer. He may just not bother expressing any interest explicitly. Like any shopper who sees an item that he wants but that he thinks is priced too high, he may just go on to the next item without saying a word. This reasoning applies whether or not the answer is in and whether or not Rex knows whether the answer is in.

Some Rules and Functions and Options for Getting Rex to Declare His Interest

Given that in a variety of basic buying situations Rex may feel no need to express his buying interest explicitly, the ideal is for AC to read Rex's mind. That ideal will have to wait. In the meantime, AC can include various functions and options for getting Rex to declare interest in an answer, wheher it is missing or actual. Below we list some of these.

"Reject Price" Button. AC can include a button that Rex can press to signify that he is rejecting the price of an answer. (AC can include other reject buttons so Rex can express other reasons for rejecting an answer.)

Browse Mode. As noted, AC can include a separate mode where users browse questions. AC can enable Rex to switch in and out of browse mode with the press of a button. So it is easy for Rex to tell AC whether he is browsing or not. (AC might also register when Rex is browsing a question. Though browsing is not considered a request for an answer, the number of people who browse a question and their rate of browsing can be significant D-info.) The difference between browsing and "actively looking" for an answer is often unclear. If AC is to have a browse mode, AC needs meta-rules for defining browsing. AC may even include different "levels" of browsing. And AC can enable users to say, at a given question, whether they are browsing that question or not.

Offer Palette. AC can include a palette for making price offers. The palette can include set price levels. This allows Rex to "click on" an offer, rather than entering one manually. It is a small difference but it may be enough to overcome his laziness.

Get Price Button. AC can include a button for getting the price of an answer. If Rex bothers to get the price of an answer it may mean he has some interest in buying.

Minimum Bid. AC can show Rex an amount that is the minimum offer Rex can make. Otherwise Rex may intentionally make an extremely low offer that tells little about his interest in buying the answer.

Price Shown Only After a Binding Offer. AC can show Rex the price only after Rex makes a binding offer. Otherwise Rex can see the price and does not have to react to it. This way, by making an offer, he must show some interest. As noted, AC can stipulate a minimum bid.

Survey. AC can a conduct survey asking Rex why he rejected an answer and providing a form for Rex to check-off the appropriate reason. AC can conduct such a survey randomly and use the data to create statistics for classifying requests.

Information AC Can Register About Rex's Buying Situation

We have described some basic buying situations above. These are characterized by what Rex does at a question and what he knows when he does it. As mentioned, the details of a sales situation can vary tremendously. Even though we have given the logical outlines of offer/counter offer situations, we have not captured any extra details. These details can be critical in compiling reliable statistics. For example, the statistics would be different for an answer costing 10 cents than one costing $10.

Below we list some key types buying situation information. The list below is not exhaustive. Other types of information can be registered. Most is repeated from above, some is not, and some from above is omitted. In the relevant situations then, AC can register the following information about Rex and his request:

Which search stats did he use to arrive at the question?

Which A-stats did he see at the question?

Was the answer in the system?

Did the A-stats tell him whether the answer was in the system?

Was a price presented to him automatically?

Did he ask for the price?

Was a price presented to him? If so, what was it?

Did he accept the price?

Did he make a counter offer? If so, what was it?

Was his counter offer accepted?

Was his counter offer rejected? If so, how low was it compared to the price?

Was he asked to make an offer?

Did he make an offer? If so, what was it?

Was his offer accepted?

Was his offer rejected? If so, how low was it compared to the price threshold?

Did he place an order? If so, did he state a price? If so, what was the price?

Did he make a commitment? If so, did he state a price? If so, what was the price?

Did he know before he arrived whether the answer was in the system? (This can be relevant because AC can enable users to screen questions based on whether they have direct answers. Also, as discussed in section 5.1, AC can enable users to see whether questions that can be selected have answers.)

Did he know before he arrived what the price of the answer was? If so, what was it?

Did he know before he arrived that he would have to make an offer?

Did he enter a new question? If so, which one?

Did he travel to a linked question? If so, which one?

Did he come from a linked question? If so, which one?

Did he make an indirect o-request? If so, what search stats, did he enter?

(Omitted here is information about alternative answers. This kind of information can be very important. The registering of this information is discussed in Book II.)

6.4 Demand Statistics

Not all D-info is stored in the D-records of individual questions. AC compiles demand statistics based on the information in large numbers of D-records. The are used in the POF as historical information.

The topic of demand statistics will only be touched on briefly. Statistics for projections, like formulas for projections, can vary too much to be described. Further, as noted, an evolutionary approach is best, where the predictive value of given statistics is tested. The point here is simply that in order to come up with good POF's, AC needs to compile statistics on a great number of situations in order to compare a given situation to similar situations in the past.

Population Statistics

AC can compile what we might call population statistics. These are based on the requests of large numbers of people in a great variety of situations. AC can examine similar patterns of request information that occur in a large number of D-records, and then check to see what the sales were in these similar situations. In other words, AC can see how actual sales correlate with certain patterns of request information.

For example, AC can examine all cases where a question has a single MMA o-miss request and see what that "predicts" for sales of the corresponding answer. An MMA o-miss will likely have different predictive value than an HMA o-miss. Moreover, the value of an MMA o-miss will also depend on how many other o-misses were registered due to the o-request that was involved (see section 5.3). Likewise, an MMA o-miss that was registered along with two other MMA o-misses will have different value than an MMA o-miss that registered along with a thousand other MMA o-misses.

These are tiny examples. The point is that request information can vary widely. The only way for AC to develop discount statistics to evaluate different requests is to compile sales information on large numbers of cases. The factors that can be examined will explode, but patterns should emerge.

Individual Buyer Stats

It is useful for AC to compile statistics on the buying behavior of individuals as well. Such statistics can be used to develop population based statistics. Just as in baseball we can develop statistics about the chances that any player will get a hit, we can also develop statistics for individual players. What is the individual's chance of making a hit? We can further refine those statistics by given situation, for example, what are the chances of getting a hit with runners in scoring position?. As we know from something like baseball, innumerable statistics can be developed that may help predict performance. In AC, performance means sales.

However, where an individual is concerned, AC may not be able to see what sales are in many cases because often the individual does not buy in a given situation, and may not even be able to buy because the given answer is missing. Nevertheless, AC can develop statistics based on the individual's behavior.

Consider the situation where Rex arrives at a question and:

AC shows him that the answer is not in the system, and he did not know before arriving whether the answer was in, and he makes no offer.

Now, how does AC evaluate whether Rex has any interest in buying the answer based on his past behavior?

One way is to have AC check past behavior in situations where:

Rex arrives at a question, and

AC shows the user that the answer is in the system, and

Rex did not know before arriving whether the answer was in.

AC can then see what percentage of the time he made an offer in these situations. AC can then discount the request where AC shows that the answer is missing by the same percentage. Now this is not an ideal discount factor, for many other factors can come into play. We are just giving an example.

Rex's buyer stats may be stored in a record about him and then pulled, as relevant, to discount his requests for different answers. The relevant statistic depends of course on the given buying situation Rex is in.

Examples Individual Buyer Stats

We give some examples below that show how AC can use the D-info discussed above. AC can keep statistics that answer the following questions about Rex.

What percentage of the time does he buy an answer that he has placed an order for?

(To give an idea of the importance of these kinds of statistics, consider: If one user buys an answer 1% of the time when he places an order, then we see that, price being equal, the value of his request is less than that of someone who buys 10% of the time he places an order.)

What percentage of the time does he buys when he has made a commitment to buy?

When rejects a price, what percentage of the time does he buy later for less?

What percentage of the time does he buy when he knows an answer is in?

What percentage of the time does he buy a linked alternative answer?

What percentage of the time does he buy an answer when he doesn't if it is in?

What is his ratio of requests to purchases?

How does his behavior change depending on the price he is presented and the price he is offered?

Answers to these kinds of questions about Rex's past behavior can enable AC to make a better guess about the value of a request by Rex. Of course, we are not even scratching the surface, just giving several examples.

6.5 Information About Alternative Answers

Knowing about the alternatives to a product can be important for guessing what the sales of that product will be. In AC, the products are answers and the principle is the same. And so, in the D-record of a given question and answer, AC can register information about answers that are alternatives to that answer.

When we say alternatives, we mean alternatives as represented by questions and Q-records. The answers may or may not be in the system. We mean the actual and potential answers, as represented by questions and described by the A-stats.

Taking a physical product example, someone who expresses interest in buying a certain shirt at a department store might also have expressed interest in buying other shirts. The value of the expression of interest in that certain shirt depends on how many other shirts the person has expressed interest in and on whether those shirts are in stock and on whether he prefers them and on other factors. Likewise, a person who expresses interest in buying an answer about a shirt may express interest in an buying answers about other shirts. The value of his interest in that certain answer will depend on whether the other answers are in the system and on a variety of other factors.

The alternatives to answers in AC can be harder to identify than the alternatives to physical products in the real world. That's not to say that product situations are simple, for who is to say what all the alternatives are to a given product. However, there are usually far more alternatives to a given answer than to a given physical product because answers are often easier to supply than physical products.

Moreover, AC does something that is not usually done in the world of physical products; it allows individuals to request their own versions of the products they want and to state the requests for similar products in a great variety of ways—ways that may or may not even seem similar. And so there can be a sea of alternative answers, the vast majority of which are missing. In other words, we have a sea of potential alternatives. This is a fundamental problem of AC: how to evaluate D-info in light of the multitude of alternatives that the D-info can apply to, and in light of the fact that preferable answers might be supplied at any time.

The problem gets worse when we consider that answers and A-stats can be easily modified and that these modifications can change demand dramatically. For example, the price of an answer be changed.

Though the potential alternatives to a given answer may be very numerous in AC, that does not change the fact that it can be quite valuable to gather information about these alternatives.

The D-info AC collects about alternatives can help Sue decide what to do. She may want to decide whether supplying an answer is worth her time. Or she may already have supplied an answer and wants to see how the competition is affecting the sales of her answer. Therefore, AC can enable her to:

a. see what some of the potential competition is,
b. see the sales and POE of alternatives that are actually in the system,
c. see, perhaps, how the competition is pulling sales from her answer.

Identifying alternatives is very important because of the problem of phantom requests. Say Rex asks ten similar questions none of which has an answer in AC, and say he only wants one answer. As noted in chapter 4, asking a number of similar questions is the common way that people ask for something, especially when they are not sure of the subject they are asking about. Well, which answer does he want? We have the problem of phantom requests. Nine out of ten questions are phantom requests. Or are they? This is a big problem and we will address it in Book II.

Actually, we wait until Book II to address the whole issue of gathering information on alternative answers. That's because the issue is more important with linked questions and more explicit as well since alternatives are often linked to each other.

The problem of factoring in alternatives is still important with non-linked questions. It's just harder to collect information on the alternatives. Come-from-Q's and go-to-Q's are the most natural choices to identify as alternatives. Thus these are registered in the Q-record of a given question.

One way to handle the problem of factoring in alternatives is to discount the value of requests. By discounting, it is assumed that a certain percentage of times that a request is registered, there is an alternative answer that a user will prefer and find.

The "discount rate" for requests can be based on large statistical samples of requestors. However, we know that some people are more prone to being window shoppers than others. Thus, such discount rates will be more accurate in general if they take into account the buying behavior of individual buyers and apply a "user discount rate" based on an individual user's buying habits. Additionally, the rate can be based on the type of answer as well. In the world or physical products we know that some products, like jewelry, are more prone to attracting window shoppers than others, like hamburgers.

As noted, the relevance of discount statistics and individual buyer statistics depends on numerous factors because buying situations can depend on numerous factors, for more numerous than we can identify. Still such statistics can be helpful.

6.6 Time Effects, Re-running Questions

As things change in the real world and in AC, questions and answers change. Some answers become out of date. Others are improved. The store of questions and answers grows.

As new questions and answers are entered, what then is the relevance of past D-info collected for older questions and answers? How do we apply D-info collected in the past to new questions and answers. How do we even apply it to the questions and answers that existed when it was collected? There is no good general solution to this problem. It is another problem we will take up in more detail in Book II.

We mention one approach here that AC can take. AC can "re-run" questions, particularly MMA o-requests, from the past to see which different answers AC would have o-requested in the present. By "re-run" we mean that AC identifies the sources of o-requests and simulates that the o-requests have been entered again from those sources. AC then sees which answers are o-requested. The answers that are o-requested will change over time. Thus AC can somewhat adjust the o-request tallies for answers, at least with respect to MMA o-requests. For example, if Movie Review Casablanca? is the source of 1,000,000 o-requests over the past year, AC can periodically re-run those requests to see which reviews, missing and actual, AC would o-request given the present store of missing and actual reviews in the system. (How far back in time AC goes to get o-requests is an open problem. As with so many other rules, AC must experiment.)

As another example, an FB-Q might be, What are the top ten companies in the US by sales?. Now these companies change over time. And so when this question is entered for the first time, AC sorts the existing companies (say they are in a table) and comes up with the top ten. Now if AC re-enters the FB-Q at a different time, AC might come up with a different top ten.

AC can enable Sue to ask that AC re-run o-requests in order to test what the effect will be on an answer Sue might supply. In other words, AC can enable Sue to enter a test question, as discussed in section 5.2, and then see what the effect is of past o-requests. Sue can identify these o-requests by their primary sources, but, more likely, she can choose questions that she considers to be close alternatives to the question she plans to answer. AC can then check the D-records of these questions for MMA o-misses and o-hits. AC can then check for the primary sources of those o-misses and o-hits. And then AC can re-run those MMA o-requests to see whether Sue's new answer would be o-requested by those sources.

6.7 Some Other Considerations

Changing Answers

If an answer changes, AC may nullify old offers both by itself and by Rex. AC can then allow fresh negotiations and may alert Rex to the possibility. The rules are of course variable.

Brief Note About Price Tests With Price Ranges

Normally a price offer is at a single price. However, AC may enable Rex to present an offer as a range, especially when an the answer requested is not yet in the system. Like a poll taker who asks people what they are willing to pay for an item, AC can ask in terms of price ranges. Moreover, AC can include a form by which Rex can check off ranges rather than enter a single figure.

A more novel idea is that AC can present an offer of a price range. That is because the nature of AC is such that a user may indeed end up paying a price that is in a range. Here we have the idea of projected price (see chapter 7 on Price Setting).

Secrecy Issue

Now if AC does not reveal its price threshold for an answer, finding that threshold can be valuable to Rex. There is more information that can interest Rex: such as whether an answer is in the system and the POE (the POE may yield clues about whether an answer is in the system and about the price threshold of an answer).

In many cases it will be best for AC to disclose all this information. The price, the POE and the presence or absence of an answer can help users, apart from buying answers. For example, a user in check mode needs to see the POE's. As another example, Rex may want to screen answers according to price range.

And yet oftentimes it will be useful to keep such information secret. There are no universal rules. In cases where secrecy is desired, AC can employ security methods to stop Rex from cheating. Primarily these are authentication techniques, because the key way people would cheat is to use confederates (or use the ID information of confederates). Rex can have a confederate make a lowball offer in order to learn about a price threshold. In addition to authentication methods, AC may seek suspicious correlations in the behavior of users because a cheater will likely have the same person(s) cheating on a repetitive basis.

6.8 Investment Offers

AC can include means and rules for enabling Rex to invest in the supplying of an answer. There are difficulties here as to the rules for determining which Sue would get to use the investment funds. We are not going to delve into this issue. Suffice to say that AC can include rules for the making and accepting of investment offers. These can be of major importance.

(See also Projected Price in chapter 7.)

Chapter 7

Price Setting in AC

AC sells answers and so those answers need to be priced.

A Quick Digression on the Difficulties of Pricing

Many problems of setting prices are the exact same as those of measuring demand, for "measuring" demand really means trying to find out how much people are willing to pay, in total, for something. As noted, the key problem is that we cannot read minds, for if we could, we would know how much a person was willing to pay for something. When setting a price, one can only guess.

And the problem is usually more complicated than that because there are usually multiple buyers, each who may be willing to pay a different maximum price.

Another complication is that the goal of setting prices is vague. There can be many goals. One is "profit maximization." Here a seller tries to make the most money. Another is "reasonable rate of return." Here a seller just tries to recoup his effort plus a profit, adjusted perhaps for the risk he has taken. Of course, deciding what a person's effort is worth is a subjective exercise, as is judging the risk taken.

Another complication is that to arrive at a "fair" price we may have to judge what will be paid in total in the future. What will be paid depends on the vagaries of the future and on the price itself.

Another complication is that one has to price with the competition in mind. Who the competition is may not be clear and, further, the competition may price in reaction to one's own price.

Let us add yet another complication. The effect of price on units sold is highly variable. There is no universal, smooth sales curve where a given reduction in price means a given increase in units sold. Further the effect of price on total sales income can be even more variable.

The problems above apply to the pricing of most goods and services and information. But information, answers, have another aspect that can further complicate the setting of prices. Unlike most goods and services, information is easily copiable. This means that an answer can be sold profitably at very different prices to different buyers. So the pricing of information can involve pricing schemes not usually seen in the world of physical products.

Note on Definition of Price

In this section, we stick with the definition of price in the chapter 6: the amount that an answer is sold for to a given buyer at a given time.

However, in this chapter, when we say a price is set, that can mean a price or price threshold. We say "price" often because it is easier than saying "price or price threshold."

The problem is that sometimes the idea of a threshold does not apply, for a price may be shown to all with no secret threshold and no negotiation involved. Perhaps we should distinguish between open prices and price thresholds. Sometimes we will use the term open price, but usually, for convenience, we will stick with the term price. It is hoped that the reader will understand by the context where price thresholds are inappropriate and open prices are the only choice.

7.1 Ways That Prices Can Vary In AC

The previous chapter showed how the concept of a single price is deceptive. In reality, an answer may have many prices. An answer may have a single price for all buyers that remains fairly static. It may have a single price for all buyers but one that fluctuates rapidly. An answer can have multiple prices according to various factors. Below we list some of the ways that prices can vary. The point is simply to show that prices can be set in AC using a great variety of schemes.

Prices that vary with sales. Where the price of an answer depends on the answer's sales level. The price may rise or decline. It can also decline to zero after the answer has had a given amount of sales.

Prices that vary by date. Where the price of an answer depends on the date it is sold.

Prices that vary by time of day. As in peak and off-peak.

Prices that vary by identity of buyer. For example, student rates.

Prices that vary according to the competition's prices. For example, a meet-the-competition rule.

Projected prices. Where a buyer can be rebated depending on future sales of an answer. We elaborate on this concept later, below.

Price Plans

Normally when we think of setting the price of something we think of setting one price at a given point in time. However, we can also think in terms of price plans where prices over time are set according to some formula. AC can have standard plans and can enable a supplier to pick a given plan for an answer.

Price Per Answer or Per Period of Search Time

Normally when we think of setting the price of an answer, we think of setting a price for that individual answer. However, pricing per period of search time is a popular and convenient method. In this method, the answers outputted during a period of time to a given user are credited according to the user's charges for that period. For example, if a user gets 10 answers in ten minutes and is charged $1 for those ten minutes, then each answer might get 10 cents royalty credit. How royalty credit is split among answers can vary.

The price of search time can vary in some of the same ways that the price of an individual answer can vary.

Pricing by search time is a price category method of setting prices (see below).

7.2 Basic Ways Prices Can Be Set

Basic Ways That AC Can Assign Prices and Price Thresholds to Answers

Given the wide variety of pricing schemes, what we are mainly concerned with in this chapter is:

a) Who does the price setting, and b) What AC provided information can be used to do the setting.

There are three parties that AC can enable to set prices, whether before or after an answer is in the system. These apply for the changing of prices as well. (As noted, we use the term price to mean open price and price threshold.)

1. AC can have system operators set prices.

2. AC itself can set prices using price setting formulas.

3. AC can have suppliers set prices.

(Note: When a secret price threshold is set, a negotiation takes place. In this case, Rex makes an offer. In a sense then, Rex partially determines the price that an answer is sold for. If his offer is above the threshold and the answer is in the system, he gets the answer. By determining how far above the threshold price he is, he is also partially setting his own price, the actual price the answer is sold for.)

Information Loop for Price Setting

Regardless of who sets the prices, the general information flow can be a feedback loop as follows:

Price setter sets price→Price test done→Price test data sent to D-record→D-info in D-record sent to POF→POE calculated by POF→POE sent to price setter for evaluation→Price setter sets price . . . .

This particular loop is not always mandatory, but what is mandatory is that the relevant D-info registered by AC is made available to the price setter.

Note About Setting Prices Before or After an Answer Is In the System

As seen in the previous chapter, the price of an answer can be set before or after the answer is in the system. If the price is set after, then there is no price before. A problem seems to exist as far as the POE is concerned. If there is no price then how can there be a POE?

Well, the POF can include assumptions for guessing what the price will be. These can use price test and historical information. The POF can also give multiple POE's based on different prices and users can judge which price they think is most likely. Further, AC can enable users to plug their own price guesses into the POF to see different POE's.

1. System Operators Setting Prices

System operators cannot feasibly set individual prices for answers, but they can define standard price categories, such as a one cent each category, a five cent each category, a two dollar category, and so on. As noted above, a variation is charging a standard amount per period of search time.

System operators can define price categories and then suppliers can choose which categories to put their answers in. (An answer may be put in more than one category at a time.) In that way, the system operators and suppliers are setting prices together.

Categories may be defined not only by price but according to the content of answers. In certain cases, suppliers may be forced to put certain kinds of answers in certain categories. For example, certain phone numbers might have to cost a certain standard amount.

Now when we say price categories, we do not mean just one-price-for all categories. Prices can vary in many ways. A price category is defined by known rules that determine the prices of the answers in the category. By these rules, a user knows ahead of time how much a given answer in a given category will cost for that given user. Rates can vary in standard ways based on different factors, as discussed above.

Where price categories are concerned, AC can enable Rex to file a price complaint if he thinks an answer costs too much, in other words if the answer does not fit the conditions of a given price category.

(Note: Rex can specify a price category when he asks a question. If the answer is missing, a supplier of the answer knows that to fit in that category, the answer must carry the specified price. Rex suggests the price of the answer then, but it is Sue who decides whether to put her answer in that category.)

2. Price Setting Formulas

AC can include price setting formulas that take D-info for an answer and calculate a price from that. Thus the information in the D-record for an answer can be fed not only into the POF but also to the Price Setting Formula (PSF). Indeed, the POF can have price assumptions in it and these can be changed by the PSF.

In the loop above, the PSF is the price setter. The loop shows how D-info can be crucial for setting prices and for estimating pay-offs, and further, how the results of setting prices can affect POE's, and how POE's can affect the setting of prices. Pricing is a helluva feedback situation.

Because so many real world factors can affect price, PSF's have great limitations. On the other hand, because AC can accumulate a large body of experience with similar situations, its PSF's may potentially do a good job of setting prices, or at least a good job of advising users.

3. Suppliers Setting Prices

AC can enable Sue to set the price for an answer she supplies. Of course, she can also change the price of her answer.

As mentioned, AC might have certain price categories and Sue can put her answer in one of these. The system can also show Sue the prices that exist for comparable answers. She can then apply her common sense.

Thus the Q-display can include a price setting option that Sue can select to enter a price for her answer. This option can have a sub-menu so that Sue can select some other options for seeing information that can help her make her pricing decisions.

AC can make all D-info available to Sue so she can make a better guess as to the best price to charge. For example, AC can show the rate of requests received, the times the requests were made, the variety of offers, the average offer, the range of offers, and other price test information. Sue can then apply common sense.

AC can enable her to ask for help from the PSF. When she selects this option AC can also enable her to plug in various guesses about future demand for her answer and possible prices. In any case, Sue's common sense will still not be good enough to figure out the "best" price for her answer. This problem will be solved when the Vulcan mind meld is incorporated into software, but that is another story.

In addition, as a sub-option, AC can enable Sue to have AC automatically set and monitor the price of her answer. In this case, she can set the initial price and AC can take the price setting from there, using PSF's that attempt to maximize her income.

In addition, as a sub-option, AC can enable her to set several different kind of alerts, alerts about the D-info concerning her answer. Like a marketing manager, she can ask AC to keep her apprised of key sales data concerning her answer. If we think of AC as a vast bazaar for answers, we can think of Sue as a peddler who rents a stall (a signomat). In order to wheel and deal properly, she obviously needs information about the sales of her product and she'd like information about the sales of the wares of other peddlers.

She can ask to be alerted when the POE drops below a certain amount, when the actual sales and the actual sales rate hits certain values, and when the prices of comparable answers change by a certain amount or percentage. If she chooses to keep abreast of comparable (alternative) answers, she may need to identify them to AC (though as we will see in Book II, AC can have means for identifying comparable answers).

She might ask to be alerted directly when a buyer makes an offer that is below her threshold. She may want to negotiate directly or respond with a counter offer quickly. These are just some of the key alerts possible. (We will see similar alerts in chapter 9 about the pay-off meter.)

7.3 Public and Private Domain Prices

Royalty Free Answers

AC likely will have rules for limiting the royalty income that an answer can generate. AC can keep track of the total royalty income of an answer and when the income exceeds a threshold, a cap, AC can make the answer royalty free. Another way AC can limit royalty income is to set a time limit during which a user can get royalties. After such a time limit, or income cap, is exceeded, we might say that the answer passes into the public domain.

Once AC puts an answer in the public domain, AC might drop the price to zero or to some very small amount to compensate for overhead. Or, AC might keep the price high in order to profit for itself. For convenience in the discussion, we will assume that answers in the public domain are free or near free.

Now to go into the public domain, the income cap must be reached. How is that cap set? There are no good general rules known. The solution in patent and copyright law is to not to set a cap but to set a time limit for protecting income (property rights). This seems stupid in many cases. AC can give users the choice of a time limit or a cap. The setting of income caps is an important area where rules need to be developed by experiment.

Though we cannot suggest good rules for setting income caps or time limits, we will assume AC enables caps and time limits to be set by AC or Sue or a judge or Rex's, or some combination of these parties.

When Sue is still due royalties for an answer, we will say that the answer is in the private domain.

"Reverting" to the Private Domain

Most answers can be changed. For example, a phone number may need correcting, a blueprint may need revising, a recipe for chocolate chip cookies may be improved.

As discussed in chapter 5, changing an answer requires Sue's effort and so she needs to be compensated. Thus, if an answer that is in the public domain is changed, it "reverts" to the private domain. This way of stating the situation is a little misleading. When an answer is changed, the original version is still is a past answer that is in the public domain. It is the new version that is in the private domain. (Rex may thus choose a past answer that is in the public domain rather than a current answer that is in the private domain.)

Demand Information Still Registered and POE Still Calculated

If an answer is in the public domain, AC still registers demand information and calculates a POE. That's because the answer may be changed and consequently revert to the private domain. Since the price is zero in the public domain, the POF must have price assumptions as to what the price of the changed answer will be. There can be various changes and various prices.

7.4 Projected Prices

Projected Price

The idea of a projected price was mentioned above. We elaborate here because the idea is new as a method of pricing answers in an answer base (data base).

What is a projected price? First let us say that AC can present an initial price and a price range. The initial price is the price that Rex is obliged to pay initially to receive an answer. (If the answer is not in the system, the initial price may be what Rex commits to paying.) The actual price is the price he winds up paying over time. The price range is the range of prices he might end up paying, from the initial maximum amount to some lower minimum amount that Rex may end up paying.

AC can estimate the actual price, and this estimated price is called a projected price. For example, AC might present an offer where the price range of an answer is, say, between $2 and 20 cents, and the projected price is, say, 50 cents. How can AC have these different prices? By rebating Rex based on the future sales of the answer.

Let's take an illustration. Let's say that a question is, What is a list of the major hologram sellers in the US.?. And let's say that Sue is thinking of compiling the list. And let's say she wants to be rather sure of being compensated for her time. She might want, say, $20. And so, she might set the initial price for the hologram answer high, because she think that will raise the chances that she will be paid the $20. Thus the first ten Rex's might be charged $2 each. These ten Rex's can be presented with a initial price of $2 and a projected price that is lower.

Once Sue has gotten her $20, a share of any additional sales revenue from her answer can go into rebating the first ten buyers. Say that another 100 Rex's buy her answer. These Rex's can be charged less, say 40 cents each, and the first ten Rex's can be rebated an amount. Thus the actual price that the first ten Rex's pay is not definite, but depends on the total sales of the answer they have bought.

Of course, many schemes are possible for rebating a buyer according to sales that occur after the buyer has bought at an initial price. The initial price can differ for different buyers and the rebates can differ for different buyers.

Just as the system has a formula for calculating a POE, it can have a formula for calculating a projected price. The projection depends on AC's sales projections. Thus Rex's projected rebate is just a modified version of Sue's projected pay-off.

Rex's rebate may be greater even than the initial price he paid. In other words, if the answer sells enough, Rex may get a profit from buying the answer. The minimum price he pays may be a negative price. This idea is not as crazy as it seems. Early buyers can be looked at as investors. They are the "early adopters" who pay the initial higher price, and in some sense deserve to share in the rewards of the lower price. They may share to the extent that they even profit. This is a fundamental way of paying for innovation.

Who Makes the Projected Price Offer

AC can enable Rex to make a price offer where he offers to pay a higher initial amount in return for a share of future royalties once a cap has been reached. AC can enable him to choose from standard plans for the sharing of royalties between Rex's and a Sue. AC can also enable him to craft his own offer using a form that AC provides. Likewise, Sue can make a price offer where she offers to pay a share of future royalties in return for a given Rex or set of Rex's paying a higher initial price. She too can choose from among standard plans AC or craft her own.

Regardless of who makes the offer, Sue must agree that it applies to her answer. In other words, a projected price is another kind of price that can be set. A given Rex can then agree to pay the price or not.

In order to implement a projected price, AC stores the standard or custom plan in the credit record for Sue's answer. AC then keeps track of the income generated by her answer, and when the income exceeds the specified amount, AC rebates Rex's as specified by the plan.

End Note

We will not delve into this idea further here but simply emphasize that the principle of projected price is fundamental and can be highly useful for getting answers into AC.

Chapter 8

Registering People's Interest in Supplying Answers
and Registering People's Rights to Supply Answers Let's assume that the POE for a given answer is $10,000 and is a good guess of what users will pay in total for the answer. The answer is a large nugget of gold then, so to speak. But is it fools gold?

That depends on how much it costs to try to find.

And it depends on the chances of finding it.

And it also depends on whether there is competition, for if another prospector finds the nugget first, the mining trip will be a bust.

Potential Competition and the POE

So let's say a stranger offers to pay $10,000 to the first person who measures the vacant space in the Empire State Building. You see the offer and think the amount is generous. But do you do the job? Before doing anything, you want to know more.

You ask the stranger, Who else knows about this?

The stranger responds, A number of people.

And you ask, Well, how many of them are interested in finding the answer?

And she responds, I don't know.

And you ask, Well, do you know if anyone is up there measuring right now?

And she responds, I don't know.

And you might say, Count me out.

The potential competition might naturally scare you off.

Your projected pay-off for providing something is drastically reduced by potential competition. A potential competitor might take all your royalties or force you to split royalties (how royalties are divided depends on the rules of the particular situation). Regardless of the royalty sharing rules, you face a risk of your income being cut, and so you must factor that risk into your estimates.

Say the royalty sharing rule is that the first supplier gets all the royalties. Say you think the chances someone will beat you to the punch are 50%. In this case you think your POE is cut by 50% on an expected basis. While your POE is cut, your cost of finding an answer stays the same, and so you may (or may not) have a negative projected profit.

Not only that, but other users in your position can feel the same way and so no one may find an answer for fear that someone else will do it first. In many situations, ignorance can reasonably lead all interested parties into believing that the projected profit is negative.

Camus Station

Let us imagine a train station, named by the way after Albert Camus, the French absurdist. This strange station doubles as a huge job placement center (it was established in an effort to reduce the French unemployment rate). Hence, the central information board that announces train departures and arrivals also announces jobs and the amounts of money they pay.

Each job requires that a person travel to another city and pick up a fact and bring it back to the stationmaster, who is also the paymaster. Payment for each job is slightly more than the cost of a round trip ticket to the city involved. And only one payment is made per fact. So if two or more people go to a city and bring back a fact, they must split the proceeds, and therefore lose money on the trip.

The problem is that the diabolical stationmaster has a rule that all ticket purchases must be made in secret. And so no one knows until they get on the train whether or not others will be on the same train to get the same fact. Unhappily then, the station is full of job seekers, sitting on benches and milling around, but not traveling. They all look at the board to see what jobs are flashed but no one buys a ticket for fear that another will have bought the same ticket. There is no exit.

Assigning Opportunities

Presuming an opportunity is spotted in the economy by one or more people, how is the job of exploiting the opportunity assigned? What happens when the task is new, and there is no boss or single customer to assign the task to a single worker or company? How is the job to be assigned when a new product or service or answer is to be provided, and no single person makes the hiring decision?

In fact we have no rational way. We trust to the "invisible hand," but that is meaningless in actual, specific cases. In real situations, people take a shot or don't take a shot at finding or making something new, while making vague guesses about what the competition is or will be.

And so what do we get? We get duplication of efforts throughout the economy. We can at least see this to some extent when we look at same jobs being done by competing parties. (Granted, duplication of efforts happens for more reasons than ignorance of the competition, but this ignorance is an important factor.)

We also get something probably far worse, that we cannot see. We get lost opportunities. Opportunities not taken because people are in Camus station. And opportunities not taken because people are busy duplicating efforts. That is not to say we get zero innovation, just that we have no idea how much we miss.

What then is a "rational" way to assign tasks if there is no single customer or boss to decide? Well, there is none that anyone knows of. All we can do is keep some goals in mind and choose certain methods in certain situations. There are no universals.

Social Goals

In the economy of AC, in order to use people's resources best, we would like to reduce the duplication of efforts. That is a vague goal and yet we can't say much more for there is no general way to define tasks and duplication, no general way to define the effort required to do something.

Another goal is to get the most valuable total store of answers into AC. And yet that is equally impossible to define, for what does valuable mean.

While we cannot escape from vague goals, they can guide in developing measures to test assignment rules. We can sometimes see that efforts are wasted and that certain answers are more valuable than others. Hence we can develop rules and functions that reduce the duplication of efforts and increase the store of valuable answers. And we can improve these rules and functions. This is a topic we do not delve into. Assignment rules and functions are discussed below, but not measures to test them (see the preface of Part II).

The most important object of such rules and functions is to get answers into AC in the first place, and that depends on the pay-off equation for potential suppliers.

A Few Names for the Discussion

We will call a potential supplier a prospector. A user can be a prospector in any mode. In fact, all users are potential suppliers and thus prospectors.

We will also distinguish sometimes between a prospector, which any user can be, and a live prospector, which is a user who has registered interest in supplying an answer. For convenience, we will sometimes call a live prospector by the name Fisher (after Mel Fisher, the treasure hunter who found the sunken Spanish galleon Attocha). We might think of a user in request or supply mode as Rex or Sue Fisher.

We will sometimes use the term job in place of "supplying the answer."

The Prospector's Pay-off Equation

The pay-off equation for a prospector determines whether or not an answer will be provided. The basic equation for a single job is:

(Projected reward)−(projected cost)=projected profit.

Since uncertainty about the competition can wreak havoc with the projected reward, it can be crucial for a prospector to find out about, or nullify, the competition.

Two General Approaches

AC takes two general approaches to help a prospector evaluate the POE in light of potential competition and to help protect the prospector's future royalty income. One is to enable prospectors to communicate with each other so they can voluntarily reduce the duplication of efforts. The other is to give prospectors property rights, exclusive rights to supply answers. (AC also gives copyrights. These are discussed in chapter 14 on Property Rights.)

For convenience we discuss these approaches separately, though communication goes hand in hand with property rights and property rights are a form of communication.

The various methods involved in these approaches are not ideal solutions. In fact there seems to be no ideal solution where competition is concerned. There are reasons to keep competitors informed and reasons not to. There are reasons to restrict competition and reasons not to.

As usual where answers are concerned, the range of situations is extremely diverse and no general rules can be prescribed.

Prospector Menu

Information about people's interest in supplying an answer is A-stat information. So is information about property rights. Both kinds of information, like other A-stats, are entered at the Q-display, are stored in the question record, and can be accessed from the Q-display.

Thus the Q-display can include a prospector button that can be selected and can lead to a prospector menu of options that include the ones to be discussed below. When a user is at a question then, he or she can select the prospector button to assert interest in supplying an answer and/or assert rights to supply an answer. Further, a user can see who the prospectors are for that answer and/or what kind of interest or rights each has asserted.

8.1 Enabling Prospectors to Communicate

AC enables prospectors to communicate with other each other. By communicating, they can better assign the tasks of supplying answers. They can stay out of each other's way, and they can better evaluate when a POE will turn negative due to competition.

When we say communicate with each other, we mean that they can post messages in the Q-record for all interested users to see and that they can also direct messages to the E-mailboxes of specific live prospectors.

AC can enable users to post several different kinds of interest messages. These can be standard messages that are stored in the question record and displayed upon request.

AC can also compile prospector statistics based on the information registered from multiple live prospects.

Below we list some of the kinds of messages AC can enable users to leave.

Non-Binding Expressions of Interest

AC can enable a user to post a message expressing a non-binding interest (NBI) in supplying an answer. By "non-binding" we mean that the user states that he is interested in supplying an answer, but that the statement carries no commitment and no penalty for non-performance.

As one of the options in the prospector menu then, AC can include a button the user selects to enter NBI information. When a user selects this button, AC registers that he is interested in the answer, and AC can present him with a form that asks for more information such as:

When do you think you will enter the answer by?

What is the probability you will enter it?

How much labor do you expect it will require to find, and what kind of labor?

What are you planning on charging?

This information is registered in the Q-record and can be displayed upon request. AC can combine the information registered from different prospectors into collective statistics, such as the number of NBI messages registered.

Another NBI message that AC can enable users to enter is one that expresses interest contingent upon the POE rising to a certain level. Thus Fisher can leave a message saying he is interested in supplying the answer once the POE rises above a certain threshold. Of course, in this case AC also registers the threshold that Fisher enters and sends him an alert message if the POE rises above the threshold.

While an NBI message carries no commitment, AC can keep track of Fisher's record of following through over a series of answers, i.e. does he enter the answer, does he enter it by the time he says he will, and are his probability estimates fairly accurate?. That way people can evaluate whether a prospector is much of threat to supply an answer. AC may keep such individual prospector stats in a user's record and may attach them to an NBI message. For example, if Fisher posts an NBI message, AC can add a statistic telling the percentage of times he has supplied an answer when he has posted an NBI message.

Binding Expressions of Interest

AC can also enable a user to post a message expressing a binding interest (BI) in supplying an answer. By "binding" we mean that Fisher commits to supply an answer by a certain time. AC registers the time and checks to see if Fisher has fulfilled his commitment. AC can assess penalties if Fisher fails to fulfill the commitment. We call this type of commitment a BI message. As with an NBI message, AC can ask Fisher to enter further information, such as information about charges and labor requirements. As with an NBI message, AC can keep track of Fisher's record of following through over a series of answers.

Prospector Alerts

When Fisher is at a question, he can check the current prospector information that has been registered. Let us say that after seeing the currently registered competition, Fisher decides to enter an expression of interest. While he sees the currently registered competition, he might like to know about other people who express interest after he does. And so AC can enable him to ask that an alert message be sent to him each time AC registers interest by someone else. The alert can include some or all of the interest information registered.

Collaboration Offer

AC can enable Fisher to post a message asking others to collaborate in finding an answer. The message can be in a standard form, or it can be lengthy, spelling out Fisher's proposal.

The terms of the collaboration may be worked out by direct communication.

(We will not discuss collaboration much further though it is a very important area. We assume AC has rules for enabling cooperation and for the splitting of royalties. These rules and attendant functions can, of course, vary widely.)

Elaboration Requests, Elaboration Messages, and Elaboration Questions

Thus far we have skirted a big issue. When a user declares an interest in supplying an answer, what is the answer? This is the multiple answer problem, which we discussed in chapter 4. We will revisit it only briefly here.

Since there can be multiple answers to a question, declaring interesting in an answer may tell little about one's intentions. Other prospectors can remain quite uncertain. And so, AC can enable users to send a message to a Fisher asking for clarification about what answer he intends to supply. We call this an elaboration request. Because of the multiple answer reality, this option can be critical.

The elaboration request can be standard, such as: Please elaborate, or it can be lengthy, asking for various details.

Fisher can respond with an elaboration message. This can be a discussion of what he plans to do. This is an A-stat, like the other prospector information, and can be accessed through the relevant Q-record. We point this out because it is in contrast to a second method of implementing an elaboration message.

The alternative way for Fisher to elaborate is by entering a new question, the question he intends to answer. We call such a question a More Specific Question. It is discussed at length in Book II.

For example, say Fisher expresses an interest in supplying the answer to,

What is IBM's phone number?.

Well, which number at IBM? Clearly, clarification may be very useful.

Say the question is, What is the text of Hamlet's soliloquy?.

Well, which soliloquy?

And in what language?

Again, Fisher can say more specifically what he intends to supply.

Say the question is, How do you get rid of crabgrass?

Again, Fisher can get more specific. He may enter a new question such as:

How do you get rid of crabgrass by obliterating all your grass?

How do you get rid of crabgrass by chemical means?

How do you get rid of crabgrass by the introduction of a different kind of grass?.

Since the elaboration message is actually a new question, the original question is linked to the new question. (We save the mechanics of more specific questions for Book II.)

The process of clarification can go back and forth with Fisher responding and prospectors asking for more elaboration. How much elaboration Fisher needs to give, and how quickly depends on the situation and the rules in that situation.

Direct Communication

AC can enable Fishers to contact each other directly. That way they can more forcefully warn each other off. They can ask each other to collaborate. And, they can ask each other to elaborate on what they are planning and doing.

Disclosure Document Option

AC can include a disclosure document option. By this we mean that Fisher can enter information that shows the progress he has made in finding an answer. AC does not store this information as the answer but does store it in the Q-record. More than one Fisher may submit a disclosure document.

Of course, the information can be kept secret and can be divulged upon the permission of Fisher.

Disclosure document information can be essential where it is important to demonstrate what progress has been made, and to demonstrate priority.

8.2 Reservation Rights

Often communication is not enough to reduce duplication of efforts and insure that a prospector's POE is positive. Some prospectors who intend to supply an answer may not communicate their intentions. And even when they do, it is uncertain whether they will supply an answer and when. For any prospector then, despite communication channels, great uncertainty can remain about potential competitors.

Therefore, in order to protect a person's investment in finding an answer, what are often needed are property rights, exclusive rights to supply an answer. We will call such rights reservation rights or reservations for short. A person who gets a reservation will be called a reserver.

The general idea is that when a user is at a question, AC can enable the user to enter a Reserve command after which AC stores the user's ID data in the Q-record to denote that the user is the reserver of the corresponding answer. Then, for a period of time, AC allows only that user to enter the answer. AC also shows other users that the answer is reserved for that period.

Reservation rights can vary widely. They need not be long-term, exclusive monopolies. They can cap the amount a supplier will make and they can be semi-exclusive. Parties may collaborate under the protection of such rights. A possibility is to allow part of the royalty income from an answer to be protected while the rest is left open to unrestricted competition.

One variation is to allow another user besides the reserver to supply an answer, but to keep this second answer undisclosed until the reservation period runs out. The reserver still gets royalties for his answer provided he supplies one. The reason to allow another person to enter an answer is that the reserver may decide he cannot fulfill his commitment, or may just fail to fulfill it. In either case, the second supplier's answer can then be used.

Disputes, Judges, and Elaboration Rights

Where there are property rights there will be disputes. As disputes are inevitable, AC must have judges to assign credit.

The main problem, which is discussed above, is determining what answer a person has an exclusive right to supply. What answer is Fisher claiming? It is tempting to think of reservation rights in terms of land, where a prospector stakes a claim to a piece of ground, yet the analogy is deceptive. Answer are usually unlike land.

One solution, as discussed above, is an elaboration request and an elaboration message. Where reservation rights are concerned, the request can be an elaboration right in itself, the right to demand that a reserver elaborate on the answer she intends to supply. This option is usually vital to make reservation rights work. It too involves a time limit, in this case a time limit to respond. Thus AC can keep track of the time and can penalize a reserver if she does not respond in time.

The Best Laid Plans

Reservation rights are different than copyrights and patents, yet they share some similarities, for all protect the income a person gets from an answer. All protect against uncompensated copying in essence. The big difference is that reservations concern answers that are planned, answers that have not yet been supplied. So disputes can arise over copying what is not yet even found.

Prospectors who would like to supply an answer naturally may be afraid of interfering with an existing reservation. Moreover, two reservations might interfere as well. For example, say that a question is, What's causing this traffic jam?. Now a user reserves the answer to this question and goes off to find the answer. Let's say that a second user wants to answer the question as well. This second user is an eyewitness to the accident that has caused the jam. She might think it pointless to enter the answer though because someone else has reserved it. Yet the original reserver might not be able to find out the answer for a period of time. Further, he might come up with some other answer. And so we have a problem.

One solution is to have the second prospector enter a more specific question such as, What's causing this traffic jam, according to an eyewitness? and then enter her answer to this question. A dispute may arise later or it might not, depending on what answer the original reserver planned to enter and where he planed to get his answer from.

Given these problems, AC can enable users to consult a judge who can give an opinion about a potential interference.

Of course there is no perfect solution to the problem. The issue is similar to, and in some cases equivalent to, resolving patent disputes. These are hard enough, but with reservations we are referring to something even more indefinite, answers that are planned but that do not yet exist. And further difficulties are presented because the methods of getting an answer and the sources of an answer can matter, as can a host of factors, such as timeliness. For example, with the answer above, the original reserver might enter the same answer as the eyewitness, that the jam was caused by, say, a jackknifed tractor trailer. But the reserver may have gotten his account third-hand and so it may be less reliable that the eyewitness's. It is the same answer and yet it is not. Should the two answers interfere? And what if the original reserver did not know where he would get his answer from?

To repeat, we will not give great solutions to these problems, though such things as elaboration requests and messages can help a great deal.

Despite the inevitable difficulties, it is useful for AC to include reservation rights.

Completion Clock

A reservation only lasts for a certain period of time. (Time limits can, of course, vary widely.) And so AC can have a completion clock that, like a 24 second clock in basketball, keeps track of the time limit once a reservation is granted and shows how much time is left until the reservation runs out.

AC can maintain a waiting list of people interested in getting a reservation. People on the waiting list can be granted the reservation should the reserver fail to do so within the time limit.

Fees and Penalties

In order to provide a greater incentive to reservers to fulfill their obligations, AC can assess fees for reservations. Likewise, AC can assess penalties should a reserver fail to fulfill his commitment.

8.3 Rules for Assigning Reservations

Presuming a reservation can be granted for an answer, how is the right to be assigned? There are several basic selection methods which we describe below. The simplest is a first come first serve rule, where the first prospector to sign up for the reservation gets it.

Reservation Clock

If a first come first serve rule is not in effect, AC needs a reservation clock. This clock sets a period of time during which prospectors are eligible to sign up for the chance to get a reservation. AC displays the clock. The clock may be started when the first prospector signs up for a reservation to a given answer.

Alerts to Interest Parties

Once a prospector asks for a reservation, AC can send an alert to all the live prospectors for that answer. The alert shows the time on the reservation clock. Live prospectors can then respond as to whether or not they want to be part of a selection process for the reservation.

Assignment By Lot

One basic selection process is random selection. Thus AC can randomly choose a Fisher to get the reservation.

Assignment by Auction

Another basic selection process is an auction. There are different kinds of auctions that AC can hold. The auctions may be silent or open.

One kind of auction is a highest bid auction, where Fishers bid on how much they will pay for the reservation. The highest bidder wins, and AC charges him accordingly.

A different kind of auction is a lowest price bid auction, where the Fisher who promises to charge the least for the answer wins. In this case, AC sets the price of the answer once it is supplied according to what the winning Fisher has pledged.

A variation is a lowest cap bid auction where Fishers agree to cap the total royalty income for an answer. The Fisher that bids the lowest cap wins. In this case, should the answer be supplied, AC stops royalty payments once the cap has been reached.

Another kind of auction is fastest completion bid auction, one where the Fisher who bids to do the job fastest wins. In this case, AC can keep track of whether the winning Fisher has supplied the answer within the time pledged, and can assess penalties if not.

The big problem of course with all such auctions is that winning is based on one parameter, such as price. An auction where more than one parameter is involved is hard to do and requires more complicated scoring methods.

Letting Buyers Assign Rights

Typically in the economy a single buyer decides who does a job. There are various ways for a buyer to do this. But what happens when there are multiple, unrelated potential buyers? How can they collectively select who gets to do a job?

Well, we have an economy where people "vote with their wallets." Collections of customers decide which company has the better product and therefore ultimately who gets to do a job in many cases. While that may be okay for products that already exist, how can unrelated potential customers collectively select who gets to produce a product that is yet unmade? How can they decide who gets a reservation right, who gets to do a new job? As yet, there is no good way in the general economy.

In AC it can be arranged so that sometimes it is practical for them to see the credentials of the various candidate prospectors and vote on who should get the right. Hence AC can include procedures for enabling requestors to vote to pick which live prospector gets the reservation. The quality records of prospectors can be displayed (see chapter 13 on Quality Control).

Another method is for requestors to grant reservations individually. By this we mean that a requestor can specify along with a request that he is giving a reservation right to a supplier. A requestor can name a supplier or let anyone be eligible for the reservation. He can further specify various details about the right, including whether the right is assigned on a first come first serve basis or whether it is by some other method. If by some other method, he can also specify the time on the reservation clock.

AC can also enable a Fisher to poll prospects and ask them for exclusive rights.

In cases where requestors grant reservation rights the problem is that different requesters can grant different rights and to different Fishers. There is no general solution to this problem. AC can include various rules for standardizing rights. Further, AC can enable a Fisher to see what kind of rights he will get given all the various ones that have been offered. There are various ways to "total up rights."

Another problem arises which is that there is no way to poll future requesters and thus determine whether a Fisher will get royalties from sales to those requesters. If some requesters give reservations and others do not, who is to claim the royalties from future sales?

We might assume that a reservation right includes the right to share in some or all of the future sales of an answer. But if the reservation is only conferred by certain requesters, how do we determine what share a reserver gets, especially if he is not the first the supply an answer? As with all rules about reservations, there are no universals. AC must simply include certain rules to determine the splits.

Selling Reservation Rights

A reserver can sell his reservation to another Fisher. This option can be important because it is a solution to the problem of what to do about a Fisher who is in a better position than the reserver to supply an answer. Thus AC can allow users to post messages for offering to buy and sell reservations, and can enable users to execute the transactions. These messages can be stored, as with other A-stats, in the Q-record, and can be accessed through the prospector menu.

First-to-File or First-to-Find, the Problem of Tipping One's Hand

A Fisher might not want to seek a reservation because he might not want to tip his hand about the direction of his research, about what he has found so far, about what he plans to supply. This is the problem of giving protection on a first-to-file basis or a first-to-find basis (in patent law the issue is first-to-file versus first-to-invent).

Both approaches have merit. Therefore, AC might allow Fisher to take either route, giving rights to both first to file users and first to invent users. In other words, a reserver who chooses first to file would share royalties with a reserver who chooses first to invent. The key to splitting royalties is a disclosure document discussed above. If Fisher wants "first-to-find" rights, he needs to supply evidence of priority in a disclosure document.

Problems With Allowing Reservations

A better answer may emerge because of competition, but no answer may emerge because of competition. This is the dilemma. Reservation rights restrict competition and are one approach that can help to insure that an answer is provided at all. But there are many open puzzles that come with reservations (and copyrights), and they cannot be solved by universal rules. Some of the puzzles are:
What is a copy of an answer?
What is an improvement of an answer?
What is a copy of a potential answer?
What is an improvement of a potential answer?
What credit should be given to improvements of answers?
What amount of time should be put on the completion clock?
What amount of time should be put on the reservation clock?
What happens to a reservation if someone can supply a better answer or an equivalent answer but faster and cheaper?
In general, how do we give reservation rights without sacrificing the getting of better, faster, cheaper answers?

8.4 Using Prospector Information in the POF

Because potential competition can be a very big factor in the POE, AC can include variables for prospector information in the POF, and can feed prospector information into the POF.

AC can show two POE's, one that factors in prospector information and one that does not (as will be seen in chapter 9, AC can show various POE's).

AC can use historical prospector information as well. Just as AC can collect information on buying situations, AC can collect information on potential supplier situations. We might call these prospector situation stats, which are distinguished from individual prospector stats that concern a single individual's record. For example, AC can compile statistics on the likelihood that an answer will be entered, and the likelihood of when, given various prospector situation facts, such as the number of NBI and BI messages that have been registered.

As with buying situations, prospector situations can be characterized in a variety of ways. Here we have not made an attempt to list the basic situations. We have given some key pieces of prospector information that can be registered that can be used in characterizations. Other information that can be used was discussed in the chapter 6 on registering demand information.

Chapter 9

The Pay-off Meter

The Pay-off Meter (POM) is the name we have given to the process by which AC records demand information about an answer, converts that information by a pay-off formula (POF) into a sales and a royalty estimate for that answer, and shows the resulting pay-off estimate (POE) to users.

In this chapter, we describe some features that the POM can include, and that AC can include regarding the POM.

POE Alerts

The POM can include POE alerts. A POE alert means that AC alerts a user about a change in the POE for an answer. The answer may be missing or actual.

As examples, AC can enable users to ask to be told when the POE for a missing answer rises above (or drops below) a threshold. A potential supplier of an answer might want to know when the POE rises above some amount because then it might be worthwhile to supply the answer.

AC can enable a user to be alerted as to when the POE for an actual answer drops below (or rises above) a threshold. The supplier of an answer might want to know when the POE drops below some threshold because she might then want to take some action, such as, lowering her price, improving her answer, or challenging an illegal copycat.

In AC, answers are products. Obviously then, the supplier of a product might want to be kept informed of the sales projections for her product, if that product makes a significant amount of money (royalties). And she might want to keep informed of the sales projections of competing products. Thus, like a system that keeps track of the price of selected stocks, AC can enable Sue to keep track of the POE's of all of her answers, and of the competing answers she is concerned about.

Check Mode

A different kind of mode from supply mode or request mode is check mode. In check mode a user is simply looking at answers, both actual and missing, to see whether a new answer is worth supplying.

As has been pointed out before, the POE is a key search stat, and so AC can enable users to search for answers according to POE. The important thing to note here is that AC can enable a user to explicitly state that he is in check mode, that he is not looking to buy an answer, but only looking for good jobs to do (or checking POE's for some other reason). Thus, a user's activity in check mode would not normally be registered by AC as D-info.

Multiple Types of POE

The POE depends on what a supplier intends on entering. For example, the supplier of an answer that is only a small improvement over an existing answer might only merit credit for a small percentage of the royalties that the new, improved answer generates. We might say that multiple kinds of POE's are possible for different kinds of improvements that are made in an answer. AC can include certain classifications of changes, with corresponding kinds of credit due to those changes.

However, there are no general ways of classifying the changes to an answer and relating those changes to percentages of credit.

So, the simplest way to look at the situation is to say that AC assumes Sue will get all the royalty credit for an answer she enters, unless she tells AC differently. It is up to Sue to figure out what percentage of the credit she will get according to the property rights (the copy/credit rules) of AC. These meta rules are crucial to any POE, but it is not AC's job, in general, to determine what share of the credit Sue should get. She must honestly assign credit realizing that others will be watching her, and challenging her if they think she has hogged too much of the credit.

Multiple POF's

AC will not necessarily show only one POE for a given answer. The POE is the result of a POF that analyzes D-info. Innumerable POF's are possible, and AC can let a user to choose from a variety of POF's. Further, AC can show a user which POF's have been accurate in projecting income when applied to D-info situations that are similar to the one that the user faces.

Having Users Adjust the POF and the POE

The POE is the result of the POF taking D-info from a Q-record (or Q-records) and converting it into a sales and royalty projection. Innumerable factors (variables) can go into a POF. AC can enable a user, say Sue, to see what values it plugs into those variables and can allow Sue to help it adjust key values to arrive at a better POE. Users can do "what-if" scenarios, based on altering the values for different factors.

(Note: A user adjusting a POF can be in any mode. For convenience we will call the user Sue, even though Rex, or prospector would do just as well. When we use Sue we do not mean that the user will necessarily supply an answer. We mean someone who has an actual answer in mind when she is adjusting the POF.)

For many factors, human brains and human knowledge of the situation surrounding a particular answer will be better than AC's assumptions, which are based on averages from large statistical samples.

AC can show Sue a form that lists key variables in a POF and can ask her to enter what she thinks are reasonable values. AC can also enable her to examine the values that AC proposes, and can enable her to ask AC how it arrived at those values—in other words, she can ask to see the D-info that AC has based its assumptions on. Below are just a five values (factors) of a POF that Sue can adjust.

Price. Sue can enter the sales price of an answer.

Time Valid. Sue can enter when an answer will no longer be wanted, or when the demand for an answer will tail off.

Royalty Rate. Sue can enter the royalty rate(s) for her answer.

Credit. Sue can enter how much of the royalty credit she is due for her answer.

Buyer Commitments. Sue can contact Rex's directly to see how solid their buying commitments are, and can enter new assumptions about those commitments.

(In Chapter 25 of Book II, we discuss some more values that Sue can adjust in order to arrive at a better POE.)

Chapter 10

Royalty Rules

Royalty rules are, of course, a crucial ingredient in the POF and POE. AC can allow suppliers to pick standard royalty plans or AC's meta rules can determine the plans.

Royalty rules can be highly variable, just as pricing plans can be highly variable. We cannot give any prescriptions about what share of an answer's sales Sue should get in general, or what share AC should get, or when an answer should go into the public domain.

Especially problematic are rules for determining how royalties are to be split between Sue's when one Sue uses anothers answer within her answer. We cannot give any general rules for the splitting of royalties between Sue's. We can only say that AC can enable users to split royalties automatically through royalty rules. It is up to the users, and perhaps the managers of AC, to determine those rules.

One important twist that should be mentioned is that AC can include a royalty plan in certain cases where, based on insurance principles, a POE is not an estimate but is a guaranteed offer. For example, if ten people commit to paying $1 for an answer, AC may make a Sue a guaranteed offer of $5. In certain cases then, AC can enable Sue to choose guaranteed royalties.

Brief Note on the Importance of the Flexibility of the Royalty Rules

One of the advantages of AC is that the royalty rules and the POF are infinitely variable. Thus, the system Manager can adjust the rules to reward certain actions such as the correcting of answers. Here we will note one of the most important consequences, starting up the system and attaining critical mass for certain answers.

For many types of fee based data-base systems, the problem is starting up and gathering enough initial data and enough initial customers. This problem is often referred to as the critical mass problem. The idea is that a critical mass of customers is needed for the system to be self-perpetuating. But it is a chicken and egg problem, for often no users can be gotten until the data is in the system.

The beauty of the AC is that it enables the System Manager to provide incentives that can jump start the system. For example, if your plan is to start a lowest price locating system, a huge obstacle is how to convince thousands of sellers nationwide to feed in their prices so that the prices can be sorted. We met a similar problem in the very beginning when we discussed the problem of even keeping a data-base of telephone numbers up to date. The problems with a lowest price locator are worse.

If we agree though that people would be interested in lowest prices we can see that if the system got started it might be self-perpetuating, for buyers would want to check lowest prices and the low price sellers would, out of self interest, want to display prices. So let us assume that once the system got going it would have value for users and would be self-perpetuating.

In order to jump start the system the System Manager can adjust the royalty rules so that the people who are the first to enter the lowest price of a given item get a share of future income from all the lowest prices that are entered, for that item for a period of time. For example, say that the item is a Sony Walkman (we'll pretend there is just one model in the world). Then the royalty rules can be set such that the person who enters the lowest price will get a share of the royalties of all subsequent lowest prices, for a period of, say, 5 years. Now, if there is no price in AC then the first person to enter the price is the lowest. That is not a reasonable way to get the system going. Therefore, the System Manager can set a rule such that the "first" lowest price Supplier is considered to be the person who has entered the lowest price that is valid at a given date and time.

The System Manager can set the royalty rules such that, for instance, the supplier of the lowest price for a Walkman on December 24th, at noon, gets a small share of the royalties for all lowest prices entered for the next 5 years on a Walkman. The reward might be, say, $200. Thus the System Manager sets up a competition to be the lowest price supplier on a given date and time. The competition might last, say, a couple of months. At the end of this competition, a truly low price might be entered and the system may be off an running for prices on that item.

We use this illustration as a representative example of the advantages of being able to adjust the POF (the royalty rules really). There are many other advantages of being able to adjust the royalty rate and thus the resulting POE's, but this use above is the inventor's favorite.

Chapter 12

Direct Mail (Note: A longer chapter was planned here initially. However, plans changed and we only have a few remarks to make about "direct mail" in AC. Rather than eliminate this chapter and then have to change all the later chapter headings, we leave the chapter here.)

The basic idea of direct mail in AC is that a prospective Sue can send E-mail messages to prospective buyers asking them if they want to buy an answer. For example, Sue can ask Rex, do you want an answer to the question, What's the newest and best treatment for rheumatoid arthritis?

(This point was already made in Chapter 6 on the registering of D-info.)

Of course, suppliers of actual answers, not just potential answers, can also send "direct mail" solicitations to buyers.

Using AC's user record information, Sue's can find out what Rex's want by the questions they have been at and by the offers they have made at those questions.

Chapter 13

Quality Control of Answers Through Labeling

For a practical AC, it is crucial that buyers be able to judge the quality of answers. The idea quality covers a lot of aspects of an answer, some describable and some not. In this chapter, we will be concerned with some of the things that users can say about answers that can help other users evaluate the answers.

Now, when we say "quality control of answers through labeling" we mean that an answer can be labeled in various ways. We might think of an answer as breakfast cereal in a cereal box. We can think of the corresponding question as the primary label, the name on the box. And we can think of A-A-stats concerning quality as the nutrition information on the side of the box.

(It is important to note that much of the quality information that can be included as A-A-stat information can be included in an answer as well. This point will be clearer in a bit when we look at information that can describe the quality of an answer.)

A different kind of quality control occurs when a user improves on or replaces an answer—e.g., when someone updates a price. This kind of quality control is closely related to quality control through labeling because, in order for someone to know that something in an answer needs to be changed, someone else often has to first say what needs changing. A user may also explicitly request an improvement. Such a request is a kind of description itself. And so, the process of improving an answer is not entirely separate from the labeling of an answer.

This chapter will stick to the subject of describing the quality of an answer rather than the subject of changing the content of the answer. Of course, when one describes the quality, one usually changes the perception of an answer. So, it is hard to say what it means to change an answer. Here we usually mean the difference between an answer and its A-A-stats—we usually have in mind the adding and changing of A-A-stats that describe the quality of an answer.

Who Describes the Quality of an Answer

The quality of an answer can be described by Sue, who puts the answer in, by any Rex who sees the answer, and even by AC in certain ways. Sue, Rex and AC can enter some of the same kinds of descriptions. Mainly, Rex and Sue can enter the same kinds of comments, while AC compiles and shows statistics about an answer and about the people who are commenting on the answer. First, let us take what Sue can enter.

Some of the Things Sue Can Say About the Quality of Her Answer

As discussed, most of the things that Sue can say about her answer, she can include in her answer instead.

1. Timeliness of Her Answer

For example, if she answers, Who charges less, Sprint or ATT? she would say when the answer was found, and possibly when it was last checked.

2. Source(s) of Her Answer

For example, if she answers, What is the best treatment for lupus?, then she would give sources.

3. Witnesses

For example, if she answers, How many people were at the Yankees game last night?, she can name other people who corroborate her figure. Sometimes a witness is the same as a source and sometimes not. We will discuss witnessing a bit later, but the point is that Sue tells about people who verify her answer.

4. Methods

She can give an explanation of how her answer was found.

5. Complete or Incomplete

She can say whether her answer is partial or complete (she can tell this fact with semantically linked questions as well). For example, if she answers, What is the best sunscreen lotion?, she may give an answer, but explain that it is incomplete in the sense that she has only tested a certain number of lotions. Or, if she answers the question, What are the ten largest steel producers in the US?, and she only gives a few names, she might say that her answer is incomplete. Normally, in such situations, she would also store her answer under another, more appropriate question. The point is simply that a basic quality comment is to say whether an answer is "complete" or "incomplete". (Naturally, these terms are subjective since there is no general definition of a "complete" answer.)

6. True or Not

Most answers that people give cannot be called true or false because they are not posed precisely enough—e.g., a movie review cannot be called true or false. Still, some percentage of answers are posed well enough—e.g., the reported price of the movie can be called true or false. Thus, where applicable, Sue can claim that her answer is true, or that certain assertions within her answer are true.

7. Guarantee

She can put up money to guarantee that certain statements are true.

8. Probability Estimate

She can explain that statements are guesses and can assign probability estimates that they are true.

9. Bets

She can make bets about statements in her answers.

10. Challenges

She can issue a challenge that her answer is better than another. This gimmick can be an important, particularly if she puts money behind it. There are many ways to pose a challenge, of course.

11. Paid Review

She can pay to have a neutral party evaluate and report on her answer.

12. Linking Answers to Supporting Answers

She can link her answer to others that support it. She can also cite such answers.

13. Abstract

She can summarize, or provide a sample of, her answer.

Some of the Things Rex Can Say About the Quality of an Answer

We should note that when Rex is making quality comments about an answer, AC does not necessarily register this activity as D-info. We might say that Rex is in Review Mode. Certain kinds of quality information can be used as D-info—for example, complaints can be correlated with the sales of an answer—but the point is that Rex is not requesting an answer. Thus, we should just say that AC may or may not use given quality information that Rex enters as D-info.

Rex's review information can be abbreviated as, for example, if he gives four stars to a movie. Of course, as with a movie review, Rex's review information can be elaborated on. Below we will discuss mainly abbreviations. In all the cases, AC can enable Rex to elaborate. The idea is just to give categories of quality information.

1. Timeliness

Rex can point out whether an answer is out of date or not. For example, if he sees a price, he can report that it is out of date.

2. Fit or Clash

Rex can say that an answer does not fit a question. For example, if the question is, How far is it to Chicago from Washington DC?, and the answer is, Jello, then the answer does not fit the question. Even when the answer is technically true, it may not fit the question. For example, the answer, Less than 1,000,000 miles, may be true, but it does not seem to be what is sought in the question above. Actually, we have no definition of what it means for an answer to fit a question, to match a question, to be appropriate to a question, and therefore all we can say is that AC can enable any Rex to state whether an answer does or does not fit a question.

3. True or False

Rex can say that an answer is true or false, or that certain statements in an answer are true or false.

4. Misleading

Rex can say that an answer is misleading.

5. Satisfactory or Unsatisfactory

Rex and say whether an answer is satisfactory or not.

6. Numerical Scoring

Rex can rate an answer on a numerical scale (and AC can compile the scores given by different Rex's).

7. Guarantee

Rex can accept a guarantee about an answer.

8. Bets

Rex can accept a bet about an answer, or can place a bet about an answer.

9. Refund Request

Rex can ask for refund. (AC would keep statistics on the rate of refund requests for an answer.)

Some Things AC Can Say About the Quality of an Answer

1. Basic Facts About an Answer

AC can tell how long an answer is, when it was entered, and by whom.

2. Scoring Methods

If people are able to score an answer, AC can compile and display the scores given by different people.

3. Compiling Complaint and Satisfaction Statistics

AC can compile statistics on how many people have complained about, or have complimented, an answer. For example if 1,000 people have bought an answer and only 3 have asked for refunds then that is a indication that the answer is good.

4. CSUB

AC can include a Communications System Using Bets.

5. Credibility Statistics

AC can compile statistics about the credibility of users.

a) Sue's Credibility Record

AC can compile statistics about how many complaints have been registered about all of Sue's answers . Sue's "record of reliability" (a poor phrase) can be kept track of in various ways. While no perfect record can be made, certain statistics can differentiate between the reliability of different people.

b) Reviewer's Credibility Record

The same principle applies to reviewers of Sue's answer.

6. Alerts

When a user has entered a review of Sue's answer, AC can alert her because she may want to acknowledge the review or contest it in some way.

The Importance of Verifiable Statements

In any system for distributing answers, the credibility of those answers is paramount. A fundamental way to gain credibility is through the use of verifiable statements, statements that can be found true or false.

By verifiable statement we do not mean a statement that is verifiable by some elaborate procedure. We have in mind statements that people agree can be found true or false without much trouble defining what true and false are in the situation that the verifiable statement describes. For example when we say that William Powell and Myrna Loy starred in The Thin Man, we do not explain how we would verify that, still we realize that most people know that the statement can be decided to be true or false.

(Another degree of verifiable statement is what can be called a bet statement. A bet statement not only can be found true or false but also contains directions telling how to find it true or false, unless the procedure is obvious.)

Verifiable statements are the touchstones for determining a person's credibility and the credibility of an answer. Why? Because they can be contested, can be called true or false. Thus if an answer has numerous verifiable statements none of which have been contested then we can often say that the answer is credible (presuming the verifiable statements are significant). But, when there are no significant verifiable statements, we can't judge well whether an answer is credible.

So, AC can enable people to highlight (identify) their verifiable statements and can enable other users to register their assents or objections to the highlighted statements— confirmations and refutations.

Judges will be required to settle disputes in many cases.

AC can compile statistics about how many times a person's verifiable statements have been successfully contested (AC will have some kind of meta rules about what it means to successfully contest a verifiable statement). Further, for a given answer, AC can keep track of how many people object, and do not object, to verifiable statements within the answer.

Verifiable statements can also have money put behind them, in which case we are dealing with bet statements and bets.

Registering Demand for Verification (Witness Costs)

A hidden cost of knowledge, of answers that is, is the cost of witnesses and witnessing. In order to use an answer, we'd like to know that it is reliable. We'd like to trust the source where it came from.

Every answer has to come from someone who saw or heard or felt or tasted or smelt something. So, naturally, we have to trust people.

Often the ultimate source of an answer is a single person, or a single team of people that we can think of as a single person. In other words, the ultimate source of an answer is often a single witness.

And yet, in many cases, we are not satisfied with that. We want more witnesses—we want verification. But verification costs time and money. In fact, the prohibitive costs of paying for extra, neutral witnessing is one of the main reasons we can't trust so many statements.

Consider the example of a medical study that says that taking an aspirin a day lowers the chance of heart attack. We want a witness to back up the claim. In this case, witnessing means repeating the experiment. Obviously, it costs a lot to do repeat studies needed to verify the results. Or, take the example of an assertion by a sunscreen maker that its product blocks UV rays at "15 times" a person's normal protection. Well, a customer may be skeptical, but who is to fund the cost of verifying the statement?

Verification Questions

Of course, AC registers demand for the verification of an answer whenever someone enters a question asking for verification. (A request for the verification of an answer is usually any question of the form: Who else says the same thing and how do they know?) For convenience, AC can also include a special, named question that we will call a verification question (ver question).

For example, say a question is, When is the best time of the month to have intercourse if you want to get pregnant?. And say the answer is, The week before ovulation according to NIH. A ver-Q may then be, Who says so at NIH?. Another ver-Q may be, What is the best time of the month to get pregnant according to some respected institution other than NIH, and according to some study other than the one NIH relies upon?

A ver-Q can be linked to a question and/or answer. Note: We discuss linked questions in Book II, so we are jumping ahead a little.

A ver-Q is like any other question, it simply has a semantic relationship relative to an answer, and to another question. AC can enable a user to enter a ver-Q and link it to a Q-A location of an answer. A user seeing the answer can then also see, and go to, ver-Q's. And the user can also find verifying answers corresponding to the ver-Q's, if those answers exist.

Ver-Q's do not need to be specially named or linked to answers. That is simply a convenience. The key point, which perhaps does not need to be made, is that questions in AC can reveal the costs of, and the need for, witnessing.

Digression on Paying for Guesses

An interesting philosophical and practical question is: How much is a guess worth?

This question is not just philosophical because in conversation most answers that people give are guesses, and any answer to a certain extent is a guess. We cannot say what a guess is worth in general.

A person who supplies a guess can sell the guess like any other answer. Of course, it helps if she attaches a probability estimate to the guess, telling what the chances are that the guess is true, in her opinion.

Deciding how much to charge for a guess if one is the seller, and how much to pay if one is the buyer, depends on many factors.

A critical issue is the value of having a 100% certain answer. Then the key issue is the supplier's record in making guesses. How good were her probability estimates in the past? Her past record will often determine the value of her guess.

(AC can keep track of a person's record of past guesses, comparing the distribution of results to the probability estimates made before the results were known.)

Chapter 14

Property Rights

Since AC collects answers by paying people royalties on the sales of those answers, AC needs to give suppliers property rights, such as copyright protection. Uncompensated copying has a huge cost, for it prevents people from finding new answers. This principle is well known, but for the sake of concreteness let's take three example questions, if only to keep in mind that there can be drastic differences in the effort it takes to find different answers, and that different kinds of protection may be necessary depending on the effort involved.
1. What's the formula for a lotion that will eliminate hair for at least 6 months and will not damage the skin?
2. Who do 2000 randomly selected Americans think will win the next Presidential election?
3. What's a short definition of the term "tonic chord"?

It is recognized that some answers, like the answer to the first question above, require some kind of protection, which we call patent protection. Other answers, like the answers to the second and third question, also require protection, though current law in the outside world does not provide for it. Why do most all answers require protection, at least initially? Because, even if an answer takes little effort to find, like the answer to the third question, it seems most people would not supply it to AC if others could plagiarize it and store it in under a slightly different question.

14.1 Laws of the Land

AC requires meta rules that spell out the property rights of suppliers and it needs functions that reflect those meta-rules. One critical property right is a law against uncompensated copying (a copyright, which can last for a set period of time or until a certain amount of income is paid). Another critical property right is a law against wrongfully changing an answer. Another critical property right is a law against lying about an answer.

(Other key property rights were discussed in previous chapters. Chapter 7 discussed the public and private domain. Chapter 8 described reservation rights. These topics could have been discussed in this chapter as well.)

Of course we will arrive at no good definitions for these laws, because the definitions of copy/plagiarize, wrongfully change, and lie cannot be made exact. For example, taking the hypothetical poll question above, say someone does a poll and enters the answer. Then say someone else does another poll later and enters another result. Should the second result be considered a new answer? What if the second poll copied the technique of the first poll? What if the second result was not from a totally new poll but was a reinterpretation of the first result? What if the second poll answer was more accurate but combined new poll data with the first poll's data?

While realizing that there are no good general rules, we can only say that AC needs to include rules for defining property rights.

14.2 Functions for Enforcing Property Rights

To enforce property rights, AC needs four things:
1. Means for Verifying the Identity of Users Before letting a user change an answer or any other valuable piece of information in AC, AC needs to verify the user's identity. AC can use well known authentication techniques that need no elaboration here.
2. Judges AC needs judges who will rule on whether rights have been violated and who will settle credit disputes. AC can enable users to file complaints with judges who, as in conventional courts, can divide property and can assess penalties. (As an aside, we note that AC can keep "rap sheets" on users.)
3. To Register and Display Detection Information AC needs to display information that enables people to detect violations. Thus AC automatically time stamps answers and can display the time stamps so that people can see which of two given answers has priority.

As described in chapter 5, and a little later below, AC enables Sue to enter credit information along with her answer. This information, which might also be called citation information, shows which answers deserve credit as part of her answer, and how much they deserve, in the sense of what split of royalties they deserve. AC displays citations so users can evaluate whether Sue has assigned proper credit.
4. Means for Detecting Violations Below are four functions AC can include for detecting violations.
a. Alerts AC can include a function for alerting Sue any time her answer has been displaced (knocked out of the current answer position) or changed in any way. She can then file a complaint with a system judge if she feels that the change is wrong under AC's rules. (Note: AC can also alert Sue if her answer has been commented on by others. Again, she can file a complaint if she thinks her answer has been wrongly criticized. This topic will be discussed in chapter 13 on quality control labels, but that chapter is not written up yet.)
b. Snitch AC can include a function that enables any user to report plagiarism, and possibly get a reward, which possibly can be paid by the offender. The snitch can report the plagiarism to Sue or to a system judge.
c. Flip Flop Stopper In order to cheat, a person might have a confederate change an accurate answer to a wrong one. The person would then re-enter the answer correctly and claim royalties. AC can have a function such that if an answer reverts to a previous answer within a given period of time, royalties will be paid to the supplier of the previous answer, provided the previous answer was accurate. The time allowed for reversion can vary depending on the situation.
d. Competition Tracker As will be seen in Book II, AC can to some extent track which answers are taking sales away from a given answer. Sue can request this information (or AC can send it automatically). Sue can then check those competing answers to see if they contain plagiarized material.

14.3 Sharing Royalties

As mentioned above, it can be useful for AC to enable a person to copy all or part of an existing answer. As discussed, the term copy can cover a very broad range of uses. For illustration's sake, we may imagine that Sue is trying to improve an existing answer or that she uses an existing answer within her answer. For example, Sue may elaborate on a short article or she may use a quote. And so AC has meta rules prescribing royalty sharing, and functions enabling Sue to share royalties. (We have discussed the necessity for these rules and functions in section 5.2e as well.)

It is usually impractical for suppliers to engage in lengthy negotiations about the splitting of royalties. (Of course that depends mainly on the value of the answer and the size of the royalty stream.) Thus AC can have standard royalty sharing plans based on some classification of the uses of answers within other answers. In addition to standard royalty sharing plans, AC can enable users to specify that a certain percentage of royalties or certain fixed royalties are to go to another answer.

As discussed in Chapter 9, it is up to Sue, not AC, to figure out how credit should be split according to the property rights (the copy/credit rules) of AC. She must honestly assign credit realizing that others will be watching her, and challenging her if they think she has hogged too much of the credit.

For royalty sharing to be implemented in an automated way, AC must have functions that enable Sue to enter credit information that:
a. identifies the answer(s) she owes credit to,
b. identifies the type of credit (the amount of credit) that is involved.

Further, AC needs functions that:
c. transfer payments as specified by the credit information Sue has entered.

AC stores Sue's credit information in the credit record for her answer, which is part of the answer's Q-A record. Then each time her answer is outputted, the cited answer gets a share of the royalties as specified by the credit information. When the credit information is displayed, we also call it citation information.

An answer may share royalties with more than one other answer directly. By directly we mean that Sue cites another answer.

It is obvious, though worth noting, that credit chains can be formed where one answer pays to a second answer, which pays to a third answer, and so on. In this sense, an answer can share royalties with another answer indirectly. In other words, Sue might specify that a percentage of royalties are to be paid from her answer to a second answer. The second answer might in turn—as specified in its credit record—share royalties with a third. Thus, Sue's answer will be sharing royalties with a third answer, even though she has not cited that answer.

(Note: Because it is often practical to negotiate about the splitting of royalties, AC can include functions for enabling users to buy and sell rights to use an answer. Negotiated splits are not treated different than splits where Sue unilaterally decides how much credit to allot another Sue's answer. Negotiated splits are also entered as credit information so that AC can transfer payments as necessary, and so that users can see who owes what to whom.)

Chapter 15

Multi-lingual AC

A great goal for AC is to be an international question and answer base where people can enter questions and answers in different languages: where a person can ask a question in, say, Swahili and get an answer back in Swahili that has been supplied originally in, say, English. It is a great goal not just because of the ideal of international cooperation but because of the economics of the system. In general, the more people who are willing to pay for an answer the more likely it is to be supplied, and the less it will cost per person. If 5 people speaking English want to know, What are the names of all the delegates to the United Nations?, the pay-off may be too small to induce someone to supply the answer. But if, say, 3 French speakers, 7 Japanese speakers, 2 Russian speakers, and others speaking other languages also want the answer then it should usually have a better chance of being supplied and should cost each person less.

For the system to be multi-lingual, it needs to do two things:
A. Match up questions posed in different languages that ask for the same answer.
B. Input an answer in a given language and output the answer in other languages.

There are many ways these tasks can be accomplished. Because it is simplest, we will first discuss a system that has a central language such that all questions and answers are translated into the central language and answers are outputted from the central language. After describing the key steps involved with a central language model, we will discuss other models.

15.1 The Central Language Model

Matching Up the Same Questions Posed in Different Languages

As mentioned in the section on best matching, the problem of matching up questions in different languages is a best match problem with translation functions added. A translated question is often just an ungrammatical question spoken in the language it has been translated into. The key step really is the matching step, which is also necessary with questions posed in a single language.

Figure 15:
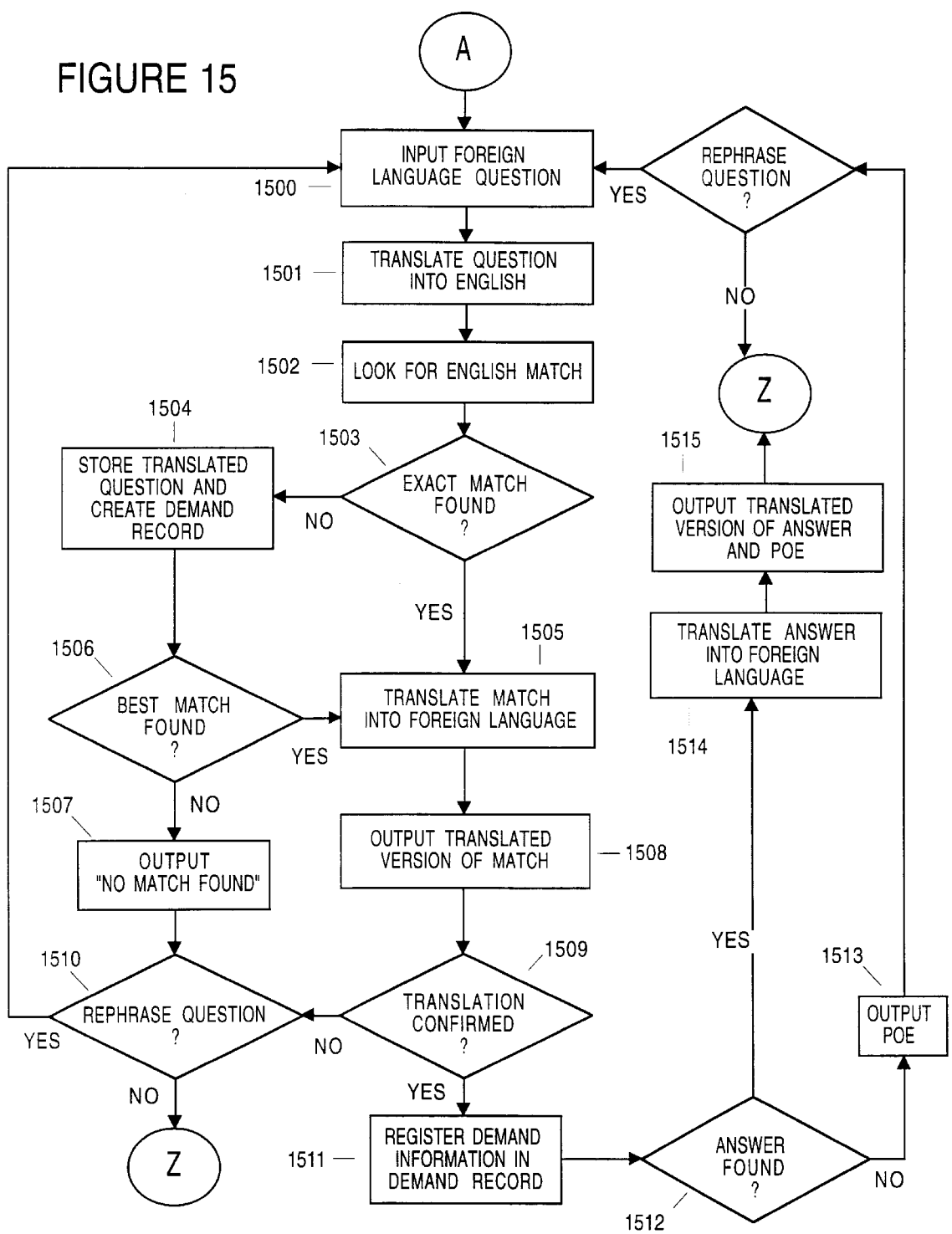
FIG. 15 shows a flow chart of steps for a multi-lingual system.

We will take the case of two languages because this case illustrates the basic steps involved. In our example, we assume the languages are French and English and that the question is entered in French and translated into the central language, English. And we assume that the user wants the answer that corresponds to the question entered (the user may just be passing through but we assume he is not). The steps that the system requires are shown below and pictured in FIG. 15.

1. Input 1500 French question string.
    Anita Morris, comment-elle est morte?
2. Translate 1501 French string into English string.
    We pretend that the system translates the French into, How did Anita Morris die?
3. Check 1502 for match among English questions stored.
4. Exact match found 1503?
    If no, store 1504 the English version, create a demand record for the question.
    If yes, translate 1505 match into French and go to step 6.
5. Best match(es) found 1506?
    If no, output 1507 a message saying that no match was found and enable the user to rephrase the question.
    If yes, translate 1505 the best matches into French.
We will pretend that in AC there is a question, Anita Morris, death of?, and that this question is the one that is the best match found.
6. Output 1508 translated match(es).
    The best match string is returned to the French user for confirmation. We pretend that the translated version is, Anita Morris, la morte?

7. Have user confirm 1509 whether any match is adequate.

Rex now sees the string in French, but it is different than the one he entered originally, because it is a translation of the best match. So Rex has the choice of rejecting the translated match or not.

If he rejects it, the system can enable 1510 him to rephrase the question.

If he accepts the best match, the system can then register 1511 demand information for the question, as posed in English. In other words, at this point AC treats the situation as if an English speaker has entered the question, Anita Morris, death of?.

8. Check 1512 if the answer exists in English.

If no, output 1513 the POE and enable the user to rephrase the question.

If yes, the translates 1514 answer into French and outputs 1515 it and the POE.

Why It's Feasible to Match Up Translated Questions

Let's see why questions in different languages can be translated and matched well, even though we know that machine translation is a hard problem. Well, is machine translation a hard problem? That depends on what you are doing. If you are translating a long piece of text then problems of interpretation mess the translation up. A translation program can't give multiple versions of each phrase in the piece because the result would be a jumble. But with short messages, like questions, multiple versions are possible. A program can make multiple interpretations of a question and try these against a existing questions in the system in a given language.

Then, when AC finds matches, it can translate these back into the original language, giving multiple interpretations of these. That number of versions can be manageable. And, because questions are usually short, the user can easily confirm a translation. Moreover, a user can easily rephrase a question multiple ways, so as to have a good shot of matching. In other words, because questions are usually (not always) short, problems of interpretation can be overcome by both the user and AC trying different possibilities.

The system also can include a feature that enables a user to more easily correct a mistranslated word or phrase. When the best matches are popped back, the system can enable the user to change some word or phrase and then re-enter the question without having to restate the whole thing.

Translating Answers into Different Languages from Central Language

Matching up questions is one essential task of a multilingual AC. The other is inputting answers in different languages and then outputting the answers in other languages. AC can include functions that translate an answer into a central language. From this language, the system can translate an answer into any other language.

However, the problem of translating answers can be tougher than that of translating questions because answers are often longer than questions and therefore can suffer from the problems of machine translation. The system can overcome this problem by enabling users to:

a. enter different language versions of an answer,
b. enter improved versions of machine translations.

In order to do this, the system can accept an answer in any language and store it in that language. For example, the system can store an answer in French. When necessary, it can be translated into English or Spanish or any other language that the system has translation functions for.

Figure 15A:
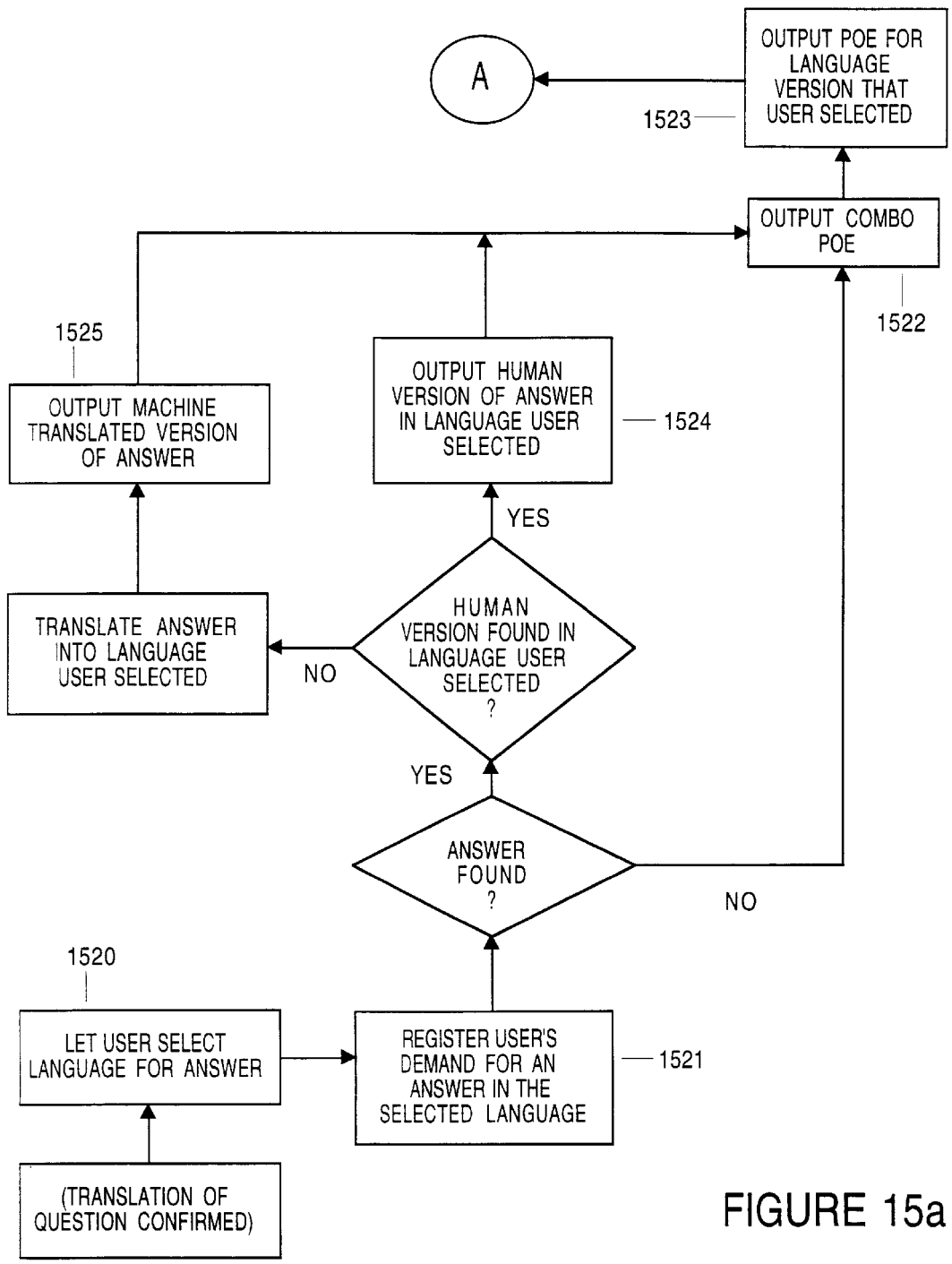
FIG. 15*a* shows a flow chart of steps for registering requests for answers in specific languages.

Now, as shown in FIG. 15a, when Rex asks for an answer, the system can allow him to select 1520 the language he wants the answer in and can register that choice and can enable 1521 Rex to make a payment offer (and enter any other D-info) for a human supplied answer in the language that Rex prefers. By registering D-info for the language Rex wants, AC can create a POE 1523 for that answer in that language.

If a "human version" of the answer in the language Rex prefers is in AC, AC outputs it. By human version we mean that the answer was originally supplied in the requested language, or that a supplier translated the answer that was originally supplied in another language, or that a supplier improved a machine translation. If a human version is not in the system, AC outputs a machine translation.

AC can also register demand for an improved translation, whereby a user who gets a machine translation can request an improved translation (we do not show this step in the figure).

Thus AC can create and output two POE's for an answer, one a combined POE 1522 based on all the requests for an answer regardless of language, and one POE 1523 for a human translated version of an answer in a given language.

A person seeing the POE for a given language can provide her own answer in that language or she can improve on a machine translation of an answer that has already been entered. AC can output 1524 the human version if one is stored, otherwise AC outputs 1525 a machine version. The person who supplied the answer first may get the bulk of the royalties while the person who improved the machine translation can get a share each time his improved translation is sold.

Thus AC can keep multi-lingual versions of an answer to correspond to a question, regardless of the language a question is posed in. And that is an important point: questions can be stored in various languages and need not correspond to the languages of the answers.

15.2 Suburb Languages and Suburb AC's

We have discussed the central language method. Let us now let us discuss a simple addition to it, which we will call the method of suburb languages. We use the name suburb language in contrast to the name central language. The idea is that AC will store questions and answers not only in the central language but in suburb languages as well. Thus, a person using a language can check first to see if a question and answer are stored in that language rather than just in the central language.

The trick is that the questions and answers in every suburb language will be translated into and stored in the central language, but not in each suburb language. We can think of AC as having a center (a central language) with suburbs such that all the material in the suburbs is translated into (duplicated in) the center, but not vice versa.

So, AC translates every suburb language question into a central language version and AC translates every suburb language answer into a central language version, but not vice versa. We will call a question in a suburb language and its central language translation translation twins. The same name applies to answer pairs.

Along with storing questions in a suburb language AC will also keep corresponding question records with Q-info that applies to those questions in that language. We will call the set of questions, answers and Q-records in a suburb language by the name suburb AC. And we will call the set of questions, answers and Q-records in the central language by the name central AC.

Why Have More than a Central Language AC?

Why have suburb AC? Because translations, especially machine translations, can lose meaning, and therefore it is preferable not to translate. However, we want to translate for economic reasons of pooling demand. So, we try to have the best of both worlds, giving native speakers the chance to have questions and answers supplied in their own language by people, but also taking advantage of the opportunity to match those questions and answers with those entered by people speaking other languages.

Most languages are spoken by large enough populations of native speakers that they can support their own suburb AC's. The key is to duplicate those suburb AC's into the larger central AC. In other words, as in the central language model with no suburb languages, the idea is to translate questions and answers entered in any language into the central language. All we are doing is adding the suburbs.

Steps for a Central Language and a Suburb Language

Below we restate the basic ideas above, giving some specific steps for an AC that stores questions and answers in two languages. To illustrate we will consider a central language, English, and a suburb language, French. We will assume that the user's native language is French and that he is using French questions and looking for French answers.

Key Definitions and Steps

A central language is the language that all questions and answers are translated into. A suburb language is a language whose questions and answers are translated into central language versions. To illustrate the key steps for a suburb language, we take a sample question and see what AC does:

1. User enters French question, A quelle heure ouvre le Louvre?
2. AC checks (its French suburb) to see if the question has any exact matches.
   a. If no,
      a1. AC stores the question in French and creates a French Q-record,
      a2. AC translates the question into English, What time does the Louvre open?, and checks if there is an exact match in English already stored,
         if no, AC stores the question and creates a central Q-record,
         if yes, AC adds a French request to the central Q-record,
      a3. AC checks for best matches in French and English.
   b. If yes,
      b1. AC adds to the tally of requests in the French Q-record,
      b2. AC adds a French request to the tally in the central Q-record,
      b3. AC checks for an answer stored in French.
         b1a. If yes, AC outputs the answer.
         b1b. If no, AC checks for an answer stored in English.

If AC does not find an exact question match in French, we assume that it checks for best matches in French and English (even if it finds an exact match in French, AC can still search for best matches in both languages) and decides whether to present best matches in French and English. The point here is not the presentation of best matches. We assume that, all other things being equal, AC chooses a French match. The point here is that questions get translated and duplicated into the central language and that Q-info registered in the suburb AC also gets registered in the central AC.

Thus, when a user expresses a preference for French, AC checks first for matches of French questions and answers. At the same time it translates everything into English so that people from other languages can pool demand for the same answers, and can enter answers to those questions.

(AC can still enable French speakers to explicitly express demand for answers to be supplied in French by enabling French speakers to make payment offers for having an answer provided in French.)

Now, where answers are concerned, when a French user enters an answer, AC would store the French version in the French suburb and then translate it into English, if no English version is already in AC. So, when a French user goes to find the answer, he can get a French answer supplied by a French speaker. When an English speaker goes to get the answer, he will get a version translated from the French, if no English version has been supplied.

If there is no French answer in AC, AC searches for an English version. If an English version exists, AC translates it and outputs it. Of course, if there is more than one suburb, the answer may originally have come from some third language.

(Note, we are not concerned here with how AC stores machine translated answers.)

Security Council Model

It should also be noted that AC will probably have more than one central language. It will probably have what we might call Security Council languages—those languages that represent the greatest populations, such as English, Chinese, Spanish, Arabic and Hindi.

The questions and answers and question records contained in each central AC would be translated into all the other central AC's.

15.3 Translating Questions Into Multiple Languages

AC may not have a central language at all. It can translate questions into multiple languages, trying various ones until it gets a match. When a user enters a question, AC first checks if a match exists in the language of the question. If not, AC can translate the question into multiple languages and look for the best match. The translation procedure described above can then follow. For example, if a French speaker asks when the Louvre opens, AC checks first whether any other French speaker has asked this question. If no good match exists, the question can be translated into various languages until a good match, if any, is found.

AC can store the multi-lingual versions of a question in a common record, like a multi-lingual dictionary/thesaurus entry for a question (a bi-lingual dictionary, like French-English, is really a thesaurus). For example, a question can be translated from French into English. If a user confirms the translation then AC keeps a record for the question and this record has two versions of the question. Then let us say that the question is entered in Spanish and that it is translated into French and that this translation is confirmed. AC would have three versions of "the" question in the record. AC will have done two translations, one of the French into the English and one of the Spanish into the French. Which languages get translated into which depends on AC's rules.

When AC keeps multi-lingual versions of a question, the demand tally for that question is based on the sum of the times the question has been entered in each language. If the question has been entered 4 times in Japanese, 3 times in French, and 2 times in English then the tally is 9. AC can keep a combination tally as well as a tally by language.

As discussed in chapter 4, there is no single Q-string for a question. So rather than lump questions into a single synonym record, it is preferable to store the questions separately and connect them by named links, such as synonym links, best match links, best translation links, and others. We take up links in Book II, where we will revisit the issue of translation.

Chapter 16

Form of the Invention

On one hand, this chapter should not be so short because it describes applications of AC that may come to pass with large commercial effects.

On the other hand, there is not much new to describe. These applications are only small modifications of the invention described in the previous chapters. We discuss these modifications because they have such large commercial potential and because there may be issues of priority.

16a Decentralized AC

It is worthwhile to pause and discuss the form of the invention. Because it is to be used by a community of people in different locations, the invention comprises a network in which terminals in various locations are used to input questions and supply answers.

The answers can be stored centrally or in nodes throughout the network. For example, certain users might request the full text of Dracula. Other users might want the film version of Dracula. These two, different answers can be stored centrally. Or the text of Dracula, the book, might be stored in a computer owned by, say, the Library of Congress, while the film might be stored in a computer owned by, say, a film studio. Because of the added communications costs, highly decentralized storage of answers is not usually the most efficient method where AC is concerned. Nevertheless, real world concerns might dictate such decentralization. A movie studio, for example, might not want to put its copyrighted movie in someone else's computer for distribution to the public.

(One problem in discussing the issue of centralized storage is that the very concept of centralized storage is blurry in this age of sprawling networks. We will not try to define the notion crisply here, but will rely on peoples' intuitive notions.)

While the storage of answers may be decentralized, the gathering of demand information in Q-records (and the calculation and outputting of POE's) must, in general, be centralized. For example, say we have a question, How many paintings are in the Louvre?, and say that a dozen users request the answer to this question. It does no good if the twelve requests are all registered on different systems. There needs to be a central tally showing that there have been twelve requests for the answer, so that the POE corresponds to the demand of twelve people. Otherwise the POE in each system would only correspond to one request.

In fact, the goal of AC is to collect the demand for a given answer centrally. That way the pay-off for supplying the answer is higher. Often, the higher the pay-off the more likely the answer will be supplied into the system. Moreover, the answer can cost less per user. If the collection of demand is not centralized then there is no way to accumulate the demand and that defeats the purpose of the system. Of course it is conceivable that the demand could be registered throughout the system but it would still have to be tallied somewhere to yield a figure which would then lead to the maximal POE.

(Note: Not only demand information must be collected centrally but so must most other Q-record information. We emphasize demand information because it is the key information for calculating POE's.)

The economic efficiency of accumulating demand information does not mean that it is necessarily best for a single AC to store all the world's questions and Q-records. An AC is meant to be used by a community and a community can be defined narrowly. For example, a company might have an AC for its employees. Still demand information (and other Q-record information) for answers concerning the company would be stored centrally and not in every employee's computer.

We have mentioned that answers might be stored in a decentralized manner. If AC does not store answers centrally, it must at least store pointers to the answers centrally. For example, if Rex asks for a given answer, AC must be able to tell if the answer is in the system or not. To do this, an A-stat identifies whether the answer is in and where it is located. Thus a pointer to an answer is surrogate for storing the answer itself. In the case of decentralized storage of answers then, a supplier who enters an answer into the system has to enter a pointer centrally while entering the answer into a given storage computer. AC can connect users to the computer that stores the answer.

Another aspect of AC that can be decentralized is the paying of royalties and the collecting of charges. This can be done at the nodes where the answers are stored. However, even if payments are transacted in a decentralized manner, payment information would still be sent to the central AC location because it is important demand information to be used in calculating pay-off estimates.

It is also possible that AC only outputs routing (pointer) information to Rex but does not make the connection to the computer that stores a given answer. In this case, AC is really a new kind of signaling system that tells users where answers are stored and tells users the potential pay-off of storing and selling the answers.

16b AC Applied to the World of Physical Products

It should be apparent that AC can be adapted to the world of physical products. By this we mean that instead of describing answers (information products), questions in AC can describe physical products that people want. Thus, AC can include lands where questions refer to physical products rather than answers.

(We will not define the term physical product in any precise way. Let us just say that a physical product is something that one might find in a conventional catalogue.)

Normally, a question is a description of an answer. It is a description of a description. When adapted to describing a physical product, a question is about an actual thing.

But the distinction is more philosophical than real. As far as the process of description goes, there is no difference between describing a T-shirt and describing a picture of a T-shirt. The main practical difference, where AC is concerned, is that the description of an actual T-shirt refers to something that cannot be entered into the system. Rather than supplying physical products to AC, suppliers input product descriptions and ordering information.

The main point is that AC can collect demand information about physical products and can output POE's about physical products. The collecting of demand information is basically the same as with answers.

AC can also execute transactions for the buying of actual products and can arrange the delivery of physical products.

For example, AC can collect demand for a given T-shirt which is described by a question. If the POE is high enough, a supplier might decide to make the T-shirt. A supplier who has made the T-shirt can supply to AC the fact that the T-shirt has been produced and also supply ordering information. The fact that the T-shirt is available is an answer to the question describing the T-shirt.

A requester, seeing that the T-shirt is available, can order it through AC. Previous requesters may have made buying commitments before the T-shirt was produced. The terms of these commitments can be fulfilled when the T-shirt is made.

The supplier may also supply a more detailed description of the T-shirt, such as a picture of the T-shirt. This additional description is then seen by prospective buyers. It is a kind of supply stat.

Whether a supplier also provides a description of her actual product or not, the reality of endless answers remains. It does not matter if we are thinking of physical or information products. A question can have infinite possible answers. Thus the techniques of Book II are as applicable to physical products as they are to answers.

And so, AC provides a novel system not only for organizing the getting of answers, but for the getting of physical products.

Book II

Enabling the System to Accommodate Natural Language

Background of Book II

Book II presents methods for enabling AC to handle natural language questions and answers. Some explanation is in order though about how this book was written.

CIP 2 addressed the issue of natural language and introduced a method for using linked questions to overcome problems with accommodating natural language. The new matter in CIP 3 expanded on the relationship between questions and answers in AC, as well as describing other subjects. CIP 3 included the new matter in CIP 2 as Book II.

In this application, CIP 4, Book II is repeated and added to. Except for some name changes, the material in chapters 20 and 21 is a repeat of material in CIP 2.

CIP 3 (basically chapters 3–8 of Book I) discussed the nature of questions and answers more than CIP 2 did. Therefore, some of the discussion of CIP 3 overlaps the discussion in CIP 2, and parts of Book II seem to repeat parts of Book I. But the parts in Book II were written first. If this were simply a paper of explanation, the repetitive parts would be deleted. But because it is a patent application, there are legal reasons, having to do with priority, for not changing what was written in previous applications. (Some parts of CIP 2 are put in the appendix for the sake of avoiding legal problems with a modified specification.)

CIP 2 disclosed the method of using semantic links between questions in order to solve problems with accommodating natural language. In CIP 4, this application, chapter 22, which is mostly new, elaborates on the semantic linking of questions. Chapter 23 describes various kinds of links between questions. Some of chapter 23 is repeated from CIP 2, where important semantic links were disclosed. And some of the chapter is new, where new links are described.

The rest of the chapters in Book II are mainly made up of new matter. And, as in Book I, several of the chapters are not yet written.

The new discussion does not nullify the old, but simply adds to it and, it is hoped, elucidates certain issues. For example, the term the "same answer" is discussed in more detail. There have also been some superficial changes in names. For example, Requestor and Supplier have been changed to Rex and Sue.

TABLE of CONTENTS for BOOK II

Background of Book II
Chapter 20 Problems of Natural Language
Chapter 21 A Solution to the Endless Answers Problem
Chapter 22 Linking Questions Semantically
Chapter 23 Kinds of Semantic Links Between Questions
Chapter 24 Semantic Links Between Actual Answers
Chapter 25 Combining Demand Information
Chapter 26 Follow Questions, Situation Stations and Elaboration Lists
Chapter 27 Multi-lingual Q-nets Chapter 20

Problems of Natural Language

Introduction

The foundation task of AC, the one that the other key tasks are based on, is to count the number of people who want a given answer. The system must get a reasonably accurate count of how many people seek the same answer because it is from this number the system estimates of the future sales and POE of the answer.

For the system described in CIP 1 to get a good count, people must usually agree on the meanings of the questions that they enter into the system, and so, the meanings need to be highly constrained. For example, the question, Billy Budd?, theoretically could correspond to an infinite number of different answers. In a given AC, the meaning would ideally be constrained to a single one, say, a phone number, a movie, a book, and so on. Otherwise, the system could not count how many people wanted the answer for there would be no single answer.

Besides reasons of tallying demand, highly constrained meanings are used, as in most data-bases, so that people can find answers. Constrained meanings for queries are necessary because computers cannot understand natural language. For instance, when a person asks the Library of Congress computer about books that Herman Melville has written, the user must enter, Browse Melville, Herman. The user cannot enter, Hey, what books did Herman Melville write? In the case of AC, where users not only enter questions but also enter the corresponding answers, it is especially important that users agree on what valid answers are, that is, agree on the interpretation of the questions. Therefore, with the system of CIP 1, a system designer or operator would strive to set rules that strictly limit how users interpret the questions entered into the system. No set of rules can succeed perfectly if the questions and answers deal with the real world, but the goal is to reduce ambiguity as much as possible.

You Can Do A Lot

As the success of computer data-bases attests, you can do a lot with constrained queries, even if the queries are just names. Names can naturally correspond to information such as phone numbers, addresses and prices and so this type of information is readily collected in an AC. And since names can correspond to most anything, AC can readily collect more than short pieces of information. In fact, the original name of AC was the MOAE, a strange acronym standing for the Mother Of All Encyclopedias. This name came from the fact that AC lends itself to creating a gigantic encyclopedia with entries corresponding to subject names. The names could be about any subject people care to know about, from the acoustic properties of jello to the role of jello in the last Presidential election.

A given MOAE would still need special rules for defining a satisfactory answer though. These rules could allow a lot of flexibility. One such rule could be that an answer that is outputted and credited with royalties is an answer that is voted best by users. In this case, the system would include rules whereby certain users would vote for the best answer to a question, or the best answer under a certain number of words. Rules like this would allow a variety of possible answers to be entered into the system, and yet the answers that could be outputted at any one time would still be very limited.

The Goal of Processing Natural Language Questions

The scope of AC would be greatly broadened if people could ask it unconstrained, ambiguous, natural language questions, as if they were talking to a person or the computer on the Starship Enterprise. It would be nice to be able to ask AC a question like, Hey, what books did Herman Melville write?, and get the answer one was looking for. But natural language poses problems for AC because when a user enters a natural language question it is not clear what answer the user is looking for. And if it is not clear what answer is wanted then AC cannot estimate a value for the answer.

Why is the answer not clear though? And can we enable the system to handle natural language questions and answers? Let us, for a moment, discuss natural language, by which we mean words and sentences people communicate with.

Natural Language

Words and sentences are things we use to refer to other things. As a synonym for "refer to" we also say that words and sentences "mean," "describe," "represent," "denote," "correspond to," "match," and "signify" things. These terms seem simple enough but, of course, we do not actually understand how this correspondence process works; we just realize that words and sentences in our brains somehow do correspond to things outside our brains and to ideas that may be only in our brains.

One fact we know about the process is that a word or sentence can refer to many things, even an infinite number of things. Take the word "drive". What does it refer to? That depends on the situation. And since the number of possible situations is infinite, the word "drive" can potentially refer to innumerable things. It depends on what situation a person has in mind. Therefore, to determine the meaning of a what is said, one usually needs a great deal of context or a lengthy description of a situation. Even then the meaning is still personal and variable in the sense that it depends on a how a person views the situation.

Agreement Necessary

To communicate successfully with words and sentences, we must agree with each other about what those words and sentences refer to, a fact that is especially obvious to anyone who has listened to a foreign language. So, while words and sentences can potentially refer to infinite things, in practice they usually refer to a certain set of things that we generally agree on. Such a set itself may be infinite but it does not contain all things. So in fact, the meanings of words and sentences are very constrained compared to all the possible meanings they could have. And this fact makes communication with words and sentences possible.

Still words and sentences can refer to enough things that an agreement process is necessary. While this agreement process is not well understood either, we do know that an essential part of it is the process of clarifying what is said.

To Humans, What Is a Question?

Now when someone asks us a question that needs clarifying, what is it that we are trying to clarify? Well, we are trying to clarify what information the person is seeking. But what then is a question that it "asks" for information?

That is a mystery will not be cleared up here. All we can say is that a question describes an answer, describes what information a person is looking for. The description does not tell all about an answer but tells enough so we know what answers can fit the description. Thus we can think of a question as a label on a black box and think of the corresponding answer as an item hidden in the box.

The problem with natural language labels is that an infinity of things could be in the box. So there is no such thing really as the answer to a natural language question. A multitude of answers can fit the description of a question-label and can be considered an answer. That does not mean all answers can fit the description, just that there is an infinity that can.

Ambiguity, a Problem for AC

All this poses a problem for the system of CIP 1 because, as mentioned, the key functions of AC depend on an agreed on, unambiguous correspondence between questions and answers. For the system to work best, a question should have a single answer. The system presumes that the same question strings (in the sense of a string of symbols that is) correspond to the same answers because to a machine the same question means the same question string. The system, being a machine, recognizes strings, not the meanings of the strings to humans.

To humans, the same string can refer to different answers. For example, say three people enter the following string into AC:

What is the definition of "drive"?

Now we know this string can refer to innumerable definitions, just three being:

To push or urge forward.

In baseball, to propel (the ball) swiftly, as by a hard or direct stroke.

A road prepared for driving, esp. for leisure driving, as in a park.

Should AC register that there are three requests for the answer corresponding to this question? Not necessarily. Rex's may want three different answers and only one request should be registered for each. But how is the system to recognize that? How is the system to recognize which answers Rex's want? How is the system to know if the desired answers are in the system? And how even would a human know which answer to supply?

The problem seems daunting when one realizes that even seemingly specific questions like, How far is it to Chicago from Washington D.C.?, are actually quite vague. How far in miles? In inches? In the time it takes to get from Chicago to Washington by foot, by car, by plane, by transporter beam? From what point in Washington to what point in Chicago? By what measurement method? According to whom? In what year? In what season? At what time of day? On a map or in reality? And so on.

Flexibility, Another Problem

Now let us consider another problem that comes about because of the ambiguity of natural language and also because of what is often called the flexibility of natural language. By flexibility we mean that we can easily say the same thing in many, even infinite ways. For humans, different words and sentences can refer to the same thing. Thus people can enter different question strings into AC and have the same answer in mind. That's a problem for AC because the machine cannot recognize the same question in the human sense. To humans the string is not the point, the point is the answer being sought. To humans the same question means that the same answer is being sought. The machine cannot recognize the answer being sought though. To repeat, it recognizes strings, not their human meanings.

Let's say that our three people have read the same passage in a book and all three want to know the meaning of "drive" in this passage. In this case they are looking for the same answer. But in this imaginary case let us assume that they enter:

What is the definition of "drive"?

What does "drive" mean?

How do you define "drive"?

How then is the system to recognize three requests for that answer rather than one request for three different answers?

This problem also seems daunting because of the infinite possible ways to ask the same question, in the sense that the same answer is being sought. Continuing from a previous example, a person in Washington D.C. might want to know how many miles it is to Chicago and ask, How many miles is it to Chicago? or What's the distance to Chicago? or How far is it to Chicago? or Where is Chicago from here? and so on.

So not only can a question be a sign for a multitude of different answers but a single answer can be labeled by a multitude of signs.

Two Problems of Natural Language Restated

Let's recall the foundation task of the system: to count how many people seek the same answer. If the system is to process natural language questions, we see at least two obstacles to accomplishing this task:

1. For any question string, there are potentially infinite answers.

We might also call this the endless answers problem.

2. For any answer, there are potentially infinite questions strings.

We might also call this the matching up questions problem.

What Follows

In the following sections we will describe solutions to these problems. First we will point out how well known best match algorithms can provide an initial solution to the matching up questions problem. Then we will focus on solving the endless answers problem. Some of the solutions we describe can also be used to solve the matching up questions problem in a new way.

To AC, What Is a Question? A Bazaar Analogy Is Given

Before plunging into these solutions, let us paint a picture, by way of analogy, of what a question is in AC. The picture will not be of just a question string but of all the information that is stored along with the string, and further, of what users can do when they have arrived at this question-record, which we will usually refer to just as a question. The analogy will not introduce any new ideas but give a more visual way of looking at questions within the system. This picture should help us keep track of the new things we will be adding to questions in later sections. In this analogy the data-base is a bazaar where answers are bought and sold.

It is said that the bazaar began long ago with a single peddler, a man named Borges they say, though no one is sure. Some come to the bazaar seeking answers and are called buyers. Others come bearing answers and are called producers. Though the bazaar was once crowded with people hawking their wares at stands and stalls, time has passed since the beginning and, though no one knows exactly when, robots took over. The robots care nothing for answers, only for running the bazaar. Why they do this is unknown.

People are the only ones who supply answers for they are the only ones who can venture out of the bazaar into the real world. There is an exception. Certain kinds of answers are made by combining and manipulating answers already in the bazaar. Robots can and do produce these answers using the materials humans supply.

People being people, disputes arise. But the robots care nothing for the disputes of humans and so the bazaar has human judges. These are wandering philosophers who spend most of their time in thought. Anyone can ask the robots to fetch one to mediate a dispute. Legend has it that the philosophers have more to do with the operation of the bazaar than meets the eye.

In the old days, a buyer who could not find an answer would build a small stand and post a handwritten sign offering a reward to anyone who would supply the answer. Others who wanted the same answer could find that stand and write an offer of additional money. Eventually, someone might supply the answer to the stand and then that person or his agent would stay there, selling the answer.

In this age, whenever a buyer asks for a new answer, states a new question that is, the robots of the bazaar construct a stand for that question and place it in its own location in the bazaar. In this age, a stand is a machine. It is an electronic sign with information about an answer, a vending machine that may sell an answer and, a polling station that collects information about buyer interest in the answer.

A question is a sign that stands twenty feet tall describing a product. (In the bazaar the products are answers but one can think of a product as anything, a pair of pants, a map, a movie, anything.) The sign is also a meeting spot where people go to find out about the product. And so the sign may also tell whether the product is in stock, what the price is, what the reward may be for supplying the product. This information may change and can be revealed at different times, depending on the type of product it is.

A question is also a vending machine that can dispense the product and collect money. In order for the product to be there, it must be brought by a producer, who then gets a part of the sales. With some questions, a buyer can agree to pay for the product by pressing a button on the machine. With other questions, just the arrival of the buyer means that he buyer agrees to pay for the product if it is there. With still others, the buyer must make an offer and the machine can decide whether or not to accept it. Sometimes a buyer can see the price of the answer in advance, other times not. The machine automatically identifies the buyer and charges him by debiting his account at the bazaar's bank. Money is electronic now, though some speak of the time when people carried gold and defended themselves with long knives.

A question also is a polling station. Each buyer's offer is recorded along with the time of the offer, whether a buyer has made an offer before and, whether a buyer has actually bought. From this data, the machine projects the sales of the product and displays the projection. Many scoff at this predicting, some call it fortunetelling, and it is true that many predictions have failed.

Because it is an automated, multi-purpose sign, a question is sometimes called a signomat. Other times it is just called a sign.

No one knows where signomats are located relative to each other. The bazaar is now a vast place and no one has surveyed it. Some say it is infinite. Other say it cannot be. In the old days, people traveled for days to come to the bazaar and had to travel by foot to find answers. Now the bazaar sends vehicles, called hypercabs, to anyone interested in buying or providing answers. The cabs have meters that keep track of all the moves that buyers and producers make. The cabs take riders to any signomat desired. All a rider has to do is state a question and the cab will take him, at terrific speed, to the signomat that displays that question. The cabs are so well made that no one yet has complained of the driving.

20.1 Initial Solution to the Problem of Matching Up Questions

As mentioned, the matching up questions problem is that people can enter different question strings but mean the same thing. (While the discussion below applies to both Rex's and Sue's, the term Rex will signify both types of users because it is simpler just to talk about Rex and because it is Rex's we are more concerned with.)

The goal then is for the system to match up strings that are different but, from each Rex's point of view, correspond to the same answer. Another important goal is to match up different questions where Rex's want "basically" the same answer. We will not define this concept here but just point out that rather than an identical answer, an answer that is close enough may do.

An obvious solution is to use best match algorithms, many of which are well known in the art. After Rex enters a question, the best match algorithm would find the question already stored in the system that best matches the question entered. The system may enable users to enter multiple phrasings of a question, all of which can be used to arrive at a "best" match. (Of course, there may be multiple "best" matches.) AC would then show the best match(es) and ask Rex to confirm whether any match was satisfactory. If no match was satisfactory, Rex could rephrase the original question or stop.

Assuming that the best match is satisfactory and taking the previous example of three people asking for the definition of the word "drive," let us imagine that already in AC is the question string:

What does the word "drive" mean?

Now say that the following three questions are entered by different Rex's:

What is the definition of "drive"?
What does "drive" mean?
How do you define "drive?"

In each case, we imagine that the system finds the best match and it is:

What does the word "drive" mean?

Once Rex has confirmed that the best match is satisfactory, basically three situations can occur with regard to an answer. No answer may exist in the system for the best match question. One answer may exist. Or, multiple answers may exist.

What then does the system do? That depends on the rules of the particular AC. In the following sections we will describe some useful procedures for handling these situations. For now, we say that the best match is above all a way to jump into AC (the data-base) and possibly land at a spot where others have been before. If Rex is satisfied with a drop off point then he can proceed. If not, he can try again.

Though we have spent little space on the best match step, we do not want to shortchange its importance and will discuss it more later. Suffice to say for now that it is an essential starting point for matching up natural language questions because a user seeking an answer usually will rarely enter the exact same question string as other users seeking the "same" answer.

Once Rex has confirmed that a best match question is a satisfactory start, then we come to the endless answers problem.

Chapter 21

A Solution to the Endless Answers Problem

Recap

As mentioned, the endless answers problem is that different Rex's may enter the same question string into AC but have different answers in mind. For example, each Rex entering Where is the ballgame? may be thinking of a different game. Thus, AC needs to have a way for Rex's to distinguish the answers they want even though they enter the same question string initially.

Further, the problem is that different Sue's may want to supply different answers to a question. One may want to supply "Fenway Park," another, "Yankee Stadium," another, "George Mason Field," and so on. Thus, AC needs to have a way for Sue's to give different answers to the same question string.

One Solution

One possibility is to store all the answers together under the same question string so that all the answers are outputted in response to the question. Yet this way is only suitable for special types of questions that require "composite" answers. For example, the answer to, "What companies in the U.S. make steel?" can include partial answers supplied by many users, each contributing the name of a different steelmaker as an answer. These multiple answers can be combined and stored as a list under the single question above.

Generally though, combining different answers leads to problems. First of all, it is usually impractical to output all the different answers users might supply to a question. Further, it is not possible for Rex to indicate which answer he wants. Thus, it is usually impractical to record the demand, and calculate a POE, for each answer individually. Also, if Rex only wants one of the answers, it is usually unreasonable to charge him for multiple answers. And further, it is usually impractical to credit Sue's.

Requirements of a Good Solution

A good solution to the endless answers problem should enable AC to distinguish between answers so that:

1. Rex's can signify which individual answers they want without signifying answers they don't want.
2. Rex's can find the individual answers they want without finding answers they don't want.
3. AC can maintain a distinct demand record for each individual answer.
4. Sue's can enter different answers.
5. Users can be charged for the individual answers they receive and credited for the individual answers they supply.

A Better Solution

In the following sections we will describe an interface and data storage procedure that enables AC to do all of the above, not perfectly, but well enough to serve in a broad range of cases. While this method involves many steps, they all stem from a couple of operations that allow both Rex's and Sue's to rephrase questions in a certain way. The operations are these:

1. Rex who enters a first question can enter a second, more specific question and link it to the first, less specific question.

So if Rex enters a question and receives an answer that he does not want he can enter a more specific question that better describes the answer he wants and he can link that question to his original question.

2. Sue who attempts to supply an answer to a first question can enter a more specific question and link it to the first, less specific question. And Sue can then enter an answer to the more specific question.

So, in a sense, an answer to a question can be a more specific question together with an answer to that more specific question. That way, when Rex enters a question, what can pop up is a more specific question, and possibly, its answer. We say possibly because AC initially might only reveal multiple more specific questions, allowing Rex to pick one that has the answer he wants.

These two operations give Rex's and Sue's the critical ability to rephrase a question so as to give a more specific description of the answer they want or of the answer they have supplied. The linking step is also critical because it allows users to "travel" from a question to a linked more specific question.

Before explaining how the rephrasing rules can be implemented, here are examples that illustrate more specific questions and show the generality of the approach.

Illustrations

What's IBM's phone number?
   What's IBM's phone number in Armonk?
   What's IBM's phone number for toll-free support?
What is 2+3?
   What is 2+3 in Roman numerals?
   What is 2+3 in the philosophy of Frege?
What is the square root of 2?
   What is the square root of 2 to five decimal places?
What is the definition of entropy?
   In 50 words, what is the definition of entropy?
   In 5000 words by Fermi, what is the definition of entropy?
A-4 paper?
   A-4 paper sellers?
      A-4 paper sellers in Washington D.C.?
Was Casablanca a good movie?
   Was Casablanca a good movie according to Siskel and Ebert?
      Was Casablanca a good movie according to Siskel and Ebert; what is the full text of what they said?
         Was Casablanca a good movie according to Siskel and Ebert and what is the full text of what they said on their show?
         Was Casablanca a good movie according to Siskel and Ebert and what is the full text of what they said in their columns?
How do you get a passport?
   How do you get a passport as fast as possible?
      How do you get a passport as fast as possible in Norway?
How do you make a chocolate chip cookie?
   How do you make a chocolate chip cookie on an open fire?
   How do you make a chocolate chip cookie that is toll house?
Blurgil smookle?
   Blurgil smookle means what in the code of masterspy "L"?
What is the text of the decision in the Merrill Lynch CMA patent case?
   What is the decision in the Merrill Lynch CMA patent case, in abstract form?
   What is the decision in the Merrill Lynch CMA patent case, full text that is?
      What is the decision in the Merrill Lynch CMA patent case, full text that is plus commentaries?

Specific Enough

By entering a more specific question can Rex describe exactly the answer he wants and can Sue describe exactly the answer she has provided? That depends on whether you believe that a natural language question can ever be perfectly exact. Usually, if not always, a more specific question will still have infinite possible answers. But by describing more Rex has a better chance of receiving an answer that will satisfy him. And by describing more Sue has a better chance of indicating what information an answer contains. However, describing too much can be inefficient. Thus AC allows Rex's and Sue's to use their common sense when asking for and supplying answers.

The operations above enable users to act somewhat like they would act in a natural conversation. For example, say you ask a friend the following question,
   Is there a restaurant around here where I can get some dinner?
And say the friend supplies the following answer,
   McDonald's is around the corner.
But you dislike McDonald's so you rephrase the question by adding information,
   I mean a good restaurant?
This rephrasing is, of course, analogous in AC to when Rex sees an answer he doesn't like and rephrases his original question. Another possibility is that your friend supplies more information to your question, for example, she supplies a more specific question and an answer, such as:
   You want Southern food? There's a place at the Foundry Building.
This rephrasing is analogous in AC to when Sue enters a more specific question and an answer to that question.

Most conversations reveal that it is somewhat of a myth that people understand natural language. Of course people do, but often not at first. People usually arrive at an understanding by a certain kind of back and forth questioning and answering. When the meaning of a question is ambiguous, they know to ask for more information (they ask for a more specific question).

The operations above allows both Rex's and Sue's to enter more specific questions. And the link created between two questions allows users to find a more specific question even though they have initially entered one that is less specific.

We should keep in mind that while users do ask AC questions, they are really addressing other users. AC is a communication system. So while the system cannot understand natural language, it can enable people to better communicate their intentions. As with natural conversation, the questions in AC can get more and more specific so an original question can have a more specific question linked to it and then that question can have a more specific question linked to it, and so on, and so forth. The reason all this works is that eventually, through asking more specific questions, we can describe the answer we want so that our fellow human beings understand, usually, what it is we want.

Advantages of the Approach

Enabling both Rex and Sue to link more specific questions to a given first question has many advantages. Among other things, it:
a. Allows Rex to state a question that better signifies which answer he wants out of endless possible answers.
b. Allows Rex to find a question that better signifies which answer he wants.
c. Allows as many answers to a single question as users want to supply.
d. Allows Sue to label an answer with alternative questions.
e. Allows Rex to see the question-labels and choose the answers he wants given what the labels describe.
f. Allows AC to first output only question-labels before outputting corresponding answers. (This yields at least two advantages. One, time is saved because full answers do not have to be outputted. Two, AC can conceal an answer until Rex agrees to pay for it.)
g. Allows AC to output a single answer to a given first question.
h. Allows Rex to be charged for individual answers and allows Sue to be credited for individual answers.

What Do We Mean By a More Specific Question?

Now that we have decided to use more specific questions, we should define them. However, we cannot give a precise definition. Only in rare cases is more specific well defined. These cases occur when we have a finite set of possible answers, say phone numbers. We can say that we are being more specific when we narrow down the list of numbers (answers) by providing more information. For example, take the question, What is the phone number of John Smith?. Assuming we are dealing with the real world, at some instant in time, and assuming that all John Smith's do not live at the same address, and assuming no other shenanigans, a more specific question is, What is the phone number of John Smith at 14 Cherry Lane?.

But since natural language questions have infinite possible answers we cannot define a more specific question as one that narrows down a list of answers. We can say that it narrows down a list in a data-base but, we cannot say it narrows down all the possible answers.

Perhaps the term more specific is not a good one. People use the term to describe a variety of situations that are not the same. The truth is, we do not understand specificity well, just as we do not understand ideas well. Still we are going to stick with the term more specific here because it is as good as any other in getting the point across. We will try to give a certain interpretation to it though.

In AC, the key to a more specific question is the purpose it serves. The purpose is to better describe an answer relative to the description in another question. We say that a question, Qn, is more specific than another question, Q when Qn:

1. matches the description of Q and
2. includes different descriptive material.

You can see this definition in operation in the illustrations above. By this definition, a more specific question does not mean that a question has more bits than another or that a question "seems" more specific than another. For example, What is in that goblet? cannot be compared to What is in that swimming pool, by chemical composition, temperature, volume and density? We intuitively feel that the second question is more specific but, by our definition, the two questions are not even compared. A question is more specific than a first question only when it matches the description stated in the first and includes different descriptive material. Another word for matches the description is fit the description. In other words then, the more specific question must itself fit the original, less specific question. Of course, whether or not the Qn "fits" Q is subjective.

One result of this definition is that an answer to the more specific question should always be an answer to the less specific question, for when stating a more specific question, a person is not supposed to be changing what he was originally looking for, he is just supposed to be giving a better description.

Even though we cannot get into a philosophical discussion of how humans match descriptions to other description or to some subject, we can divide more specific questions into two broad types which we will call restricted and unrestricted.

A Restrictive Definition of "More Specific"

We said that Qn must fit the description of Q and include different descriptive material. One way to do this is for Qn to repeat Q and then add information. The illustrations above all fit this definition. Below is another example, this time with four questions, listed from least specific to most:
Q1 What is in the can?
Q2   that has no label on it?
Q3     and that you are holding?
Q4       in your left hand?

Still, the term the "repeat" Q is a little ambiguous for when we add information to Q we can add to the front, to the back, or in between. Or, we can do some combination of all three. For example,
Q: What is the definition of entropy?
  In 5000 words by Fermi, what is the definition of entropy?
  What is the definition of entropy, in 5000 words by Fermi?
  What is the definition, in 5000 words by Fermi, of entropy?

Because it is easier for people to keep track of extra information when it is at the beginning or end of a sentence, we shall ignore the version where a person can insert information in between, though we note that it is often a natural alternative. We will say that a restrictive definition of a more specific question means that a question has the exact same information as a first question plus more information appended at the beginning or end of the first question.

This restrictive definition has advantages because it reduces ambiguity. For example, users can make a "ladder" like the one above that orders questions by their specificity. On the other hand, we lose some of the benefits of natural language.

A Loose Definition of "More Specific"

We would like a more natural definition of more specific. Sorry. Though others may have better ideas, about the best we can do here is the definition above that, to repeat, Qn must fit the description of Q and include different descriptive material. That is a very subjective definition.

To judge whether Qn is more specific than Q, the most important test is to recall the purpose of a more specific question—to better describe an answer relative to the description in another question—and see if Qn fulfills that purpose.

Another test is to see whether a question is more specific than another is to check if an answer to the more specific question will always be an answer to the less specific question. As discussed above,
  an answer to Qn is always an answer to Q but,
  an answer to Q is not necessarily an answer Qn.
For example, the answer to What's IBM's phone number in Armonk? will also answer What's IBM's phone number?. But the answer to What's IBM's phone number? will not necessarily answer What's IBM's phone number in Armonk?. The reason is that the more specific question fits all the conditions of the less specific question but the less specific question does not include all the conditions of the more specific question. Of course, this test is still subjective.

Below are examples of more specific questions posed in an unrestricted manner.
More Illustrations
How can you reach IBM
  What's IBM's phone number?
  What's IBM's Internet address
  Can you reach IBM's manager's by flying a blimp over their headquarters?
Who were the main actors in Casablanca?
  What was the full cast of Casablanca?
What time do the buses to New York leave today?
  When do the afternoon buses to New York leave today?
    When do the buses to New York leave after 3:00 p.m. today?
What is an example of furniture?
  What is an example of Louis XIV style furniture?
  What is an example of a chair?
What is the poverty rate in Washington, DC?
  According to the Brookings Institution, how many people in Washington D.C. are below the poverty line?

What percentage of households in Washingtonian D.C. are on welfare?

What does the census say about the poverty rate in Washington, DC?

"Oma"?

What is the definition of "oma"?

Does "oma" mean some kind of cancer?

What is a hybridoma?

What does an arterial plaque look like?

Arterial plaque in a ten minute video by NIH?

An illustrated guide to arterial plaques?

Artierial plaques according to drawings by Harvey?

Until someone fully understands how ideas work we probably will have no precise definition of more specific. Meanwhile, in a given AC the standards can vary and can be judged by humans. The examples above show there is much room for controversy as to whether a question is more specific than another. Nevertheless, the benefits of using natural language and letting people use their common sense can outweigh the costs in confusion.

Both the restrictive and unrestrictive definitions can be implemented in AC.

Now we describe a method for implementing more specific questions in AC. We discuss how AC enables people to build networks of linked questions, using more specific questions, and how AC enables users to move around in those networks to get and supply answers.

22.1 Building and Moving Around in Question and Answer Nets

In the system described in CIP 1, questions are stored, and answers are stored to correspond directly to those questions. This section, which has four parts, describes how the system stores a new type of question that we have called a More Specific Question (MS-Q) and describes how people use this type of question. In part 1 we again define MS-Q's, this time giving rules about how they are stored in the system. In part 2 we describe new procedures that the system requires for enabling people to use MS-Q's. In part 3 we illustrate key steps of these procedures. And in part 4 we give examples of Rex's and Sue's using MS-Q's.

Part 1: Rules Defining How MS-Q's Are Stored

1. An MS-Q is a question.

This means that an MS-Q is like any other question in that users can enter it, store it, find it, and store an answer to correspond to it.

2. An MS-Q is a question that is stored to correspond directly to another question.

This means that an MS-Q is linked directly to another question, which we will call a Less Specific Question (LS-Q). By "linked directly" we mean that an MS-Q is stored such that when a user enters a linked LS-Q, the MS-Q can be accessed by default or in response to a command. And further, a user can jump from one linked question to another. Rather than say that an MS-Q is a special type of question, we can just as well say that the link created between two questions is special.

3. Any question, including an MS-Q, can have an MS-Q linked to it.

This means that a question can have an MS-Q linked to it and that MS-Q can have an MS-Q linked to it and so on and so on.

4. There is no limit to how many MS-Q's can be linked to a question.

(Of course, a system designer could set a limit.)

5. Users decide whether the link between an MS-Q and an LS-Q is valid and users can nullify an invalid link.

This means that users, not the system, judge whether an MS-Q is really more specific than a question it is linked to (a partial exception, discussed below, is the case of Restricted MS-Q's). Further, the system can enable users to take action to nullify a link they consider invalid.

Restricted MS-Q's

As discussed, MS-Q's can be divided into two types, restricted and unrestricted.

2.1 A Restricted MS-Q includes the exact same information as the LS-Q it is linked to and includes extra information as well.

This means that the system can in certain cases recognize whether a Restricted MS-Q is valid or not because the system can recognize a mismatch between the LS-Q and MS-Q. However, a system can eliminate this possibility by enabling users to create an MS-Q just by entering the information that is to be added to the LS-Q. The system can also enable a user to choose whether the extra information is added to the beginning or end of the LS-Q.

Linking Further Explained

Linking is a familiar term for the process of connecting two records in memory so that they can be accessed from one another. In AC the records we are concerned with are questions, not just the question strings but all the information that is collected to correspond to those strings—the question record of Book I.

When we say a first and second record are linked directly we mean several things:

a. The link is named to describe the semantic relationship between the two question strings. When two question are linked, each question is named relative to the other.

b. While a user is at a first record the system can display at least the question string of the second record. The system may display this second string by default or in response to a command. If by command, the command would correspond to the name of the link, for example, "Get MS-Q's." From the first record, the user may be able to access more, or even all, of the information in the second record, depending on the rules of the particular system.

c. When a user is at a first record, the system can access all information at the second record and can make decisions based on that information. For example, if many MS-Q's are linked to a question, the system could determine which ones to show based on the information held in each.

d. The system enables a user to travel from the first record to the second.

e. The system can register when a user travels from one record to the other. This information can be kept in each record and/or kept in a third record created to store information about movement on the link.

f. From a given record, the system can access an indirectly linked record and can enable users to do so as well.

How Answers Correspond to Questions

The system also requires rules that define how many answers can correspond to a question. There is no hard and fast rule; it is a design decision. For simplicity's sake, we adopt the rule below.

6. Only one answer can correspond directly to a question.

This means that only one answer can correspond to a question that has no linked MS-Q's. If a question has linked MS-Q's these might have their own direct answers. If so, these answers correspond indirectly to the original question, the LS-Q. Hence this rule differentiates between a direct answer and an indirect answer. A question can have one direct and multiple indirect answers. Further, it can have only indirect answers.

(To repeat: this rule is adopted for simplicity in the following discussion. As discussed in Book I, there are many rules that can be used for entering multiple direct answers to a question.)

Finally, we recall a rule from CIP 1.

7. An answer can correspond directly to multiple questions.

The system described in CIP 1 allowed a single answer to answer multiple questions. This rule can be very useful where MS-Q's are concerned.

Part 2. Procedures and Functions for MS-Q's

To implement the rules above the system needs new procedures and functions.

Follow the Signs

Before getting into a lot of details about these procedures, let us get some perspective and see basically what is being added to the system described in CIP 1. Basically, functions are added that enable users to link questions, to identify which of two linked questions is more specific, and to jump from one linked question to another.

These additions mean that a question, while still being a sign that tells about an answer, can also be a sign that tells about other questions. Further, these additions mean that users can find an answer by following the signs. In the system of CIP 1, a person would find an answer by entering the corresponding question. If the result was unsatisfactory, the user would have to enter another question. In the new system, a user can zip from sign to sign. What's more, the user can add new signs and link them to existing ones, letting other users follow his path.

Returning to the bazaar, let's say that the products are not answers but clothes. And let us say that a buyer asks for pants and that a sign exists for pants. This sign might point to other more specific signs about pants, for example, for khakis, jeans, cords, and others. Now let's say a buyer selects the sign for khaki's. He would then zip to this sign where he might find khaki pants but he also might find directions to more specific signs, for example, for pleated khaki's, loose-fit, 100% cotton, pre-washed, and others. Again he might pick one of these and then find directions there to more specific signs such as those describing certain sizes. Eventually he might find a sign that described the pair of pants that he wanted. It probably would not be for the exact pair of pants he wanted, but it could be close enough.

At that point he could request the pants and hope that they were there. (The sign could tell him if they were there and the price as well, and the estimated reward for supplying the pants.) On the other hand he might not find a sign for the pair of pants he wanted, for example no sign might describe his size. And so he could ask for a certain type of pants in his size and the robots of the bazaar would set up a sign for those pants, and could link it to the sign he is at.

Now let's say a producer and wants to supply khaki pants. And say she finds that the sign saying "khaki pants" already has pants in stock, but not the ones she has in mind. The pants there might be khakis with pleats while she might want to supply khakis without pleats. And so she could: 1) have a sign set up saying "khaki pants without pleats," 2) supply the khakis without pleats and, 3) link the new sign to the sign saying "khaki pants."

To illustrate the situation with answers rather than clothes, take the case of someone looking for a recipe for chocolate chip cookies. A sign for such a recipe might direct a person to more specific signs listing toll-house, and a variety of other recipes. A person picking "toll-house" might then find directions to more specific signs such as those for toll-house cookies made with walnuts, or margarine, or turbinado sugar, and so on. Eventually, the person might find the recipe he wanted.

Thus the bazaar is transformed into land of linked signs (or signomats as we also call them). A question gains an extra role, that of an intersection that can have any number of paths leading in and out. The intersection has a signomat in the middle and the signomat now has a large telescreen, like an airport telescreen, telling people the destinations they can zip to. So a person can stop at the intersection and buy something or just get directions to another signomat.

Now back to the procedures that the system includes to make this scheme work.

How the Description Below Adds to the Description of CIP 1

In CIP 1 we described how a user could ask a question in Request Mode and possibly get an answer. Further we showed how the system included functions for registering demand and outputting a POE. We also showed how a user could supply an answer in Supply Mode. And we described various other possible steps and functions such as those for price testing and quality control.

Now we are adding a whole new capability to the system but let us stress that the basic functions remain. The central idea is of a question where demand is collected and where users can get an answer and a POE, and where users can supply an answer as well. The functions for making these things possible, such as the pay-off formula, all remain, though they may be modified. Rather than repeat what has been said about these functions, we will describe mainly the things that are added.

We will combine the old procedures with the new ones and call them both options because they correspond to the options that the new system presents to users. These options can be in menu form. When a user chooses an option, further choices may be possible and can be presented in a sub-menu.

Each option can have many variations. For example, the option of Getting MS-Q's can display MS-Q's by default or in response to a command. This option can also allow MS-Q's to be shown according to certain search parameters. These are just a couple examples. The point is that numerous variations are possible and we only have time to delve into certain ones. We will explain the basic steps.

One thing that is different from CIP 1 is that in describing the options we do not differentiate between Request and Supply modes. That is because the point of the new procedures is to enable users to build networks of questions and answers, and to move around in those networks. Users do these things in both the roles of Rex and Sue, and therefore, Rex's and Sue's usually use these procedures in the same way. Moreover, the system can allow users to switch roles easily. In building the data-base, and moving through it, the main difference between Rex's and Sue's is that the actions of Rex's are registered as demand information while those of Sue's are not. (Of course, Rex's usually do more searching than Sue's and Sue's enter answers.) In the discussions then, we assume a user has declared which role he is in and that he can switch at any time.

(As for Check Mode, we do not go into it but note that a user in this mode would also use the same procedures for moving around the data-base.)

As mentioned previously, two topics have their own sections. These are the topics of the Pay-off Estimate (registering and calculating demand) and of Searching. Both topics involve functions that are part of the main menu options but these functions are put in their own sections for the sake of clarity. The key thing first is to describe how the system allows questions to be linked to each other. Linked questions allow users more choices of answers. It is these choices that can then make registering demand and searching more complex. So we first explain how the choices are created then we describe functions for dealing with those choices.

Being At a Question

With the new system it is natural to think of a user being "at" a question because he can now move from one question to another. Being "at" a question was never brought up in CIP 1 because there was no need; a person who entered a question was then "at" the question. While there, the user could transact business—make an offer, receive an answer, see a pay-off estimate, supply an answer, and so on. In the system of CIP's 2, 3 and 4 the meaning is the same as, except that once at a question a user can do more things. When a user arrives at a question, especially one that is already in the system, a POE might be shown along with a question automatically, even though a user does not request an answer to the question.

(As discussed in Book I, the user can get to a question by entering it, by confirming a best match, or by moving to it from another question. We call the question that the user is at the current question.)

Options

Figure 25:
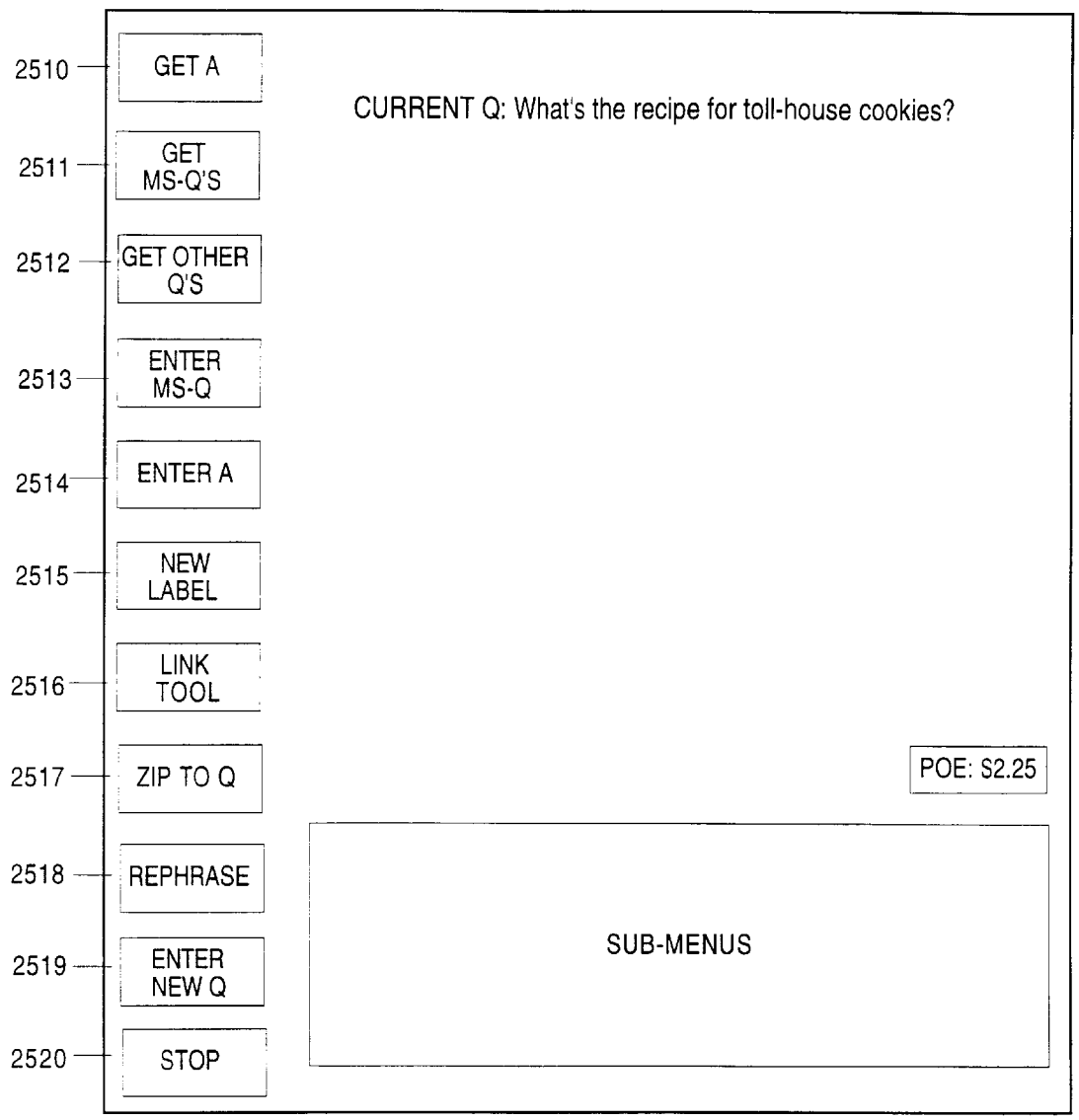
FIG. 25 shows a basic menu for a system that includes More Specific Questions.

As seen in FIG. 25, once a user is at a question, the system presents him with a list of options. The system lets the user:
a. Get an answer 2510,
b. Get MS-Q's 2511,
c. Get other questions 2512,
d. Enter an MS-Q 2513,
e. Enter an answer 2514,
f. Enter a new question-label 2515,
g. Link the current question to an existing question 2516,
h. Zip to another question 2517,
i. Rephrase the last entered question 2518,
j. Enter a new question 2519,
k. Stop 2520.

We now describe these options one at a time but not in the order above.

(Keep in mind that many of these options have been better explained, and have been expanded, in Book I. See preface to Book II as well for why this is so.)

(Note: We below give procedures for entering, finding and zipping to MS-Q's. The same procedures apply to LS-Q's as well, of course, in the sense that a user can enter, find and zip to an LS-Q.)

Entering a Question

Before a user is at any question, he must use the procedure for entering a question. Once he gets to a question he can also use this procedure to get to another question.

When he enters a question the system searches for an exact match. If there is no exact match, the system stores the question and creates a demand record for it. The system then looks for a best match. If there is no best match the system alerts the user that there is no best match. If the user likes, he can rephrase the question. If there is a best match or matches the user can select a match. If he does, the selected question becomes the current question.

The user may be satisfied with a best match candidate, but he may still prefer his original question. Further, he may want to link his original question to the best match question. Thus even though the user chooses a best match, the system stores the original question, and any rephrasings the user enters.

In the bazaar the entering a question procedure is equivalent to telling the cab driver which signomat to go to. If no such signomat is already in the bazaar, the robots of the bazaar construct the one that the rider has described. After taking him to it, the cab takes him to on a tour to see one or more similar sounding signomats. If the rider is satisfied with one of these he can tell the driver to stop. If he is not satisfied, the cab returns him to the new signomat the system has constructed for him.

Rephrase the Question

When a user, especially Rex, enters a new question, he may be starting a new search or he may be rephrasing a previous question. The system may enable the user to distinguish between starting afresh and rephrasing a question. If so, the system includes a command for identifying the next question entered as a rephrasing of the last question entered.

In the bazaar this is analogous to a rider giving the driver slightly different directions, hoping to get to a signomat that already exists in the bazaar.

Zipping to Another Question

When a user is at a question, the system can enable him to move to (zip to) a linked question, or to any other question the system shows on screen or otherwise makes available to him. The system includes a select command so the user can designate which question he wants to move to. The command may consist of clicking on a question that is shown on screen. As is pictured in FIG. 26, to move to a question, a user would click on the zip tool 2621 and then click on a question on screen. The selected question would then become the current question and the information associated with that question would then also appear on screen.

In the bazaar this option is equivalent to a rider telling the driver to go to another signomat that user has seen either at the current signomat or during his trip.

Getting MS-Q's

When a user is at a question, the system enables him to see the directly linked MS-Q's. The system may show these automatically or in response to a command. The system can also display the number of MS-Q's that are directly linked to the current question. Once the system displays the MS-Q's, the user can select any one of them to zip to. The process can be continued in the direction of greater specificity, unless there are no MS-Q's linked to the question that the user is at.

The system can also enable the user to see more than one level of MS-Q's. This type of viewing is especially feasible when the MS-Q's are Restricted MS-Q's. And the system can tell the user the maximum depth and average depth of the MS-Q tree is that the user is on (the actual depth depends on the route a user takes).

Figure 29:
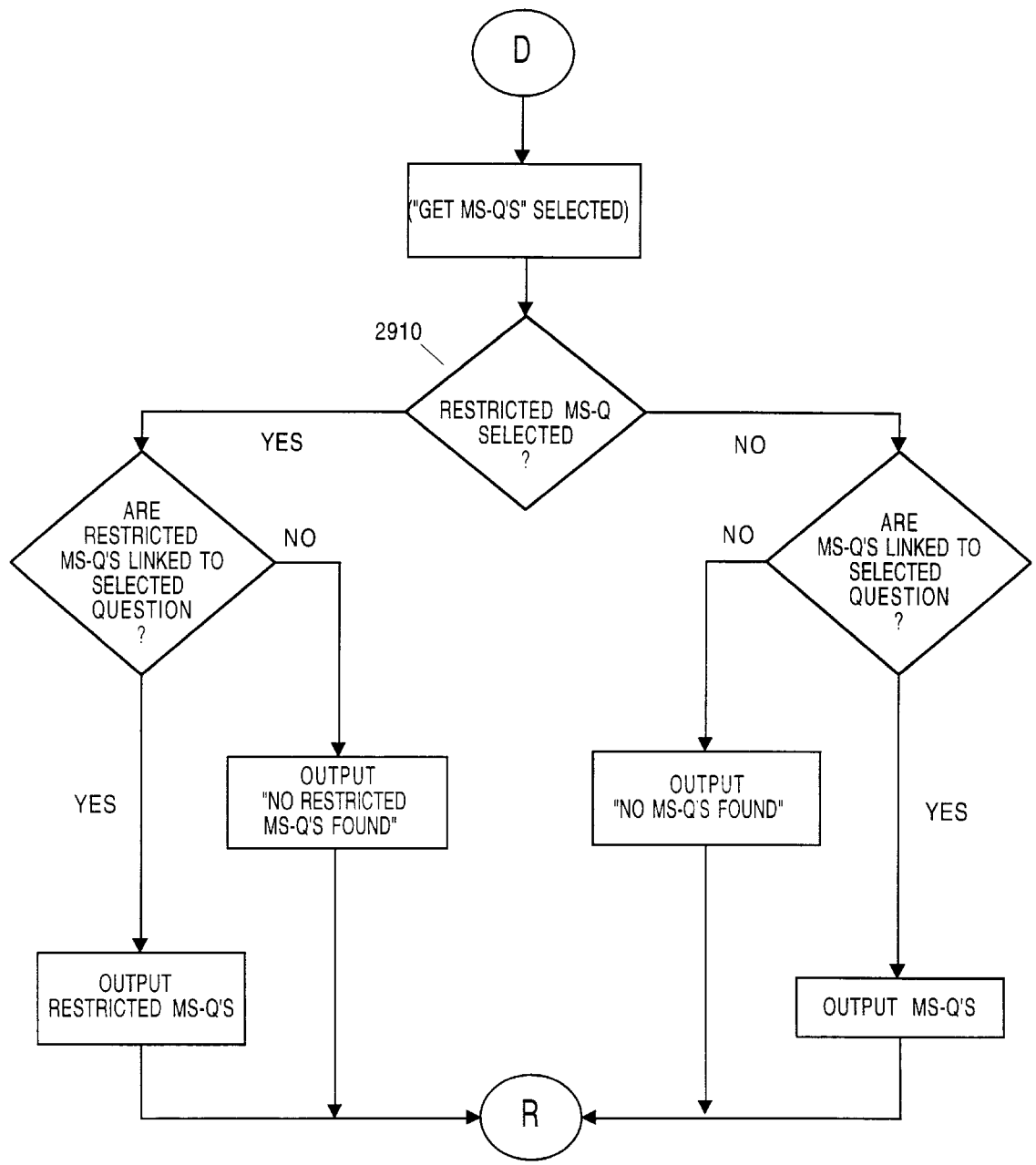
FIGS. 29 and 29*a* show additional steps for getting and entering More Specific Questions.

As shown in FIG. 29, the system can enable the user to select 2910 only the Restricted MS-Q's. When a Restricted MS-Q is shown, the system may output only the extra information the MS-Q contains over the current question.

The system must include defaults to determine the order in which MS-Q's are shown when there are too many MS-Q's output at once. In this case, the system can enable the user to scroll through the MS-Q's. Also, the system can enable the user to determine which MS-Q's to see according to various criteria.

In the bazaar, Getting MS-Q's is like viewing the telescreen that shows signomats that are linked to the signomat the rider is at. The telescreen may show these automatically or the rider may have to press a button to see them.

Getting Other Questions

When a user is at a question the system can enable him to see and move to more than just the directly linked MS-Q's. For example, the system can also show linked LS-Q's. This feature is important for it allows the user to backtrack, instead of just going in the direction of greater specificity.

The system can also enable the user to see any question the user has previously entered or been at. In this case, the system keeps a list of the questions that the user has been at and can enable the user to call up this list and select a question from it. The most important of these is the last question the user was at because returning to this question is often the most natural type of backtracking. The system need not show this previous question but can just include a command for selecting it.

The system may include an option whereby the user may ask to see questions that are good matches for the current question but that are not directly linked to that question. The reason for this feature is to enable the user to see questions in the data-base that may be related to the current question but that have not been linked together. This feature enables a user to zip to and possibly link questions that the user might not otherwise find out about.

In the bazaar, a signomat's telescreen would be able to display the less specific signomats linked to the signomat. A rider could then select one of these to go to. Also, the cab meter could keep a list of all the signomats a rider has gone to in a certain trip and can let the rider pick a signomat on the list to return to.

Entering an MS-Q and Linking It to a Question

Figure 26:
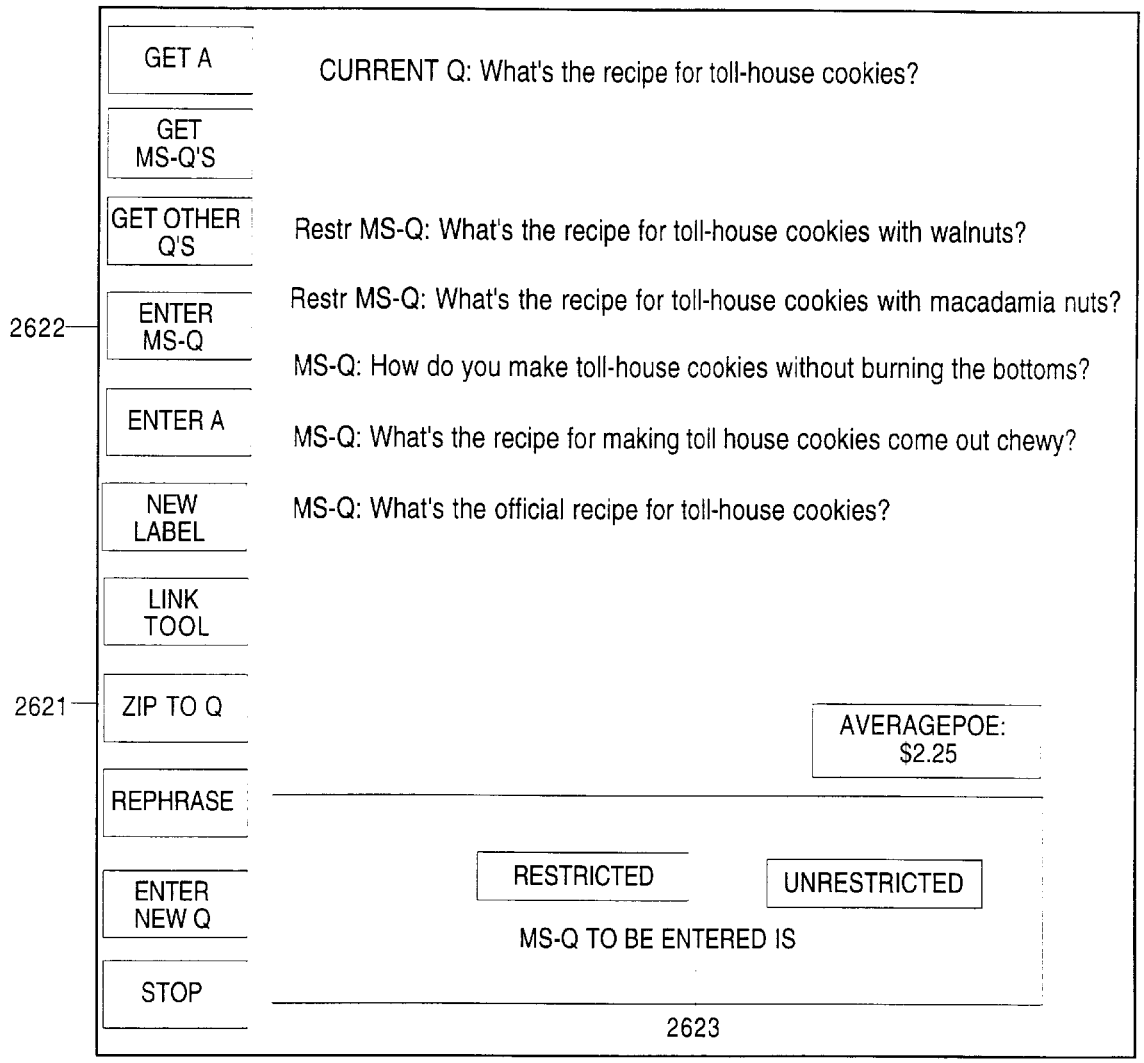
FIG. 26 shows another basic menu for a system that includes More Specific Questions.

When a user is at a question, the system enables him to enter an MS-Q. The system includes a link command (as shown in FIG. 26, "Enter MS-Q" 2622). The user selects the command, which signifies that the current question is to be an LS-Q, relative to a new question to be entered. The user then enters a new question and the system stores it as an MS-Q to correspond directly to the LS-Q. The user can repeat this process, linking multiple MS-Q's to the question he is at.

Figure 29A:
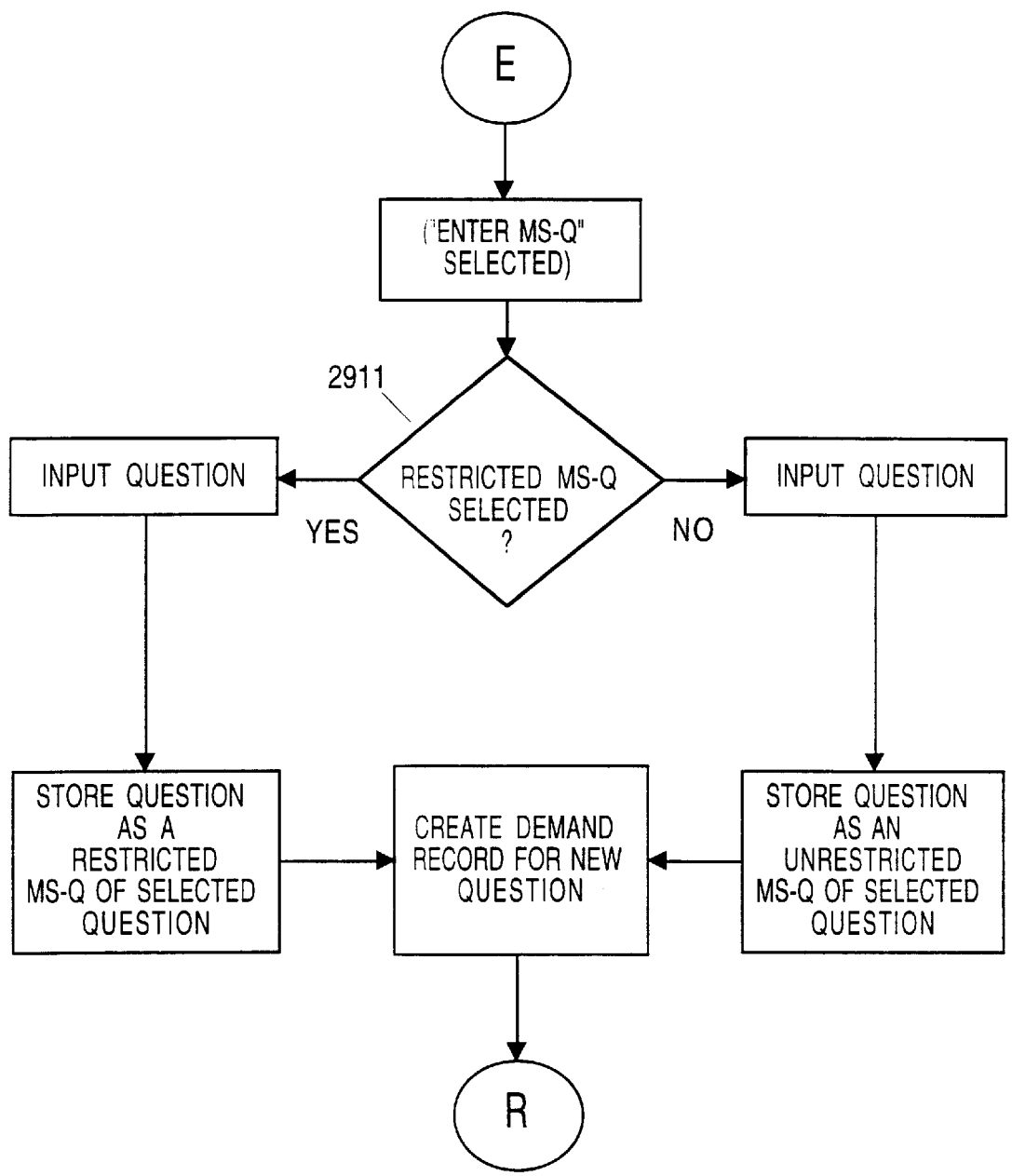

As shown in FIG. 29*a*, if the system offers the option of entering both Restricted and Unrestricted MS-Q's then the system can enable the user to select 2911 which type of MS-Q the user wants to enter. This choice could be presented as part of a sub-menu. As mentioned, with Restricted MS-Q's the system can enable users to enter an MS-Q by only entering information to be added to the LS-Q.

Now it may be that the MS-Q has an exact match in the data-base. Thus when a user enters an MS-Q the system can look for an exact match. If one is found, the system can link it to the current question. The system can also look for a best match for the MS-Q, and output best match candidates. The user might want to link one of these to the current question as well. The search for a match of the MS-Q can enable the user to find and link questions he might not otherwise have seen.

In the bazaar then, a rider can press a button on the signomat that signifies that the next question he enters will be for a more specific signomat and that the new signomat should be linked to the signomat he is at. Then, when the rider asks for a more specific product, the robots of the bazaar construct a signomat for it and paint a magnetic path with arrows pointing from the current signomat to the new one.

Entering an Answer

When a user is at a question, the system enables her to enter an answer. Thus the system includes a command for entering an answer (the system may enable Rex to become Sue just by entering this "Enter Answer" command). After the user enters the command, and if the question has no direct answer, Sue enters the answer and the system stores it as the direct answer.

If the question already has a direct answer, the system tells Sue she can only enter an indirect answer (unless she has is correcting an existing answer) and enables her to do so. Sue can enter an indirect answer by entering an MS-Q and supplying a direct answer to the MS-Q. She can enter as many indirect answers as he likes.

The system can enable the user to designate whether she is entering a direct or indirect answer. She can enter both a direct and indirect answers, if the current question has no direct answer, or she can enter only indirect answers, if she wants.

To make it easier to enter an indirect answer, the system can enable Sue to use a sub-menu procedure when entering an MS-Q and an answer to the MS-Q, rather than making Sue switch to main menu option for entering an MS-Q. So the Entering an Answer procedure can also include steps for entering MS-Q's.

As discussed earlier, a question is a label that identifies what information a corresponding answer will have. It is often helpful to label an answer in multiple ways. Multiple labels can help people find an answer, just as listing a business under different headings in the phone book can help people find the business. The ability to name an answer in various ways is especially important when dealing with natural language requests where people call the same thing by many different names. For Sue's, multiple labels are like having multiple advertisements for a single answer. So the system can enable users to enter multiple MS-Q's for a single answer (and the system can include short cuts so that a user does not have to re-enter the same answer each time he enters a new label for it).

In the bazaar, a rider with a product to supply—call it a recipe—can press a button on the appropriate signomat and the signomat will then store the product to dispense to buyers. But, if a product is already in the signomat, then the producer must have a new signomat constructed. She can link this new machine to the original signomat she wanted to supply the product to. And she can have numerous machines set up with different signs for the same product. And she can have all these machines all linked to the original signomat.

Linking Existing Questions to Each Other

The system can include a linking tool that enables users to link two questions that are already stored in the system. One way for such a tool to work is for a user to select (click on) the tool and then select a question on screen. The system then creates a link between the current question and the selected question such that the selected question is an MS-Q of the current question.

There are many other ways for selecting two questions to be linked and for designating the relationship between the two. In particular, a linking tool can be selected and then two questions on screen can be selected. In this case, the system would create a link between the two questions with the first question selected being the LS-Q and the second the MS-Q (or vice versa).

In the bazaar, the rider may press a linking button on the signomat telescreen and then select a signomat on the telescreen. The selected signomat then becomes linked to the signomat the rider is at.

Entering a New Label for an Answer

Before explaining this procedure, a quick digression is in order to explain the need for the procedure. Let us look at some possibilities where questions, MS-Q's and answers are concerned.

A question can have no answer, in which case there is no problem. A question can have one direct answer and no MS-Q's, in which case there is no problem. A question can have no direct answer and have MS-Q's that have direct answers. Again there is no problem if the MS-Q's just have direct answers.

Figure 27:
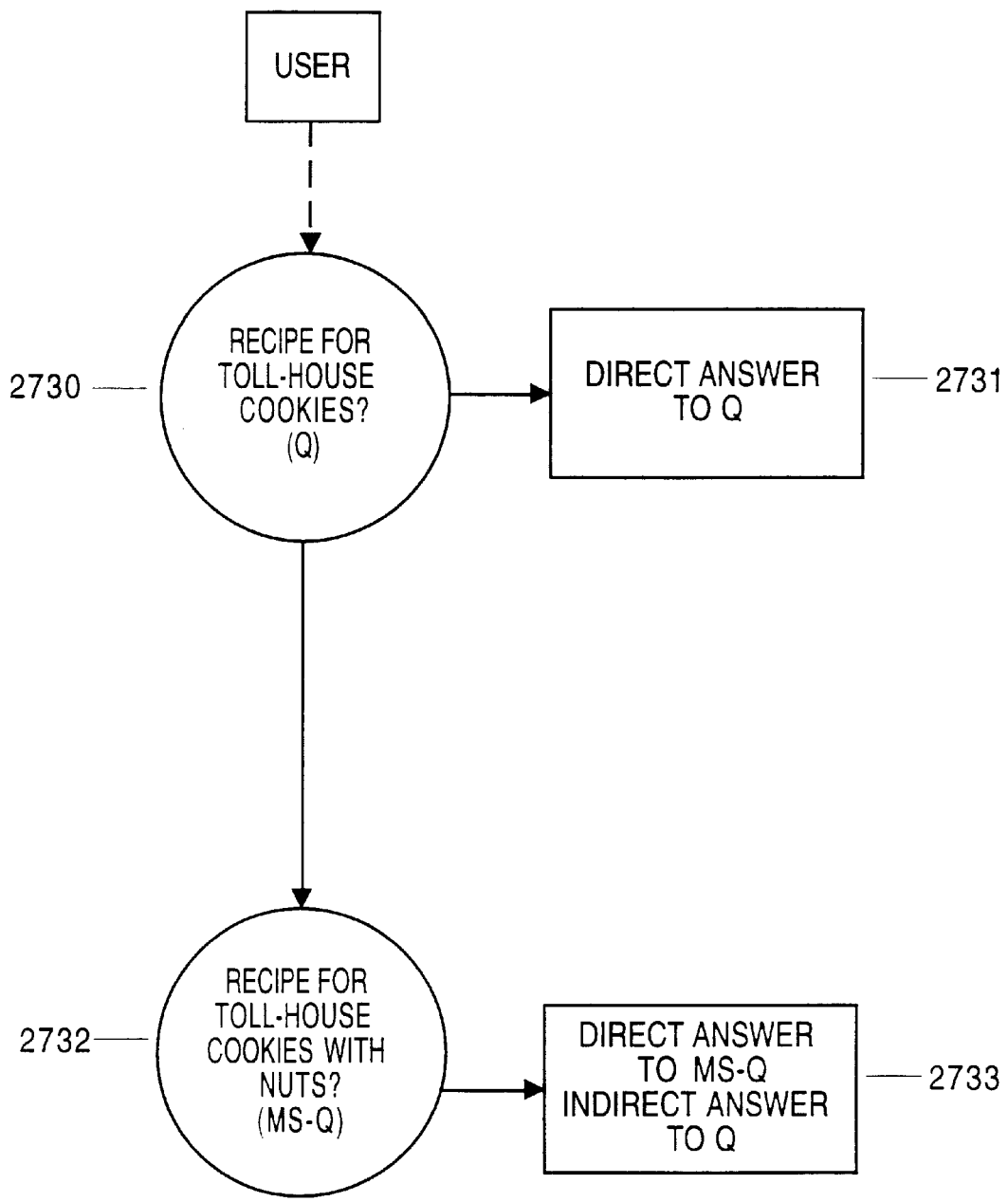
FIGS. 27 and 27*a* show how a direct answer might be relabelled.

A question can have a direct answer and an MS-Q that has a direct answer. Now we may have an problem. Why? Because when a person is at the question and wants an answer, how is he to differentiate between the direct and indirect answer? The question (the LS-Q) describes the direct answer but it also describes the indirect answer. As shown in FIG. 27, let's say the LS-Q 2730 with the direct answer 2731 is:

What is the recipe for Toll-House cookies?

And let's say the MS-Q 2732 with the direct answer 2733 is:

What is the recipe for Toll-House cookies with nuts?

There is no way to differentiate between the LS-Q's direct answer and indirect answer. Both are valid answers to the LS-Q. (The direct answer for both questions may even be the same; it may be the same recipe with two different labels.)

The problem gets worse when many MS-Q's are linked to a question that has a direct answer. Ideally then, the direct answer would be relabelled with an MS-Q so that the answer could be differentiated from the indirect answers.

(It is also possible to do nothing, to allow the direct answer to be described only by the LS-Q even though that question may have many MS-Q's with direct answers. This situation is feasible depending on the rules for outputting answers. These rules, for example, can include extra search parameters so that the direct answer can be differentiated by information other than the question-label.)

If a direct answer is to be relabelled, four people can do the relabelling:

1. The original Sue can do it, but he may not be easy to alert to the need and he may not be interested in doing it.

2. The new Sue who puts an MSQ on the question and thus "crowds out" the direct answer can do it. But this person has a conflict of interest and might not give an accurate label.

3. A system judge can do it, but judges cannot keep up with the need.

4. Rex can do it. He might see a direct answer and feel it needs a more accurate label. This type of labeling can help other Rex's find an answer and it can also be an excellent method of quality control. For example, a question may be, How far is it to Chicago from Washington, D.C.?
and someone may have supplied the following answer,
Less than 1,000,000 miles.
Now Rex receiving this answer might relabel the answer, for example, How far is it to Chicago from Washington, D.C. to within 1,000,000 miles?

Figure 27A:
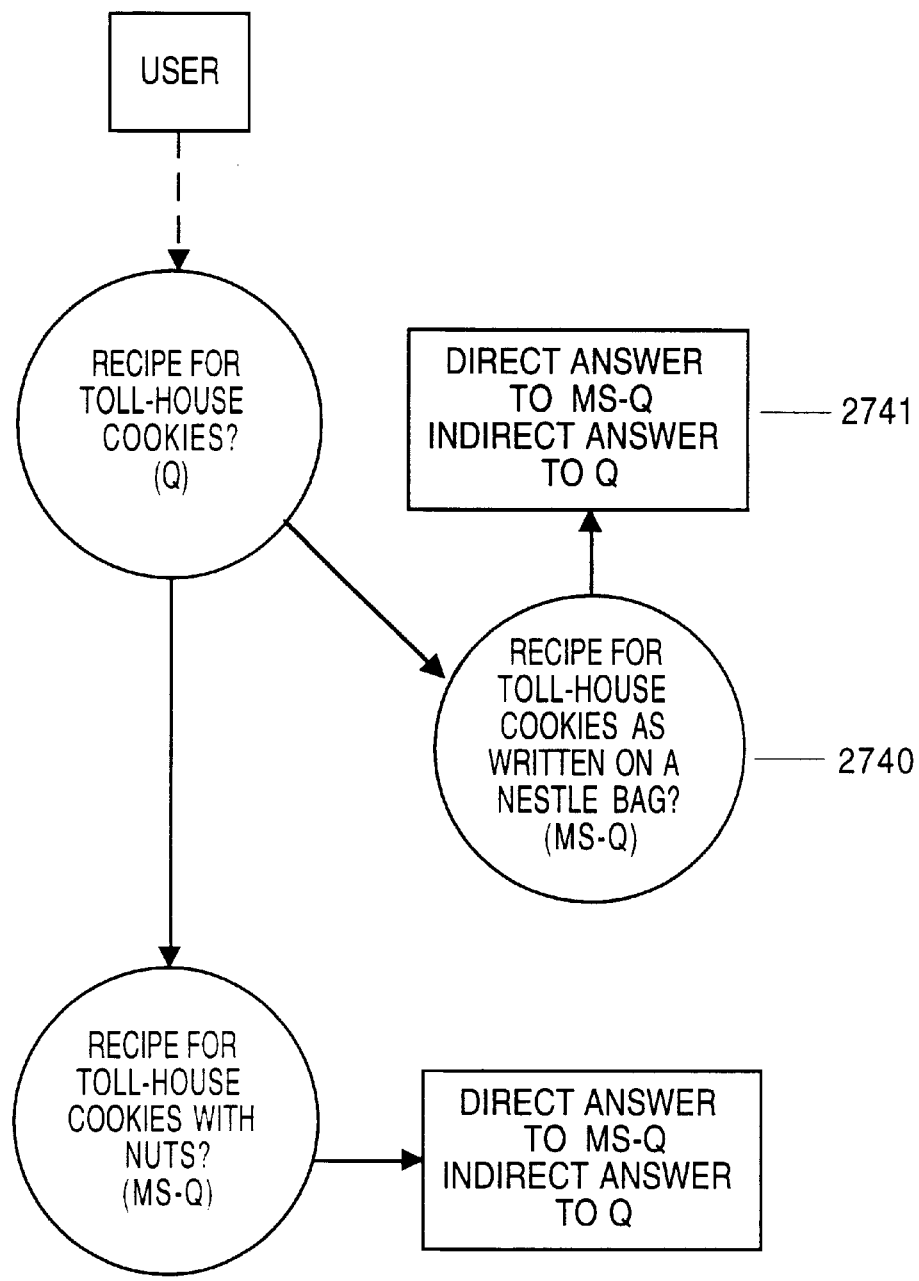

The rules as to who can do the relabelling can be variable depending on the system. In any case, it can be useful for the system to include a procedure for relabelling an answer. Thus the system can include a command for selecting a direct answer, for example by selecting its "direct" question, and then entering an MS-Q to relabel (or add an extra label to) the direct answer. As shown in FIG. 27a, this MS-Q 2740 would be linked to the original question and would correspond to the original question's direct answer 2741.

In the bazaar, this relabelling is like having the system construct a new, more descriptive singomat for a product that is already in a signomat.

Getting an Answer

When a user is at a question, the system can enable him to get an answer, whether direct or indirect, by entering a command. (The system may enable Sue to become Rex just by entering this "Get Answer" command). We should note that in some cases the system may output the answer without a command.

Now, in the system of CIP 1, a person (a Rex that is) who entered a question and was therefore "at" the question was presumed to want the corresponding answer. Price tests could be done there to gather more information about what Rex was willing to pay, and it might turn out that Rex might not get the answer even if it was there. But the point is that it was presumed that Rex wanted the answer and so arriving at a question was registered as demand information.

In the new system, arriving at a question does not necessarily mean that a person wants a corresponding answer, direct or indirect. The person can just be passing through, looking for a good question. So the arrival is not necessarily registered as demand information. Though it depends on the particular system's rules and on the particular answer, a user may have to explicitly express interest in paying for an answer, for instance by entering a Get Answer command, in order for the system to register the demand information, and for the system to output an answer. Of course, price testing could then be done, and other demand information gathered.

Getting an Answer can be the most complicated procedure of the ones we have discussed. That's because the point of implementing MS-Q's is to give users more choices for getting answers. The available answers may be direct and indirect and there may be many available. Or there may be unanswered but linked questions. As mentioned, these expanded choices raise several design issues. For example, when there are multiple possible answers, direct and indirect:

a. which one is the system to output?, b. how is demand to be registered when a user may express interest in more than one answer; what should the POE be based on?, c. what if the user is dissatisfied with an answer because didn't think the question described it well and he wants to look at another answer?

Our solution here is to skip these type issues for now and discuss them in sections 2 and 3. Here we will take the simplest case where the question has a direct answer and no MS-Q's. As in CIP 1, the user then asks for the answer, demand information is registered and a POE is outputted, and if the answer is in, the answer is outputted and Rex is charged and Sue credited. Now, as discussed in CIP 1, there are many ways to accomplish these things. For example, price tests can be done. We will not go over these issues again.

We do note though that in a system using natural language, rules for charging for answers are likely to be different than a system with highly constrained meanings. A person is more likely to be disappointed with an answer that corresponds to a natural language question than with one that corresponds to a highly constrained query. And so a system that handles natural language might have special rules for enabling users to see more than one answer but only pay for one. These rules are highly variable and are feasible in the system of CIP 1 as well. (If the system charges a flat per hour fee for searching the data-base, this issue is not as relevant.)

We also note though that Sue's as well as Rex's can be interested in whether an answer is in the system. Sue might want to know so she can see if a question needs answering or see if someone else has already entered his answer. Two problems arise. One, Sue may be forced to pay to see an answer. Two, Sue might steal an answer and store it under another label (MS-Q). We do not go into these issues here, only note that the system requires rules for dealing with them. These issues are not new from CIP 1 but they become more pronounced where multiple answers to a natural language question are concerned.

Back in the bazaar, the signomat may or may not have the product—again, call it a recipe—that the rider (a buyer) is looking for. If the rider is interested in the recipe, he usually presses a button. If the recipe is there, and if the rider knows the price in advance, the recipe is dispensed. Another possibility is that the signomat posts a price, and the buyer can then choose to buy or not. Or the signomat can post a message saying, "Well, I might have the recipe and I might not, what are you willing to pay for it?," and let the buyer make an offer. If the recipe is there it is dispensed, if the buyer's offer is high enough. In any case, the signomat registers the details of any buyer offer and displays a POE for the recipe.

Quality Control Functions for MS-Q's

The system can include functions for quality control that enable users to nullify links. The system can allow users to take several actions. Two mains ones are:

1. ask the system judge to invalidate a link,
2. post a complaint about a link for other users to see.

So the system can include means for a user to select an MS-Q and post a complaint marker for others to see. Further the system may reward users who properly point out invalid links and may penalize those who create such links.

The system can be self-regulating though without these measures because an invalid link may merely be ignored by users. An ignored link will not benefit its creator, and further, the system may have rules that cause an unused link to vanish.

In the bazaar, this type of quality control is like a rider posting a complaint on the telescreen about a linked signomat and possibly asking a judge to erase the link.

Part 3. Sequence of Operation

Figure 28:
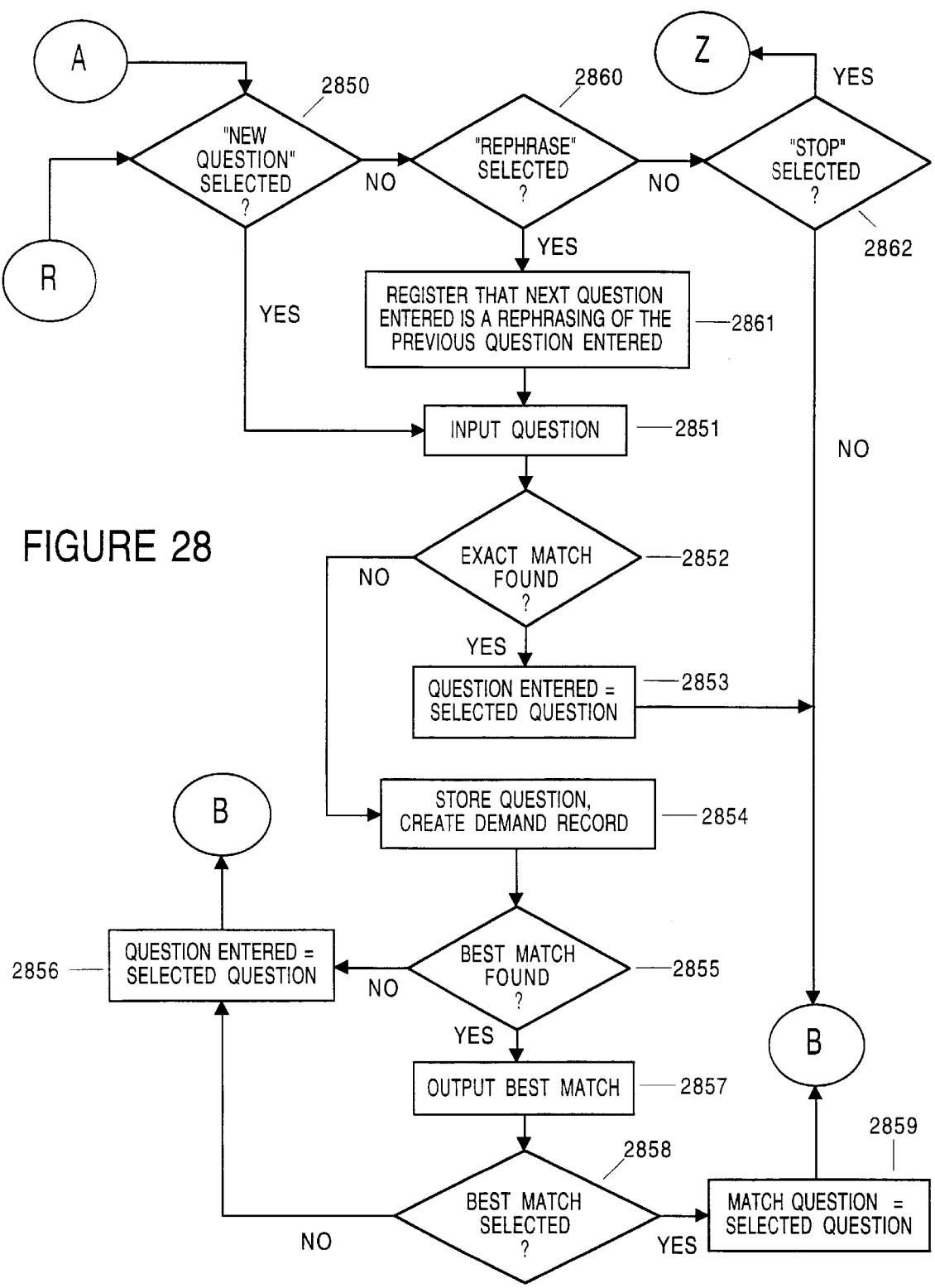
FIGS. 28–28*b* show a flow chart of steps for a system with More Specific Questions.
Figure 28B:
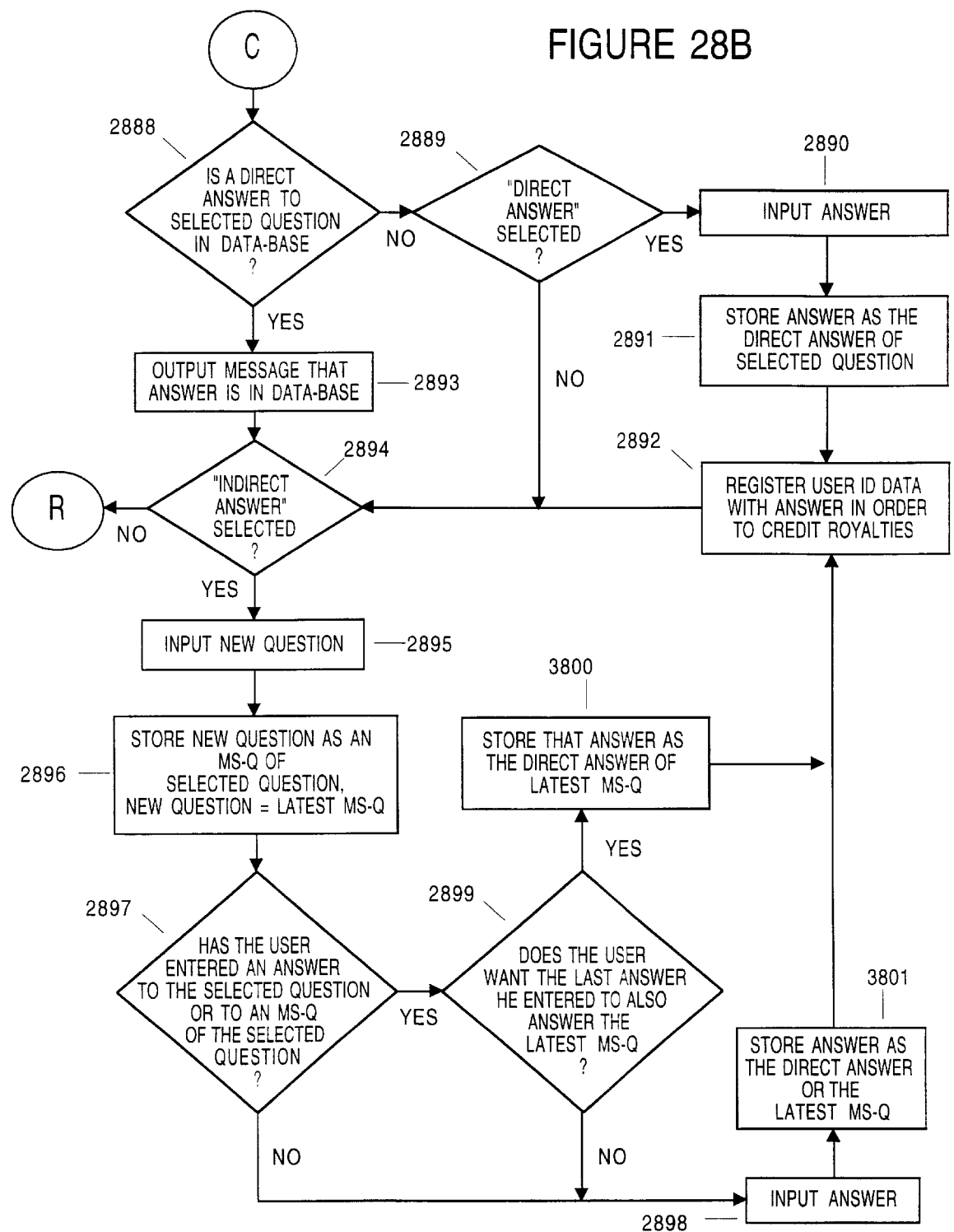

We do not show steps for all the options in Part 2 above, just the key steps for the critical options for creating question and answer nets. We are repeating things that were said in Part 2, but here give flow diagrams. In the sequence below, selected question corresponds to current question in the discussion above. Below we assume a user has already arrived at a question and now selects an option. As shown in FIGS. 28, 28*a* and 28*b:*

New Question

If the user selects "New Question" 2850 he enters a question string and the system:
 a. Inputs 2851 the question,
 b. Checks 2852 for an exact match,
  b1. If an exact match is found, the question is the selected question 2853,
  b2. If no exact match is found, the system stores 2854 the question, creates 2854 a demand record for it, and checks 2855 for a best match,
   b2a. If no best match is found, the question is the selected question 2856,
   b2b. If a best match is found, the system outputs 2857 the match(es) and asks the user to confirm (select one) 2588,
    b2b1. If the user selects a best match question, it is the selected question 2859,
    b2b2. If the user selects none of the matches, the inputted question is the selected question 2856,
 c. Waits for an option to be selected.

Rephrase

If the user selects "Rephrase" 2860 the system registers 2861 that the next question entered is a rephrasing of the previous question entered. When the user enters a question, the system continues with the procedure described just above for New Question.

Stop

If the user selects "Stop" 2862 the system exits.

Get Answer

If the user selects "Get Answer" 2870 the system:
 a. Registers 2871 demand information (the request, the time of the request, the price offered, and other information depending on the particular system),
 b. Checks 2872 if an answer is in the data-base,
  b1. If no, outputs 2873 a POE and the message "answer not found",
  b2. If yes, outputs 2874 the answer, and a POE, and registers 2874 a charge to Rex and a credit to Sue,
 c. Waits for an option to be selected.

Get MS-Q's

If the user selects "Get MSQ's" 275 the system:
 a. Checks 2876 if any MSQ's are directly linked to the selected question,
  a1. If no, outputs 2877 a message that no MS-Q's are found,
  a2. If yes, outputs 2878 the MSQ's,
 b. Waits for an option to be selected.

Zip To

If the user selects "Zip To" 2879 the system:
 a. Checks 2880 if any MS-Q's are currently outputted,
  a1. If no, the system remains at the menu,
  a2. If yes, the user selects one of the MS-Q's that has been outputted and the system inputs 2881 the selection, and makes 2882 the selected MS-Q the selected question,
 b. Waits for an option to be selected.

Enter MS-Q

If the user selects "Enter MS-Q" 2883 the user enters a question and the system:
 a. Inputs 2884 the question,
 b. Stores 2885 the question to correspond directly to the selected question as an MS-Q of the selected question,
 c. Creates 2886 a demand record for the new question,
 d. Waits for an option to be selected.

Enter Answer

If the user selects "Enter Answer" 2887 the system:
 a. Checks 2888 if a direct answer is in the data-base,
  a1. If no, the system asks 2889 the user if he wants to enter a direct answer,
   a2a. If the user selects yes, he enters an answer,
   a2a1. The system inputs 2890 the answer,
   a2a2. Stores 2891 it as the direct answer to the selected question and registers 2892 the user's identification data in order to credit royalties,
  a2. If yes, outputs 2893 a message telling Sue that a direct answer is already in the data-base,
 b. Asks 2894 the user if he wants to enter an indirect answer,
  b1. If the user selects no, the system waits for an option to be selected,
  b2. If the user selects yes, he enters a question,
   b2a. The system inputs 2895 the question,
   b2b. Stores 2896 the new question as an MS-Q of the selected question, and sets 2896 the MS-Q as the Latest MS-Q,
   b2c. Checks 2897 if the user has already entered an answer to the selected question or to an MS-Q of the selected question,
    b2c1. If no, the user enters an answer and the system inputs 2898 it and stores it as the direct answer to the Latest MS-Q,
    b2c2. If yes, the system asks 2899 the user if he wants the last answer he entered to also answer the Latest MS-Q, b2c2a. If the user selects yes, the system stores 3800 that answer as the direct answer of the Latest MS-Q, b2c2b. If the user selects no, he enters an answer and the system inputs 2898 it and stores 3801 it as the direct answer to the Latest MS-Q b2c2c. Registers 2892 the user's identification data in order to credit royalties, and goes to step b.

Part 4. Illustrations: Basic Situations

Now we show some illustrations of how users can build question and answer networks (nets). Having arrived at a question, a user can face three basic situations with regard to direct answers.

1. The question is completely new; and so has no direct answer.
2. The question has been entered before but has no direct answer.
3. The question has a direct answer.

(Note: we do not show the situation where a question has no direct answer but does have an indirect answer. In this case the MS-Q is a question that has a direct answer and so this case does not add much to the discussion.)

What the System Lets Rex's Do

The Question Is Completely New

Figure 30:
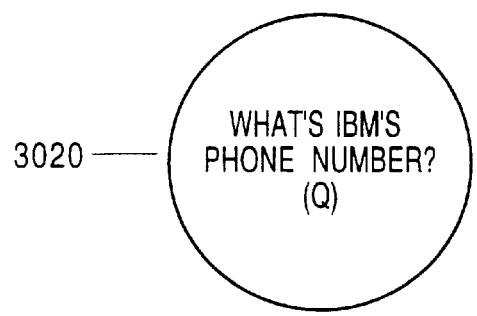
FIGS. 30–30*d* show diagrams of steps for creating question and answer nets using More Specific Questions.

When Rex enters a question that no one has entered before, the system stores it. The question the current question and so Rex can enter an MS-Q. We do not picture the user adding an MSQ, we only picture one new question, in FIG. 30, and imagine that the question is, What's IBM's phone number? 3020.

The Question Has Been Entered Before But Has No Direct Answer

Figure 30A:
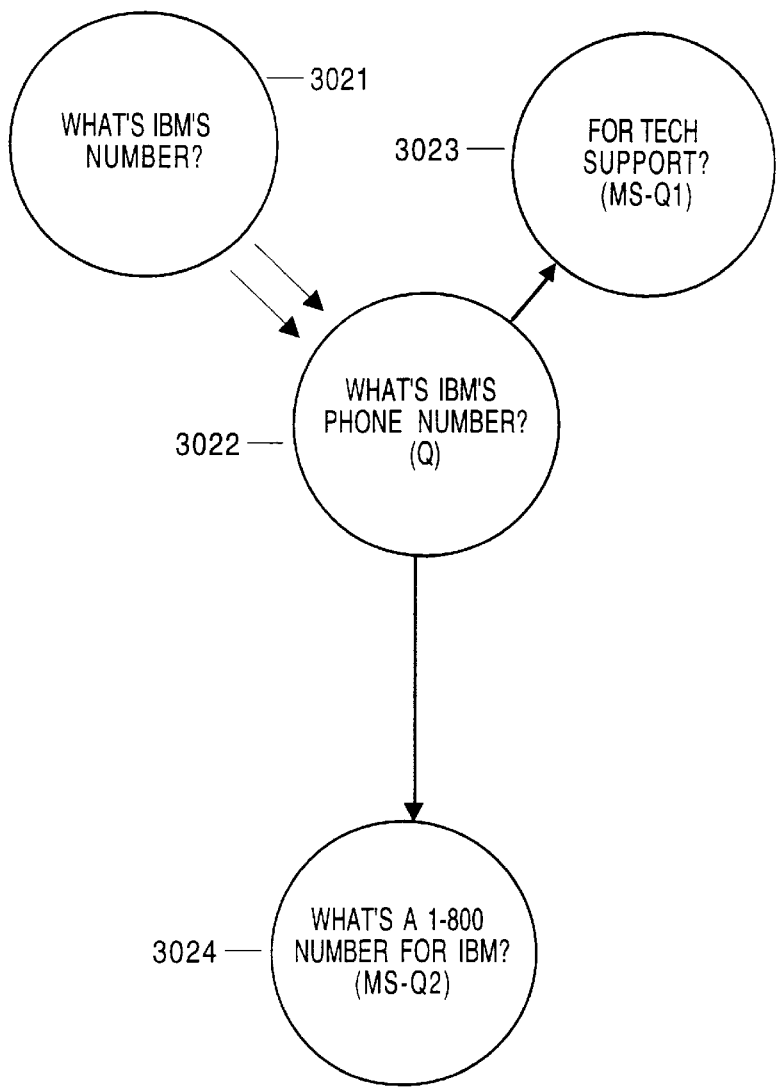

When Rex arrives at a question that is already in the system but that has no direct answer, he can enter an MS-Q to that question. In FIG. 30a, we imagine that the user has initially entered, What's IBM's number? 3021, and that the system has shown him a best match of What's IBM's phone number? 3022, which he finds satisfactory. He then adds two MS-Q's, for tech support? 3023 and What's a 1-800 number for IBM? 3024. The first MS-Q is restricted and the second is unrestricted.

The Question Has a Direct Answer

When Rex arrives at a question that has a direct answer, he can get an answer and/or add an MS-Q. We do not picture these situations.

What the System Lets Suppliers Do

The Question Is Completely New

When Sue enters a question that nobody else has entered, the system stores it and Sue can then enter a direct answer. She can also enter and MS-Q and an answer to that. We do not picture these situations. (Sue may enter a new question and answer because she feels that people will ask the question in the future, even though no one has asked it in the past. For example, IBM might enter, A Directory of IBM Toll Free numbers in the U.S.?, and then enter an answer to their own question.)

The Question Has Been Entered Before But Has No Direct Answer

When Sue arrives at a question that has no direct answer, she can:

a) supply a direct answer,
b) supply an MS-Q and a direct answer to the MS-Q or,
c) do both of the above.

Figure 30B:
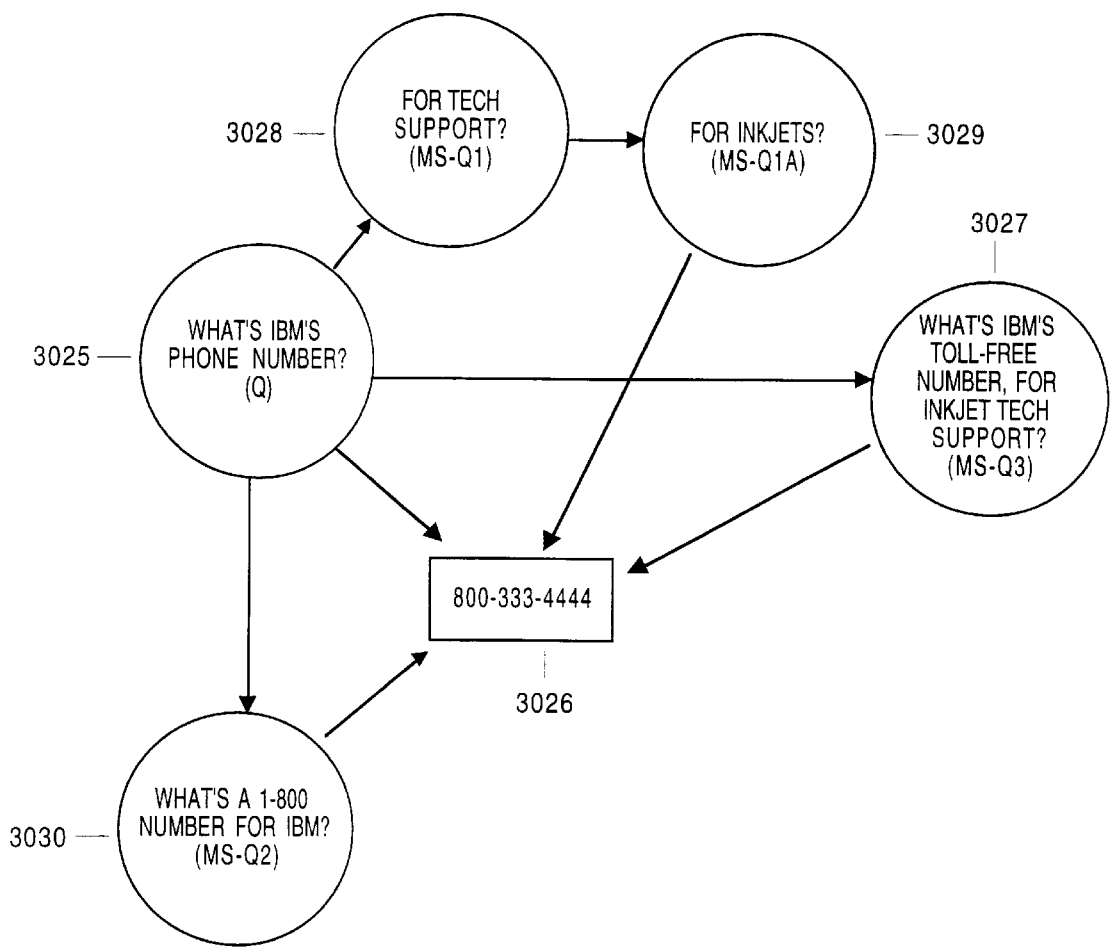

Doing both is shown in FIG. 30b. Sue selects the original question, What's IBM's phone number? 3025 and enters a direct answer, 800-333-4444 3026. She then enters one MS-Q, What's IBM's toll-free number for inkjet tech support? 3027, and then enters the same answer. She then selects another existing MS-Q, What's IBM's phone number for tech support? 3028 and adds, for inkjets 3029 to this, thus creating another MS-Q. She enters the same answer again. Finally, she selects another existing MS-Q, What's a 1-800 number for IBM? 3030, and enters the same answer.

The Question Has a Direct Answer

Figure 30C:
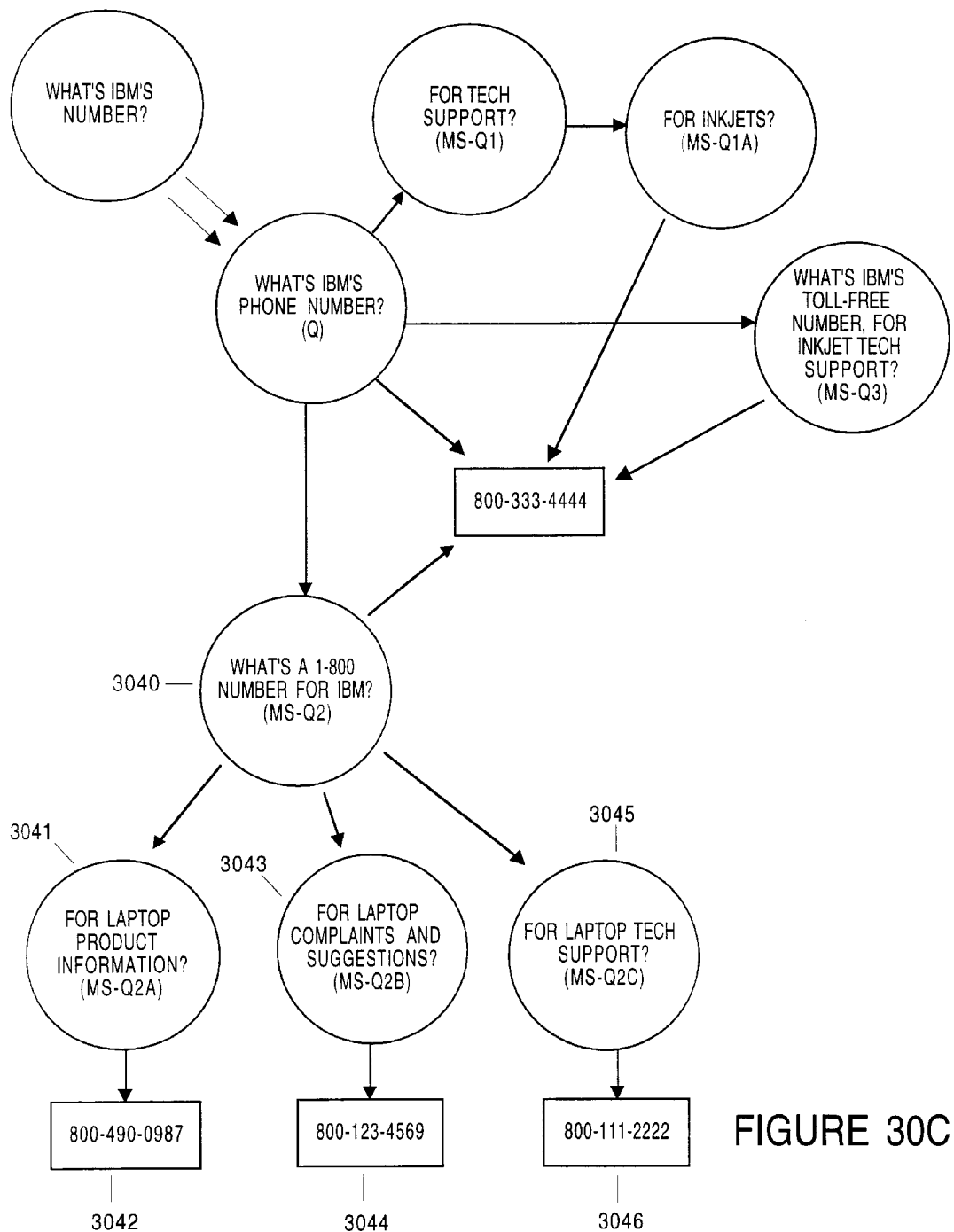

When Sue selects a question that already has a direct answer she can then add an MS-Q and a direct answer to that MS-Q. In FIG. 30c, Sue selects the question, What's a 1-800 number for IBM? 3040, and then adds one MS-Q to it, for laptop product information 3041, and then enters an answer 3042 to that new MS-Q. She then enters another MS-Q, for laptop complaints and suggestions 3043, and an answer 3044 for that. Finally, she adds a third MS-Q, for laptop tech support 3045, and an answer 3046 to that.

Using the Linking Tool

Figure 30D:
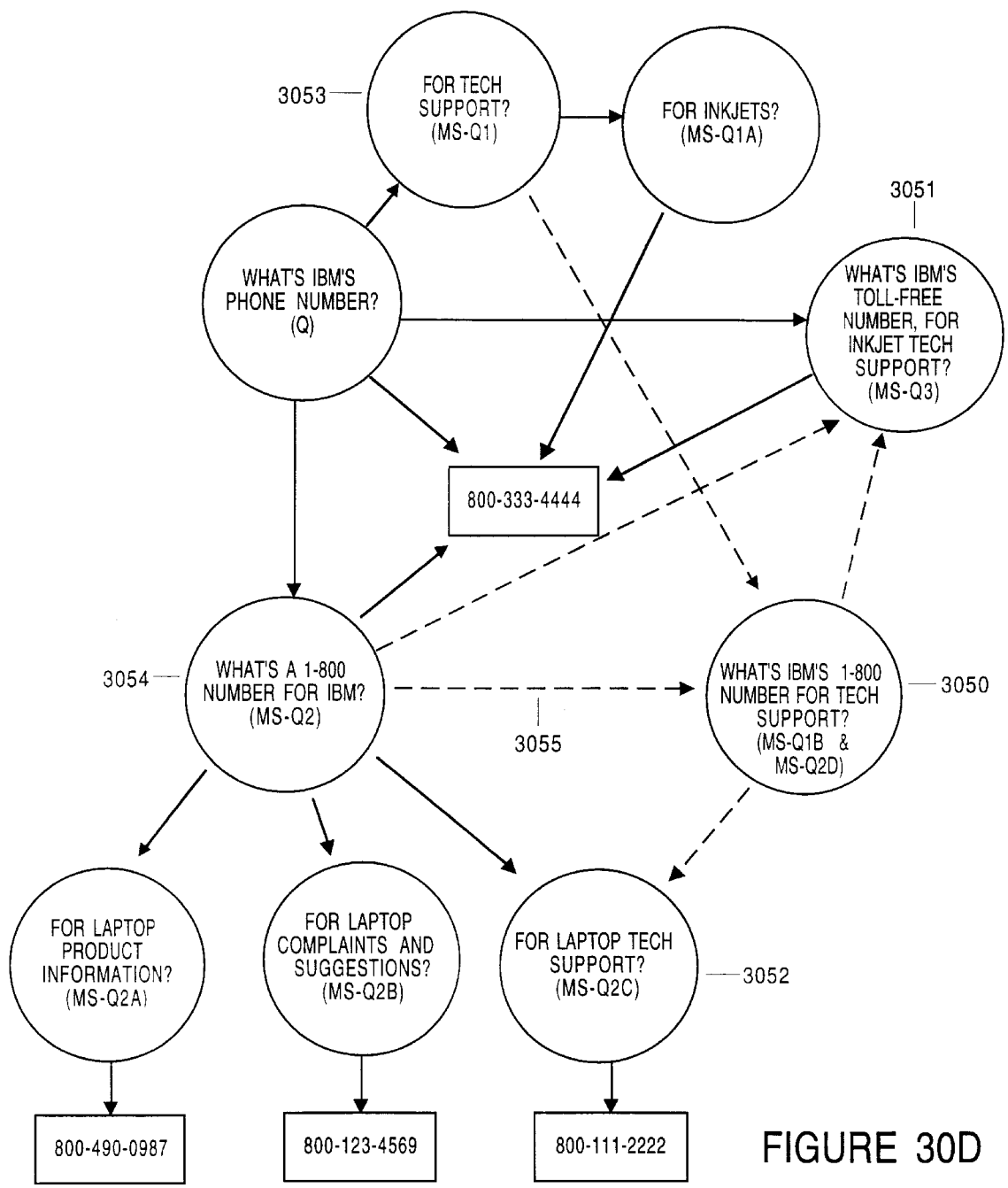

As mentioned, the system can provide a linking tool that enables a user to link any two questions that appear on screen. In FIG. 30d, we show how Rex might link a new question with best match candidates.

The user enters,

What's IBM's 1-800 number for tech support? 3050

This is the current question. Now we assume the system presents the user with four best match candidates:

What's IBM's toll-free number, for inkjet tech support? 3051

What a 1-800 number for IBM, for laptop tech support? 3052

What's IBM's phone number for tech support? 3053

What's a 1-800 number for IBM? 3054

In FIG. 30d, the dashed lines 3055 represent possible links between the current question and the match candidates. We assume the linking tool works such that the user first selects the tool and then selects two questions, the first being designated the LS-Q and the second the MS-Q. In our example, we imagine that the user selects the current question 3050 and then selects the first match 3051 above. The system creates a link between the two questions with the match candidate being the MS-Q. The user repeats the process with the second match candidate 3052. Now we assume that the user selects the third candidate 3053 but selects this question before selecting the current question 3050. Thus the current question becomes an MS-Q relative to the third match candidate. The user repeats the process with the fourth match candidate 3054. Thus four links have been created, two where the current question is an LS-Q and two where the current question is an MS-Q.

Chapter 22

Linking Questions Semantically (A Solution to the Endless Questions Problem)

Introduction

Let us now take up the endless questions problem again. This problem was discussed in chapters 4 and 5 and again in the beginning of chapter 20. Here we delve into the problem further (and repeat many points made previously) in order to give a better explanation for the solution that is presented. This discussion does not nullify what was previously said.

To see the problem, we first look at Rex's goal of finding an answer, Sue's goal of supplying an answer, and AC's goal of enabling Rex and Sue to accomplish these goals. These are search goals. For now, we do not consider AC's economic goal of creating a sales forecast (or forecasts) for an answer. The search goals alone reveal why the reality of endless questions is a big problem.

After presenting the problem, we give the gist of a solution. The solution can be used independently of AC (in the sense of AC's economic organization). In other words, the solution is a general one for enabling people to create and search a data-base of natural language questions and answers.

Of course, AC is a special data-base in that it is organized around the goal of making good sales forecasts for answers. The endless questions reality poses problems for achieving this goal. In section 22.6, we show how the solution to the search problem can be used to achieve AC's primary economic goal as well.

As examples of answers, we will use "a" weather report, "a" photo of a rose, and "a" pair of jeans (a physical product).

(Notes on terminology: As before, "entering a question" may mean entering or selecting a question, also called "arriving at a question" (see chapter 5). Context will dictate whether "enter a question" means "enter a new question" or "select an existing question" or either one. Also, when we refer to Sue we may mean an actual Sue, someone who is supplying an answer, or a potential Sue, someone who is considering supplying an answer.)

22.1 Goals and Problems

Goals

When Rex enters a question (for instance, What's the weather going to be like today in Miami?) his goal is to find an answer that is in AC or to express interest in buying an answer that is not in AC.

When Sue enters a question (for instance, Miami weather report?) her goal is to supply an answer to the question, and have the answer found by every Rex who wants it. The question may already be in AC due to a Rex, or it may be a question Sue has originated.

AC's goal is to enable Rex and Sue to accomplish their goals.

What Is "An" Answer

As discussed, there is no such thing as an answer or the answer, in the sense of a single answer. So what does Rex want to find and what should Sue provide?

Let us discuss, once again, what an answer means. An answer does not mean one answer; it means any answer from a set of satisfactory answers. This set is undefinable except as a matter of interpretation by each person who has asked a question. A given Rex can say whether a particular answer—a particular weather report, a particular photo of a rose, a particular pair of jeans—is satisfactory or unsatisfactory to him. But no person can define the set. A particular person can only say yea or nay to particular examples of answers.

Naturally, different users will have different opinions about whether a particular answer is satisfactory or unsatisfactory. A Sue and a Rex can disagree about whether an answer fits a question.

From AC's point of view, "an" or "the" answer to a question usually means an answer according to what the average user has in mind—the random Rex and the random Sue. For example, generally speaking, AC calculates a POE for an answer that is to be supplied by a random Sue, based on the requests of random Rex's. (We say "generally speaking" because there are ways that AC can customize a POE for a particular answer and according to particular Rex's.)

"Average user" and "random user" are themselves a little deceptive because the users interested in a given answer will not be average or random. The idea, though, is that there is usually no single opinion about what an answer should be. AC cannot, usually, tell who will supply an answer, and who will judge it. A slew of potential answers and a slew of opinions about those answers is the reality.

In CIP's 2 and 3 we used the terms "same answer, an answer," and, "the answer" often. Here we also use the terms the "same satisfactory answer" and "a satisfactory answer" because they may get across a little better the idea that there is a slew of satisfactory answers for a given question.

Goals Restated

So, a better way of stating Rex's goal is to say that he is looking for a satisfactory answer—a satisfactory weather report, photo of a rose, or pair of jeans. The broad adjective "satisfactory" is used because what Rex wants when he enters a question is fairly broad. His idea of what is satisfactory may change when he finds out what is in AC. He may lower his expectations, just as someone who goes to buy a pair of jeans may settle for a pair that is not as good as he "envisioned" in the first place. He may also raise his expectations, seeing a selection of answers that are better than he "envisioned" when he entered a question. We put envisioned in quotes because Rex usually doesn't see any particular answer in advance. Only when he is provided with a particular answer can he say "unsatisfactory," or "satisfactory."

Satisfactory really refers to a person's response to an answer. It encompasses many responses ("not what I hoped for but I'll take it for now," "partially satisfactory," "just what I wanted," "better than I expected," and so on). Perhaps a better way of stating Rex's goal is to say that he is looking for the most satisfactory answer he can get, given limited time (and usually limited money). He is not necessarily completely satisfied by a "satisfactory" answer. He may want a better one. In other words, Rex's goal is not well defined. For now, as good a way as any of briefly stating his goal is to say that he wants a satisfactory answer,.

A better way of stating Sue's goal, then, is to say that she is seeking to provide a satisfactory answer to as many Rex's as she can.

(In fact, we should say that Sue is seeking to sell her answer to as many Rex's as possible, not just provide a satisfactory answer. We are leaving the economic issue of sales until section 22.6 of this chapter.)

AC's goals then are to:

1) enable Rex to find a satisfactory answer and
2) enable Sue to provide a satisfactory answer to as many Rex's as she can.

Endless Answers Again

Of course, as discussed, the endless answers problem gets in the way. We might restate the endless answers problem by saying that there are endless satisfactory answers and endless unsatisfactory answers to any question—e.g., endless unsatisfactory weather reports, photos of roses, and pairs of jeans. The problem is: how can Rex tell Sue what he wants so that she provides a satisfactory answer?

One basic solution to this problem is the introduction of more specific questions. We will not repeat our discussion of these.

Endless Questions Reality Restated

And so we come back to the endless questions reality which we said was that endless questions could refer to the "same answer". Now we substitute the term "a satisfactory answer" for "the same answer". The underlying reality remains: there are endless questions that refer to a satisfactory answer (endless ways to ask for a satisfactory weather report, photo of a rose, pair of jeans, and so on).

Why the Endless Questions Reality Is a Problem for Rex and Sue

Recall, Rex's goal is to find or express interest in a satisfactory answer, but how? Which question should he enter? If there are endless ways to ask for, say, a satisfactory weather report, which question is he supposed to ask? If he asks a question, how is Sue to know to find that one? And if Sue has already supplied an answer to a particular question, how is Rex to know to find that question?

Recall, Sue's goal is to supply a satisfactory answer to a question, but how? Which question is she supposed to supply the answer to? A single Rex can ask for an answer, say a weather report, in endless different ways. Say he asks in a dozen different ways. Even if Sue sees these questions, which one should she answer? As a practical matter, she usually cannot answer all of them individually. And further, with multiple Rex's entering questions asking for similar satisfactory answers (say the Rex's are all asking in different ways for "a" Miami weather report) how is Sue to answer so many different questions? Again, as a practical matter, she usually cannot answer all of them individually.

Consider the following list of seven ways to ask about the weather in Miami. This list is quite short compared what would really be in AC concerning the weather in Miami (which could be tens of millions of questions or even far more). Assume that seven different Rex's have entered these questions.

1. Weather report, Miami?
2. What's the weather going to be like today in Miami?
3. What's it going to do outside in Miami?
4. How hot is it going to get in Miami?
5. What does the weather say today in Miami?
6. NWS report for Miami?
7. National Weather Service report for Miami?

Now, let's say that Sue even finds these seven questions. To repeat, which one should she provide an answer to? If there really were only seven different ways to ask for a weather report then she could answer them all. But with natural language people phrase questions in a vast number of different ways.

Now, let's say that Sue has provided an answer to one of the questions. To repeat, how is Rex supposed to find it? The task is easy enough if there really were only seven ways to ask about the weather in Miami, but what if there are ten million questions in AC about the weather in Miami?

An initial solution to these problems is to use best match algorithms. These are essential but inadequate for a few reasons. First, there is no best match question, or small set of questions, that AC can take users to. The reality is a huge profusion of similar questions. Second, at this time, computers cannot understand questions, which is necessary, in most cases, to match two questions. In other words, two questions may describe the same answer, but AC will usually not realize the fact. (Fortunately, best match algorithms can successfully match questions in enough cases.) Third, while best match algorithms can get Rex or Sue to a given Qx, that Qx will still be isolated in the sense that AC cannot recognize in most cases when an answer to Qx may potentially be supplied to a given Qy. Further, if a satisfactory answer to Qx actually is supplied to Qy, AC will usually not be able to locate that answer for a Rex who is at Qx, because AC does not connect that answer with Qx.

22.2 Connecting Questions with Semantic Links

The solution is to let humans make semantic links between questions so that questions are not isolated. We will also call these question links (Q links). As was discussed in the previous chapter, chains of questions can be formed because questions are described relative to each other. So, a question can be linked to another question, which can be linked to another question, and so on. In this way vast numbers of questions can be indirectly linked to one another. Whether question networks are large or small, the questions are linked two at a time, each time by some person deciding on the semantic relationship between the two questions.

What is a semantic relationship? We can give no precise definition. There are innumerable kinds of semantic relationships that people could point out between questions. To be brief, for our purposes, a semantic relationship means a relationship between two questions where—because of the meaning of the questions—a satisfactory answer to a first question may also be a satisfactory answer to a second question. A more general way of putting it is that an answer to a first question might be wanted by a person who has asked (arrived at) a second question.

In other words, the meanings of two questions are compared regarding their answers. A semantic relationship tells why the answers to one question might satisfy another question. Another way of putting it is that the answers to the question are compared. Some relationships have to do with a difference between the questions concerning their answers, and some have to do with a similarity. (These things become clearer in the next chapter, where several semantic relationships are described. Note: It may be worthwhile to glance at the next chapter at this point.)

For example, Qx might be called less specific relative to Qy which is more specific relative to Qx. The corresponding link, which can be called a less specific to more specific (LS-MS) link, describes the relationship between the answers to the two questions. Another example of a semantic link is a synonym to synonym (Syn—Syn) link. When two questions are linked by a Syn—Syn link that means that some user thinks that the two questions refer to the same set, or "roughly" the same set, of satisfactory answers. The two questions are described, labeled, as synonyms of each other, and a link is created between their Q-records. (The seven questions above about the weather in Miami might be linked by Syn—Syn links.)

Some semantic relationships are such that the answer to Qx will usually answer Qy, but the answer to Qy will usually not answer Qx. For example, the questions: Weather report, Miami? and National Weather Service report for Miami? may be linked. The answer to the first question may not answer the second question, but the answer to the second question will answer the first question, at least in the minds of most people.

We also call a semantic link a named link since it names the relationship between two questions. The essentials of such a link then are:

1) each question is named to describe its semantic relationship to the other question,
2) a link is created in memory between the Q-records of each question.

As will be seen in the next chapter, many relationships between questions tell when the answer to one question may satisfy someone who has asked another question.

Links Refer to Potential and Actual Answers

The semantic links we describe between questions do not tell whether the questions have actual or missing answers. (In chapter 24 we will describe links that refer only to actual answers.) A semantic link between two questions is meant to provide information about the relationship between the potential answers to the two questions.

If a linked question has an actual answer, the semantic link will describe that answer as well because the answer is supposed to be part of the set of potential answers for that question. For example, if a person is at Q-1 (say, Weather report, Miami?) which is linked to Q-2 (say, What's the weather going to be like today in Miami?) by Syn—Syn links, and Q-2 has an actual answer, then the user and AC know that a satisfactory actual answer to Q-1 may be at Q-2.

Of course, when a question has an actual answer, a semantic link will still refer to potential answers to that question.

Questions in Different Lands Can Be Linked

It should be noted that while we say that semantic links are necessary for handling natural language, AC can enable users to link natural language questions to questions in lands where grammar is highly constrained. For example, a natural language question, What are mortgage rates these days?, can be linked to a highly constrained question such as: Table of mortgage rates in the U.S.?, which we imagine is a table of questions and answers, where there are strict rules that govern the entering of questions and answers.

People Create Semantic Links

People create links. So, when we say that a link compares the answers to two questions, we mean it expresses the opinion of the creator of the link. People, of course can disagree. There are at least three reasons for such disagreements, and they are worth discussing, in order to understand the uses and limits of semantic links.

One reason is that the people have different conditions for being satisfied. For example, say one person, Paul, enters:

Weather report, Miami? and

National Weather Service report, Miami?

Now Paul might just be looking for any decent weather report for Miami. He has entered both of these questions in the sense of synonyms. To him they both refer to basically the same thing he wants. Now, he realizes that in other people's minds there are differences between the two questions and their potential answers. But in his mind, at the time he is asking the questions, they are both in search of an answer in the same set of potential answers. An answer to either question will satisfy him.

Now, say another person, Steve, enters National Weather Service report, Miami?. He might not be satisfied by any decent weather report for Miami. And so, to him the two questions above may not be synonyms. He might only be satisfied by an answer that "really fits" the second question. The Syn—Syn links may not be appropriate for him because he may have different needs in an answer than Paul. In other words, the relationship between answers depends on the needs of a user at the time he is entering questions. So a link that is appropriate for one person may not be appropriate for another person, because the people have different needs.

A second reason that people disagree about whether a link is appropriate is that people can disagree about the meaning of two questions. People will envision different kinds of potential answers for the questions and thus they will label the relationship between these potential answers differently. For example, Photo of a red rose? and Photo of a red, red rose? might evoke the same image in two people or they may evoke different images. Paul might think that these questions should by synonyms of each other while Steve might think they should have a less specific to more specific relationship.

A third reason people will disagree about links is that they will have different ideas about the abstract notions of behind the links, for these notions are not well defined. Synonym question, for instance, can mean different things to different people.

Clues, the Main Idea Behind Semantic Links

While there are many kinds of useful semantic links, each of which has a different reason for being useful, we can give a general rationale for using most of them (we will meet some exceptions to this rationale in chapter 26). The rationale is simply that a semantic link tell s that an answer to one question might be a satisfactory answer to another question (recall, for our discussion, "satisfactory" encompasses a range from, "partially satisfactory" to "better than expected").

We say might because here can be great uncertainty in the information that links give. This uncertainty comes from several sources. First, a link that is appropriate for one person might not be appropriate for another person, as discussed above. In other words, the link may only give information that a certain percentage of Rex's agree with. Second, an actual answer may be disappointing. For example, Rex may agree that a link is appropriate, in the sense that the answer to Qx will answer Qy, but he may think that the actual answer at Qx is unsatisfactory. So, potentially, an answer to Qx might also answer Qy, but in actuality, given a particular answer that has been supplied, the answer does not satisfy Qy, according to a particular Rex. Third, the semantic relationship may be such that only certain answers to Qx will also satisfy Qy. For example, only certain answers to Photo of a rose? will satisfy Photo of a red rose?.

The point here, then, is that a semantic link does not give definitive information. It gives a clue about whether Qx describes a satisfactory answer to Qy, for a certain percentage of Rex's. In other words, a link says that Qx has a greater than 0% chance of describing a satisfactory answer to Qy, according to a given Rex.

We cannot say in general what the chance will be. Semantic clues can be anywhere from very unreliable to very reliable, depending on the type of link. Experience will tell how reliable certain links are in practice. Of course, because of their meanings, certain kinds of links should be more reliable than others in general. For example, two questions that are linked as Close Synonyms should have a higher chance of sharing a particular answer than two questions that are linked as Loose Synonyms.

AC uses the link information, along with other A-stats, to select matches to present to Rex. For example, say Rex is at a first question that has no answer, and wants to see a satisfactory answer. AC might then show a question that has an answer and is linked to the first question by a Syn—Syn link. Often AC will select poor matches because the semantic links give uncertain information.

We might call link information probabilistic in the sense that a semantic link indicates some probability that, for a given Rex, Qx, describes an answer that also satisfies a linked Qy. AC can develop probabilities from large samples of linked questions—registering the satisfaction of users who have traveled along different links, and who have found answers through different links. AC can also enable a user to initially set the probability that the answer to Qx will also satisfy Qy, and the probability that the answer to Qy will satisfy Qx.

In general, probability weightings that AC assigns will depend upon the other A-stats that are involved (and perhaps upon other factors, such as a user's past preferences, which AC can keep track of in certain ways). AC's matching rules will "learn" how to use link information to select matches. We take this topic up further when we discuss how AC can enable Rex and Sue to travel using semantic links.

The Meaning of "Satisfy a Question"

We will often use the phrase "an answer satisfies a question". By this we mean that an answer answers a question. We use "satisfies" and "answers" synonymously. But, what do we mean by these terms? An answer cannot satisfy a question, it can only satisfy a person.

So, when we say that an answer satisfies a question we mean that the answer is satisfactory to some percentage of Rex's who enter the question. We cannot specify a percentage. We also mean that the answer has some probability of satisfying a particular Rex. We cannot specify a probability.

When we say a "particular", or a "given" Rex we do not necessarily mean a random Rex who enters the question. AC may be able to keep track of the preferences of different Rex's, and so, AC can assign different probabilities that an answer will satisfy different Rex's. Still, the easiest way to think of the phrase, "an answer satisfies a question," is that an answer has a probability of satisfying a random Rex.

Further, when we say an answer, we may mean a particular answer supplied by particular Sue, or any answer supplied by a random Sue.

We say that an answer satisfies a question because it is easier to abbreviate than to include all the qualifications. But the qualifications are the reality.

Letting Humans Do the "Matching" that a Computer Can't Do

In previous chapters, the endless questions problem was also called the matching up questions problem because the idea was that we needed to match up all the questions that referred to, described, the "same" answer. But just as the word "same" is deceptive, so is the word "match". No one has defined what a match is. And no one knows how the brain does its various and continual matching tasks.

We will use the term match, even though it is deceptive, because it is convenient and familiar, and we cannot think of a better one. Yet while we might say we need to match up questions, let us realize that the task is to determine whether an answer to one question has a greater than 0% chance of satisfactorily answering another question. This task is really what we mean by matching up questions.

Ideally, we want to know the probability but, in practice, we cannot give any hard probabilities associated with any links. That's okay, just the ability to detect the possibility that two questions share answers is enough to use and build on.

Except in special, well defined cases, only humans can tell whether two questions match in such a way. For example, in general a machine, at the present time, cannot know that an answer to a question like What's it going to do outside today in Miami? may also be an answer to a question like Today's weather report in Miami?. But a human, who speaks English, can know. So, we let humans "match" questions with semantic links. AC can then select matches based on the human matches.

We might want a semantic link to indicate a much higher than 0% chance of a satisfactory—and indeed it might—but that is not the point. The ability to detect that the answer to one question may also satisfy another question, and the ability to explain why, is the key thing.

As noted, the matching is according to the tastes of each user who creates a match, a link that is. People will disagree on matches, of course. Happily, they will also agree, which is why the semantic matching of questions can work.

AC can enable users to confirm a link, or complain about a link. AC can use such confirmations and complaints to evaluate the accuracy of links.

Matching Often Non-Commutative and Asymmetric

One counter-intuitive thing about matching, as it is defined here, is that it is not necessarily commutative. When we say that Qy matches Qx, or that Qy is a match for Qx, we mean that Qy describes answers that might satisfy Qx. But, we do not necessarily mean that Qx describes answers that might satisfy Qy.

We have discussed this point before. We emphasize it because, in everyday language, the term "match" usually connotes a "commutative" or "symmetric" situation. We usually think of two things—like two fingerprints, like a map and a territory, like two puzzle pieces, like two text strings—as matching each other, commutatively so to speak. But in AC, two questions may match non-commutatively. For example, if:

Qx is: What's the UV index in Miami?, and

Qy is: National Weather Service report for Miami?, then

Qy may be a good match for Qx because answers to Qy may answer Qx. But, answers to Qx usually will not answer Qy. Therefore, Qx is not a good match for Qy.

Matching has two directions in AC, one from Qx to Qy, and the other from Qy to Qx. There are match probabilities associated with each direction. Thus, in the example above, it is possible that an answer to Qx will also answer Qy—there is some chance. But the chance is far greater that an answer to Qy will answer Qx. If the match probabilities in both directions are the same or roughly the same, we might say the questions match symmetrically. If the match probabilities are significantly different, we might say the questions match asymmetrically (see section 22.4.)

Matching Multiple Questions Through Question Networks (Q-Nets)

To solve the endless questions problem, it is not enough to match up (semantically link) just pairs of questions. The goal is to "match up" all the questions that might share the same satisfactory answer (or at least share some of the same satisfactory answers). This goal will rarely be reached, but we still must match up as many questions as we can where the questions might share a satisfactory answer.

The goal of matching up multiple questions is accomplished with networks of linked questions, Q-nets. We might say that a semantic link is the matching of two questions and a Q-net is the matching up of more than two questions.

Normally a Q-net would be greater than two linked questions, though we can say that a single question is a Q-net of one and a pair of questions is a Q-net of two.

(Note on terminology: A Q-net can have actual answers in the sense that questions in the Q-net can have direct answers. An d so, a Q-net should perhaps be called a Q-A-net. For simplicity we will stick with "Q-net," whether a network of linked questions includes actual answers or not. Also, when we say that a Q-net has a satisfactory answer we mean that an answer that will satisfy a given Rex has been supplied to some question in the Q-net.)

The Necessity of Linking Questions Indirectly

To semantically match up multiple natural language questions in AC, users usually must link most of the questions indirectly. Otherwise, each time a question is entered into AC, a user would have to see whether or not it matched all the other questions in AC. Even if AC could somehow find all questions that were likely matches for a new question, the user would still have an impractical number of matches to make.

Taking our seven questions above, let's say that the first six have already been entered and are linked, directly or indirectly, to each other. Now say that the seventh is entered. A user would have to create six new links in order for the new question to be directly connected to the all the others. The practical solution is to link the new question to one of the existing questions and let the new question then be indirectly linked to all the others. That is not to say that we only link a question to one other, but simply that it is unfeasible to create direct links to all the "matching" questions in AC.

We see, again, that where natural language questions are concerned, the reality is a profusion of similar questions that have many different relationships with each other. In AC, most of these relationships must be identified indirectly, through indirect linkages that is.

(Note on terminology: for convenience, when we say that questions in a Q-net are linked we mean directly and indirectly.)

22.3 How and Why Q-Nets Can Work

Let us now elaborate on how the method of making Q-nets can solve the search problems raised earlier—what question should Rex enter to find an answer, and what question should Sue enter to supply an answer to?

Q-nets are a solution because they can become large enough so that Rex has a reasonable chance of asking a natural language question that AC will—using best match algorithms—successfully match against a question in a Q-net. (When we say successfully, we mean that Rex is satisfied by the match.) The Q-net, in turn, has a reasonable chance of having a satisfactory answer, which can be found by Rex and by AC, using the links (and other A-stats) in the Q-net.

Entering and Linking of Questions Revisited

A Q-net can grow large by the numerous linkings of questions by numerous users. In the previous chapter we did not delve into many variations on how AC can actually enable users to designate questions to be linked. Here we will not delve much further because the steps are fairly clear: AC must enable a user to:

1) designate the two questions to be linked and,
2) to name the relationship between them.

These steps can be accomplished in many ways. Still, we should review a few of the important variations.

When a user is at a current-Q, AC can present match candidates. The user can then link the current-Q to one or more of these. AC can enable the user to select the match question and designate its relationship with the current-Q by using a linking tool. AC can also enable the user to zip to the match question, and name it with a designated link. For example, AC can enable the user to press a "Syn-Q" button, followed by a "Zip to" button, followed by a "click" on the match question. This sequence is a way that AC can enable the user to go to the match candidate and at the same time link it by a Syn—Syn link to the question that was the current-Q. In other words, AC can enable users to travel to a question on screen while also designating its relationship with the previous current-Q.

When a user is at a current-C, AC can enable him to enter a new question to be linked to the current-Q. The current-Q can remain the current-C, while the new question is stored as a question that is linked to the current-Q. Normally a newly entered question does become the current-C, but AC can also enable the user to choose to stay at a question while entering new questions to be linked to the question he remains at This way was covered in the previous chapter. In FIG. 32, we show this way again, where the user is at Q-1 5000 and then enters two questions, Q-2 5001 and Q-3 5002, and links them to Q-1, which remains the current-Q.

Another basic way of enabling a user to link two questions is to enable the user to enter a new question to become the current-C, and then link the new current-Q to the previous current-Q. AC can enable the user to make the link when he enters the new question. For example, if the current-Q is Photo of a red, red rose?, the user might then press a New-Q button followed by a Syn-Q button and then enter, Photo of a red rose?. Thus the user calls this new question a synonym of the previous current-Q. AC then labels both as synonyms and create a Syn—Syn link between them. In FIG. 32, we show this way where a user enters Q-1 5003 which is the current-Q first, and then he enters Q-2 5004 and links it to Q-1. But in this case, Q-2 becomes the current-Q when it is entered. The user then enters Q-3 5005 which itself becomes the current-Q and is linked to Q-2.

This way of linking questions sequentially can be convenient because a natural way that people ask for answers is to ask a series of questions, until they find a good response. In the context of AC, Rex's goal is to look for a question that may have the answer he is looking for. He may have to ask a series of questions until he finds an adequately matching question. For example, he might ask, Why is it easier to balance on a bike when you're moving than when you're standing still?. If he finds no good match, he might then enter, Why are you able to balance on a bike when you're moving?. If he gets no good match he might then enter, Physics of balance on a bike?, and so on, until he finds a match question he is satisfied with.

In looking for answers, it is typical of people to ask a series, a chain so to speak, of questions, where each question in the chain has a relationship with the previous and subsequent question. When a person is asking questions in this natural way, it is usually more natural to make a new question the current-Q. Thus, AC can enable a user to describe this relationship of the new question to the preceding question, while making the new question the current-Q.

Growing Q-nets

Let us look at a few of the basic situations by which users grow Q-nets in order to show how Q-nets can become large. For simplicity in the discussion, we assume in 1–3 below that Rex's are growing a Q-net. Sue's grow them too, and in the same way, but Rex's do more of the job. In 4 below we explain an important way that only Sue's grow Q-nets. For simplicity, we use the two tiny Q-nets below as examples, and imagine that the Q-nets are only made up of questions connected by Syn—Syn links (a large Q-net would normally be made up of questions connected by various links).

Q-Net A What's the weather going to be like today in Miami?
What's it going to do outside in Miami?
How hot is it going to get in Miami?
Q-Net B What does the weather say today in Miami?
NWS report for Miami?
National Weather Service report for Miami?

1. Adding a New Question to an Existing Q-Net

When Rex enters a new question, AC uses best match algorithms to present tentative matches. Each tentative match is already part of an existing Q-net in AC. Rex can then decide whether the new question should be linked to one of the matches. If Rex decides a link should be made, it is made, and the new question is added to an existing Q-net in AC. For example, Rex might enter, Weather report in Miami today?. This question might be tentatively matched with National Weather Service report for Miami? in Q-net B above. If Rex decides to link the two questions as, say, synonyms, then Rex's question becomes part of Q-net B.

Another basic way Rex can add to an existing Q-net is to already be at a question in the Q-net and then enter a new question and link it to the first question.

2. Joining Two Q-Nets

When Rex is in a Q-net, AC can suggest a tentative match to the current-Q such that the match candidate is not part of the Q-net that Rex is in. Rex can then decide whether the current-Q should be linked to the tentative match. If he decides a link should be made, it is made, and the Q-net of the current-Q is connected to the Q-net of the tentative match question. Thus two Q-nets are joined. For example, if Rex is at What's the weather going to be like today in Miami? in Q-net A above, and AC suggests a match of National Weather Service report for Miami? from Q-net B, and Rex decides to link the current-Q with the match candidate, then the two Q-nets are connected.

Of course, any time Rex links two questions that are part of separate Q-nets, he is joining these Q-nets. Questions from different Q-nets can be shown on screen in a variety of ways, not just by AC showing a match candidate. For example, Rex might call up a past question he has asked that is part of a different Q-net than the one the current-Q is part of.

3. Making a Mini-Net (a Q-Chain)

Another way Rex can grow a Q-net is to grow his own. He does this by entering a series of questions all aimed at finding the same satisfactory answer. For example, Rex may enter ten questions trying to find out what the weather will be like in Miami. He can link all these together. Usually he would do this sequentially so that as he enters a new question he tells what its relationship is with the previous question he entered. In this way, Rex can make a "mini-net" (which we can also call a mini-Q-chain).

Mini-nets will be common because the natural way Rex will often ask for an answer is with a bunch of related questions. He keeps asking until he gets a good match in AC, then he goes to that question. Meanwhile what has happened is that he has asked, say, ten related questions that are rephrases or rough synonyms of each other. If one of these questions is then linked to an existing Q-net, the whole mini-net is joined to the existing Q-net.

(Making a mini-net is not mechanically different from the first way above because Rex is creating a Q-net in AC and then adding to it one question at a time. What is different is the fact that the mini-net is made up only of his questions, which then may or may not be connected to a Q-net made up of other people's questions.)

4. Adding a New Question and Answer to an Existing Q-Net

When Sue arrives at a question and wants to supply an answer to it, she may feel that the answer satisfies a semantically related, new question. So she then enters the new question, links it to the previous current-Q and then enters an answer to her new question. The link tells other users how her answer can satisfy the first question. For example, if she is at What's it going to do outside in Miami? and she wants to supply her answer to a new question, say, What's the weather going to do in Miami?, she can enter this question, link it to the first question, and supply her answer to the new question.

Large Q-Nets Especially Accessible

Any question can have a direct answer supplied to it. Most won't though because it is impractical to supply answers directly to most questions that have been entered. That's because questions are generally easier to create and enter than answers. (There are ways of enabling Sue's to supply an answer to multiple questions quickly, but even so it seems that questions that have no direct answers will predominate.) In fact, the largest proportion of questions may be those that are only entered once and are never found again.

While most questions will not have direct answers, a large proportion (no one can say what proportion) will have indirect answers.

A Q-net, then, is made up mostly of questions that are used to access the Q-net and to travel in the Q-net.

Rex can ask a bunch of natural language questions in search of "an" answer and he will often find a reasonable match for one of the questions in a large Q-net. Why? Because someone else will probably have asked a similar question before, and that similar questions will often be in a large Q-net. The match question often will not have a direct answer (unless Rex has specified that condition in a search stat). Thus, a large Q-net enables Rex to accesses it from one question, a match question, and then find a satisfactory answer at another question in it, if such an answer exists.

Let us elaborate a little more on how AC enables Rex and Sue to travel in a Q-net.

22.4 Traveling Using Semantic Links (Finding Questions and Answers in Q-Nets)

AC enables Rex and Sue to travel and get answers in the same ways (though Rex's actions are registered as demand information, and Sue's are not). For simplicity, we will just refer to Rex. Let us then recap the basics of how Rex can travel and get answers in AC.

a. Rex can enter a new question or a new Q+. (Recall, one way that Rex can enter a new question is to be at a question and then add or edit Q-specs. And one way that Rex can enter a new Q+ is to be at a question and then add or edit A-stats, also called search stats.)

b1. Rex can ask AC to show questions that match the current-Q or Q+. (Recall, AC can show matching Q-A locations as well as Q-locations.)

b2. Or, Rex can ask AC to output an answer that matches the current-Q or Q+.

c. If AC shows matching questions, Rex can go to (select) one of these.

Of course, when we say that Rex travels, it is AC that is doing the work, finding and showing match questions and answers based on Rex's instructions and on its rules for evaluating matches. When we say that AC evaluates a question we mean that it examines a Q-string and the corresponding A-stats (information in the Q-record).

Locating Satisfactory Matches with Semantic Links

What's new with semantic links is that link information is another kind of A-stat which can be used by Rex and AC to locate matches. When we say that Rex uses semantic link information, we mean in the sense of search stats that Rex enters. When we say that AC uses semantic links we mean in the sense of evaluating the links between questions to locate match questions and answers.

The simplest way to describe how AC evaluates semantic links is to say that AC uses them as probabilistic screens to eliminate unsatisfactory match questions, and identify satisfactory ones. However, in reality there are a lot more factors than links that AC can use to determine whether a match is satisfactory or not. And many of these factors affect how AC evaluates the links themselves. In other words, semantic links are not independent, static probability screens. Nevertheless, to get the main idea across, we will pretend that they are, at first. Then, we will add to the picture.

A Simple View: Semantic Links as Probabilistic Screens

When any two questions, Qx and Qy, are directly linked, AC assigns two probabilities:

1) the probability that Qx describes an answer, Ax, that will satisfy Qy, and 2) the probability that Qy describes an answer, Ay, that will satisfy Qx.

In other words, a link has two directions. One direction signifies the probability that Ax will satisfy Qy. The other direction signifies the probability that Ay will satisfy Qx. Put another way, if Rex is at Qx, then Qy has a certain probability of being a satisfactory match, according to Rex. Conversely, if Rex is at Qy, then Qx has a certain probability, which may be different, of being a satisfactory match, according Rex. The differences in probabilities come about because of the meaning of the links and other factors that AC can take into consideration.

So, using a semantic link, AC can guess by some assigned probability whether Ay will satisfy Qx. AC can continue this guessing process by continuing down a path of links, using the probability of a match from one question to another to get a resulting probability between two indirectly linked questions. From Qx, AC follows a path of linked questions to find the questions that have the highest chance of being satisfactory matches to Qx.

Figure 33:
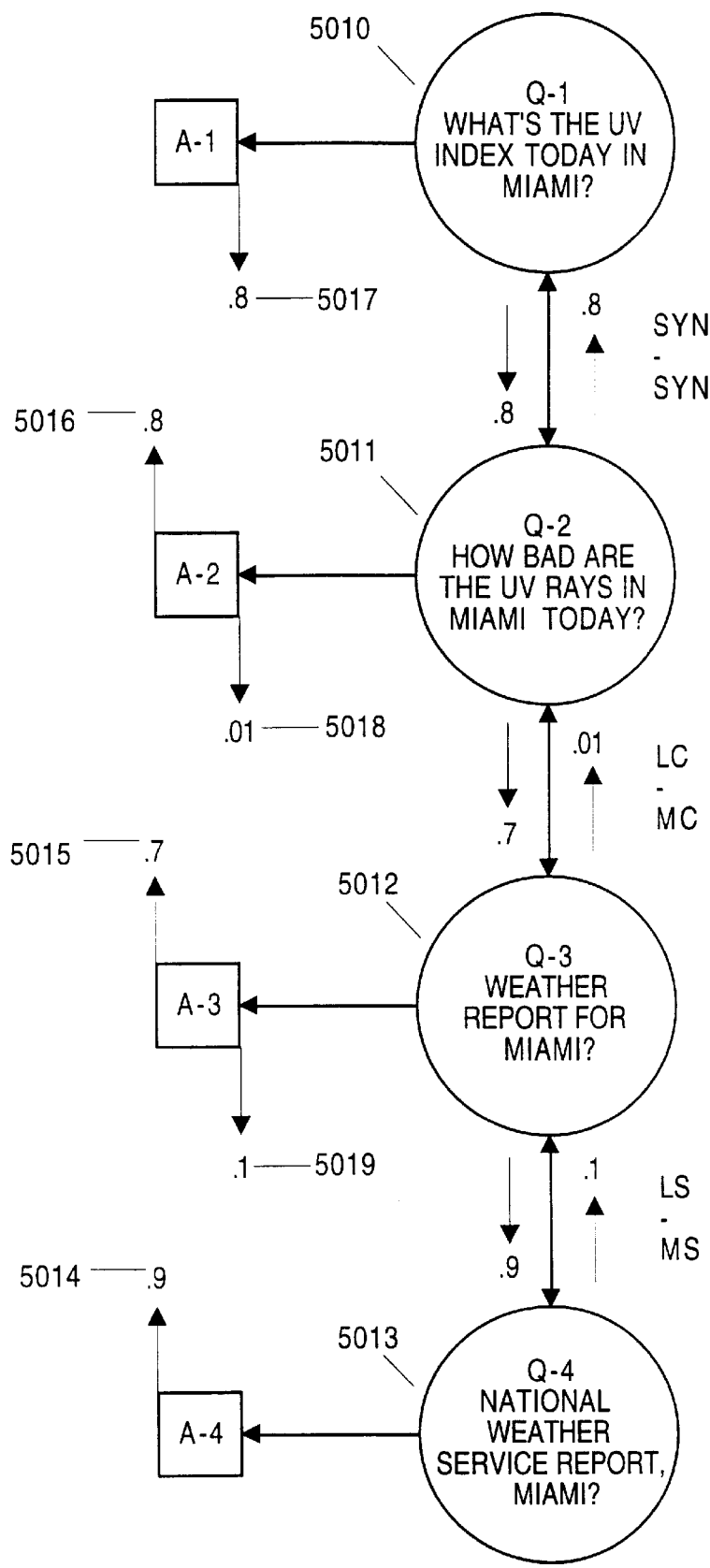
FIG. 33 shows a diagram of the probabilities associated with semantic links.

We will give an example of a path of four linked questions, linked sequentially by three different kinds of links to show what we mean. We will also imagine the match probabilities that AC assigns initially. As shown in FIG. 33:

Q-1: 5010 What's the UV index today in Miami? connected by a Syn—Syn link (synonym to synonym) to Q-2: 5011 How bad are the ultraviolet rays in Miami today? connected by a LC-MC link (less complete to more complete) to Q-3: 5012 Weather report for Miami? connected by LS-MS link (less specific to more specific) to Q-4: 5013 National Weather Service report, Miami?

Now we imagine the probabilities that an answer to one question will satisfy another question. We imagine that:

an answer to Q 4 has a 0.9 5014 chance of satisfying Q-3, an answer to Q-3 has a 0.7 5015 chance satisfying Q-2, an answer to Q-2 has a 0.8 5016 chance of satisfying Q-1.

And thus if we multiply from one question to the other, we get a resulting probability that the answer to Q-4 has a 0.504 (0.9×0.7×0.8) chance of satisfying Q-1.

In other words, an answer to National Weather Service report, Miami? has a 0.504 chance of satisfying a Rex who has asked, What's the UV index today in Miami?. What we mean by this is that the answer that the average Sue will supply to Q-4 has a 0.504 chance of satisfying the average Rex who has asked Q-1.

If we travel along the path in the opposite direction, we see, very differently, that the answer that the average Sue will provide to Q-1 has very little chance of satisfying the average Rex who has asked Q-4. We imagine the following match probabilities:

an answer to Q-1 has a 0.8 5017 chance of answering Q-2, an answer to Q-2 has a 0.01 5018 chance of answering Q-3, an answer to Q-3 has a 0.1 5019 chance of answering Q-4.

And thus if we multiply from one question to the other, we get a resulting probability that the answer to Q-1 has a 0.0008 chance of satisfying Q-4.

(In FIG. 33, the two directions of links are illustrated in two ways. On the left side of the figure, we show arrows pointing from one answer to another. Each arrow has a number associated with it, signifying the probability that one answer will be a satisfactory substitute for the answer it is pointing to. On the right side of the figure, we show arrows pointing from one question to another. Each arrow has a number associated with it, signifying the probability that a user at one question will find a satisfactory answer—missing or actual—at the question being pointed to.)

Eliminating Unsatisfactory Matches

Figure 34:
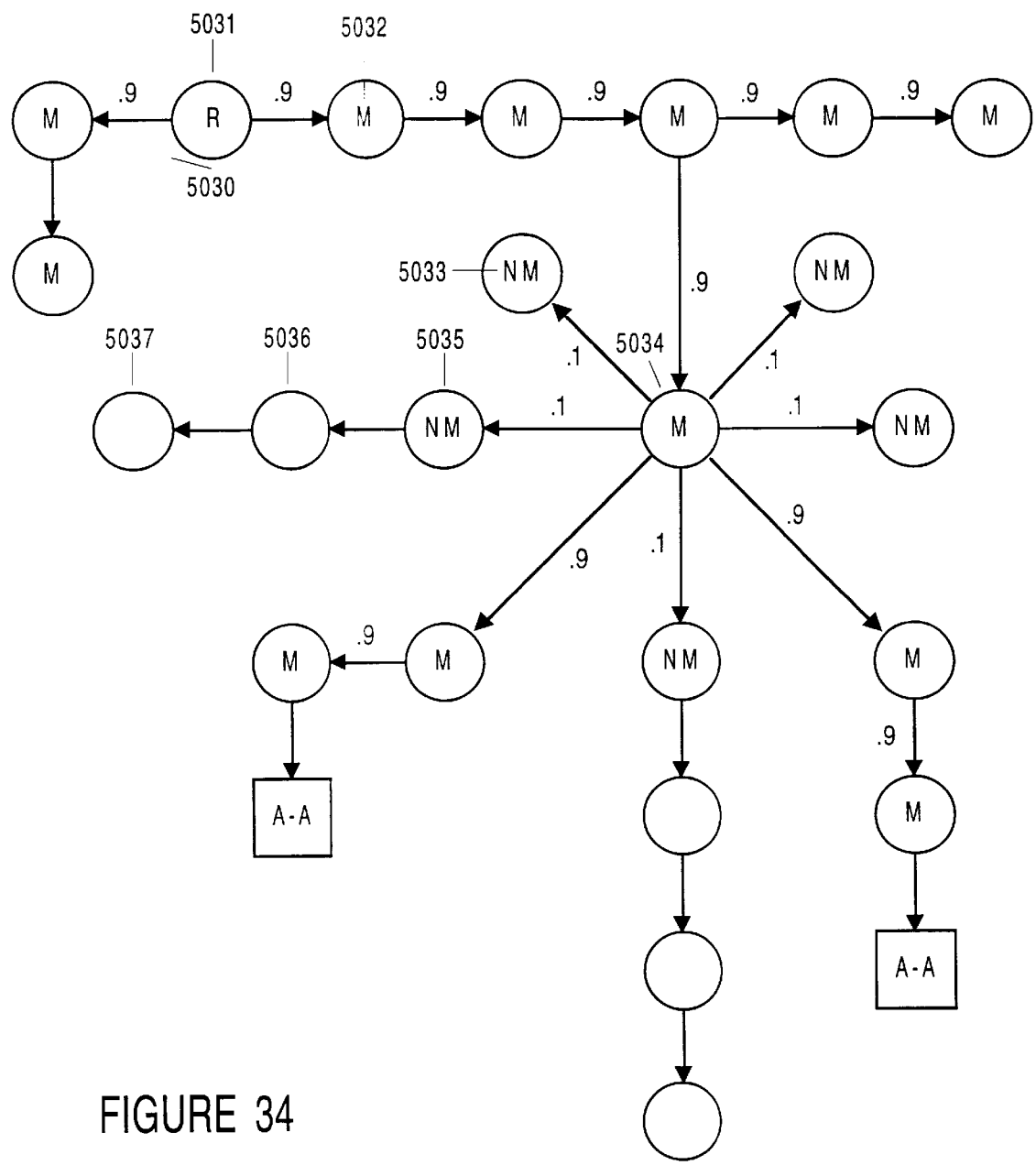
FIG. 34 shows a match path in portion of a question network.

Now, as shown in FIG. 34, let us imagine that Rex 5030 is at Qx 5031, in a large Q-net, which we only show a tiny, simplified portion of. (For simplicity's a sake, we do not show multiple links between questions and we do not show more than two links per question. In reality, Q-nets can be vast and within them questions can have, in theory, virtually unlimited direct links.)

We imagine, further, that Rex asks to see matches. AC then evaluates the semantic links using Qx as the origin of the search. The direction of the search is portrayed in the figure as arrows between questions pointing in one direction—away from Qx.

Usually, AC will not have a static probability threshold for deciding upon satisfactory matches. AC will choose some number of the most likely satisfactory answers. Thus the threshold depends on the alternatives that AC examines and on the number of matches that AC chooses.

However, in our toy example, we imagine that AC has a threshold for declaring a question to be a satisfactory match of Qx. We imagine that the threshold is a probability of 0.3. If AC finds that Qy has a 0.3 or greater chance of matching a Qx, then AC considers Qy to be a satisfactory match candidate. AC might not show the candidate because there may be many others, but the point is that the candidate makes the "first cut" in the selection process.

Each link has a match probability associated with it in a given direction. For the sake of illustration, we imagine only two different match probabilities, 0.9 and 0.1, which we show in the direction out from Qx.

Starting at Qx, AC goes from one question to the next, seeking matches. AC starts at Qx with an initial probability of matching Qx of 100%. We will call the probability that a question will match Qx by the name resulting probability. Starting with an initial probability of 100%, AC goes from one question to the next, multiplying conditionally by the link probabilities to yield resulting probabilities for the linked questions.

In other words, when AC is at a question Qi, on a path from Qx, and AC evaluates a directly linked question, Qj, AC multiplies the resulting probability for Qi by the link probability, in the direction of Qi. This multiplication gives the resulting probability for Qj. If Qj is a satisfactory match-if this resulting probability is above some threshold— AC "goes to" Qj. Then, AC evaluates the questions linked directly to Qj.

As shown in FIG. 34, AC identifies numerous satisfactory matches, signified by the letter "M" 5032, and eliminates numerous other questions, signified by the letters "NM" 5033. As can be seen, AC eliminates possibilities by not examining a path in a given direction once it finds that a question is an unsatisfactory match. For example, a "hub" question 5034 leads into a non-matching question 5035. AC then will not examine the next questions 5036, 5037 in that direction, on that path, because the probability of a match will be too low, as indicated by the first non-matching question 5035. (Actually, this rule does not always hold but, for simplicity's sake, we assume that it does.) Thus, a search down a path of questions is cut off by a non- matching question.

Note though, there can be more than one link (avenue) to a question, and therefore, even if a search is blocked from one link, the question may possibly be accessed (found in a search) from another. Since semantic links do not have any hard deductive logic defining them, a question that cannot be accessed by one route will often be accessible by another.

Match Paths (Traveling from AC's Point of View)

To explain further, we will give some names to a search that AC conducts using semantic links.

When AC starts at Qx, the current-Q, and examines questions sequentially, looking for matches along a series of linked questions, we say that AC is traveling in the Q-net. The current-Q is called the origin of the search.

Rex does not see all the questions that AC travels to (evaluates). Rex only sees the matches that AC chooses to show to him. Rex may then decide to go to one of these questions, in which case he jumps from one point in the Q-net to another (we have also called this process "going to" or "zipping to a question").

In searching for matches, AC can take many paths from an origin question. We call all the paths that AC takes from the origin by the name match path, while connected parts of the total path might be called just paths or sub-paths.

The linked questions in a match path are called stops.

Stops that AC does not show to Rex are called hidden stops.

Stops that AC does show to Rex are called displayed stops.

(Since AC can only show a certain number of questions at a time, only a certain number of stops will be displayed at first. The rest will be hidden. If Rex asks to scroll through matches then some of the hidden stops will become displayed.)

Stops that AC determines are unsatisfactory matches are called dead stops.

When Rex goes to a displayed stop that is directly linked to the current-Q Rex is making direct jump.

When Rex goes to a displayed stop that is indirectly linked to the current-Q, Rex is making an indirect jump.

Thus we have two different perspectives on traveling in a Q-net: AC's perspective, in which AC starts from Qx and examines paths of linked questions; and Rex's perspective, in which Rex can jump to matches that AC determines are best to show.

The Probability Screens Are Not Necessarily Conditional

When AC travels along more than one link on a path, it does not necessarily multiply the match probabilities associated with those links as if they were conditional probabilities. That's because how the probabilities are evaluated can depend on many factors. For example, how the links were created, and by whom, can be important.

Say, for instance, that one person enters ten questions (Q-1 through Q-10) and links them sequentially one after the other as synonyms. He might think that Q-1 is as much a synonym to Q-10 as it is to Q-2. If AC travels from Q-1 to Q-10, multiplying conditionally from one question to the next, Q-1 and Q-2 will have the highest probability of match, while Q-1 and Q-10 will have the lowest—even though that might not have been the user's interpretation. In other words, in the user's mind, the synonym relationship between Q-1 and Q-10 might not depend conditionally on Q-1's relationships with any of the intermediate questions. On the other hand, if ten different people enter questions that get linked sequentially as synonyms, then Q-1 and Q-10 might indeed be the least synonymous (have the lowest probability of matching). The same evaluation rules should not be used in both situations.

As AC travels, it might, or might not, multiply conditionally from one question to the next. Either way, it will have rules that adjust probabilities in various ways to suit different situations. We cannot suggest rules for setting and evaluating the probabilities associated with links, but only say that the possible situations are very diverse, and the idea of static, conditional probability screens does not suffice.

Dynamic Link Probabilities

The match probabilities associated with either direction of a link depend on a variety of A-stats. These A-stats change, and so the match probabilities change.

For example match probabilities can depend on whether there is more than one link between two questions. If there is one link and then another is added, for instance, the match probabilities will likely change.

Particularly important in affecting match probabilities are A-stats having to do with the usage of links. AC registers the travel that takes place on a link and the direction of the travel. When we say travel we mean AC's travel and Rex's jumps. The greater the traffic, in general, the higher probability that the link gives good information. Therefore, when a link is traveled on in a given direction, AC can increase the match probability in that direction. (AC can also decrease the match probabilities of questions that are not selected by Rex.)

However, it is also important that AC take into account whether the traveling was satisfactory. Thus AC also takes into account what Rex does at a question that he jumps to—AC registers whether Rex made an o-request, whether he got an answer, whether he complained about the answer, whether he traveled to another question, whether he complained about a link, and so on.

"Satisfaction information" can be very important in setting match probabilities (and such information can be crucial for ranking matches as well). There are different kinds of satisfaction information, of course, and the differences are important. For example, an o-request usually denotes more interest than just a simple es-request (where a user simply arrives at a question). While we cannot give any rules for evaluating satisfaction information, the point is that AC registers more than just travel along links. Any information that tells whether Rex has been satisfied or not by the matches shown can be used to alter the match probabilities. By using this kind of information to set match probabilities, AC "learns" how to use a Q-net to more successfully select matches.

Figure 35:
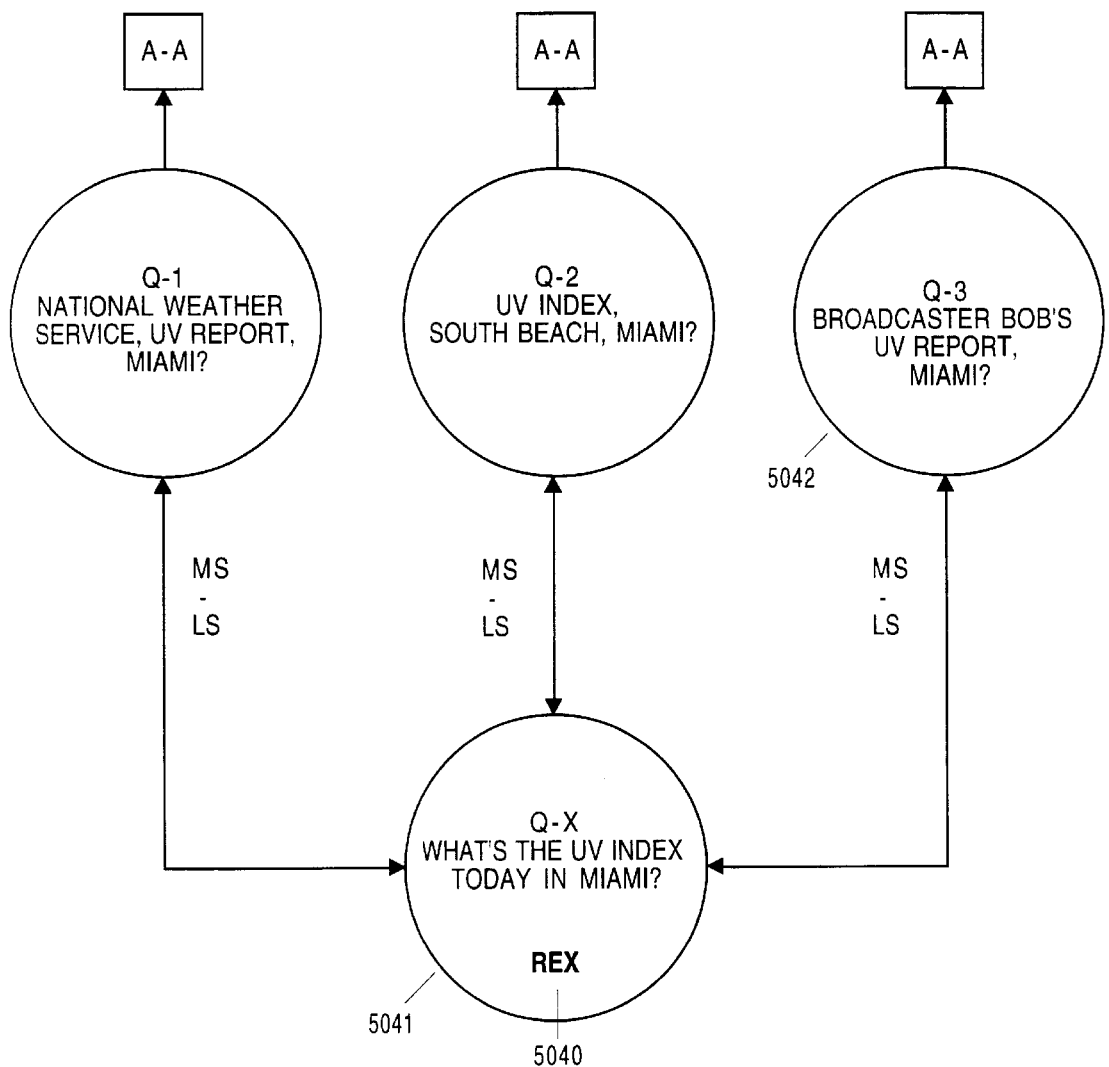
FIG. 35 shows three questions that can be traveled to from a fourth question.

As shown in FIG. 35, say Rex 5040 is at Qx 5041, and AC shows him three direct MS-Q's: Q-1, Q-2 and Q-3. Now we imagine that Rex makes a direct jump to Q-3 5042 and that he makes an o-request at that question. These actions would indicate a successful match selection, and so AC could increase the probability that Q-3 is a satisfactory match to Q-1.

The situation is a more complicated when Rex makes an indirect jump. Here there are intermediate links and intermediate, hidden stops. And so, AC can have rules for "strengthening" each link in the path that AC traveled on to get to the question (the displayed stop) that Rex jumped to. By "strengthening", we mean increasing the match probability in the direction that AC traveled in to get to the displayed stop. It's important to note that traveling does not have to include Rex's jumps. If Rex asks AC to output an answer, and that answer is an indirect answer, then AC will be the only one to travel. AC will travel to the direct question and get an answer. Moreover, AC will also register whether Rex is satisfied by the answer or not. If he is satisfied, AC can increase the match probability of intermediate questions in the direction of AC's travel. Conversely, if Rex is dissatisfied, AC can decrease the match probabilities.

It should be pointed out, though, that rules for increasing or decreasing match probabilities of intermediate stops might not be valid, because that AC cannot detect which probabilities in the intermediate path should be increased or decreased.

As an alternative to (or in addition to) strengthening the probabilities of intermediate links, AC can make a short-cut. This procedure is discussed next.

Short-cuts

When Rex makes an indirect jump from Qx to Qy, AC may make an implicit match link between Qx and Qy. When we say implicit we mean that no user has created the link. Such a link might only have one direction, from Qx to Qy—where AC assigns a probability that Qy matches Qx, but does not assign a probability that Qx matches Qy.

(Any user can create an explicit semantic link. And, if numerous Rex's go from Qx to Qy, then it is likely that one of the Rex's will link the two questions explicitly. Still, the point is that AC can by itself make a direct link between Qx and Qy indicating that Qy is a good match for Qx.)

By making an implicit link between Qx and Qy, AC bypasses the intermediate stops between the two questions. In this way, AC builds upon the links in a Q-net by making its own links. AC can travel on its own links as it would on any others when it searches for matches. In other words, rather than evaluate the intermediate questions, AC may just use short-cuts.

When AC takes a short-cut to Qy, that does not mean that AC necessarily displays Qy—AC can continue its search from that stop.

So we see, again, that semantic links create a network that AC builds upon and "learns" how to use.

Best Matching: Semantic Links Used With Other A-stats

As discussed above, AC can use semantic link information to identify a set of questions that have above a certain chance of being satisfactory matches to the current-Q or Q+. Yet AC's task is not only to identify satisfactory matches but to find the best matches. The ideal is to show Rex the questions that he would want to see if he knew all the questions and answers in AC.

So AC's task is to come up with the best set to be shown, and scrolled through. AC can accomplish this task by using A-stats (including, of course, A-A-stats of Q-A-locations) and its internal matching rules.

Rex may only ask AC to output answers, in which case Rex only sees an answer or "no answer found." Still, AC must look for a best match.

A quick digression is in order about the sequence of events. The previous discussion may have implied that AC first finds a set of satisfactory matches using semantic links, and then culls that list to find best matches. However, this sequence has only been presented in order to more clearly explain the role of semantic links. In reality, AC may evaluate questions using semantic links and other parameters at the same time. It may also narrow down best match candidates using other search parameters before it uses semantic links. There are innumerable ways of making searches more efficient. We not concerned with efficient searching here, but are only trying to get across the main functions of semantic links.

Figure 36:
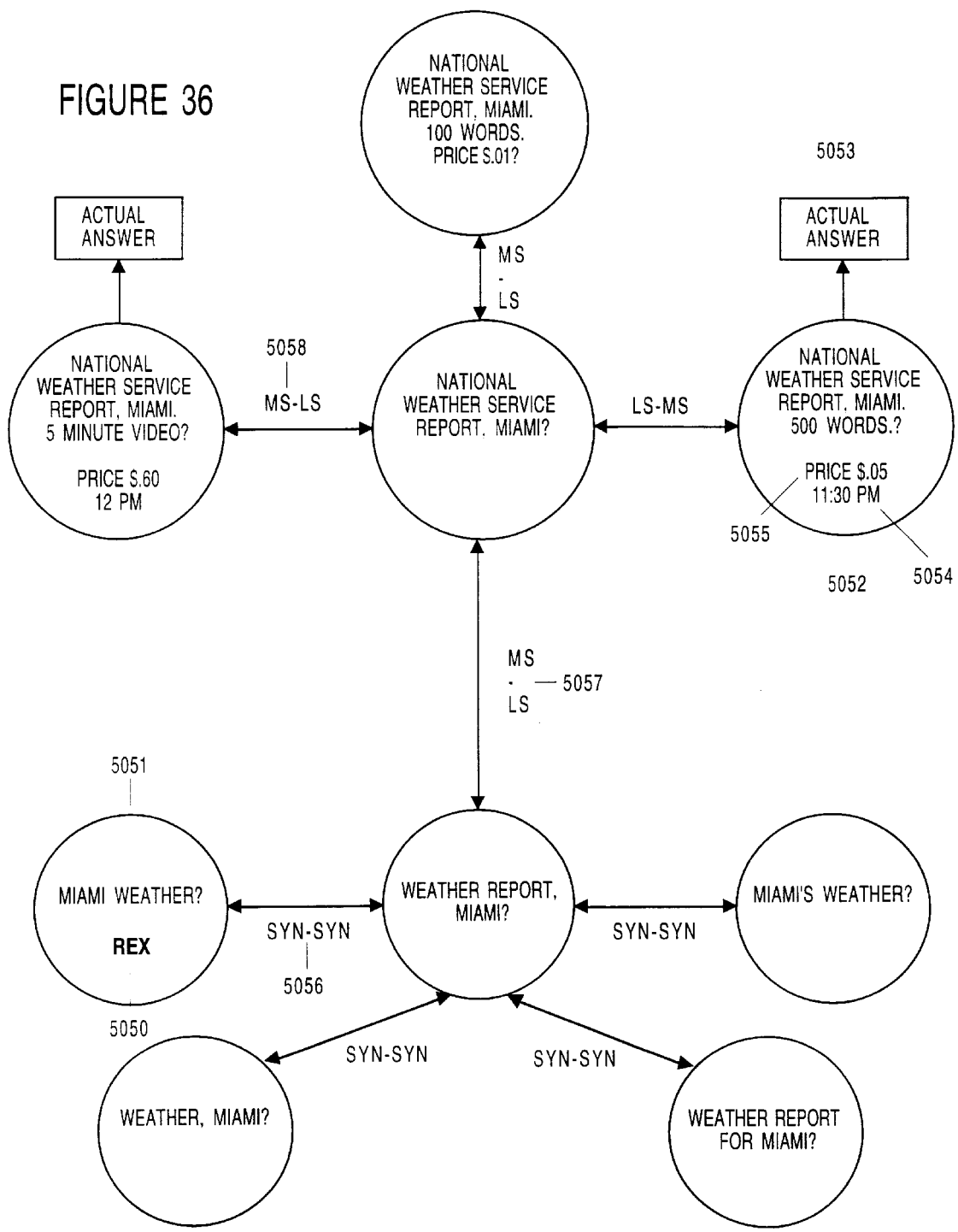
FIG. 36 shows linked match choices for a question.

Therefore, for simplicity's sake, we will assume that AC has identified a set satisfactory matches and that it now has to select best matches from that set. To illustrate, we will consider another toy example. As shown in FIG. 36, we will take nine linked questions, and assume that Rex 5050 is at a current-Q 5051. Further, we assume that AC has identified all the other questions as satisfactory matches. Finally, we simplify and assume that AC is looking for one best match.

(The main simplification, actually, is in the number of satisfactory candidates that AC would consider. In reality, there could be billions of satisfactory matches for a given question. Despite such huge numbers, A-stats enable AC to narrow down a set of matches.)

A-stats as Screens

When Rex enters A-stats (search stats) as part of a Q+, he can specify that they are optional or mandatory. If he specifies "mandatory" that means that the search stat conditions must be met. AC then screens out all questions and answers that do not meet these conditions. For example, Rex might specify that AC only show questions that have actual answers that are below $0.25. AC screens out all questions with missing answers, and all questions that have answers above $0.25. In FIG. 36, such screen would leave only one question 5052 and answer 5053.

AC will usually screen out questions and answers that do not match optional search stats as well.

Once AC screens out questions and answers that do not match search stats, it may still be left with too many matches to show at once. AC may be in the same situation if Rex has not entered any search stats. AC must then select matches to show according its rules for ranking matches that is.

(Another possibility, which we ignore here, is for AC to ask Rex for more search information.)

A-stats Used to Rank Matches

We cannot give any particular kinds of rules. Selecting best matches is like selecting contestants for a beauty pageant—there is usually no rigorous way to compare different selection criteria. For example, Rex may enter as a mandatory A-stat. actual answer in, and as optional A-stats:

time entered: after 12:00 PM 5054 price: under $0.20. 5055

Yet, in our figure, there is no question or answer that fits both these criteria. So which should AC choose? Of course, we can give no rules. As noted, the best approach to making matching rules is an evolutionary one, where AC learns to select matches to show.

(In case we have given the impression that AC must find "the" best match by ranking all the satisfactory matches, it should be noted that, in the interest of efficiency, AC will not necessarily take the time to rank all the satisfactory questions and actual answers; it might just select the first matches that it scores as "good enough," just as humans usually do when seeking something.)

Below we give some examples of the kinds of A-stats AC can use in selecting best matches and explain how they can narrow down choices, when used in default/ranking rules (this subject taken up further in section 22.5).

Whether an actual answer is supplied directly to a question. AC can default to showing questions that have actual answers supplied to them. In AC, the vast majority of questions will have no direct answers, and so this default is an important way of ranking questions.

The time an answer was supplied. Given equivalent choices, AC may default to showing the most recently entered answer. There may be, for example, millions of weather reports, but there is only one that has been entered most recently.

The POE for an answer. Given equivalent choices, AC may choose the question that has the highest POE. This demand factor indicates the answers that are wanted more than others and enables Rex's to pool their efforts.

Quality stats about an answer. AC may default to showing answers that have certain quality characteristics, such a low refund rate, or a low complaint rate, or positive ratings. We cannot describe the host of quality ratings that can be applied to actual answers, but only say that they can be crucial to determining what match questions and answers are shown. (Often Rex will specify quality screens.)

Arrival stats for a question. Especially important in choosing a match are arrival stats for a question—how many people have gone to the question as compared to the other questions being considered. The POE at a question is one indicator of interest in an answer, but traffic alone to a question can be pivotal as well. As mentioned, AC will also take into account whether the travel was satisfactory.

Destination stats for a question. Destination stats are also valuable for they tell where users have gone to from a question. Thus, when AC is trying to find matches for a question, it may default to the most popular destinations from that question. Again, whether or not the users were satisfied by those destination is key. (Note: a short-cut link that AC makes can be looked at as a kind of destination stat.)

Semantic relationship of match candidate relative to the current-Q. AC may favor questions that have certain relationships with the current-Q over questions that have other relationships. For example, AC may choose a "more complete" question to the current-Q over "synonym" question to the current-Q. The point is simply that the semantic relationship of a potential best match question to the current-Q can be used as a default, just as it can be used as an explicit screen by Rex. (Often, these relationships will be indirect. We discuss the meaning of indirect semantic relationships below.)

Aside on Using the "Logic" of Semantic Relationships

What does it mean to say that Rex asks to see questions that are indirectly linked to the current-Q by a certain kind of link? If there is more than one link separating two questions, how is AC to determine the relationship between the indirect questions? For example, if Rex is at a question and asks to see synonym questions that are indirectly linked to the current-C, how can AC find them?

AC can apply the "logic" of the semantic relationships. Semantic relationships, theoretically, have a logic of sets behind them. But, since the sets are not well defined, the logic only works probabilistically. And yet, there are no standard probabilities. Therefore, there isn't real logic. Still, AC can use the theoretical logic behind the relationships.

For example, the synonym to synonym relationship is commutative in the sense that if Q-A is a synonym to Q-B then Q-B is a synonym to Q-A. It is also transitive in the sense that if Q-A is a synonym to Q-B, and Q-B is a synonym to Q-C, then Q-A is a synonym to Q-C. By contrast, the less specific and more specific relationship is not commutative. If Q-A is more specific than Q-B, then Q-B is not more specific than Q-A. The relationship is transitive in the sense that if Q-A is more specific than Q-B, and Q-B is more specific than Q-C, then Q-A is more specific than Q-C. Most of the semantic relationships described in the next chapter have a some kind of commutativity and/or transitivity that AC can use to determine—on a probabilistic basis—the semantic relationship between indirectly linked questions.

For example, as shown in FIG. 36, if Rex is Q-1, 5051 and asks to see a more specific questions, AC can use the Syn—Syn link 5056 and then an LS-MS link 5057 which leads to a more specific question. From this question, AC can use LS-MS links 5058 to show Rex other questions that are even more specific.

Whether or not Rex explicitly states a preference for questions that have certain semantic relationships to the current-Q, AC can use the logic of semantic relationships when evaluating satisfactory match candidates to find best match candidates. As noted above, AC may favor questions that have certain kinds of indirect semantic relationships to the current-Q over other kinds.

Traveling and Getting Answers from Rex's Point of View

Now we will look, from Rex's point of view, at how semantic links can be used to travel in AC and get answers.

Figure 37:
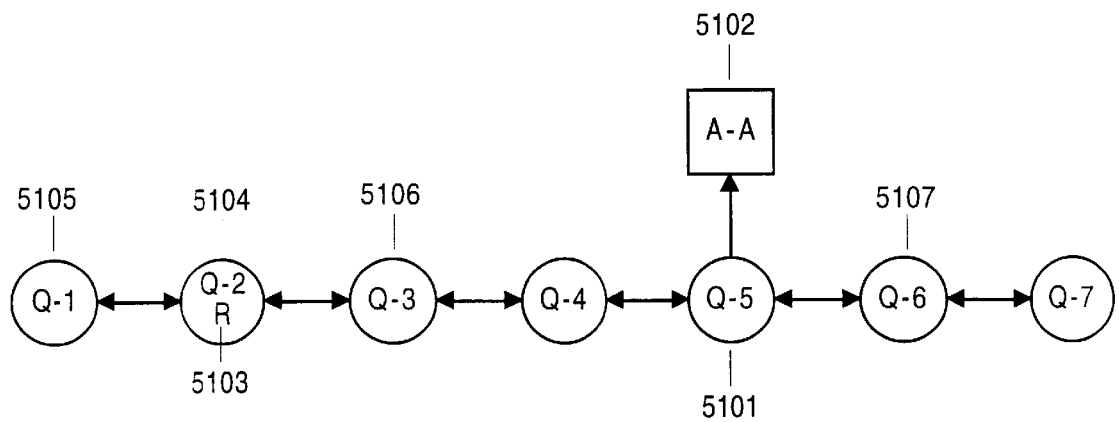
FIG. 37 shows a path for finding an actual answer in a question network.

We will take our toy Q-net of seven questions about the weather in Miami. For illustration's sake, we assume that the seven questions are linked sequentially from top to bottom by Syn—Syn links. This Q-net is pictured in FIG. 37. We will assume that Q-5 5101 has an actual answer 5102. In reality, of course, a Q-net can be vast, with a multitude of actual answers and a greater multitude of questions.

1. Rex can ask AC to show matches.

As discussed, AC can use link information to find matches to the current-Q. If Rex 5103 is at Q-2 5104, AC might show, say, Q-1 5105, Q-5 5101 and Q 6 5107 which AC knows probabilistically are matches because of the Syn—Syn links. Once matches are shown, Rex can go to one. Rex may or may not go to a question that has an actual answer. If he does go to a question with a direct answer, Rex may ask to have that answer outputted. This way to get an actual answer was called the human matched answer output path (HMA output path) in chapter 5.

2. Rex can enter new Q-specs and ask AC to show matches.

Here Rex is entering a new question, but AC may still use the Q-net Rex is in to search for matches since the new question, created by the new Q-specs, is very similar to the previous current-Q. As above, Rex can go to one of the matches.

3. Rex can enter A-stats (search stats) and ask AC to show matches.

Using the Q-net that Rex is in, AC can look for matches to the Q+. Rex can enter all kinds of A-stats, of course. Rex can ask to see answers—missing and actual—according to their popularity, cost, length, timeliness, and so on. As discussed, A-stats are key to narrowing down choices and to finding an actual answer. (Rex can ask AC to only show match questions that have actual answers.)

4. Rex can ask AC to output an answer.

Rex can choose the machine matched answer (MMA) output path, discussed in chapter 5. AC then searches for the best answer in the Q-net. At Q-5 5101 AC finds an answer by using the Syn—Syn links and outputs the answer. So, because all the questions are linked, directly or indirectly, with Syn—Syn links, Rex can land at any one of the questions and let AC find a satisfactory answer through the links.

5. Rex can enter Q-specs and ask AC to output an answer.

The points made in 4 above apply.

6. Rex can enter A-stats (search stats) and ask AC to output an answer.

The points made in 4 above apply.

As mentioned above, not only can AC use link information implicitly as search information, but Rex can use it explicitly as well.

7. Rex can ask AC to show questions that are directly linked to the current-Q. And he can specify the type of link. For example, he can ask to see direct synonym questions. (If there are a large number of such questions linked directly to the current-Q, AC must apply other criteria to determine which linked questions to show.)

8. Rex can ask AC to show questions that are linked indirectly to the current-Q. He can specify the type of link as well. For example, he can ask to see synonyms that are directly or indirectly linked to the current-Q.

9. Rex can use link information along with other A-stats, for example, he can ask to see synonym questions with actual answers under a certain price.

We have been discussing traveling in a single Q-net. But, the Q-net that Rex is in may not have a satisfactory actual answer. Therefore, AC can search other Q-nets. Moreover, AC can enable Rex to specify whether a match should be sought in the current Q-net or not.

Q-Net Statistics

AC can give Rex useful information about the Q-net he is in. This information can help Rex decide whether or not he should continue pursuing an answer in that Q-net. For example, AC can tell Rex:

how many questions are in the Q-net, how many actual answers are in the Q-net, how many questions are related to the current-Q by a given kind of relationship (AC will use the logic of semantic links when the relationships are indirect), how many satisfactory actual answers AC finds to the current-Q.

Rex's Main Search Goal Achieved

So, given a Q-net with an actual answer that satisfies Rex, Rex does not need to guess the "right" question to ask in order to find an answer. He can ask any question that AC matches tentatively to a question in a Q-net. If Rex approves of the match, he can go to the match question, which means he is in the Q-net. If that question has no direct answer, he can ask AC to output the best answer that AC can find in the Q-net to the current-Q, or Q+. Or, he can ask AC to show him the question(s) that have the best answer(s) to the current-Q, or Q+. He can go to one of these match questions, or ask to see more of them. If he goes to one, he can ask to have the direct answer outputted. So, whether he uses the HMA or MMA output path, his basic search problem is solved.

(We are simplifying above. If Rex is at Qx, a satisfactory actual answer at Qy may not be findable. We presume above that a question, Qy, with a satisfactory actual answer, is adequately linked to Qx in the sense that Qy has a reasonable chance of being found from Qx, using semantic Links. We are also simplifying in the sense that we assume that the answer outputted is satisfactory. In fact, the answer outputted might not be satisfactory. If he is at Qx, Rex has a chance of being satisfied by an actual answer that AC finds at Qy.)

As noted, Rex can travel extensively in the Q-net and see numerous match questions before he asks to see any answer. Semantic links enable him to see the best alternatives AC can find to the current Q. Thus he may find a question that describes a better answer than he originally envisioned.

Sue's Main Search Goal Achieved

Conversely, Sue does not need to supply her answer to a multitude of similar questions that a multitude of Rex's have asked. She can supply it to one question, Qy, in a Q-net, and let Qy (and her answer, Ay) be found through the questions that are adequately linked to Qy. So, her basic search problem is also solved.

(Note: We ignore, for now, whether or not Sue's answer is better than all the others that can satisfy Rex's current-Q or Q+. Our point is just that Sue does not need to supply her answer to a large number of questions.)

22.5 Searching In the Vast Bazaar

While Rex's and Sue's main problem—choosing any suitable question at all—has been solved in principle, in practice the profusion of similar questions in a Q-net means that search problems will still exist. There will be vast Q-nets with an abundance of satisfactory answers for Rex, and an abundance of opportunities for Sue. Rex will want to enter questions that minimize his time traveling to find a satisfactory answer. And Sue will want to find the most profitable question(s) she can to supply her answer to.

Vast Q-nets will also present an abundance of mirages for Rex and Sue—questions with unsatisfactory answers, and questions that seem to be profitable to answer, yet are not.

Metaphorically speaking, AC is a vast bazaar of linked stalls (signomats). The problem is that a user can only see a small number of stalls at a time, the number that can fit on a screen. Behind those that can be seen, there may be millions of stalls that have potentially satisfying answers. So how can one find what one is looking for in this vastness?

Using A-Stats

As discussed, the main solution is A-stats. A-stats enable Rex to identify a satisfactory answer to buy and enable Sue to identify a profitable answer to supply within a Q-net, because A-can drastically narrow down the possible match questions and/or answers.

Aside on the Usefulness of Popularity

It has been noted (in this book and in Book I) that D-info is important A-stat information which can be used by Rex's to find answers, by Sue's to find profitable questions to answer, and by AC to select good matches to show to users. These uses of D-info, of course, apply where Q-nets are concerned.

It should also be noted that AC can "reinforce" the popularity of questions by showing popular questions as matches more than unpopular ones. The relative popularity of questions depends on the situation. In some cases, a question might be favored over another by only one request at first, but then gain in popularity because it is shown more. The more that people go to a given question, the more AC can show it over many other suitable alternatives. The same applies to a Q-A-location.

There are innumerable ways of defining popularity, for example: most popular answers by actual sales, most popular by destination that other users have traveled to most from the current-Q, most popular by highest POE.

What may happen in AC is that even though thousands of similar questions are entered for a given answer, AC will match them against a far smaller number of "popular" questions. In other words, AC may show users certain questions far more than others, even though there is no great semantic difference between the questions. That means that a question may get thousands of questions linked to it, while a similar question may get only one or two questions linked to it. For example, there may be thousands of similar questions linked to Today's Official National Weather Service report for Miami? because this question has proven popular and the actual answer at the question has satisfied thousands of users. AC might present this question as a match for millions of similar questions. And users might then link many of those questions to this hub question.

Using a question's popularity as a selection criterion is a basic way that AC can address the problem of what questions to show, given a profusion of similar questions. As noted, the same principle applies to Q-A-locations. Popularity is a basic way of distinguishing one actual answer over others, or over potential answers.

Thus, taking advantage of popularity is a basic way that AC can reduce the work load of users. And, it is a basic way that AC can reduce its own calculation load.

Encouraging Accurate Semantic Links

Accurate semantic links are important to making searches successful. Yet it can take effort to think about and name the semantic relationship between two questions. And so, AC can compensate users for making links.

AC can treat questions and links as investments where a user is charged rent for storing a question or creating a link, but is also paid for the use of the question or the link. "Use" can mean Rex's or AC's travel through the question or on the link. "Use" can also mean that an answer is bought at a question. Royalties for the question or link can be based on connect time charges and/or on the sales of the answer. As with answers, AC may not charge storage fees, but may simply pay a supplier when a link, or a question, is used.

Some users might specialize in the making of "accurate roads" between questions. The benefit of making accurate links is obvious. But it is not worth the time to make links unless people will use them. It might only be worthwhile spending extra time to link popular, high POE, questions. (AC can include a road building mode that is distinguished from other modes or is part of supply mode. In this mode, a user's actions would not be registered as demand information.)

AC cannot in general calculate a POE for a link because Rex's would not ask for specific links to be made, as they would ask for answers. AC could tell a user how many people have specified a certain kind of linked question from a given question. A link maker could use this information. In general, a link maker would have to guess how much a link would be used, based on the two questions being linked.
Restraining Rules To making the search task easier, AC can also include functions for restraining the linking of questions. The idea is to eliminate links that would not be used.

a. AC can charge users for entering questions.

b. AC can charge users for creating links.

c. AC can have "forgetting" rules, where questions and links that are not used for a period of time vanish.

d. AC can forbid automated linking, for example, by limiting a user to creating a maximum number of links per period of time.

e. AC can have meta-rules that forbid plagiarism. Sue's may enter new questions simply to enter copied answers under them. Thus the prevention plagiarism can prevent unnecessary duplication of questions and the links between questions.

Digression on Voice Input and Output

It may seem that the multiple choices created by linked questions are suited only for screen input and output. But often people would want to use the system by talking to it, and often users might not have a screen. For example, user might want to use a plain old telephone as a terminal. Yet there is no doubt that choices are much harder to present by voice because they take time to output.

More important and seemingly difficult is the problem of entering a question and then facing multiple possible matches, especially given linked questions. But this problem can be addressed by using A-stats. For example, say Rex is at What time does the Louvre open on Tuesday? and AC has too many questions and answers that can match the question. He can then add as search stats: Please give me the most popular answer bought, under 25 cents. With these criteria added to the Q-string, AC can find a question that is in the same Q-net as the current-Q, and that has an answer that has satisfied numerous other users.

(Note: though an answer may originally have been supplied by text, it can be outputted by text-to-speech functions.)

Where voice recognition and AC are concerned, questions have an inherent advantage. They are usually short. Thus a user can enter a question by voice in multiple ways and AC can look for a best match using the multiple phrasings. Normally, voice recognition suffers from problems of interpretation, but because questions are usually short messages, multiple phrasings can enable the system to find a good match. Once the system arrives at a good match, A-stats can be added, especially those specifying the most popular answers.

Note: Answers, even long ones, can be entered by voice if AC has voice recognition functions. An answer can be confirmed by the user or "cleaned up" at a later time.

22.6 Semantic Links and Economic Goals

Having glossed over economic issues in the previous sections of this chapter, we now take up the economic problems that are posed by the endless questions reality.

We said in chapter 3 that the "organizing goal" of AC is to make good sales forecasts for answers, and that the "foundation task" is to count how many people want an answer. And we said in chapter 4 that the endless questions reality poses a problem: given that endless questions can refer to the "same" answer, how do we count how many people want a given answer? As we said, we need a way to match up questions that refer to the same answer.

Here we will explore all these notions a bit more. And we will explain the basis of how semantic links enable AC to accomplish its task and goal, in the face of the endless questions reality of natural language.

To see how, we will look at the endless questions reality from the point of view of Rex's and Sue's main economic goals. These goals are another way of looking at AC's goal of making good sales forecasts. That's because the rationale behind AC's main economic goal is to enable Rex and Sue to fulfill their economic goals. In fact, AC's goal of making good sales forecasts for answers can be thought of as a shorthand way of stating Rex's and Sue's goals. So let us discuss those goals.
Rex's Goal of Pooling Demand The previous discussion—which did not focus on the economics of getting answers in to AC—emphasized that Rex was looking for an actual answer. In fact, Rex may be looking for a missing answer. Generally speaking, when he arrives at a question, he is looking for an answer. If he finds no satisfactory actual answer at the question, then he is arriving at the question in order to express demand for a missing answer.

In doing so, he prefers, if possible, not to be alone. He would rather pool his demand with as many to her Rex's as he can so that:

1. there is a greater reward for the answer, leading to a greater chance in many cases that the answer will be supplied, and, 2. the cost for the answer, per Rex, will be less, on average.

For example, if Rex wants a weather report for Miami, he would rather not get a report that is gathered just for him. He would rather have other Rex's agree to pay for it as well, so as to share the costs of getting the report.

This goal is fundamental for Rex, and for the economic efficiency of AC, and yet it poses a problem for Rex (and AC). Rex's problem (and AC's) is to find all the other Rex's who want the same answer that he wants. He must do this by finding the questions they have asked. In other words, his task is to enter and find questions that not only describe the answer he wants but that enable him to pool his demand with that of other people. The problem is that there is no single question, or small group of questions, for stating what he wants, and thus, no single question, or small group of questions, where he can pool demand. What to do then?

Semantic links provide a solution because they enable AC to pool demand by combining demand information from linked questions.
Pooling Demand in Q-nets Q-nets—which are made up of semantically linked questions, of course—enable Rex to pool his demand with other Rex's. One way Rex can do this by asking to be taken to a popular question that matches the current-Q. (As noted, popular can be defined in many ways in AC.) A popular question may not be in the same Q-net as the current-Q, but we will assume, for illustration's sake, that it is. Such a question may have an actual answer, but we will assume that it does not because the idea of pooling demand is easier to think about if no answer has been supplied (as discussed in chapter 5, a question with an actual answer also has a missing answer, so users also pool demand on questions with actual answers).

For example, say Rex has found out, by asking AC, that no question in the Q-net he is in has a satisfactory answer to the current-Q. Say Rex is at What's it going to do outside in Miami? and only one person one has been there before. Rex might then ask to be taken to the most popular synonym question (one that is linked directly or indirectly by Syn—Syn links to the current-Q). That question might be Weather report, Miami?, which, say, one thousand people have gone to previously. By intentionally going to this question, he is intentionally pooling his demand with that of other people (though he might have other motives as well).

This kind of straightforward pooling may not be not necessary. By causing D-info to be registered at a question that is linked to others, Rex will still be causing D-info to be registered at those questions which, according to the semantic links, might describe answers that will satisfy Rex's current-Q. The D-info of the multiple questions can be combined to yield a POE for "an" answer to any of the questions. In other words, a Q-net, or a given part of a Q-net, can be thought of as a way of collecting demand for an answer.

That is not to say that every question in a Q-net will refer to the same answer. Indeed only a tiny fraction of questions might be satisfied by the same answer. It is up to AC, using semantic links, and other A-stat information, to identify which questions might have answers in common. There will not be clear boundaries about which questions refer to the same satisfactory answer. In large Q-nets, most questions will have nothing to do with one another. Only in sub-parts of a large Q-nets will questions share common answers. Thus, the principle remains that the demand for an answer can be pooled in the Q-records of linked questions.

For example, say that Rex arrives at Weather report, Miami? in the toy Q-net above. D-info registered at this question can registered at every question in the Q-net—at least in our toy example. (Normally, we cannot say exactly how many other questions the D-info will be registered at.)

More precisely we should say that D-info that has been registered at Qx can be registered at any other Qy in the Q-net, should the need arise to calculate a POE at Qy. We cannot say, in general, how many Qx's AC will pull D-info from, or how AC will combine the D-info from the Qx's but that is not our point here. The point is just that AC can combine D-info from linked questions, provided AC thinks that Rex's who arrive at those linked Qx's will buy an answer that is supplied to Qy.

Thus, if Sue is at Qy and wants to know the POE at that question, AC can pull D-info from Qx. For example, if Sue is at NWS report for Miami?, AC can give her a POE based on D-info from Weather report, Miami? and from the other questions in the Q-net. D-info from Weather report, Miami? can be used at NWS report for Miami? because if Rex is at Weather report, Miami? he may get a satisfactory answer that is a direct answer to NWS report for Miami?.

As can be seen above, while demand is combined from multiple questions, it is still expressed at individual questions. In other words, Sue must check POE's at individual questions. (AC may enable here to select multiple questions at once and ask for a combined POE. Still, the basis for the POE's is individual questions.)

The example above is a little misleading in the sense that it may give the impression that all linked questions will show the same POE. In practice, questions in a Q-net will usually have different combined demand, different POE's. It depends on the questions and the links involved. The situations are highly variable, and D-info can be combined in innumerable ways, depending on numerous factors. The matter is taken up further in chapter 25.

(Note: we do not want to give the impression that D-info is only combined for questions that are in the same Q-net. AC will combine D-info of Qx and Qy whenever it thinks that a Rex who is at Qx might get an answer from Qy. It does not matter if these two questions are in the same Q-net. However, Q-nets provide a direct way for AC to guess that a Rex at Qx will get a direct answer to Qy.)

Digression on the Importance of Linking Questions Indirectly

Indirect links allow for a vast number of questions to be related to each other with respect whether they have answers in common. AC can then identify whether two questions might share the same answers, even though those questions are separated by many links. The importance of these connections should not be underestimated: they allow large numbers of people, with AC's help, to identify common wants—whether a want is for an answer, a product, or an action (by a person or a group).

Another word for a want is a goal. With AC's help, then, people can use linked questions to identify common goals, and figure out (project, guess) how much they are collectively willing to pay, in the present and future, for getting those goals.

The reliability of combined D-info depends on the questions and links involved, and on the number of links separating questions. For example, if two questions are separated by fifty Syn—Syn links, those two questions may not even be synonyms of each other. But then again, vast numbers of questions may be linked much more closely. There will often develop questions that have numerous other questions feeding into them, which can happen especially when a question has a good actual answer. Thus a million questions may be separated by only two or three links. For example, AC might connect millions of questions to National Weather Service Report, Miami?, which we might assume has a weather report that has proven to be satisfactory to millions of users. Each question linked directly to this "hub" question is separated from another by only two links, the link that each has with the hub.

Of course we are just giving an example. Regardless of the number of links separating questions, the point is that indirect semantic linkages are a fundamental way of connecting, melding, matching, collecting, pooling, agglomerating—many words apply—"a" want that numerous people have in common.

We might say that a question entered by a single person represents the idea of "I want+a description of the thing that is wanted." We might say that linked questions entered and connected by multiple people represent the idea of "We want+multiple descriptions of the thing wanted."

Indirect semantic linkages are not necessary for pooling demand. They are only necessary, it seems, if natural language is to be used.

Exactly how demand is pooled depends on AC's rules for evaluating the links and for combining D-info in Q-records.

Why is this pooling important? Because, in order to have something produced—be it an answer, a physical product, or an action—it is often necessary to share costs. Pooling demand is often essential for finding out how many people are willing to share the costs of having something produced, and for showing how much a community wants one thing versus another.

Sue's Goal of a Good Sales Forecast

Sue's goal is to find out how much she is likely to make for supplying a particular answer. Now the answer may not be exact, like a single telephone number. It may be somewhat fuzzy, like a weather report in which she is not sure what details to include. But the point is that she has a certain answer in mind that she is fairly clear on, and she wants to find out how much she will get for supplying it.

Sue will decide what to provide based on how much she thinks she will make. For example, in a weather report, she will decide whether to include, say, ultraviolet information based on whether she thinks that including that information will be profitable. So her task is to envision a possible answer to provide. Then she must check the POE for it at a question (or questions) that it satisfies.

Yet if she wants to check the POE for a particular answer, it will not suffice to see a POE based on demand that is registered from people who have arrived at just one question. She needs to find out (get a good projection of) how many different questions her answer will satisfy, and more precisely, how many Rex's will buy the answer, and how much each Rex is willing to pay. The way she finds out about all those Rex's is through D-info that is registered at all those different questions that her answer fits. So, we are back to the problem of finding out all the questions her answer will satisfy. Then, the D-info of all these questions must be combined in some way by a POF to yield a total POE for her answer. Semantic links provide the basis of a solution to these problems.

AC's Solution Is to Combine Demand Information from Linked Questions

AC combines D-info from semantically linked questions in order to arrive at a POE for a given answer. To see how this solution can work, we will consider the toy example of our Q-net of seven questions about the weather in Miami, which we repeat below. We imagine that it is made up of only questions that are linked by Syn—Syn links. For simplicity's sake, we also assume that none of the questions has had an answer supplied to it.

1. Weather report, Miami?
2. What's the weather going to be like today in Miami?
3. What's it going to do outside in Miami?
4. How hot is it going to get in Miami?
5. What does the weather say today in Miami?
6. NWS report for Miami?
7. National Weather Service report for Miami?

Figure 38:
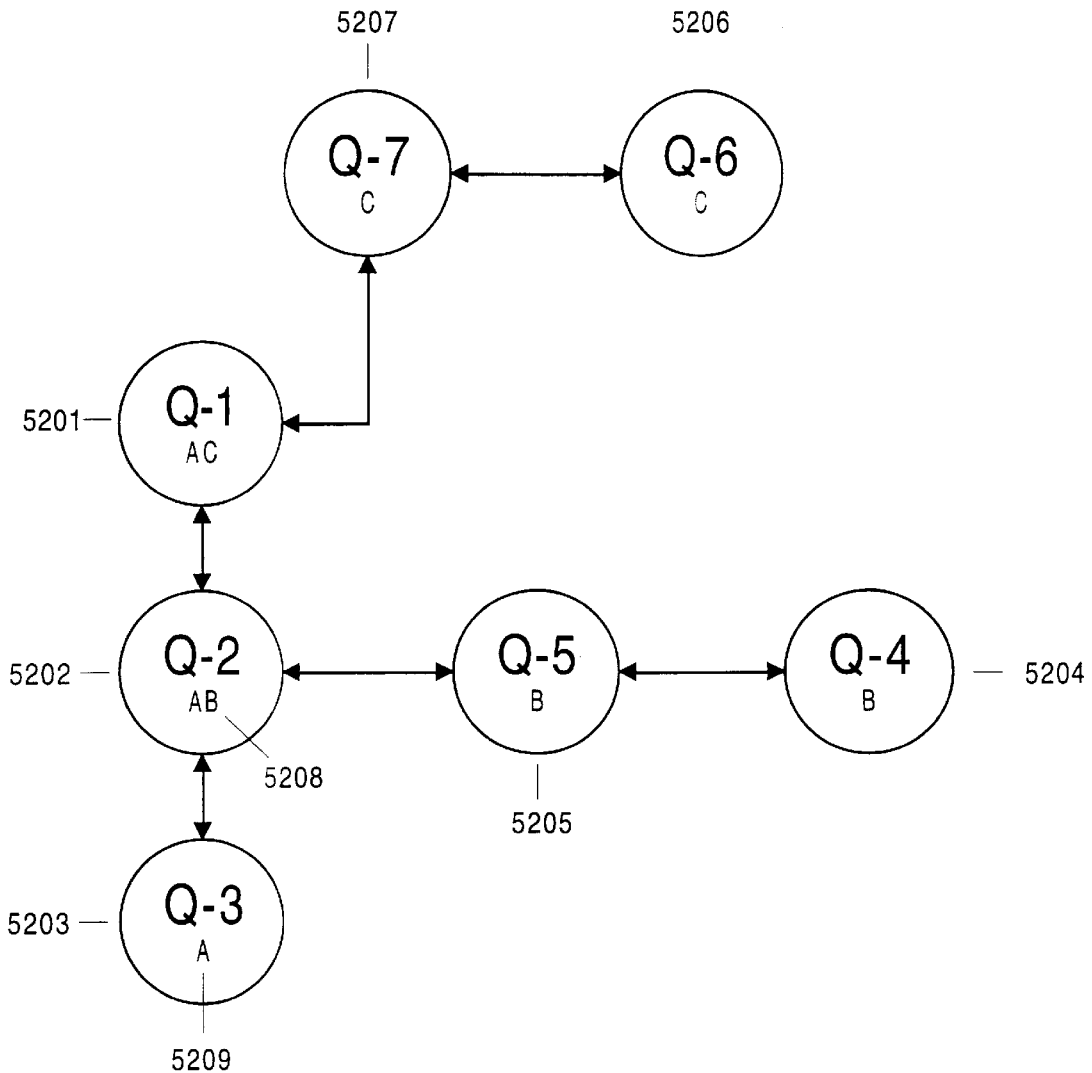
FIG. 38 shows demand information in a question network.

In order to see how D-info can be combined, let us first imagine how it came to be registered, how the Q-net was created. We will imagine that it was created by three Rex's who we will call Andy, Bill and Cal. We picture the growth of the Q-net in FIG. 38 and number each question to signify when it was entered.

Andy enters Q-1 5201 and AC finds no matches that Andy thinks are adequate, so Andy does not go to a match. Q-1 is therefore isolated in AC. Andy then presses an "Enter Syn-Q" button to signify that the next question is a synonym of the current-Q. Andy then enters Q-2 5202 and AC links it to Q-1. (Q-2 is now the current-Q.) AC finds no match for Q-2 that Andy likes. Andy presses "Enter Syn-Q" again and enters Q-3 5203 which gets linked to Q-2. We'll imagine that there is no adequate match for Q-3 and that Andy stops, so there is an isolated Q-net of three questions in AC.

Now Bill enters Q-4 5204 and AC finds no adequate match. Bill then presses "Enter Syn-Q" and he enters Q-5 which AC links to Q-4. Now, we imagine that AC shows an adequate match to Q-5 5205 which we imagine is Q-2. Bill thinks the two questions are good synonyms and so he links them and he goes to Q-2. He finds that no answer has been supplied in the Q-net though and so he stops.

Now Cal enters Q-6 5206 and AC finds no adequate match. Cal then presses "Enter Syn-Q" and he enters Q-7 5207 which AC links to Q-6. Now, we imagine that AC shows an adequate match to Q-7 which we imagine is Q-1. Cal thinks the two questions are good synonyms and so he links them and he goes to Q-1. He finds no answer has been supplied in the Q-net though and so he stops.

Now what we have is seven questions linked through Syn—Syn links. We see a total of nine es-requests (recall from chapter 5 that an es-request is one where a user has arrived at a question) because Q-1 and Q-2 have been arrived at twice 5208. And finally we see that there are three different Rex's (in the figure, the es-requests that the users' made are represented by the first letters of their names).

To combine D-info, AC needs rules for evaluating the D-info. These rules can have a great variety, so again we simplify drastically. For illustration's sake we say that AC assumes that the synonyms are "perfect" synonyms which means that the questions are interchangeable. Under this assumption, AC checks all the es-requests to determine the number of different Rex's who are responsible for them. AC then bases its POE calculation on the number of different Rex's that have arrived at the linked questions. AC does not base it POE on the total number of es-requests because six of the es-requests are double counting. They simply signify that the Rex's have asked more than one question looking for the same answer.

So, in order to calculate a POE at a given question—the POE for an answer to that question—AC not only uses the D-info registered at that question but also the D-info from linked questions. Therefore, if Sue is at, say, Q-3, she gets a POE based on three Rex's, even though only one Rex 5209 has arrived at Q-3. This count works because we have assumed that the questions are interchangeable. If a Rex is at any of the questions, he will be satisfied with Sue's answer to Q-3 (presuming her answer is a satisfactory answer to Q-3 according to Rex). Moreover, he will be able to find her answer from any of the Linked questions. Thus, Sue can reasonably expect to have sales based on the demand expressed by three Rex's and not just one.

Now that is the basic idea, but of course, the situation is more complicated in practice since questions are not exactly interchangeable. In chapter 25, we discuss some of the complications that arise.

Another Digression on the Importance of Linking Questions Indirectly

As discussed, linking questions indirectly is crucial because it allows AC to "combine D-info" about potential customers. Where natural language questions are concerned, linking questions is crucial for another reason as well: it allows Sue to see the competition—in other words, it allows her to identify answers that are alternatives to her answer.

By competition we mean actual answers and potential answers. We will explain in chapter 25 how AC can use semantic links to let Sue see the competition. For now, the point is that indirect linking of questions enables Sue to do so.

Sue needs to see the competition in order to see if her answer is better than the competition. She needs to see the competition to find out if her answer will sell enough to justify her time in getting and providing it. Thus, identifying the competition is fundamental for Sue, and for the economic efficiency of AC. From AC's point of view, the goal is to enable Sue to make as high a return as is economically efficient (though we cannot define efficiency well). Another way of putting it is that AC's goal is to reduce the duplication of efforts by its users. As discussed, this goal is hard to define well, yet it is still a central goal. Obviously, in order to reduce the duplication of efforts, suppliers need to be able to identify the competition. These matters have been discussed in chapters 8 and 14.

There is a second critical reason for identifying the competition: Sue needs to see whether she will have to share royalties with another answer (or answers)—whether she will have to pay to use or build upon an existing answer. As discussed, how much she will make depends on how much she has to pay to other answers.

Chapter 23

Kinds of Semantic Links Between Questions

In this chapter we describe various kinds of semantic relationships between questions that can be of use in AC, in the form of semantic links. We cannot precisely define any of these relationships. And we cannot be exhaustive; other useful relationships exist between questions, of course.

The relationships given here are useful for different reasons, as is best seen from looking at the relationships themselves. The basic rationale behind them all was given in the chapter 22.

All the operations for making the links described below are directly analogous to those described for LS-Q's and MS-Q's in chapter 21. While the meaning of the links is different, the mechanics of linking remain the same. The mechanics of linking were also elaborated on in chapter 22, in the discussion of the growth of Q-nets.

Two questions can be linked by more than one link. That's because most of the links are not mutually exclusive. And it's because people may think different links are appropriate between two questions.

A Less Specific Question to a More Specific Question (LS-MS Link)

We have already discussed this relationship between questions.

A Synonym Question to a Synonym Question (Syn—Syn Link)

In this relationship, two questions are meant to describe the "same" answer, the same set of satisfactory answers. For example, Synonym Q: Who wrote "Can't Buy Me Love"?
Synonym Q: What group wrote the song "Can't Buy Me Love"?

AC can enable users to grade synonym questions (Syn-Q's) according to how similar their answers are supposed to be. There might, for example, be two kinds of synonyms distinguished, a close synonym and a loose synonym.

A close synonym is one where a question is supposed to ask for the very same answer, or very close to the same answer as another question. For example, the two questions above might be considered close synonyms.

A loose synonym is one where a question is meant to ask for "roughly" the same answer as another. For example, Loose Synonym Q: Why is it easier to balance on a bike when you are moving than when you are standing still?
Loose Synonym Q: How does balancing on a bike work?
Loose Synonym Q: Why do pennies stay up on their edge when they are rolling but fall over when they slow down?

Having at least two different kinds of synonyms seems useful because of the way that people ask for answers. Sometimes were are really trying to make as close a paraphrase as we can. Other times we are just trying to get the "same" general request across.

What, again, does same mean? Well, when we make a list of Syn-Q's, we see that there is no such thing as the exact same. We might say we "have in mind" the same answer, yet if we look at the Syn-Q's and what they describe, we realize that there is no same answer that they describe; there is only a variety of satisfactory answers that we call "similar" or "very similar," or "the same". All these terms in quotes are verbal dodges that allow us to avoid speaking about our lack of understanding about how we refer to things. We do have some understanding, of course, it just isn't very clear or explainable.

As a practical matter, since we do not have any clear way of grading the similarity (sameness) of answers, it is the habits of users that will determine whether any grading of Syn-Q's is useful or not.

A Less Complete Question to a M ore Complete Question (LC-MC Link)

Two questions can have relationship where an answer to one, the more complete question (MC-Q), is supposed to always answer the other, the less complete question (LC-Q), but an answer to the less complete question is not always supposed to answer the more complete question.

This relationship sounds like the LS-Q to MS-Q relationship of chapter 21. Indeed, an LC-Q can be less specific than an MC-Q, , but it is not necessarily the case. That is because in the LC-Q to MC-Q relationship, the content of the two questions does not have to match, as it does in the LS-Q to MS-Q relationship. The more complete question does not necessarily add information to the less complete question. Superficially the two questions may not even seem to be about the same things. The user must recognize that the more complete question describes a situation that somehow can answer the less complete question. The examples below demonstrate.

Less Complete Q: Did Elvis write "Can't Buy Me Love"?
More Complete Q: Who wrote "Can't Buy Me Love"?
Less Complete Q: Is Johnny in the class?
More Complete Q: What's a list of all the students in the class?
Less Complete Q: How far is it to Chicago from Washington?
More Complete Q: Let me see a Rand McNally roadmap of the United States?
Less Complete Q: Is Paris the capital of France?
More Complete Q: What does the Encyclopedia Britanica say about Paris, France?
Less Complete Q: Is it vegetable, animal or mineral?
More Complete Q: What is it?
Less Complete Q: What's the hypotenuse of a right triangle with sides of 2 and 3?
More Complete Q: What's the formula for finding the hypotenuse of a right triangle, given the two sides?
Less Complete Q: What is the sum of the angles of a triangle?
More Complete Q: What are the main differences between Euclidean and non-Euclidean geometry?
Less Complete Q: Whose side were the French on in the Civil War?

More Complete Q: Who were the allies of the North and South in the Civil War?

A Related Question to a Related Question (Rel-Rel Link)

All the semantic links in this chapter tell about some relationship between two questions. These are general relationships in that they occur frequently between pairs of questions that we ask. For example, one question might be more specific than another. Because we understand the general idea behind such semantic relationships, we can see that an answer to one question might be an answer to another. The names given to the relationships are meant to describe the ideas behind the relationships, very briefly. The names are supposed to imply why the answers to on e question are related to the answers of another.

There are many cases where we cannot describe the semantic relationship between two questions briefly except to say that the answer to one question might answer another. In these cases, we use the poor name, Related Question to Related Question. The corresponding link we call a Rel-Rel link. A Rel-Rel link signifies that we cannot briefly and generally imply why the answer to one question might answer another question, yet that we can recognize the possibility. Examples of pairs of Rel—Rel questions, such as those below, demonstrate.

It is important to note that with Rel-Rel links, as with certain other semantic the relationship between two questions can be "one-way" in that the answer to one question might answer the other question but usually not vice versa. AC can enable the user to indicate whether the relationship is one way. For example in the first pair of questions below, the name of the restaurant may give away the kind food that the restaurant serves, but the kind of food the restaurant serves usually will not give away the name of the restaurant.

Related Q: What's the name of that restaurant on Willow Street?

Related Q: What kind of food does that restaurant on Willow Street serve?

Related Q: What's on the menu of John's Pizza?

Related Q: How much is a pizza at John's Pizza?

Related Q: Why should you correct your posture?

Related Q: What does bad posture do to you?

Related Q: Where can you get hologram stickers in the U.S.?

Related Q: Who sells high security stickers in the U.S.?

Related Q: How does a lawnmower engine work?

Related Q: How does an internal combustion engine work?

Related Q: Why is it easier to balance on a tightrope when you're walking than when you're standing?

Related Q: Why is it easier to balance on a moving bike than on a stationary one?

Related Q: What kind of sunglasses block UV rays best?

Related Q: How can you find out how well different sunglasses block UV rays?

Related Q: What actor has created lots of cool roles like Lenny and Ratso Rizzo?, Related Q: What actor starred in The Graduate and Marathon Man?, A Full Question to a Partial Question (Full-Partial Link)

Two questions can have a relationship were the answer to one question, the "partial" question, gives part of the answer to another, the "full" question.

Many times when we ask a question, we want more of an answer than we will get. Conversely, many times when we try to provide an answer, we can only give a partial response. The link between a "partial" question and a "full" question can be helpful in showing users what answer to expect from a linked question. We might say that the answer to the partial question is a partially satisfying answer.

As will be further discussed in chapter 24, this link is especially useful where Sue sees a question and realizes she can only supply part of the answer. So she enters a new question, supplies her answer to the new question and then links the new, "partial" question to the existing "full" question. For example, the full question might be Why do you get heart disease?. Sue might enter, One big reason you get heart disease?, link it as a partial question to the full question, and then enter her answer to the partial question. Some more examples of full-Q's to partialQ's are:

Full Q: What a good and cheap restaurant?

Partial Q: What's a cheap restaurant?

Full Q: What's the architect's floor plan of this Home Depot?

Partial Q: What's a rough sketch of how this Home Depot is laid out?

Full Q: How do you get to Gary, Indiana from New York City?

Partial Q: How do you get to Indiana from New York City?

Full Q: What phone numbers can Thor be found at?

Partial Q: What's Thor's office number?

Full Q: How do you make a chocolate chip cookie?

Partial Q: What are the ingredients of a chocolate chip cookie?

Full Q: Who are our ten largest trading partners?

Partial Q: Who are three of our largest trading partners?

Full-Q: Where can I buy laser cutting tools?

Partial-Q: What's one directory where you might find sellers of laser cutting tools?

Full-Q: How do you set up a company officially to do business in the U.S.?

Partial-Q: A checklist for incorporating your business in the U.S.?

Special Case Question to General Case Question (Spec-Gen Link)

Somehow the brain can abstract from example cases a pattern that is general, that applies to innumerable, similar examples. We sometimes call the examples special cases. We sometimes call the general pattern the general case.

Two questions can have a relationship where one question describes a special case answer and the other describes a general case answer. Because the general case can often imply the specific case, an answer to the general case question can often answer the specific case question. It is also possible that the answer to the specific case question will answer the general case question as well, because a person may give a general answer to the specific case question.

(In the world of pure logic, the general case solution may automatically answer the special case question. However, in the real world of questions and answers logic only works sometimes. Therefore, we say that the answer to the general case question may answer the special case question.)

We call a special case question a Spec-Q and a general case question a Gen-Q. We call the link between them a Spec-Gen link. Since we often move back and forth from general case to specific case when we ask questions, a Spec-Gen link between questions can be useful. Some examples below demonstrate.

Special Case Q: What's the hypotenuse of a right triangle with sides of 2 and 3?

General Case: What's the formula for finding the hypotenuse of a right triangle, given the two sides?

Special Case Q: How can we stop burglary?

General Case: How can we stop crime?
Special Case Q: How do people become cocaine addicts?
General Case: How do people become addicted to things?
Special Case Q: How can you balance on a bike?
General Case: What is the physics involved in balancing yourself while moving?
Special Case Q: What causes leukemia?
General Case: What causes cancer?
Special Case Q: Where can I get a chair?
General Case: Where can I get furniture for my apartment?

A Goal Question to Sub-Goal Question (G-g Link)

As discussed in chapter 4, questions can be thought of as goals. And we know that often we cannot get directly to a goal, we may have to get to a sub-goal first. Two questions can have a relationship where the answer to one describes how to get to a goal, and the answer to the other describes how to get to a sub-goal of that goal. A sub-goal answer might be wanted by someone looking for larger goal answer. And a sub-goal answer may be all that someone can supply. Thus a Goal to Sub-Goal (Gag) link can be a useful kind of link to have in AC. Some examples demonstrate.

Goal Q: How do you get to California?
Sub-Goal: Where can you buy a map to California?
Goal Q: How can you stop cancer?
Sub-Goal Q: How can you reach only cancer cells with drugs?
Goal Q: How can you build a house?
Sub-Goal Q: How can you build up a foundation for a house?
Goal Q: How can you build a house?
Sub-Goal Q: How can you hire an architect?

Match Link

When a user (especially Rex) is at a current-Q and AC shows tentative matches, the user can then select a match and go there. Now, by going to a question, the user does not necessarily mean that the question is a good match.

AC can include an option whereby the user explicitly states that the go-to question is a good match for the current-Q. For example, say Rex enters:

Current-Q: Chess results from Kasparov and Deep Blue match?and AC presents the following three questions as tentative matches, Tentative Match: The score between Kasparov and Deep Blue?
Tentative Match: Summary of the Kasparov versus Deep Blue match?
Tentative Match: The complete games between Gary Kasparov and Deep Blue?

Now, say Rex goes to the first match question. He can select it, in order to go to it, and then hit a Match Link button that AC includes to allow him to confirm that the match is a good one. AC then creates what we will call a confirmed match link (match link, for short) between the question that was the current-Q and the selected question that has become the new current-Q.

This kind of link helps AC determine what matches to show to other users. In other words, match links enable humans to validate or invalidate AC's match choices, which can then help AC pick future choices.

(Recall from the previous chapter that, regardless of whether a user confirms a match with a match link, AC can use traveling information to register user preferences for the future presentation of matches.)

A match link is like a Syn—Syn link, but a better way of thinking about it is simply that the two questions that Rex links are good matches, according to that Rex, at the time he is making the link. Here we mean good matches in the sense of AC's goal of selecting matches that Rex most wants to see, not just synonyms. Match links can help in that respect, and should not be thought of as narrowly as synonyms.

Rex might not even link that two match questions are synonyms. The question he goes to might be a better one than he thought of originally. The idea behind the link is that the go-to question describes an answer that Rex wants which is similar to the answer described by the previous question he was at. For example, taking the chess questions above, Rex might have wanted originally just to know the score between Kasparov and Deep Blue, but seeing the second question, he might have decided that a summary of the match is a better answer, the answer he really wants after all.

AC can enable users to grade matches on a scale, say 1–10, or it might have a palette of fewer classifications such as: Great Match, Adequate Match and Poor Match.

(Note: Where the making of match links is concerned, a user does not have as many options as with other links because match links are made when a user travels from one question to another. It is, of course, possible for AC to enable users to make match links at any time, between any two questions on screen.)

Rephrase Link

Searching for an answer, Rex will often enter various questions that might correspond to the "same" answer, or some of the same answers. He might not specify the relationship between two such questions except to say that they are both entered in pursuit of the same answer. AC can enable him to do this by hitting a "Rephrase" button before entering a new question. This command signifies that the new question to be entered is a rephrase of the previous question entered. The system can then create a rephrase link between the two questions. The user may further specify the relationship between the two questions later. Or he may not and the link would remain to identify the questions as rephrases of each other.

The advantage of a rephrase link is that it is easier, while pursuing an answer or a set of related answers, to hit the Rephrase button rather than think about each question's relationship to the previous question asked.

The rephrase link enables Rex to make a mini-net easily (mini-nets were discussed in chapter 22). The mini-net can then be joined to a larger Q-net. While other users can ask to see the rephrase questions linked to a given question, the main value of a rephrase link is to enable the quick construction of mini-nets which can then be connected to larger Q-nets and used to feed into those larger Q-nets. Thus, rephrase questions can enable other users to find their way into the larger Q-net, presuming that one of the rephrase questions is found and matched by other users.

To illustrate, we will assume that Rex enters the following questions and that, after each, AC shows no matches that Rex likes, until the last question is entered. Each time he sees no match he likes, he enters a Rephrase command and enters another question:

Q-1: Why is it easier to balance on a moving bike than on a stationary one?

Rex presses Rephrase and AC links the next question with the previous one,

Q-2: Why does a penny stand up while it's rolling but then falls down as it slows down?

Rex presses Rephrase and AC links the next question with the previous one,

Q-3: Why can a tightrope walker balance more easily while walking than standing?

Rex presses Rephrase and AC links the next question with the previous one,

Q-4: What about hopping, why is it easier to stay up when you're hopping on one foot than when you're standing still?

Rex presses Rephrase and AC links the next question with the previous one,

Q-5: What's the general theory of balancing while moving?

Rex presses the Rephrase and AC links the next question with the previous one,

Q-6: The physics of balancing on a bike?

Now, we imagine, AC shows a match that Rex likes, say, Balancing on a bike explained?, and he goes to this question, which might be part of a large Q-net.

The result of all these questions and rephrase links is that Rex has created a six question mini-net, a mini Q-chain. Now, Rex goes to the match question he likes which, we imagine, is part of a larger Q-net. AC does not automatically link the mini-net with the larger Q-net; it enables Rex to create a link. For example, Rex can make a Syn—Syn link between the last question he entered and the go-to question.

Even if Rex does not make a link, AC still would register that Rex went to the go-to question from the last question Rex entered, Q-6. Registering this fact predisposes AC to showing Q-6 as a match for Balancing on a bike explained? and further, tells AC that other users might want to travel along the same path. In fact, as far as showing matches, AC might weigh traveling information more heavily than explicit links made by users. As noted, how the information is weighed depends on rules that will evolve from experience.

Now, imagine that another Rex enters a question that matches a question in the mini-net. Because of the explicit link, and/or traveling information, between the mini-net and the larger Q-net, this other Rex can also gain access to the larger Q-net.

(Note: Where the making of rephrase links is concerned, a user does not have as many options as with other links because rephrase links are made when a user enters a new question and wants to link it to the previous one. It is, of course, possible for AC to enable users to make rephrase links at any time, between any two questions on screen.)

Aside on the Prevention of Double Counting

A brief aside is in order about another important use for the links discussed. These links, especially the rephrase and Syn—Syn links, are important for preventing the double counting of requests. If Rex asks, say, ten questions and links them all with a Syn—Syn links, AC can evaluate those request as a single request for an answer. That's because Rex is really only looking for one answer. But, if Rex enters these questions separately, so that they are not linked, AC may think that Rex has made ten requests for ten different answers, which can lead to false request counts.

If Rex has not connected his questions, other people might. So AC can use links that other people make to identify where Rex may have made more than one request for the same answer. Generally, where AC detects that two questions are for the same answer, AC will only count one request per Rex who has arrived at those questions, even though a given Rex may have arrived at more than one of those questions.

But this general idea is crude. How to combine D-info is a subtle problem. The topic is taken up further in chapter 27, and even there it is treated superficially. To repeat, the combining of D-info will require rules based on experience, not just analysis. The point here is just that AC uses semantic links not only for adding up requests from different questions, but also for preventing falsely inflated request counts.

Drawing of Some Screen Options for Making Semantic Links

Figure 40:
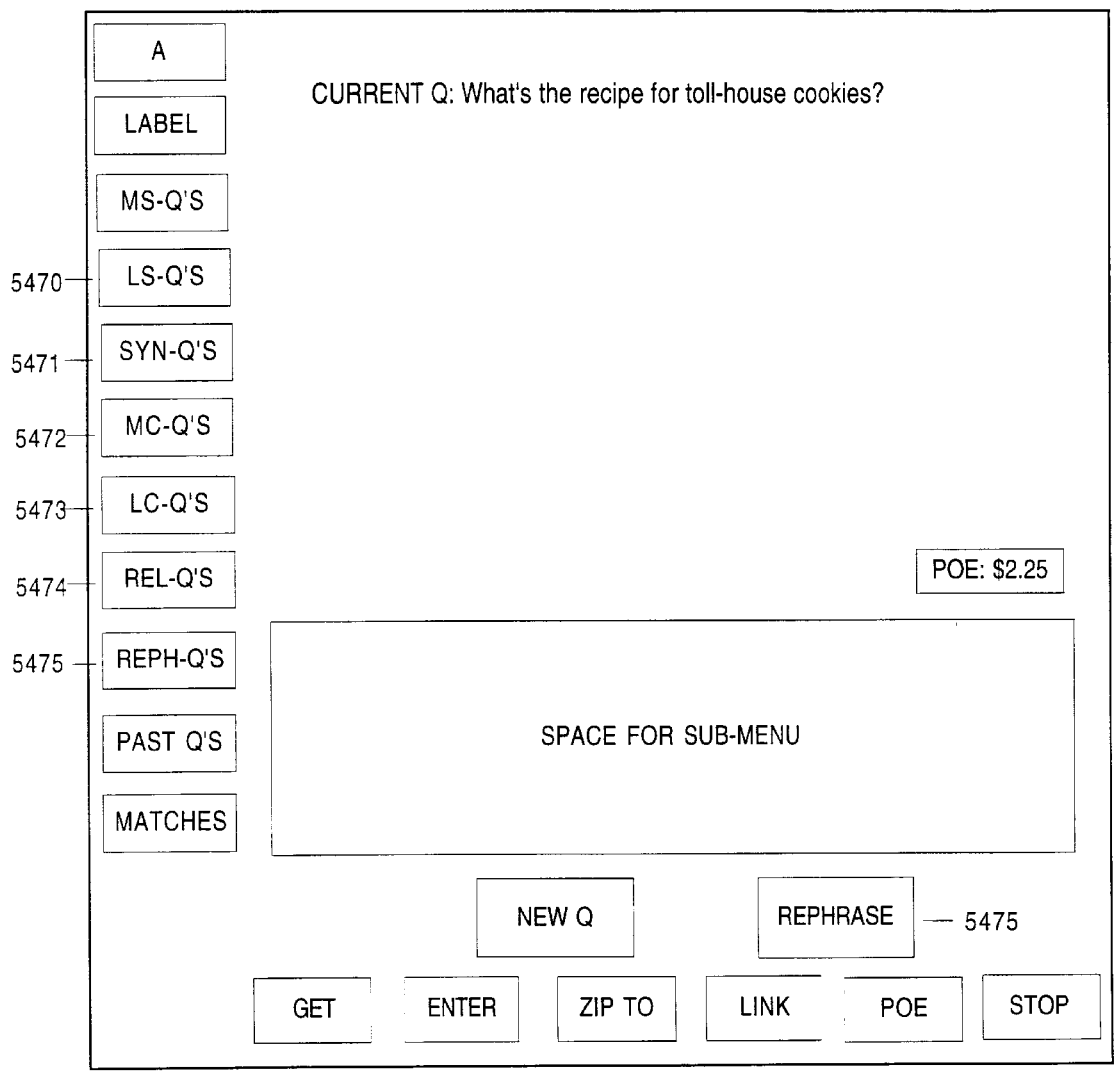
FIG. 40 shows a part of a menu for making links between questions.

As shown in FIG. 40, in addition to enabling users to enter MS-Q's AC can include options for entering and designating:

Less Specific Questions 5470
Synonymous Questions 5471
More Complete Questions 5472
Less Complete Questions 5473
Related Questions 5474.
Rephrase Questions 5475

(Note, buttons for designating the other semantic relationships described in this chapter are not shown because the figure was drawn for CIP 2. Obviously, AC can include more buttons on screen for designating the other semantic links described.)

Chapter 24

Actual Answer Links

Just as AC can enable users to create semantic links between questions, it can enable users to create semantic links between actual answers. We will call these actual answer links (A—A links). They are a kind of A—A-stat and so are recorded in Q-A-records. They are created in between Q-A-locations.

While Q links compare descriptions of answers, A—A links compare actual answers themselves. In other words, while Q links refer to missing and actual answers, A—A links only refer to particular pairs of actual answers.

A—A links are directly analogous to Q links and share many of the same characteristics. They both name semantic relationships. They both have two directions. They both can be looked at as probabilistic screens (though A—A links would generally be more reliable because they refer to particular answers rather than potential answers). They both are used to combine D-info to yield POE's for answers.

All the semantic relationships and links described in the previous chapter, except the Rephrase relationship and link, have corresponding A—A relationships and A—A links. For example: synonym answer to synonym answer, less specific answer to more specific answer, and less complete answer to more complete answer. The relationships that are the same as those between questions are the first category of relationships between actual answers. There are two more useful categories.

Negations of Relationships Between Questions

The relationship between two actual answers may be different from that described by the Q link, if any, between the direct questions to those actual answers. Two questions might be linked as, say, synonyms yet their actual answers might be very different. For example, How long is Gone With the Wind? and What's the length of Gone With the Wind? might be linked as synonyms, and yet, their actual answers might be, The movie is three hours long. and, The book is five hundred pages long . . . . These answers would not be synonyms. The questions would have been interpreted differently by different Sue's. Thus negation links, such as "not a synonym", can be useful. Each link in the first category above has a corresponding negation.

It should be noted that an A—A link that differs from a Q link does not nullify the Q link; the A—A link simply describes the relationship between two actual answers to two questions, while the Q-link still describes the relationship between potential answers to the two questions.

(Note: Semantic relationships between questions also have negations but they are not, generally, as useful as are those that refer to actual answers.)

Quality Comparison Links

Another category of semantic relationships has to do with quality comparisons. AC can enable users to make A—A links that compare the quality of two actual answers. Innumerable quality comparison are possible. Better, worse, more verified, newer, improved, better written, more up-to-date, higher probability of being true, and so on. A quality comparison link would normally be made by Sue who wants to compare her answer to another answer, though Rex could make one as well. AC would include standard names for quality comparison links, and would also enable users to enter custom descriptions that compare two answers.

Quality comparisons include those that describe a difference, a change, from one answer to another. As discussed in section 5.2i, AC can enable users to label the differences between two direct answers to the same question. Users can do the same thing in comparing two answers to different questions by using an A—A link. The link can tell how one answer differs from another.

It should be noted that as long as the direct questions of two actual answers are linked, AC itself can use quality statistics in the Q-A-records to compare the actual answers. Still, explicit A—A links about how two answers compare can be useful and allow comparisons that users draw themselves between two actual answers.

(Note: Quality assertions represented in A—A links are one way to give a new answer an opportunity to compete with an "entrenched answer." Sue can link her new answer's Q-A-location to an existing answer's Q-A-location and assert in various ways that her answer is better. Such assertions can be described in an A—A link.)

Mechanics of Linking Actual Answers

To link Q-A-locations, a user needs to identify the Q-A-locations. A convenient way is for a user to be at one Q-A-location, and then go to, or create, another and then link the current Q-A-location to the previous Q-A-location. AC can enable users to link Q-A-locations in this way.

In order to see actual answers that are linked to a given Q-A-location, a user must be at the Q-A-location or must be seeing an actual answer. Either way, AC can enable the user to call up A—A links, which can then be used to go to other Q-A locations or to get the corresponding answers themselves.

Using A—A-Links

Users and AC use A—A-links for traveling and searching, just as they can use Q links. Of course, an A—A link will lead to a Q-A-location rather than just a Q-location.

Confirming or Rejecting a Link

AC can enable users to confirm of reject (challenge) an A—A link. The same goes for the other kinds of links described below.

Question to Answer Links (Q-A Links)

Another distinct category of semantic links are links between a question and an actual answer—between a Q-location and a Q-A-location. We might call such links question—answer links (Q-A links).

The important links here are those that negate, or differ, from what is said in a Q link. That is because, as noted, an actual answer might not have the relationship to an indirect question that has been described by the Q link between the answer's direct question and the indirect question. As discussed, while a Q link may reasonably describe the relationship between potential answers, an actual answer itself may be different than expected or hoped for.

For example, say

Q-1: What kind of food does that restaurant on Willow Street serve?

is linked by a Rel—Rel link to

Q-2: What's the name of that restaurant on Willow Street? And say, Q-1 has no answer and Q-2 has the following answer: Kramerbooks.

Now, this answer may reveal to some people what food the restaurant serves, but may not reveal anything to other people. And so, for some people, the answer to Q-2 will not answer Q-1. Someone going from Q-1 to Q-2 who is therefore disappointed by the Rel—Rel link can enter a negation link (a link that tells someone at Q-1 that the answer to Q-2 will not satisfy Q-1).

Thus, as with A—A links that are negations, a Q-A negation link can prevent Rex and AC from using a misleading Q link. A negation blocks people at Q-1 from getting a particular answer at Q-2, or from going to Q-2 because of that answer. (Other answers, if any, at Q-2 may be satisfactory).

However, it should be noted that negation links do not block travel with certainty. Just because one person has entered a negation link does not mean that others will agree with it. Other people may be satisfied by what a Q link has described. And AC will register, in various ways, the satisfaction of these travelers. As with other links, then, a negation link is one factor that can be used to set match probabilities in a given direction of travel. As with all semantic links, a negation link is a clue that AC uses to help Rex find the questions and answers that will satisfy him best.

Answer to Question Links (A-Q Links)

Another distinct category of semantic links are links between actual answers and questions—between a Q-A-location and a Q-location. We might call such links answer-question links (A-Q links). These can be useful because an actual answer can naturally lead to a question. In the next chapter we will see an example of a follow link that connects an actual answer with a follow-up question. Here we only describe one example: an improvement request link that connects an actual answer with a question that describes an improvement.

As discussed in chapter 6, Rex can enter an improvement request that is part of a given question yet is not a question of its own.

Alternatively, Rex can enter an improvement request that is a question. One way Rex can do this is to be at a question, see an answer, be dissatisfied and then enter an MS-Q to the current-Q, the MS-Q describing the improved answer Rex wants. Another way is for Rex to enter a synonym question that describes the improved answer he wants.

Yet if Rex doesn't want a full new answer but just a "piece" added to an existing actual answer, then he can ask a question for that piece. For example, if a question is Weather report, Miami? and the actual answer is a weather report that does not include a UV index, Rex might be satisfied with the answer except that he wants to know the UV index. And so, AC can enable him to enter a question asking for the UV index and link that question by an improvement request link to the actual answer (to the Q-A-location of the actual answer).

UV index for Miami? will be an individual question in AC with its own Q-record. At the same time, users who get the direct answer to Weather report, Miami? can see additional questions—such as UV index for Miami?—that are linked by improvement request links. Users can then go to these, and also supply answers to these. The answers to the linked questions will have their own POE's.

Having separate questions for improvement requests can make it easier to calculate POE's.

(A user can, of course, incorporate an improvement answer within the answer it improves upon to make a new actual answer.)

Chapter 25

Combining Demand Information
How Much Will an Answer Sell?

In the previous chapter we were interested in matching up questions, based on the idea that the answer to one question might also be a satisfactory answer to a directly or indirectly linked question. Here we are interested in something else in addition to whether an answer will satisfy a question; we are interested in how much the answer will sell.

Assume a potential supplier (for convenience, we will call the user just Sue) is at a question in a Q-net. And assume Sue wants to see the POE for the answer to this question. The problem is: how can AC combine the D-info from the Q-records of the questions in the Q-net to arrive at a reasonably accurate POE.

(We'll call the question that Sue is at a check question because she is checking the POE at that point in the Q-net.)

Let us pose the problem in a more simplified way. Given a check question, Q1, linked to another question, Q2, what does a request at Q2 foretell for the sales of the answer to Q1?

Normally a check question will be in a large Q-net, not just a two question Q-net. So the real problem is what does the D-info in the Q-records of a large set of linked questions foretell for sales of the answer to the check question.

Because we are dealing with numerous questions—quite possibly thousands or millions in a Q-net—certain important problems arise in calculating the POE for the answer that Sue potentially intends to supply to the check question. We will list three key problems and then give some techniques for dealing with each.

1. Which questions will Sue's answer satisfy?
2. For which questions, and which Rex's, will Sue's answer be the best answer?
3. What percentage of the answer's royalties will Sue have to share with other Sue's.

These three questions are critical for arriving at a reasonable POE. Sue's answer not only has to satisfy multiple questions (satisfy some fraction of the Rex's who asked those questions, that is) but her answer must also be better than the alternatives that the Rex's have. Moreover, her POE depends critically on whether she will owe some other Sue(s) royalty credit based on the copy/credit rules (the property rights) of AC.

(Note: At times the emphasis in this chapter will be on projecting the sales of potential answers, yet just about every point made applies to projecting the sales of actual answers as well.)

Rules for Combining the D-info of Linked Questions

Metaphorically, we might think of a question location as a movie theater, a question as the movie title on the marquis, a Q-record as the box office, and an answer as a movie. More often than not, the movie won't even be showing, it will be a potential movie. For this metaphor, let's assume that no movie is actually showing. Now, when a patron shows up at the theater, he drops a metaphorical ticket into the box office. In this special theater, the tickets are actually questionnaires about how much patrons are willing to pay for the movie. The robot ticket taker will automatically fill out some of a ticket and the patron will also fill out some of the ticket. Our problem is, how does AC project the sales of a given movie by combining the ticket information from numerous, linked box offices of different theaters that are showing, or potentially showing, movies with different titles.

Figure 41:
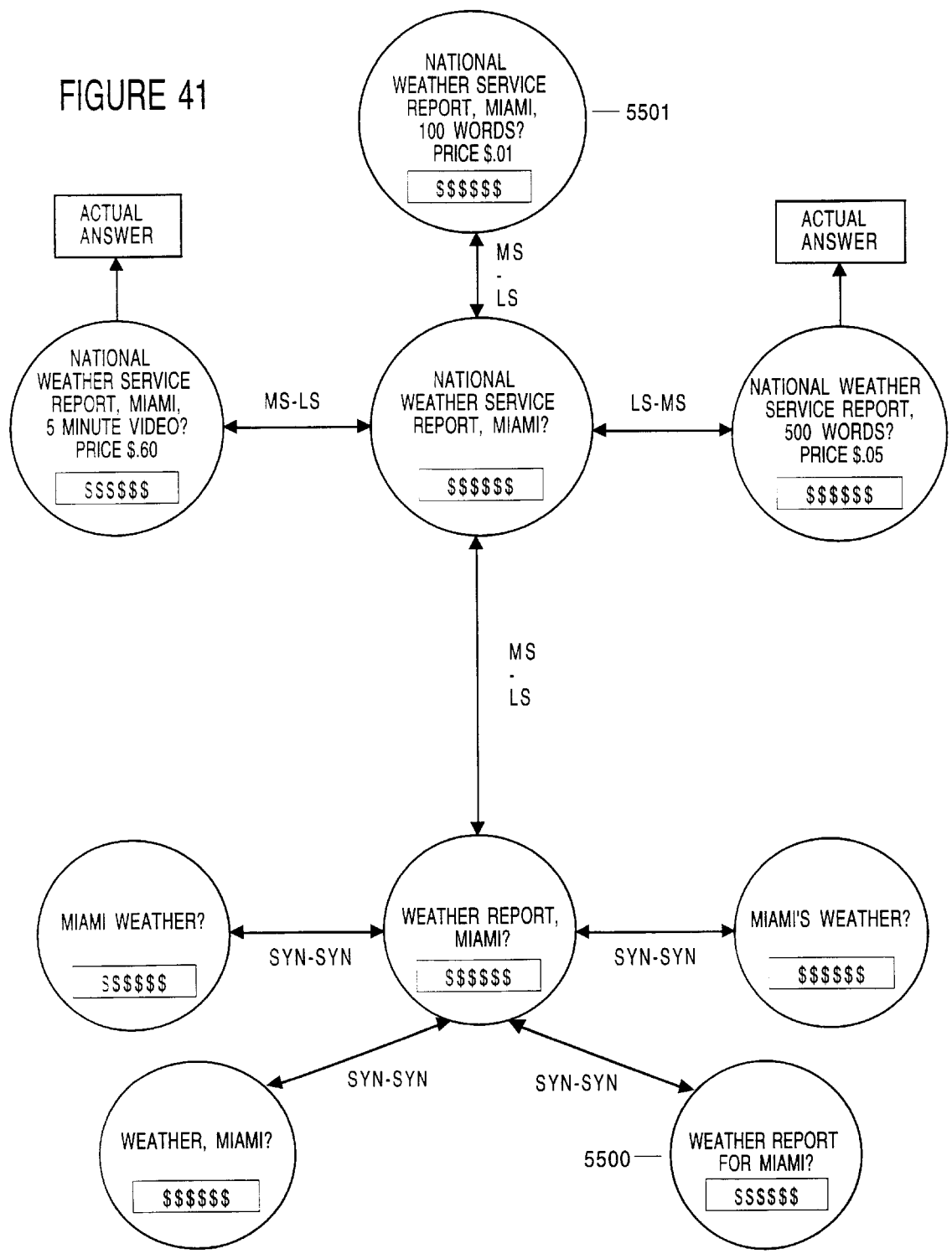
FIG. 41 shows a question network with economic aspects illustrated.

As an illustration, FIG. 41 shows a Q-net of nine questions. "Box offices" are pictured as boxes in the middle of the circles that represent questions. The problem is to figure out what the "box office" information at one question, say, Weather Report for Miami? 5500 will foretell for the sales of an answer to another question, say, National Weather Service Report, Miami, 100 Words? 5501.

When we say that AC "combines" D-info from different Q-records, we mean that a POF uses D-info from the Q-records of multiple, linked questions. Now that is not telling anything about how a POF might use the D-info collected from different questions. Still we can't say many specific things about how a POF combines D-info.

We can make certain generalizations. For example, we can say that a POF would use request information on a probabilistic basis. But that is true regardless of whether the D-info comes from a check question or from a linked question. We can say that a POF would include rules for canceling phantom requests, where a user has arrived at numerous linked questions but only wants one answer. But such generalizations don't tell much. The fact is that POF's for Q-nets—POF's for combining D-info from various questions—have not been invented yet.

So, in this chapter we will not be focusing on POF's, but on how Sue can help AC to arrive at POE's for answers to questions in a Q-net.

Sue's Feedback Can Be Crucial

The main message of this chapter is that Sue's feedback can be crucial in helping AC arrive at a POE for Sue's answer. How so? Well, to solve the three problems above, Sue's human knowledge can be critical.

(In Chapter 9, we discussed Sue's role in adjusting values in a POF. Here we are talking about feedback that applies to Q-nets.)

Recall, AC does not know that Sue's answer will satisfy a given question. AC makes a probability judgment based on averages from large statistical samples. But Sue's answer is a particular answer and she can tell better than AC whether her answer will satisfy particular questions. And so, AC can enlist Sue's help in evaluating whether her answer will actually satisfy the questions in the Q-net that AC guesses it will satisfy. Sue's judgment will not be perfect of course, because she cannot know how many Rex's her answer will satisfy ultimately, yet her judgment should, on average, be better than AC's.

Moreover, Sue's knowledge will usually be better than AC's in judging whether her answer is better than competing answers, especially competing actual answers.

Let us first consider Sue's role in solving problem 1 above, the problem of evaluating how many questions her answer will satisfy.

Having Sue Sample a Q-net

Sue cannot check every question that AC pulls D-info from, the Q-net will usually be too big. AC usually must show her a sample.

For the sake of illustration, let us imagine that Sue's check question is in a Q-net made up solely of 10,000 synonym questions. Let us further imagine that AC assigns Sue's answer a 50% probability of answering each individual question in the Q-net. AC can show Sue a sample of the questions in this Q-net and ask her what questions she thinks will satisfied by her answer. She can then mark the questions that she thinks her answer will satisfy—yielding a percentage. AC can then take this percentage and adjust the probability assumption it has made.

Of course, not all links in a Q-net will be Syn—Syn links. But the principle remains. AC uses semantic links to come up with guesses about the probability of an answer satisfying questions, and Sue helps AC adjust those probability guesses.

In showing a sample of a Q-net, AC will probably favor popular questions. As previously noted, using popular questions is a key way to reduce not only AC's calculation load but the work load of users.

Of course, AC does not assign each question in a Q-net the same probability of being satisfied by Sue's answer. AC will assign differing probabilities to questions based on the semantic links involved and on a variety of factors. Thus, AC can arrange questions in a probability distribution. For example, AC can put questions with a 80–90% chance of being satisfied in a group.

AC can then show Sue questions grouped by probability interval and have Sue say what percentage of each group she thinks will be satisfied.

(AC does not have to present questions grouped by probability intervals. It can present Sue a mixed bag of questions that have widely different probabilities assigned to them.)

Regardless of how AC presents a sample or samples to Sue, AC must adjust its probability guesses at various intervals. For example, if AC shows Sue a sample of 100 questions that it thinks have a 10% chance of being satisfied, and Sue thinks that only 1 of these will be satisfied by her answer, then AC knows that it has to adjust the its probability estimate for the interval around 10%, and further that is has pulled D-info from too many questions in a Q-net.

Thus, Sue's feedback not only helps AC adjust its probability estimates for the match candidates it picks, but helps AC determine how wide it should look for match candidates in a Q-net. And so, Sue's feedback can help AC solve problem 1 above.

Seeing and Analyzing the Competition

In attacking problems 2 and 3, sampling a Q-net is not as important. Their solution is mostly a matter of seeing the competition. AC needs to show Sue the most likely competitors to her answer. (Her answer may be potential or actual.) Sue can then pop back to AC what percentage of people she think will prefer her answer.

To find the competition, AC would employ various methods. Primarily, AC would search for answers that are good matches for the check question. Among these, AC would show:

a. Actual answers that have high POE's.
b. New actual answers even if they do not have high POE's (an actual answer might not have a high POE and yet still be an important competitor).
c. Missing answers that have high POE's.
d. Missing answers that are covered by a reservation rights (answers that people have committed to supplying that is).

(Note: AC might also show preference data that AC can enable Rex's to enter. By preference data we mean that AC can enable Rex's to state preferences between answers. This point has not been discussed previously but it should be noted, as this kind of information can be important.)

We can think of the contest between Sue's answer and other answers as a contest between movies. AC keeps track of which movies people go to and which movies they prefer to go to, given choices among movies. Thus, AC can show Sue the main movies that will compete with hers and she can respond as to how well she thinks her movie will do.

Competitive answers are a critical factor in a POF. AC must have default assumptions about how competing answers will steal sales from Sue's answer. And yet these assumptions will usually be crude. Although her estimates may be crude as well, it is often better for Sue to adjust these assumptions, at least where the key competitors are concerned.

Another important factor is the probability that a new, better competitor will arrive at some point in time. While Sue may not have any good ideas about this, she may have better ideas than AC.

Finally, but not of small importance, is royalty credit. Seeing alternatives, also is necessary from a credit standpoint. Sue must see the answers she might owe royalty credit to. Linked questions enable Sue to see who she might owe credit to. In addition, if she has entered an answer, they enable her to spot pirates. AC can alert her when answers are stealing sales ways from her answer. She can then examine the competing answers and see whether they owe her credit.

(AC might assume that Sue gets full credit, allowing Sue to lower that figure if necessary. As discussed, Sue is the one who needs to assign the credit AC cannot figure out whether her answer should include royalty citations to another answer.)

Polling Rex's

To help solve problems 1 and 2 above, AC can also enable Sue to poll a sample of Rex's directly. She can then solicit their opinions as to whether the answer she is thinking about supplying will satisfy them, and whether they will prefer it to the alternatives. She can, of course, ask Rex's any relevant D-info, such as how much they are willing to pay for her planned answer. She can then use this personally polled D-info to give AC feedback for calculating a POE.

Chapter 26

Follow Questions, Situation Stations and Elaboration Lists

Quick Recap

Speaking generally, we can say that the purpose of semantic links is to enable people to describe and find answers that they mutually want. We accomplish this goal through semantic links in two general ways. One, in some cases we take advantage of the way that people naturally ask questions, for example the fact that they rephrase questions (and so we have a rephrase link). Two, we enable people to describe a relationship between two questions where that the answer to one question might also satisfy the other question, for example, two synonym questions might have answers in common.

The point is not to repeat previous material but to say that AC can also include useful semantic links that describe semantic relationships between two questions where the questions do not have any answers in common. We do not mean the negations of relationships already described, we mean that additional semantic relationships exist that can help people find answers they mutually want. We will describe one such relationship and link below.

Spur Answers to Follow Questions (Spur-Follow Link)

The key, new relationship we have in mind will be called a spur-follow relationship, and the corresponding link will be called a spur-follow link (follow link). A question that follows another question, or follows an answer, will do so through a follow link, and that question will be called a follow question. The question or answer that it follows will be called a spur question or spur answer.

The idea of a follow-Q is a familiar one, the more conventional term being a follow-up question. In other words, a follow question is a second question that occurs to someone who asks a first question. Or, perhaps more commonly, it is a question that occurs to someone upon seeing or hearing an answer.

For example, a person might ask, What is the National Weather Service report for Miami today? and upon getting the answer might ask a follow-Q, How does the National Weather Service gather its data?

A follow-Q is like any other question in that it can be connected to other questions by any kind of semantic link. It is a follow-Q only relative to a given spur-Q or spur-A. The follow link is simply a new link that shows that a relationship exists between two questions or between an answer and a question. This link is useful because more than one person who finds an answer might have the same follow-Q occur to him. Likewise, more than one person who asks a question might have the same follow-Q occur to him. Thus, a follow link can help people describe and find answers they mutually want.

In order to link two question by a follow link, a user takes the same basic steps as with linking any other questions. However, it should be noted that a follow-Q is probably more often connected to a Q-A-location than a Q-location. In other words, follow-Q's probably follow actual answers more often than questions. So, when a person sees an answer, he can press a follow-Q button before entering a question. The question that is entered next would then be linked to the Q-A-location for the answer, and could be called up on screen when anyone sees that answer. A Q-A-location can be connected to any number of follow-Q's.

(Note: AC might not show a list of follow-Q's at a Q-A-location without also showing the answer. The reason is that sometimes the follow-Q will give away the answer. Further, the follow-Q, if it is spurred by the answer, will have less context without the answer.)

Using D-Info from a Spur Question's Q-Record

D-info from a spur-Q record, including information about travel on the follow link, can be useful for estimating the sales of the answer to the follow-Q. We will call this answer a follow answer, relative to the spur-Q or spur-A. The D-info in the Q-record of a spur-Q is used by a POF probabilistically to help estimate the sales of a follow answer. In other words, taking our example above, information about usage of the follow link, along with D-info in the spur-Q's Q-record, tells AC that some percentage of people who want the answer to, What is the National Weather Service report for Miami today?, will also want the answer to How does the National Weather Service gather its data?.

Situation Station

Let us return once more to the question, What is a question?

We have said that a question is a description of an answer. Another way of looking at a question is to say that a question is a description of a situation plus a description of a "missing" part—the missing part being the answer. For example, you may ask, In this large hardware store, where is the bathroom?. This question describes a context, the hardware store you are in, and describes an additional part that is wanted, the location of the bathroom. Loosely speaking, we might say that a question is a picture plus a description of a missing part of the picture that is wanted.

The key thing to realize is that an answer does not stand alone. An answer fits within a situation that a question describes. We usually take this aspect of questions for granted. Questions are often short because we don't have to spell out the context. For example, when we are in a store and we ask an employee, Where's the bathroom?, we don't have to tell the employee that we mean the bathroom in the store, or that we mean the closest bathroom, or that we mean by foot, or that we mean a lot of other things. The question is short, but if we had to spell out all our assumptions the question would become quite long.

(A question is often unclear because it does not give enough context. That is why a more specific question is often needed. An MS-Q provides more information about context, about a situation. The point is not to take up MS-Q's again, just to see their role from a slightly different angle.)

Now, some questions require only a little description of context, others require a lot. In normal conversation that is not a problem because two (or more) people build up a context in the conversation, while at the same time keeping track of the context. That is a great feat of intelligence.

To save effort, people can, and do, use a trick called pronouns. Questions are kept short by the use of pronouns and by the understanding of the context being discussed. For example, a patient and a doctor can be discussing the patient's sprained ankle, and they can have a conversation full of questions without repeating the term sprained ankle and without repeating the many circumstances surrounding the sprain.

In AC the whole point is to match up questions and so it is not so simple to use pronouns. The pronouns in the abbreviated questions must refer to some description that AC can match. For example, if a person enters, How long should I rest it?, AC will have no idea that it refers to an ankle with a grade three sprain that has been described by numerous symptoms. The person will need to enter a description of the sprained ankle in order for AC to find a match. And yet, if a person has a series of questions about the same context, the same situation, say the ankle with a grade three sprain, then it is a big nuisance to have to repeat oneself.

To be user-friendly, AC should not have to make people who ask a series of questions about the same situation repeat themselves. In effect, AC should allow them to use pronouns. How though?

The solution is to split a question into two parts: one a description of the situation, and the other a description of the missing part of the situation, the answer part.

We will call the description of the situation a situation station. Why? Because the idea is that people meet at—travel to, find—a situation and then branch off to different abbreviated, questions attached to that situation. We will call these abbreviated questions by the name satellite questions. Answers correspond directly to the satellite-Q's, not to situation stations.

Situation stations can be short or long. We will give an example of a brief one below to illustrate the idea.

Situation Station: I want to start a business selling information online and I would like to be able to accept payments by credit card.

Now, a user can attach a number of satellite Q's such as:

Who sells the necessary machinery?

How much does it cost to get set-up?

How can you get set up within two weeks?

What kind of credit rating do you need?

What are some tricks for getting approved?

And so on.

A user would enter a situation station and then press a satellite-Q button in order to enter a satellite-Q to be linked to the situation station. A user could also arrive at an existing a situation station and enter a satellite-Q. Likewise, AC can enable a user at a satellite-Q to enter a new satellite-Q to be linked to the same situation station.

AC can take a user to a situation station just as it can take a user to a question. In order to go to the situation station, the user may enter a situation station, or the user may enter a question. The user may or may not have to specify whether he wants to go to a situation station. He may also identify the situation part of a regular question and ask AC to find the best match. There are no hard and fast rules.

That's because even though a situation station cannot have a direct answer, it is very similar to a question and is treated almost the same way by AC. Therefore:

1. A situation station is entered like a question, it is stored like a question, and it can be found like a question. The satellite questions attached to a situation station are found by AC using the information in the situation station. Further, AC can take users either to a situation station or to a satellite-Q directly.

2. A situation station has a demand record (a record of people who have traveled to it). This record is not as directly useful as a question record but it can help users to intuitively guess roughly how many people might want an answer. For example, if 100,000 people share the same situation, say a grade three sprained ankle, then they will have many of the same questions in common. Knowing that 100,000 people have arrived at a situation station, a person might be able to guess that a certain answer pertaining to that situation would be valuable to numerous people.

(Note, satellite-Q's would have Q-records just like any other questions. A satellite-Q is just an abbreviated question. It includes the situation station part for the purpose of registering Q-info.)

3. Situation stations can be semantically linked to other situation stations by the same kinds of links that we have described previously. Situation stations can also be connected to questions.

Note: Satellite-Q's can be connected to questions as well. But, while a satellite-Q can be directly connected to a regular question by a semantic link, AC would also show the situation station part of the satellite-Q when a user travels to the satellite-Q from a linked, regular question.

Questions as Situation Stations

It is important to note that a question itself can be used as a situation station in the sense that it can be used as context for a linked, abbreviated question. AC can have means for letting users designate a question as a situation station relative to a linked satellite-Q. For example, say a first question is, What is the best time to have intercourse, if you want to get pregnant, according to NIH?. Now, a satellite-Q might be, And who says so at NIH?.

(Obviously, this question can be considered a follow-Q as well. Follow-Q's can often be made into satellite-Q's. But not all follow-Q's are satellite-Q's.)

We saw the idea of a question being used as context for another question in the discussion of restricted MSQ. However, the principle is more general and can apply to any question.

A second question that uses the context of a first question can be looked at in two ways. One way is to think of it as an MS-Q. This way is appropriate if the questions are combined in the sense that a user is looking for two answers. For example, combining the two questions above we get the single question:

What is the best time to have intercourse, if you want to get pregnant, according to NIH?, and who says so at NIH?

This question is compound question, an MS-Q relative to the first, less specific question.

Usually, a better way to look at a second question that uses the context of a first question is not as a compound question. Usually it is better to look at it as its own abbreviated question, simply as a satellite-Q using the situation described in the first question. This view seems more natural because the second question—Who says so at NIH?, in the example above—is really looking for one answer. By contrast, a compound MS-Q is really looking for two answers.

Answers as Situation Stations p As the example above implies, answers can also be used as situation stations, and most conveniently, where follow-Q's are involved. Thus, the answer to, What is the best time to have intercourse, if you want to get pregnant, according to NIH?, can be made a situation station, which can then have satellite questions. Say the answer is, The week before ovulation. A satellite-Q might be, Who says so at NIH?.

(As noted, a follow-Q is not necessarily a satellite-Q. In the case above, How do you know when ovulation occurs? would be a follow-Q but not a satellite-Q.)

Digression on Multimedia Questions and Situations

A question can include audio as well as visual content (a point made by James Dix). Thus AC can enable users to enter "multi-media" questions that include text and sound and visual content. We do not delve into this possibility except to say that the description of a situation can obviously be enhanced by, or may require, audio or visual content. And we also note that the method of semantic links applies to the matching of multimedia questions and situations.

Elaboration Lists

Elaboration lists are a simple idea based on the fact that when we ask a question we often don't know enough to pose the question well enough to get a good answer. We see this most clearly when we have a conversation with an expert, say a car mechanic. Imagine that your car has broken down and you've been told that your head gasket is blown, and you want to know what to do. So, you ask a question, What should I do now that the head gasket is blown on my car?.

Well, to answer this question, a person would need more context. Your situation must be built up. Thus an expert, the car mechanic would ask you a series of questions about the condition of your car. He would ask you to elaborate. The list of conditions might be called an elaboration list. He might ask you:

what the make of your car is,
how old the car is,
how many miles it has on it,
whether the engine block is cracked,
how much you want to spend on a repair,
whether you are willing to buy a re-machined replacement part,
and so on.

Normally, in an everyday, real time conversation, your situation is described by a back and forth questioning and answering process. But, AC is not a real-time machine (it can be in special circumstances) where people engage in back and forth conversations. An elaboration list substitutes for that conversational process.

An elaboration list that is attached to a question can help a user create a more specific question (a more specific situation) from which the user can get answers.

AC can enable a user to enter an elaboration list to be linked to a question. So then, when Rex is at an initial question, What do I do about a blown head gasket?, he can call up an elaboration list. This list would contain a series of questions that Rex can fill in. The answers to those questions can be added to the initial question by Rex. (It is possible to automate the process so that the answers Rex gives to the elaboration questions are automatically incorporated into his initial question.)

Now, why would someone enter an elaboration list? Well, the person who enters such a list could be paid for the use of the list. A person would normally enter an elaboration list to be linked to a question when the question is a popular one. The same elaboration list can be linked to any number of questions.

User's could collaborate in entering the questions in an elaboration list. That is not really the point here.

The point is that an elaboration list is sort of like a record of a conversation between a person who wants an answer and an "expert". The person will usually ask a question that is too vague and the expert will usually have to ask the person various questions to find out what the person needs to know. These questions, in effect, can be recorded for use by others. In this way, a new Rex can easily see what to ask because some other Rex has gone through the process of finding out what to ask—gone through the process of building up an adequate description of the situation he wants an answer about.

Chapter 27

Multi-Lingual Q-nets

This chapter will be brief. It is about how a Q-net can be used by people speaking different languages and about how a Q-net can be made up of questions and answers in multiple languages. The basic ideas are simple. As in Chapter 15, we will take the case of two languages, English and French, where English is a central language and French is the language the is being translated into English.

The Central Language Model Applied to Q-nets

We will first consider how the central language model can be applied to Q-nets. Let us say Rex, a French speaker, is at a question in Q-net that is made up of English questions. The problem is: How can he travel in the Q-net when the questions are all English.

The central language model can be applied in basically the same manner as was described in Chapter 15. Let us say Rex is at, What time does the Louvre open?

In fact, he will not be at this question, he will be at the translation since AC will have presented him a French translation that he will have selected or confirmed. So, he will be at, say, A quelle heure ouvre le Louvre?

Now, let us say that the English question is linked to two MS-Q's:

What time does the Louvre open on Saturday? and

What time does the Louvre open on Sunday?

Now, AC simply translates the questions into French and presents them as MS-Q's. Rex can then travel to one of these if he likes. He will find himself at a French question (that has been translated from the English).

He cannot confirm that the translation is a good one, but the fact that the question is an MS-Q can give him a good hint as to whether the translation is any good.

The same principle applies, of course, with other kinds of linked questions.

Rex can also enter a French question to be linked to an existing English question. The French question will simply be translated into English, and then stored and then linked to the English question.

Adding a Question in a Suburb Language

Now let us say that English is the central language and that French is a suburb language. The problem then is: How can AC enable Rex to add French questions to the Q-net. Again, the solution was in Chapter 15. AC simply makes translation twins. Thus, when Rex enters a new question in French, AC stores it in French but also makes and stores an English translation.

So, when Rex is at a question in a Q-net, he may be able to go directly to a question that has been originally entered in French, or he may go to a question that has been translated from the English.

Thus, a Q-net can be built that has questions in multiple languages.

Entering Answers

Just as the ideas of Chapter 15 hold concerning questions, they hold concerning answers. AC can store an answer in the original language it was entered and then can translate it into a given language on demand. Further, AC can store multiple language versions of an answer.

Translation Links (trans—trans link)

Where suburb languages are used, another useful semantic link is a translation link. This link is analogous to a Syn—Syn link in that it tells that two questions in different languages mean the same thing.

Thus a user can be at a question in one language and press a translation link button, and then enter a translated version of the question. AC will then link the two questions by a translation link.

A translation links gives AC a direct, human route from a suburb language question to a central language question, and vice versa. This kind of link can be useful especially where popular questions are concerned because it is with these that accurate translations can be especially helpful. (It is presumed that a person will, on average, make a better translation than AC.)

(Translation links can also be used where there is no central language. But we have only briefly described such a model in Book I.)

Of course, translation links can also be made between actual answers, but these are implicit when AC stores different human translated versions of the same answer.

Appendix 1

BRIEF DESCRIPTION OF THE DRAWINGS

FIG. A-1 shows a flow chart of a basic SODB.

FIG. A-2*a* shows the flow chart of the Request Mode of a lowest price locator.

FIG. A-2*b* shows the flow chart of the Supply Mode of a lowest price locator.

FIG. A-3 shows a flow chart of the steps preceding the gathering of information on what users are willing to pay for given data.

FIG. A-3*a* shows a flow chart of steps for gathering of information on what users are willing to pay for given data.

FIG. A-3*b* shows another set of steps for gathering of information on what users are willing to pay for given data.

FIG. A-3*c* shows another set of steps for gathering of information on what users are willing to pay for given data.

FIG. A-3*d* shows another set of steps for gathering of information on what users are willing to pay for given data.

DESCRIPTION

The SODB is a data-base system that charges users for the data they receive and pays royalties to users who input that data. What differentiates the SODB from other data-bases is a function that tells users who request data what the estimated royalty value is for supplying the data. The function keeps track of the rate of requests for the data and from this rate projects a demand rate. The estimated demand multiplied by the royalty rate yields a projected royalty stream. If a person requests a piece of data that is not in the SODB, the SODB outputs the projected value of inputting the data. (If the person finds the data answer is in the SODB, the SODB still can output the projected royalties for improving, correcting or updating the data.) Then, if necessary, the SODB tells users how to input the data. In sum, the SODB is a powerful feedback system that tells users what data needs supplying, tells them the financial incentive to supply it, tells them how to supply it and then pays them for supplying it.
Some Definitions and Comments Start Mode: The procedure the SODB executes to allow users to access the SODB and choose between the Request and Supply Modes. Start Mode is not strictly necessary as long as its "logging on" functions are part of the Request and Supply Modes.

Request Mode: The procedure the SODB executes to provide answers and/or Pay-off estimates to Requestors. In the Request Mode, a user inputs a question causing the SODB to search for the corresponding answer. If the answer is not found, a Pay-off Estimate is outputted. If the answer is found, the answer is outputted along with the Pay-off Estimate (see Pay-off Meter) and a Charge is registered to the user.

Supply Mode: The procedure the SODB executes to allow users to input answers, potential answers and raw data. User identification data is registered along with the inputted data so that the user can be credited with royalties each time the data is used to supply answers.

Requestor: User who accesses the SODB by Request Mode seeking an answer. The Requestor owes a Charge if the answer is found.

Supplier: User who enters the Supply Mode to input an answer or raw data. The Supplier gets paid a Royalty each time the answer or the raw data is used by the SODB as determined by the royalty rules of the SODB.

Check Mode: The procedure the SODB executes to allow users to check the Pay-off Estimate given data. In this mode, a user is neither a Requestor nor Supplier though the Check Mode could be accessed through either the Request or Supply Modes.

Charge: The amount owed by a Requestor who receives an answer from the SODB.

Royalty Rules: The rules, embodied in functions, that determine the amount due to a Supplier of an answer (or of the raw data that is necessary for an answer), each time that answer is outputted to a Requestor.

Payments Register: The function the SODB executes to register payments owed by Requestors and payments due Suppliers. When an answer is outputted, the Payments Register registers who is owed a royalty and who owes a charge for the data used. What the Payments Register registers depends on the royalty rules of the SODB.

Question: Specific data corresponding to other specific data called the answer. When entered into the SODB by a Requestor, causes the SODB to search for the corresponding answer.

Answer: Specific data corresponding to other specific data called the question. An answer may be static, for example, the chemical structure of gasoline does not change. It may be dynamic, for example, the price gasoline does change. And, it may be improvable as well, for example, the octane of gasoline may be more accurately given. An answer may be long or short. It may have one component or many. For example, the question, "What are the Chinese restaurants in Biloxi?" may yield one restaurant or many.

The Correspondence Between a Question and Its Answer: There can only be one answer for any question, though that answer may have many components. Of course, a question may have multiple, even infinite, answers. But, the SODB requires rules that limit the answers to one, in the following sense: the answer to a question must be a finite set of data that is outputted to the requestor and charged for. The answer is what the requestor pays for. (A big problem in defining "answer" is that no one has come up with a good definition yet.) In the SODB, users input the answers they deem best. And users police the accuracy of those answers. The SODB accepts untrue or approximate answers, for it cannot divine meanings and truth, but any answer is displaced by a better answer. A better answer is one that, by convention and by the rules of the SODB, satisfies a question better than the existing answer. A user may displace one answer with another. If there is a dispute between users as to which answer is better, a neutral third party, the Data-Base Manager can be alerted to settle the dispute.

Of course, with many types of questions, whether an answer is "better " is not clear by convention. There may be many, even an infinite number of equally good answers. So, depending on the type of question, the SODB rules must limit the possible answers. One rule, for example, may be that the first answer inputted is considered better than all equivalent answers. However, no set of rules can capture truth and therefore, the manager, has final authority to decide whether an answer is true or not and whether one answer is better than another. See also Quality Control Functions below.

Potential Answer: An answer that may become the best answer in the SODB to a question.

Raw Data: If it has the requisite functions, the SODB can process raw data to arrive at answers. A piece of raw data may itself be considered the answer to a question. For example, the question, "What is the closest McDonalds to 1234 Main Street?," might require the SODB to have map coordinates for 1234 Main Street. Therefore, the coordinates are raw data. And, the coordinates themselves are the answer to the question, "What are the coordinates of 1234 Main Street?." Any answer for one question may be raw data for answering other questions. (The distinction is largely artificial between data that is by itself an answer and "raw data" that is used in calculating an answer. The distinction is artificial because "raw data" usually answers at least one question by itself. We will keep this term for now but probably improve on it in a future application.)

Storing Answers: Usually, the SODB simply lists an answer under the question it answers. The answer can then be accessed by simple lookup. Answers can also be stored as raw data that is processed.

Data-Request: Any search for data initiated by a Requestor inputting a question. An infinite variety of searches can be done for data including searches that invoke functions to yield data. A data-request and a question can be considered synonyms. (By infinite searches we mean that there are infinite possible questions which can involve infinite different operations for finding or arriving at answers.)

Classifying a Data-Request: The SODB classifies data requests in order to differentiate between them and count them. However, as in any classification system, arbitrary rules must be established. SODB's classification of requests can therefore be infinitely variable.

Data-Use: When the SODB uses a piece of data as an answer or to arrive at an answer. Data-uses broadly fall into two types:
  a) outputting the data as an answer or as part of an answer,
  b) plugging the data into an algorithm that outputs the answer.

Classifying a Data-Use: As there are infinite algorithms and infinite types of answers, there are also infinite uses of data. The SODB has rules to classify these uses for the purpose of tallying the uses and paying royalties. For example the use of pi may be given a different royalty value than the use of the date of Lincoln's Birthday or the use of a passage from Shakespeare. As in classifying data-requests, there are no hard and fast rules.

Pay-off Meter (POM): The function that is the heart of the SODB. The POM has three sub-functions:

1) The Demand Meter (D-Meter) which tallies Data-Requests and Data-Uses over time to come up with an estimated demand rate for an answer (or for a piece of raw data),
2) The Pay-off Formula (POF) which takes the demand rate and calculates a Pay-off Estimate (POE) of the income a user will get for inputting the answer (or the data),
3) Input Signal (I-Signal) which outputs the POE and tells the answer (or the data) that may need inputting and, if necessary, instructions on how to input the answer (or the data).

The POM works most simply when the SODB's answers are listed under questions and the SODB can find the answers by simple lookup. For example, a Requestor may input the questions, "What is Lincoln's date of birth?." The SODB will do a lookup. Initially, the answer will not be in the SODB. The SODB will then store the question and tally each lookup. The SODB will also register the time of each lookup so that the rate of lookups over time will be known. The rate of lookups (the demand rate) for the answer will be fed into the POF to yield the POE. The I-Signal outputs this POE to every Requestor. Since answers are listed under questions, the I-Signal need not tell what answer need inputting nor how to input it. It is assumed that Requestors implicitly know that to enter an answer, they simply access the Supply Mode, enter the question and then enter the answer. Once the answer is inputted, the D-Meter still keeps track of the demand rate because the answer may be wrong. The POM is then still able to provide Requestors with the POE for correcting the answer.

When the SODB simply looks up answers, data-requests and data-uses can be measured by tallying lookups. The SODB can get more complicated though because the classification of data-requests and data-uses can get complicated. Furthermore, the demand rate can take into consideration prices of data as well. POM functions are discussed below, taking into account the issue of classifying data-requests and data-uses but not the issue of the pricing of data.

Demand Meter (D)-Meter): The function that tallies data-requests and data-uses along with the time they take place in order to calculate the demand rate for a piece of data.

The D-Meter tallies:

a) data that is specifically searched for by name and not found. For example, a user may request a businesses phone number which is not in the SODB. This data-request can be tallied under the business' name;
b) data that is used but not specifically searched for by name. For example, a user may request the average price of airline tickets to Boston. Dozens of prices may be fed into an averaging function to answer this request. Each of these prices is used but has not been specifically requested by name.
c) data that is searched for by name and used (found). In these cases, the D-Meter only counts once. It does not count both the search and the find.

As discussed above, there can be an infinite variety of ways of classifying data-requests and data-uses, therefore, the D-Meter itself can be infinitely variable.

The key to the D-Meter is that it tallies data-requests and data-uses for data that satisfies two conditions: royalties are paid on the data and users can be instructed to input the data. The point of the D-Meter is to measure demand for specific data so that the demand rate can be fed into the POF which then yields the value of inputting that data. There would be no point in tallying requests for data that could not be named and therefore not be inputted by users.

The D-Meter does not necessarily measure the demand for all types of data that may be input into the SODB. For example, it is important to note that the D-Meter cannot measure the demand for potential answers. But, by measuring the demand for actual answers, the D-Meter can give users an idea of what the potential value is of inputting a potential answer. An example will illustrate both this situation and the issue of classification.

Assume the question inputted by a Requestor is, "What store has the lowest price on Sony Camcorder #1239?" Say there are 1,000 requests. Now it may be that ten stores have the same lowest price. What then is the demand for a given store? That depends on how the SODB classifies the answer. The SODB may have a rule that only the first store with the lowest price can be outputted as the answer. This store becomes the answer and all royalties go to the inputter of this store. The SODB in effect turns the data-request into, "What stores have the lowest price and which among them was entered first?" Of course, the Requestor does not care which was entered first but the SODB may have default assumptions built into it to limit the size and number of answers outputted. Therefore, all other stores, even though they have the same lowest price are only potential answers (the first store may change its price so that another store takes its place). An inputter of a store with the lowest price does not know whether that input will generate any royalties or not. There is no established demand for that store.

On the other hand, the SODB can have a rule, for example, that all stores with the same price are equally part of the answer so the answer then has ten components. The demand rate for the store with the lowest price can then, for example, be divided by the number of components to arrive at a demand rate for each component (this calculation may actually be part of the POF). The classifications can be even more complicated. The second store inputted may be considered different from the first, location of the store may matter, and so on. The point is that the D-Meter tallies according to what data receives royalties and that depends on how answers are classified and that can be infinitely variable.

(Here in this continuation, we will often substitute the term "demand record" for Demand Meter because the key idea is that demand information is stored and then sent to the POF. There may be intermediate functions which calculate a demand rate (and these can be called part of a "demand meter") but that is not the main point. The same functions can be incorporated into the POF. It is easier to think of the parts of the Pay-off meter as being storage of demand information, calculation of a pay-off estimate, and outputting of the pay-off estimate. In the parent the issue may have been confused by having the demand meter do calculations. Because this application is a combination of the parent and an addition of new matter, we will use both terms. a future application will be stick to one way of looking at the steps of storing demand information and calculating demand.)

Pay-off Formula (POF): The function that calculates a Pay-off Estimate (POE). The POF projects future demand for a piece of data based on the demand it has had in the past. Thus two variables are critical, N, the number of times the data has been requested and, T, the times those requests took place. Based on the rate of requests for a piece of data, the POF estimates how many future requests there will be and then multiplies that by a royalty rate to arrive at the POE. When a piece of data is already in the SODB, the POF uses the tally, N, of data-requests and data-uses as supplied by the D-Meter. (This point is elaborated on later in the text.)

Like any equation for a projection, the Pay-off formula can be infinitely diverse based on historical data and other factors. For example, the formula would include a historically based assumption of when demand would end. The POF may contain estimates not based on the actual demand rate for a specific piece of data but for pieces of data that are similar. Regardless of what historical assumptions are built into it, the POF is always a function of the demand rate. The values for N and T are plugged into the POF which has the royalty rate built in.

The royalty rate can, of course, be infinitely variable. There may be sliding scales for the royalty paid to an answer for example. And different data-requests and data-uses may have different royalty rates. (Technically, it is possible for the POF not to have a royalty rate and only calculate a projected request rate. In this case, the royalty rate would be known by users who could do their own calculations.) Also, the POF must have an arbitrary value for the POE when a piece of data has been requested zero times or one time. This value could be an amount or simply a message like, "POE unknown."

(Note: the SODB can include multiple Pay-off Formulas that apply to different types of data)

I-Signal: The function that is the output part of the POM, the signal that tells Requestors what data is needed, what the value is of supplying it and how to supply it. When a Requestor requests an answer not in the SODB, the SODB outputs the POE. When a Requestor requests an answer that is in the SODB, the SODB outputs the answer and the POE for correcting, updating or improving it. (The POE may be outputted only upon request rather than automatically).

When the I-Signal outputs the POE it may also output the answer needed or the data needed. Usually, the answer needed is implicit from the question asked. If raw data is needed, the data needed may not be implicit from the question. In this case, if the SODB had the requisite functions for recognizing the data needed, the I-Signal might output the type of data needed as well. For example, "Need Answer to, 'What is the speed of light?', POE: $2." Finally, if necessary, the I-Signal could output instructions on how to input the data.

The I-Signal may include an alert function whereby a user can enter ask to be told if the POE for an answer rises above a threshold amount. The I-Signal can then alert the user if the threshold is exceeded, for example by sending a message the the user's E-mailbox.

A basic SODB includes of the following elements and procedure as shown in FIG. A-1

SODB Elements
   Computing means for executing SODB functions.
   SODB Functions
     a) inputting, storing, deleting and outputting data.
     b) start mode
     c) request mode
     d) supply mode
     e) lookup
     f) registering charges
     g) registering royalties
     h) Pay-off Meter (POM)

SODB Procedure
  Start Mode
    1) User inputs user identification data, SODB stores it 9001
    2) User inputs supply or request command 9001, SODB accesses appropriate mode 9002.
  Request Mode
    1) Requestor inputs a Question 3, SODB
      a) registers date-time of Request 9004
      b) executes a look-up 9005.
    2) If the SODB has the Answer, it
      a) outputs the Answer 9006
      b) registers a payment due by the Requestor 9007
      c) registers a royalty due to the Supplier 9007
      d) adds one to the number of requests for that question 9008, calculates the POF 9009
      e) outputs POE 9010.
    3) If the SODB does not have the answer it invokes the POM function which
      a) checks if the Question is already stored in the Pay-off register 9011 (has been asked before)
        a1) if no, stores the Question 9012, sets the number of requests for that question to one 9013, calculates the POE using the POF 9014
        a2) if yes, adds one to the number of requests for that question 9008, calculates the POE using the POF 9009
      b) outputs the POE to the Requestor 9010.
  Supply Mode
    1) Supplier inputs a question 9015, SODB executes a look-up 9016 (this lookup is not counted as a data-request; only lookups in the Request Mode are so counted in the POM),
    2) If the answer is not found, the supplier inputs the answer 9017, SODB stores the answer to correspond with the question inputted and stores the Supplier ID data along with the answer 9018, in order to credit the Supplier with a royalty each time the Answer is requested.
    3) If the answer is found, the SODB outputs a message saying the answer is already in the SODB 9019, if the Supplier intends to correct the existing answer, the Supplier inputs a command such as, CORRECT 9020, and the SODB allows the new answer to replace the old answer 9017 and allow new supplier ID data to replace the old ID data as well 9018.

(We should correct an oversight here from the parent. The parent did not mention that the the Supplier can enter an entirely new question into the SODB and then supply an answer to that new question. Thus in the procedure above, if the Supplier's question is new, the system would store the question. That these steps were omitted was an oversight but was also due to the fact that a user could enter a question in the Request Mode and then enter the answer in the Supply Mode. The only problem with this is that the answer would have a single, superfluous request tallied for it.)

These elements and procedure are the heart of the SODB. The SODB would usually include other useful functions. Before detailing some of them, an embodiment of the basic SODB is described, a self-filling telephone directory (the SFTD). Then an embodiment is described which does more than lookup answers under questions.

1. The SFTD includes a list of names and corresponding telephone numbers, initially empty, a computer for storing the list and functions for inputting data into the list, outputting data from the list and looking up data in the list.

2. The SFTD also has a sign-on function that allows users to identify themselves for billing and payment purposes. The SFTD stores the ID data.

3. Users access the SFTD over the phone. The SFI computer is equipped with phone-interface equipment. The SFID accepts calls from two lines, a Request line and a Supply Line. The Request line automatically puts users in the Request mode, while the Supply Line puts them in the Supply Mode.

4. Using the Request mode, a Requestor accesses the SFTD list by spelling a name over the phone into the SFTD's computer. Equipped with a speech recognition function, the SFTD recognizes the request and does a lookup. Equipped with a speech synthesizer, it then responds with a speech synthesized answer.

5. If the SFTD has a number corresponding to the name, it outputs the number and registers the charge due by the Requestor and the royalty due to the Supplier. One is added to the POM tally of data-requests, the time of the request is registered, and a new POE is calculated and outputted along with the number.

6. If not, the SFTD's POM is invoked and outputs a POE to the Requestor. The POM has several functions: a) it registers the time of the request, b) it checks if the request has already been stored in the POM register, c)if not, it sets the request tally to 1, stores the request and defaults the POE to the message "Insufficient Data to Estimate Pay-off," d) if the request is already stored, the POM advances the request tally by one and then calculates the POE using the POF (let us assume for illustration's sake, the POF divides the number of requests by the time period of those requests and then assumes that this rate will continue for 4 years. The formula then multiplies the number of requests over those four years by the royalty rate per request to arrive at the POE), e) outputs the POE.

7. A Supplier accesses the SFTD by spelling a name over the phone into the SFTD. The SFTD's speech recognition function recognizes the request and the SFTD does a lookup to see if a corresponding telephone number is already in the list. If the number is not in the SFRD, the SFTD allows the Supplier to enter the number and stores the Supplier ID data along with the number in order to properly credit royalties. If the number is already in the SFTD, the SFTD outputs a voice synthesized message, "Number is already in directory." If the number needs correcting, the Supplier then enters the command, CORRECT. The SFID allows the Supplier to input the number using the SFTD's speech recognition function. The SFTD stores the number to correspond to the question, to the name that is, and also stores the Supplier's ID data with the number, in order to properly credit royalties.

Let us look at another embodiment, a lowest price locator, as shown in FIGS. A-2*a* and A-2*b*.

1. A lowest price locator (LPL) includes a list of product names and corresponding prices and stores, initially empty, a computer for storing the list and functions for inputting data into the list, outputting data from the list, looking up data in the list and processing data in the list.

2. The LPL also has a sign-on function 9030 that allows users to identify themselves for billing and payment purposes. The LPL stores the ID data.

3. Users access the LPL over the phone. The LPL computer is equipped with phone-interface equipment. The LPL accepts calls from two lines, a Request Line and a Supply Line. The Request line puts users in the Request mode, the Supply Line puts them in the Supply Mode.

4. Using the Request mode, a Requestor accesses the LPL list by spelling a full product name over the phone into the LPL's computer. Equipped with a speech recognition function, the LPL recognizes the request 9031 and checks 9032 to see if the price is in its data-base.

5. The LPL registers 9033 the time of the request.

6. If LPL finds no list of stores and prices under the product name, it checks 9034 to see if the price has been requested before. If not, it stores the request 9035, sets the request tally to one 9036, calculates the POE 9037 and outputs the POE 9038. If so, it advances the tally 9039, calculates the POE 9040 and outputs the POE 9038.

7. If LPL finds a list of stores and prices under the product name, it checks 9041 for the lowest price. If it finds 9042 more than one store has the same lowest price, it finds 9043 the store whose lowest price was entered first and outputs 9044 that store and its price. If not, it outputs 9044 the single lowest priced store and its price. It then registers 9045 the charge owed by the Requestor and the royalty owed the Supplier. It then advances the request tally 9039, calculates the POE 9040 and outputs the POE 9038.

Supply Mode

8. A Supplier accesses LPL by the Supply Mode and spells a product name over the phone into the LPL. The LPL's speech recognition function 9050 registers the name and allows the Supplier to input 9051 a store and price.

9. The LPL registers 9052 the time of the inputting along with the store and price.

10. The LPL registers 9053 the user's identification data along with the store, price and time.

11. The LPL checks 9054 to see if there is list of stores and prices under that product name. If not, the LPL creates a list and stores the data in the list.

12. If the LPL already has such a list, the LPL checks 9056 to see if the store inputted matches any store in the list. If not the store, price, time and user ID data are stored 9057 in the list. If so, the data just inputted and registered is put in the list in place 9058 of the data registered with the matching store.

13. The LPL finds 9059 the lowest price.

14. The LPL checks 9060 to see if there is more than one lowest price. If not, the single lowest price is held 9061 for output. If so, the LPL finds the first, lowest price entered 9062 and holds 9061 it for output.

Some Comments on Data Processed in Lists and Tables

As the embodiment above indicates, the SODB is well suited to collecting data that is processed in what may generally be referred to as lists and tables. Let us then make a few comments about such data and how the SODB can be applied to collect it. Many kinds of answers can only be found by processing data in a list or table and often that data can only be collected efficiently by members of a community rather than a central authority. For example, usually the most efficient way for an economy to find the lowest price on a given item is through a system that allows people to feed in prices to a central list where the prices are sorted to find the lowest ones. This way is more efficient than having a central authority call all the sellers of the item in order to check prices. With a feed-in system, only the low price sellers need feed in. The SODB is, of course, a feed-in system.

We also note that, because of the nature of data tables, it is often advantageous for a single entry to include many sub-elements. For example, in a table of data on companies, each company entry might have many sub-elements, such as the name of the company, its telephone number, address, sales, number of employees, top officers and so forth. Thus a "single" entry can be used to answer multiple questions.

We also note that when a supplier enters data into a table, the SODB may suggest that the Supplier enter additional data as part of the entry. For instance, a Supplier might supply the answer to the question, "What is the telephone number of IBM?" The SODB might then also suggest that the supplier enter IBM's address. The SODB could guide the Supplier in how to enter extra data.

Additional Method For Outputting Pay-Off Estimates

We now describe an additional method the SODB can include for outputting a POE for data that answers or helps answer multiple questions. This method can be especially useful for data that is entered into and processed in lists or tables, for this type of data is often used to answer multiple questions.

As discussed in the Definitions section, the demand meter records multiple data-uses and sends this demand information to the POF which then calculates the POE for the relevant answer or "raw data". The Definitions section did not go in depth about how the Demand Meter registers multiple data-uses. It was understood that each time a piece of data was used, the use was recorded. Here we will elaborate on this topic and how multiple data-uses can lead to multiple POE's.

Before explaining how the SODB can output multiple POE's for an answer that is used for multiple questions, let us review how the SODB outputs a POE for an answer to a single question. A question is entered and before any answer is entered into the system, demand information is recorded and a POE is calculated for the question. After the corresponding answer is supplied, the demand information and POE can still be attached to the question or they can be attached to the answer, or they can be attached to both. It makes no difference concerning answers that answer one question.

But where an answer is used to answer multiple questions, then multiple POE's can be involved. Demand information can be stored for and a POE calculated for each question answered. In other words, the SODB keeps a demand record and corresponding POE for each question. The SODB can also keep a separate demand record for the answer itself. This record would include the demand records and POEs for all the questions involved.

For example, the answer to the question, "What was the lowest temperature at the South Pole yesterday?" might answer other questions, such as, "What was the lowest temperature on the surface of the earth yesterday?" Thus a demand record would be kept for both questions and a separate POE attached to both questions. The temperature data for the South Pole would also have its own demand record which could include the records of the two questions (and other questions the temperature data answers or helps answer). The POE for the South Pole data could then be calculated based on a combination of the demand information of the various questions involved.

The parent explained that the SODB registers multiple data uses, but did not illustrate multiple demand records. They are not illustrated here either, for they are easily implemented by those skilled in the art.

Now, when it comes time for the SODB to output a POE in response to a question, the POE can be the POE associated with the question or it can be the POE associated with the answer (based on demand information from all the relevant questions). The Pay-off Formula determines the POE to output.

But the new point made now is that human common sense will often be better than a machine rule (POF) for guessing the projected income for an answer that is used to answer multiple questions.

For example, the answer to the question, "What is the lowest price for a Walkman in the world?" might have as the answer, "$25 at Luskins." Another question that uses the same data for an answer might be, "What is the price for a Walkman at Luskins?" Now we will assume that the first question has a high POE, say $100, because we will assume that thousands of people want to know what the lowest price in the world is for a Walkman. And we will assume that the POE for the second question is low, say 10 cents, because we will assume that far fewer people ask the price for Walkmans at Luskins. So the same data, "$25 at Luskins," has a POE of $100 when it answers one question and 10 cents when it answers another.

Now assume that the price changes and the Luskin's price rises so that it is no longer the lowest in the world and thus no longer answers the first question. The remaining POE is only for the second question, 10 cents. And let us say that the new price is not in the system yet, and that a Supplier wants to enter the new price. But the new price may have an unusually high POE based on the "lowest-price-in-the-world" question it previously answered. Once the new price is in the system, the SODB will quickly register a drastic drop in demand for the Luskin's price but not until the new price is in. A person however can look at both questions that the data has answered and determine that the new POE will be low because the new price will only answer the second question (we assume the Supplier gets no extra reward for correcting the answer to the first question).

And so, a useful new feature not disclosed in the parent is that the SODB can include steps enabling Requestors to see more projected pay-off information than a single POE. The SODB can display some or all the information kept in the demand meter for an answer. Thus, the SODB can display, for example:

a. all the questions that given data has answered or helped answer, b. the actual royalties paid corresponding to each question, c. the time periods the royalties were incurred and, d. the current POE's for the questions.

If there is a large number of questions, their display can be ordered in some way, such as by showing the questions that have generated the most royalties or have the highest current POE's. By seeing the questions that the data has answered or helped answer, the Requestor can see whether supplying replacement data is worthwhile.

We note that the most common procedure might be for the SODB to first output the POE for the question that the Supplier is intentionally answering. The Supplier can usually signify which question by entering the question first and then the answer. In the case above, the Supplier would signify that he was answering the question, "What is the price of Walkmans at Luskins?" The SODB may then default to first showing the POE for this question, and then showing a combined POE and/or the POE's from other questions the data might answer.

(We also note that before an answer is in the system, the SODB can include means for anticipating multiple questions that an answer might satisfy. For example, a question might be, "What is the temperature in Moscow today?" The system might anticipate that the answer to this question can be used to answer other questions such as, "What is the average temperature in Moscow this month?" The POE would then reflect these anticipated data-uses. For the SODB to anticipate in this manner requires that the SODB have functions that identify comparable questions and answers and extrapolate demand information and POE's from them. Further, the SODB might have functions for identifying and registering that missing data could have been used to answer multiple questions. We do not describe such functions because they depend on highly specific situations. Users, of course, can make their own extrapolations.)

Additional Demand Information

We have shown above how the SODB gathers demand information on which to base a pay-off estimate. However, we showed only the most basic information being collected, the number of data-requests and the times of those requests. It often useful to gather more information. In fact, there is often a tradeoff between taking the time to gather more information versus the value of that information for calculating a more accurate projection of income, the pay-off estimate.

Formulas for projections have been known to contain thousands of variables. We will not discuss or describe nearly that number but we will note here a few more pieces of demand information that can be useful.

One piece of information that can be useful to register is whether a Requestor has asked the same question previously. In many cases repeat requests will mean misleading double counting of requests. For example, a Requestor might ask for the final score of a football game ten times before getting an answer (because the answer has not been entered until the time of the tenth request). It can therefore be useful for the SODB to include steps for registering whether a Requestor is making a repeat request.

In another variation of gathering such information, the SODB can ask the Requestor whether he has asked for the same answer before and whether the request is new or is a "repeat." Asking the Requestor explicitly can be important in at least two cases. In one case the system may not record the Requestors of a given answer. In the other, the Requestor may know better than a machine based rule whether a request constitutes double counting or not. For example, a person might request an answer to the question, "What is the temperature of the ocean at Ocean City?" The answer can change rapidly. The Requestor will know if he is his request is a repeat or if he expects a different answer in each case. The point is that double counting depends on the situation and the user's common sense can be more valuable in identifying double counting than a machine rule.

Another piece of useful demand information that the SODB can register is how long users are interested in the answers they have requested. Many answers are only valuable for short periods of time. For example, the SODB might register dozens of requests for the score of a football game. From all these requests, the SODB might project a large POE. However, the SODB does not "know" that almost no one will be interested in the score shortly after the game in question is over. For the SODB to "realize" this fact, users must "tell" it. Thus, the SODB can ask Requestors to input a time period for which they are interested in an answer. Even if the data is outputted, the SODB can still ask Requestors to input this information.

Furthermore, a Requestor could also specify how long he thought others would be interested in an answer. Now this opinion is a guess but can still provide valuable information to the SODB for calculating a projection of future demand. Taking our football score example, a Requestor can input that he is interested in the score of the game up until four o'clock. And he can say that he thinks demand for the score will taper off at eight o'clock. Say the game ends at 4 o'clock. It is often better for the SODB to register and use such information than not.

In another variation of this type of demand information, the SODB might ask users whether they want an answer sent to them and for how long the order stands. The Requestor would specify the time period that the answer could be sent until. The Requestor could also cancel the request. (We presume that the SODB in this case has the capability to send answers to E-mail boxes.)

Price Tests—Registering More Demand Information

The parent did not delve into the issue of gathering price information from Requestors. It was assumed that Requestors knew the price of the answers they were requesting as, for instance, a person calling directory assistance or a 1-900 number would know the charges involved. The parent avoided price because the goal was to describe the core steps of an SODB. These steps include the gathering demand information about answers, feeding this information into a pay-off formula and outputting a pay-off estimate to Requestors. The key demand information the parent described (the number of times a question is asked and the times of those requests) is usually critical for making a projection of future income. Collecting this information did not, of course, preclude collecting other information about the demand for answers. Here we will describe steps for gathering information about what Requestors are willing to pay for answers.

Often it is neither practical nor desirable for Requestors to know the price of answers before the answers are requested. For example, the price of certain answers may change rapidly. The price of, say, today's weather report might be 20 cents while the price of yesterday's may be 2 cents. As another example, similar type answers may have very different prices. The phone number of the President's barber might cost 5 cents while the phone number of the President's private line might cost $5,000.

When the price of answers is not known in advance by Requestors, it is often useful to gather information on what Requestors are willing to pay for those answers because this information can be used by a POF to calculate the POE.

(We also note that gathering information on what Requestors are willing to pay for answers can be critical for setting the prices of those answers. We will discuss this issue in a future application.)

Now since the SODB can't read minds, it must perform what we will call price tests. These tests will not reveal exactly what people are willing to pay, but they seem to be the best that can be done. There are two fundamental price tests. One is where the system (seller) offers a price for an answer and the Requestor (buyer) can accept or reject the price. The other is where the Requestor offers a price and the system can accept it, reject it, or simply register it (if the answer is not in the system, the system usually need not accept or reject the offer but just record it in the demand meter and tell the Requestor that the answer is not in the system).

The world of commerce has evolved a great variety of price offers and counter offers that can occur in a sale situation. Earnest money can be pledged, time limits can be imposed, letters of intent can be written, discounts can be given, and so forth. Many of these price offers can have analogues in SODB price tests. Here we will describe mainly the basics, in which either the system makes an offer or the Requestor makes an offer. We will include some important additions but we realize that a great number of variations are possible.

The basic idea behind the system-offer price test is that the system can tally total requests along with the acceptance/rejection rate at a given price. This information is then fed into the POF. The resulting POE might then be correlated not only with acceptances but with total requests and with the acceptance/rejection rate.

The basic idea behind the Requestor-offer price test is simply that the system can register what each Requestor says he will pay. This information is also sent to the POF. The Requestor's offer is not necessarily just talk. If the answer is in the system, the Requestor would usually be charged the amount offered, if the offer was accepted. Even when the answer is not in the system, the system can enable the Requestor to obligate himself to pay the amount offered provided the answer is entered into the system by a given time.

For price testing, it can matter if the answer is in the system or not. For example, take the answer to the question, "What time does The Rockford Files start tonight?" After this answer is in the system, the system might have a price assigned to the answer. But before the answer is in the system, the system might ask the Requestor to make an offer. Thus, different price tests can be used before and after the answer is in. Or, the same price test can be used in either case. There are four basic possibilities:

| Before Answer Is In | After Answer Is In |
|---|---|
| System makes offer | System makes offer |
| System makes offer | Requestor makes offer |
| Requestor makes offer | System makes offer |
| Requestor makes offer | Requestor makes offer |

It can also matter if the price test is done before telling the Requestor whether or not the answer is in the system. Thus we double the number of possible ways by which price tests can be done. We will not illustrate all the permutations but will illustrate enough to get the basic steps across, while recognizing that variations are possible.

The significance of the price tests differs depending on the permutations and therefore the SODB can register information concerning whether the price test was done before or after the answer was in the system and whether or not the Requestor knew if the answer was in the system or not.

We will illustrate some price testing sequences. In the illustrations we will avoid repeating steps previously shown. For example, we gloss over the registering of data-requests and the times of those requests. The point is to show the new steps for executing price tests and using information from these tests in a POF for output as a POE. Also, we will assume that a given question has already been entered and that a demand record has been created for the question, as shown in FIG. A-3. The rest of the FIGS. A-3*a*–3*d,* show various price testing sequences. Also, in the figures, the term "question" will be used in place of "data-request" and "answer" will be used in place of "data." Also, when we say that the system registers a piece of information we mean that it stores the information in the demand record for the question being asked.

Finally, note that we also assume that the price offers that the system makes and the price thresholds that the system includes can be set in various ways: by the data-base manager, by the Supplier, by a price setting formula, or by some combination of these. We do not show the setting of prices but assume that step is done at the appropriate time in each case. Price setting will be addressed further in a future application.

FIG. A-3 shows the basic steps for registering the number of times a question is asked and the times of those requests. This demand information is stored in a demand record for the question and corresponding answer. Price test information is also stored in this demand record (in the parent this record was called the Demand Meter). As FIG. A-3 shows, the SODB inputs 9100 a question, then registers 9101 the time of the request and checks 9102 to see the question has been entered previously.

If the question is not found, the system creates 9103 a demand record for the question and then stores 9104 the time of the request and sets 9104 the number of requests at 1.

If the question is found, the system stores 9105 the time of the request and adds 9105 one to the request tally.

The system then goes on to the steps for executing price tests. We will use the steps above as common preceding steps for four different price testing sequences. These different sequences are illustrated in FIGS. A-3*a*–3*d*. For the sake of concreteness, let us say that the question we will have in mind in all these illustrations is, "Who sells security holograms in the U.S.?"

In FIG. A-3*a* a price testing sequence is illustrated in which the system presents 9110 a price to the Requestor. The system enables 9111 the Requestor to accept or reject the offer and the system does not tell the Requestor whether or not the answer is in the system.

If the Requestor rejects the price, the system registers 9112 the rejection at that price, calculates 9118 the POE, and outputs 9119 the POE.

If the Requestor accepts the price, the system registers 9113 the acceptance at that price, and then checks 9114 to see if the answer is in the system. If the answer is not found, the system tells 9115 the Requestor and then calculates and outputs the POE. If the answer is found, the system outputs 9116 the answer, registers 9117 the charge due to the Requestor and the royalty due to the Supplier and, calculates and outputs the POE.

FIG. A-3*b* shows a different price testing sequence where the system tells the Requestor whether or not the answer is in the system before the price tests. Further, the sequence has both price tests, one where the system makes an offer and the other where the Requestor makes an offer.

As shown in FIG. A-3*b,* the system checks 9120 if the answer is in the system. If the answer is in, the system tells 9121 the Requestor and presents 9122 a price. The system then enables 9123 the Requestor to accept or reject the price. As before, if the Requestor rejects the price, the system registers 9124 the rejection at that price and calculates and outputs the POE. And, as before, if the Requestor accepts the price, the system register 9125 the acceptance at that price, outputs the answer, registers charges and royalties and calculates and outputs the POE.

Now, if the answer is not in the system, the system tells 9126 the Requestor that answer is not in. The system then asks 9127 the Requestor to make an offer. Here, as shown, the system can include steps for enabling the Requestor to make various offers.

The system can register 9128 a non-binding offer. Here the Requestor expresses what he says he is willing to pay The system can register 9129 a binding offer to pay an amount up until a certain time. In this offer the Requestor not only states an amount he will pay but states a period of time his comitment is valid until. This type of offer can be quite important where certain kinds of answers are concerned. When binding commitments are involved, the Supplier can be fairly sure of getting a given amount of money for supplying a given answer. The system would also add to the POE based on Requestors who do not make binding commitments.

The system can register 9130 binding offers that include a commitment of earnest money as a deposit.

(Also shown in FIG. A-3*b* is a step 9131 for registering the Requestor's opinion as to the reasonable price for the answer. This opinion is simply the Requestor's judgement and not a personal offer. The step is pictured because it can be important demand information in certain cases. The Requestor can have this option in other price sequences as well and can both make an offer and state an opinion.)

Once the system registers the Requestor's offer, the system, as usual, calculates and outputs the POE.

FIG. A-3c shows another price testing sequence that includes both types of price tests. In this sequence, the Requestor is not told before the price tests whether the answer is in the system or not. The main new feature here concerns the Requestor offer. The Requestor is asked to make an offer when the answer is in the system. In addition to asking for an offer, the system includes steps for registering when the Requestor makes an offer and steps for limiting the number of offers the Requestor can make.

If a Requestor can make unlimited offers when an answer is in the system, the Requestor will start low and keep going up. The Requestor will try to discover the system's threshold price ("bottom line"). Thus, the system needs to limit the number of offers the Requestor can make. This concern does not apply usually when the answer is not in the system because then the answer may have no price threshold attached to it.

(It is possible for a Requestor to have a confederate make an offer in an attempt to find the system's "bottom line." But with answers that cost a small amount this practice is unlikely or impractical. So, a feature limiting the number of offers a Requestor can make on an answer can be useful.)

The sequence in FIG. A-3c limits the Requestor to one offer. (In FIG. A-3d, steps limit the Requestor to one offer per a set period of time.)

In FIG. A-3c then, the system checks 9140 to see if the answer if found. If the answer is not in the system, the system presents 9141 a price to the Requestor and enables the Requestor to accept or reject the price. The System then registers 9142, 9143 whether the price is accepted or rejected and tells 9144 the Requestor that the answer is not in the system and then calculates and outputs a POE.

If the answer is in the system, the system then checks 9145 whether the Requestor has made a previous offer. If yes, the system tells 9146 the Requestor that he is ineligible to make an offer and then, as usual, the system calculates and outputs a POE.

If the Requestor has not made an offer, the system asks 9147 the Requestor to make an offer. The system then registers 9148 the offer. The system then accepts or rejects the offer. If the offer is rejected, the system tells 9149 the Requestor that the offer is rejected and registers 9150 that the Requestor has made an offer for this answer. Then, as usual, the system calculates and outputs a POE. If the offer is accepted, the system outputs 9151 the answer, registers the charges and royalties due, and calculates and outputs the POE.

FIG. A-3d shows a price testing sequence in which only the Requestor makes offers. Here steps are shown that limit the Requestor to making one offer per time period. The point, as mentioned previously, is to limit the number of offers that a Requestor can make in order to get the Requestor to make a higher offer. We note in FIG. 3d that if a Requestor makes an offer before the answer is in the system then this offer is not subject to a time period prohibition. The Requestor is free to make a different offer once the answer is in.

So as FIG. A-3d shows, the system checks 9160 whether the Requestor has made an offer that has been rejected.

If yes, the system checks 9161 to see if the pre-determined time period has expired. If not, the system tells 9162 the Requestor that he cannot make another offer and, as usual, calculates and outputs a POE.

If the time period has expired, the system asks 9163 the Requestor to make an offer. The system registers 9164 the offer. The system then checks 9165 to see if the answer is in the system.

Likewise, if the Requestor has never made an offer before that has been rejected, the system ask for an offer, registers the offer and checks to see if the answer is the system.

If the answer is not in the system, the system tells 9166 the Requestor that the answer is not found and, as usual, calculates and outputs a POE.

If the answer is in the system, the system checks 9167 the price threshold and accepts or rejects the offer. If the system rejects the offer, it tells 9168 the Requestor that the offer is rejected and sets 9169 a time period for when the Requestor can make another offer for the answer, and, as usual, calculates and outputs a POE.

If the system accepts the offer, it outputs the answer and registers charges and royalties and calculates and outputs a POE.

Brief Note About Price Tests With Price Ranges

Normally a price offer is at a single price. However, the SODB and Requestors can each present offers as ranges, especially when an the answer requested is not yet in the system. For example, marketing research polls that ask people what they are willing to pay for an item often ask in terms of price ranges. The point is that information about price ranges can be more useful than single prices (we also note the important point that Requestors, and the SODB, can offer different prices corresponding to different times.).

There is another reason though that the SODB can present offers in ranges and that is because the nature of the SODB is such that a user may indeed end up paying a price that is in a range. Here we have the fundamental idea of projected price.

The SODB may present a Requestor with a projected price. For example, the SODB might present an offer whereby the price of an answer is between 20 cents and $2.00, with the projected or expected price being 50 cents. Taking our hologram example, a Supplier who does research and compiles a list of hologram producers might want to be rather sure of being compensated for his time in compiling the list and entering it into the system. He might want, say, $20. And so, the SODB might set the initial price for the hologram answer high, in order to better insure that the Supplier will be paid the $20. Thus the first ten Requestor might be charged $2 each. However, say another 100 Requestors ask for the same hologram answer. These can be charged less, say 20 cents each, and the original Requestors can be rebated an amount. Thus the actual price the original Requestors pay is not definite, but a projected or expected price. Just as the system calculates a POE, it can calculate a projected price.

We will not delve into this idea further here but note that in certain situations the principle of projected price, like projected income, is not only fundamental but highly useful in getting answers into the SODB.

Brief Comments on the Types of Answers Suppliers Can Enter

In general, we get answers from computers in three ways. One is by straight look-up, direct correspondence. For example, if someone asks, "What type of wood are Stradivarius violins made out of?" the answer could be stored in a computer under the question.

Another type of knowledge is what might be called "algorithmic" in the sense that information is compressed in an algorithm. For example, one could ask, "What is the length of the hypotenuse of a right triangle with sides 3 inches and 4 inches long?" This answer could be stored to correspond to the question. One could make a huge look-up table with answers to questions about the lengths of different hypotenuses. A more efficient way of representing this information though is by the well known Pythagorean Theorem which allows you simply to plug in the relevant numbers and let the computer calculate an answer.

The SODB can be adapted to calculate answers from algorithms. For example, if 1,000 people ask questions about the length of the hypotenuses of different triangles, a user might realize that, rather than answer each of these questions, she could enter the theorem and enable people to plug in the appropriate numbers. The user that entered the formula and the interface allowing people to enter the numbers could then get the royalties for the questions the theorem answers.

It is thus possible to enable users to enter formulas and an interface procedures for Requestors to be able to use the formulas to get desired answers. The problem is that the SODB cannot come up with a POE for the algorithm because doing so requires the intelligence to realize that a group of different questions can be answered with a single algorithm.

Likewise with tables of data that is processed; it is possible to enable Suppliers to enter sets of functions that create tables such that data can be entered into the tables and then be processed.

Again, the SODB does not have the intelligence to assign a POE to such tables+functions. As with algorithmic answers, we note the possibility of enabling Suppliers to enter tables+functions and paying Suppliers for the usage of the tables. While having such features can be quite important, it is not the main point of the system.

(In the parent we presumed that the tables and functions can be part of the SODB. After all, there is nothing new in processing data in tables. What is new in the SODB is how economic values are attached to given data (whether that data is in tables or not) to induce users to supply that data.)

Brief Note on the Form of the Invention

Before going on to other features of the invention, it is worthwhile to pause and discuss the form of the invention. Because it is to be used by a community of people in different locations, the invention comprises a network in which terminals in various locations are used to input data requests and supply data. The terminals can be anything from telephones to super computers.

The data itself can be stored centrally or in nodes throughout the network. For example, certain users might request the full text of Dracula. Other users might want the film version of Dracula. And all this data can be stored centrally. Or the text of Dracula, the book, might be stored in a computer owned by, say, the Library of Congress, while the film data might be stored in a computer owned by, say, a film studio. Because of the added communications costs, highly decentralized storage of data is not usually the most efficient method where the SODB is concerned. Nevertheless, real world concerns might dictate such decentralization. A movie studio, for example, might not want to put its copyrighted movie in someone else's computer for distribution to the public.

(One problem in discussing the issue of centralized storage is that the very concept of centralized storage is blurry in this age of sprawling networks. We will not try to define the notion crisply here, but will rely on peoples' intuitive notions.)

While the storage of data itself may be decentralized, the gathering of demand information about data-requests (and the calculation and outputting of POE's) must, in general, be highly centralized. For example, say we have a data-request, "How many paintings are in the Louvre?," and say that a dozen users request the answer to this question. It does no good if the twelve data-requests are all registered on different systems. There needs to be a central tally showing that there have been twelve requests for the data. That way the POE corresponds to the demand of twelve people. Otherwise the POE in each system would only correspond to one request.

In fact, the goal of the SODB is to collect the demand for given data centrally. That way the pay-off for supplying the data is higher and the data can cost less per user. Moreover, the more demand for a piece of data, the more likely the data will be entered into the system. If the demand is decentralized then there is no way to accumulate the demand and that defeats the purpose of the system. Of course it is conceivable that the demand could be registered throughout the system but it would still have to be tallied, matched up, somewhere to yield a total figure which would then lead to the maximal POE.

(The economic efficiency of accumulating demand information does not mean that a single SODB will store all the world's data-requests. An SODB is meant to be used by a community and a community can be defined narrowly. For example, a company might have an SODB for its employees. Data-request demand information would be stored centrally though and not in every employee's computer.)

We have mentioned that the data itself might be stored in a decentralized manner. However, if the SODB does not store data centrally, it must at least store pointers to the data centrally. For example, if a Requestor asks for a given piece of data, the SODB must be able to tell if the data is in the system or not. To do this, a pointer would identify whether the data was in and where it was located. Thus a data-pointer is surrogate for the data itself. In the case of decentralized storage of data then, a Supplier who enters data into the system would have to enter a pointer centrally while entering the data into a given storage computer.

It is also possible that the SODB only outputs routing information to the Requestor but does not make the connection to the storage computer. In this case, the SODB is really a new kind of signaling mechanism that tells users where data is stored and tells users the potential pay-off of storing and selling data. This form of the invention was not envisioned in the parent and is noted here.

Another aspect of the SODB that can be decentralized is paying royalties and collecting charges. This can be done at the nodes where the data is stored. Again, this form of the invention was not envisioned in the parent but is noted here. However, even if payments are transacted in a decentralized manner, payment data would still be sent to the central SODB location because such data is usually important demand information to be used in calculating pay-off estimates.

Brief Note on the Importance of the Flexibility of the Royalty Rules

One of the advantages of the SODB is that the royalty rules and the POF are infinitely variable. Thus, the system Manager can adjust the formula to reward certain actions such as the correcting of answers. We will go into the importance more in a future application but here we will note one of the most important consequences, starting up the system and attaining critical mass.

For many types of fee based data-base systems, the problem is starting up and gathering enough initial data and enough initial customers. This problem is often referred to as the critical mass problem. The idea is that if enough users use the system the system will be profitable and self-perpetuating. But it is a chicken and egg problem, for often no users can be gotten until the data is in the system.

The beauty of the SODB is that it enables the System Manager to provide incentives that can jump start the system. For example, if your plan is to start a lowest price locating system, a huge obstacle is how to convince thousands of sellers nationwide to feed in their prices so that the prices can be sorted. We met a similar problem in the very beginning when we discussed the problem of even keeping a data-base of telephone numbers up to date. The problems with a lowest price locator are worse.

If we agree though that people would be interested in lowest prices we can see that if the system got started it might be self-perpetuating for buyers would want to check lowest prices and the low price sellers would, out of self interest, want to display their prices. So let us assume that once the system got going it would have value for users.

In order to jump start the system the Manager can adjust the royalty rules so that the people who are the first to enter the lowest price of a given item get a share of future income from all the lowest prices, for that item for a period of time. For example, say that the item is a Sony Walkman (we'll pretend there is just one model in the world). Then the royalty rules can be set such that the person who enters the lowest price will get a share of the royalties of all subsequent lowest prices, for a period of, say, 5 years. Now, if there is no price in the data-base then the first person to enter the price is the lowest. That is not a reasonable way to get the system going. Therefore, the System Manager can set a rule such that the "first" lowest price Supplier is considered to be the person who has entered the lowest price that is valid at a given date and time.

The System Manager can set the royalty rules such that, for instance, the Supplier of the lowest price for a Walkman on December 24th, at noon, gets a small share of the royalties for all lowest prices entered for the next 5 years on a Walkman. The reward might be, say, $200. Thus the System Manager can set up a competition to be the lowest price Supplier on a given date and time. The competition might last, say a couple of months. At the end of this competition, a truly low price might be entered and the system may be off an running for that item.

We are using this illustration just as a representative example of the advantages of being able to adjust the POF (the royalty rules really).

There are many other advantages of being able to adjust the royalty rate and thus the resulting POE's, but this use above is the inventor's favorite.

Additional Functions

An SODB should include more functions than the basic ones described above. Some useful functions are described below.

Matching Functions

The SODB is a matching machine in two senses, both critical. First, it matches questions (data-requests) and keeps a tally of how many times the same, matching questions have been asked. Second, it matches answers to questions. In both types of matching, problems can arise due to the nature of language and the nature of questions and answers themselves. Therefore, the SODB should have functions to increase the chance of accurate matching. Examples of such approaches are best match algorithms.

a) Infinite Ways to Ask the Same Question

There are multiple, in fact infinite, ways to ask the same question. Two questions that have the same meaning may not be matchable because they have a different form. And so, the goal of the SODB is to try to make questions with the same meaning take on the same form. The SODB can therefore have a function that takes a Requestor through a standard input structure so that Requestors have a better chance of posing Questions in matching forms when the questions have the same meaning. This structure is easiest with simple questions such as, "What is the telephone number of John Smith?" A Requestor might simply input the name "John Smith," which would of course, match other inputs of "John Smith." This example brings us to the next problem.

b) Questions Can Have Multiple, and Possibly Infinite, Answers

To match an answer to a question, there needs to be a single answer. However, as discussed previously, the phrase "one answer" is not very clear. An answer can have multiple components.

For example, the question, "What is John's telephone number?" might have an answer that includes multiple numbers because John might have several numbers. However, the answer could still be considered a single answer because the numbers are that person's numbers, which is what the requestor asked for. The Requestor though would not want multiple numbers of various people with the same name. For example, a person entering "John Smith" looking for a number might find hundreds of numbers. In fact, most all questions can have multiple answers, even seemingly specific questions such as, "What is John's weight in pounds?" The answer may be 150 or 150.111 or 150.1111, and then any figure depends on when he was weighed, with what scale, and so on. To narrow answers down, we use implicit default assumptions, some of which we build into our data-bases. In addition to these assumptions, the key to narrowing possible answers is to specify enough information in a question to make it highly likely that only one answer will be given. Specifiers such as full name, location, ID number, time, source of information and so on can often narrow the possible answers to one. The SODB can include a function that asks the Requestor to pose the question more specifically. The SODB can also include a function that picks one answer out of a set of equivalent answers. For example, the answer to the question, "Where is the lowest price on a certain compact disc?" might be many places. The SODB might pick one at random.

Quality Control Functions

Quality control of answers in the SODB is essential. The SODB can have many functions to provide incentives and sanctions that encourage Suppliers to provide accurate answers. A general incentive is that a corrected answer will displace a wrong answer and garner royalties. The SODB may have rules to define what a wrong answer is but these rules cannot cover all situations. Disputes may arise as to whether answers are accurate and these dispute may have to be settled outside the system by the Manager of the SODB. Some quality control functions are listed below.

a) The SODB can have a function that stores identification information about an Answer such as the time it was supplied and the primary source (the primary source and the Supplier may or may not be one and the same).

b) The SODB can have a function that allows users to input a claim that an answer is wrong and send that claim to the Manager.

c) A user, Requestor or Supplier, can claim that an answer was intentionally supplied wrongly. The SODB can have a function that allows a user to record this claim and send it to the Manager.

d) The SODB can have a function that allows a user to request that a manager inspect an answer. The function can also register a charge for this inspection.

e) The SODB can have a function that allows the Manager to register that an answer is wrong and to register that wrong to a Supplier.

f) The SODB can have function that keeps a record of the wrong answers a Supplier has provided. This function can also disqualify a Supplier who has inputted too many wrong answers.

g) The SODB can have a function that charges Suppliers an amount of money, a penalty, for providing wrong answers.

h) The SODB can have a function that rewards a user who discovers that an answer is wrong. Such a function can charge a penalty to the Supplier of the wrong answer and pay the penalty fee to the discoverer of the incorrect answer.

i) The SODB can have a function that pays Suppliers to update answers. Let us call such a Supplier an Updater. For example, a price that was originally entered correctly might become outdated. A user who discovers this can be paid for changing the answer to a correct one. The user would be paid royalties that the new, correct answer would generate. However, sometimes, when an answer is changed, it may receive no royalties. This is particularly true with prices and other time sensitive offers. For example, the answer to the question "Who sells HP printers for the lowest price?" might change. The Updater might find out that the current answer in the SODB is wrong. But the Updater might not be able to Supply the correct answer. That may have been supplied by someone else. In these cases, the SODB can have a function that pays the Updater a share of the Royalties owed to the Supplier of the new answer and/or of the old answer. Or the SODB may be able to credit the Updater in other ways, such as crediting him with free answers.

j) To cheat, a person might have a confederate change an accurate answer to a wrong one. The person would then re-enter the answer correctly and claim royalties. The SODB can have a function such that if an answer reverts to a previous answer within a given period of time, royalties will be paid to the Supplier of the previous answer, provided the previous answer was accurate. With static facts, such as a person's birthday or the speed of light, the first person to supply the answer accurately would usually claim all royalties. With changing facts, such as prices, the time allowed for reversion could vary depending on the situation.

k) The SODB can have a function that "confirms" answers by making sure that they are outputted to Requestors only after having been inputted by more than one Supplier.

l) The SODB can have a function that allows Suppliers to enter answers only after having entered a passcode.

m) If accessed by voice, the SODB can have a function that records the Supplier's voice for identification.

n) The SODB can have a function that audio records the Supplier receiving an answer from the primary source of that answer. For example, a Supplier could be getting a price from a store. In order to insure that the store cannot renege on this price, the Supplier might want to record the conversation. Thus the SODB can have a call forwarding function in which the Supplier calls through the SODB, the SODB connects the Supplier to the store and then also records the conversation. To reduce recording costs, the recording might be done randomly.

Deleting Data Function

The SODB can have a function to get rid of "deadwood" by deleting answers, raw data, data-requests and data-uses whose demand rate drops too low. For example, the SODB can automatically delete any answer that has not been requested or any question that has not been asked for a period of time.

User Fee Functions

To offset costs and to encourage efficient use, the SODB can have a function that charges users for connect time, for the storage of answers and for any other usage of the data-base.

Pay-off Meter Functions a) A user might prefer not to have the POE outputted automatically but instead upon request. Therefore, the POM can have a function that allows Requestors to request a POE.

b) A function can be added to the POM that tells not only the Pay-off Estimate but also an estimated per hour rate. Thus the Pay-off Formula would have to include an estimate of the time it takes to input the necessary data. From this estimate, a per hour estimate follows.

c) The Pay-off Formula can calculate a second POE, one that is a percentage of the original POE and could be called a Referral Fee. This fee would be due a person, a Referrer, who alerted a Supplier to enter an answer. This function would allow a Supplier to input the name of the Referrer. The function would then credit royalties to both the Supplier and the Referrer. These two would normally share the original royalty amount.

d) The Pay-off Formula can calculate the Pay-off per component in an answer. There are infinite ways to assign a value per component. The Pay-off Formula could, for example, simply take the POE and divide it by the number of components, x, in an answer. The SODB would also have a function that tallies the components.

e) As mentioned, the SODB can include steps enabling Requestors to see more projected pay-off information than a single POE. The SODB can display some or all the information kept in the demand meter for an answer. Of particular importance, as mentioned in the section on price setting, is that the system can output a projected demand rate, without a price or cash pay-off attached to it. Of course, any data in the demand record (demand meter) can be made available.

f) The Pay-off Formula can allow users to create "what-if" scenarios, where users plug different values in for key variables in the POF, such as the price of a answer, the time period that the answer will be desired, the rate of requests, and so on. This subject will be taken up in a future application.

Requestor/Supplier Functions a) A Requestor may not want to supply certain data because another Requestor might beat him to the punch. Therefore, the SODB can have a function that reserves the right to input the data. The Requestor could enter a command, such as RESERVE, after hearing the POE for the data. The function would store the Requestor's ID data along with the Requestor's question. Then, for a period of time, the SODB would allow only that user to enter the necessary data. This function would also alert other users that the data was reserved for that time.

b) A Requestor who becomes a Supplier may not want to bother re-entering a Question that he previously asked when in the Request mode. The SODB can then have a function whereby this user, when in the Request mode, could enter a command, such as "WILL SUPPLY", after hearing the POE for the answer. The function would store the Requestor's ID data along with the Question. Then, when the user is in the Supply mode, the function would, upon a command, such as PREVIOUS, look-up the last question that the user had asked. The data inputted by the user would then be stored to correspond to that Question.

c) A user who intends to be a Requestor might enter the Supply Mode, using that mode to check whether an answer is present in the SODB. (A user can check whether an answer is present using the Request or Supply Mode.) If the answer is present, the SODB can have a function that allows the user to automatically switch modes upon a single command and have the answer automatically outputted and a charge registered to the user. This function may seem trivial but an important issue lies behind it. The SODB is a feedback system different from other data-bases in that it forms a tight feedback loop based on royalty incentives provided to users who normally would pay to receive data. With certain data-bases, suppliers, who do not pay for receiving data, may be able to check on the potential royalty revenue from a piece of data But, for the first time, with an SODB, this pay-off information is made directly available to users who are seeking data and who are charged for it if it is in the data-base. This fact makes a great difference for it creates a tight, efficient feedback system that is new.

Check Mode

Check mode was mentioned in the the parent briefly. The basic idea is that a user can check the POE of an answer without registering as a Requestor or Supplier. Check Mode is not necessary for a user could always check the POE of an answer in Supply Mode. With a special Check Mode, however, the system can enable a user to check multiple questions at once. Thus the system could enable a user to conduct a search based on the value of POE's. Such a search would probably be too broad but when conducted along with a keyword search could show users answers that were potentially high yielding and that the user might be able to answer. The other reason for Check Mode is that if a Requestor just wants to check whether an answer is in without registering demand information, this can be another way to do it.

Alerts

The system can include different types of alert functions that alert users as to relevant changes in the status of given answers. Users can direct the system to send them information on such chages. Two key alerts are the following:

1. A POE alert (mentioned in the definitions section under the I-Signal). In this alert, a user would ask that the POE for a given answer be sent to the user if the POE rises above a threshold.

2. Answer Status alerts. In this alert the user ask the system to send information if an answer has been supplied, has changed, has been complained about, or has been given a change of name (has had a new question attached to it). Both Requestors and Suppliers might be interested in such information. Requestors might of course want to find out if an answer is in and Suppliers might want to know if their answer has been messed with.

Probabilistic Payment Functions

If payments and royalties for data are quite small, it is very advantageous to use an expected value payment method (EVPM). An EVPM is described in U.S. Pat. Nos. 5,085,435 and 5,269,521. Please see this patent for an explanation of the method.

The main question in an EVPM is how to insure fair bets. In this case the bets are between the SODB and its users, both Requestors who owe money and Suppliers who are owed money. We will take the case of Requestors who owe money. The principles involved extend to Suppliers. Cheat-prevention methods are described in the patents above. Two examples of cheat prevention methods that can be applied to the SODB are given below.

Numbers Game Method: In the illegal Numbers Game, results were often determined by one number, for example the last three digits of the handle at the track. Anyone who picked that number would win. Thus, one number decided thousands of bets. Likewise the SODB's Payments Register can set up EVPM bets with each Requestor. Charges registered one day can all be decided by the daily lotto number the next day. For example, assume the stakes are set at $10.00. The bet then is decided by the last three numbers in the daily lotto. (See EVPM patent). So, the Payments Register register the charges owed by all Requestors during one day. Then the next day, the daily lotto number is announced. The Payments Register takes this number and applies it to every bet is made with Requestors on the previous day.

The only problem with such a method is that it can truly be feast or famine. For example, assume all charges one day are 10 cents. The SODB only has a 1% chance of winning bets if the stakes are $10. Therefore, the SODB stands a 99% chance of getting nothing and a 1% chance of getting 100 times its money. In order to even out the income stream, the Payments Register might assign to each Requestor an extra number to be added to the lotto number. The extra number might be part of the Requestors ID number, for example. These extra numbers would be random or nearly so in order to even out the wins and losses from bets. As long the extra numbers are agreed upon by Requestors before the lotto number is announced, all is fair.

Probabilistic Metering Method: Normally, when people use an on-line data-base or phone system or any usage sensitive system, there is a metering component that measures usage and ultimately determines charges. The SODB has that with its Payment's Register. However, registering charges and then billing for them can be a large cost. Therefore, it would be advantageous to do the metering on a probabilistic basis by EVPM. For example, the meter might be off 90 percent of the time but, when on, the charges applied would be at 10 times the normal rate. The periods of time the meter is on and off are determined by a random number supplier that picks a number, in this case an integer from 1–10.

The SODB's Payment's Register can have a Probabilistic Metering Function (PMF) that randomly determines the time periods during which the SODB will register charges to Requestors (and register royalties to Suppliers). The function is described below.

1. A period of time is broken up into sub-periods. For example, a day might be broken up into minutes.

2. The probability that the meter will be on during a sub-period is decided upon by the SODB manager.

3. Each sub-period has assigned to it a random number that determines whether the meter will be on or off during that period. The number is chosen by a random number generator such that the probability of the meter being on is the probability that the SODB manager has decided on. With each sub-period having a random number chosen, a sequence or list of "on's" and "off's" is created. This list is inputted into the PMF.

(The list is supplied by an independent source that generates the numbers. The independence of the source is necessary to verify whether or not the SODB's sequence if fair.)

5. The PMF has a clock and a sub-function that, upon the clock's arriving at each sub-period, checks the list to determine whether the meter should be on or off. The sub-function turns the meter on and off as determined by the on/off list.

6. The clock is synchronized to an independent clock so that fairness can be assured.

7. When the meter is on, the Payment Register registers charges and multiplies them by the inverse of the probability that the meter would be on. Thus, if the meter is to be on 1/10 of the time, the charges would be 10 times normal.

Probabilistic metering by this method offers an efficient way to insure fair bets and also a way to smooth out the wins and losses from bets. Perhaps more importantly, it allows Requestors not to have to input the ID data unless they lose bets. There is no reason to input one's identity if one does not have to pay. Thus the inputting of ID data is eliminated from the Start mode. This can be a very advantageous for people in a hurry. It means they only have to identify themselves for billing purposes when they lose the bets. Of course, people might not pay if they haven't identified themselves. However, in addition to honor, it is possible in some cases to gather evidence to trace Requestors. It is possible to capture the Requestor's voice, for instance, if the SODB is accessed by voice. If the SODB is accessed by computer, the computer may be traced.

Appendix 2

Section 2: The Pay-off Estimate

In the system of the parent, it was assumed that when a question was entered by a Requestor that the Requestor wanted (was willing to pay something for) the corresponding answer. In the new system of linked questions, this assumption may no longer hold because the system can present multiple alternative answers.

Let us pretend for a moment that the system is an ordinary department store and that you are a buyer. You ask for khaki pants and the salesperson says, "Well, we may have ten different styles." You have a choice of these and you can add your own custom choice if you want. Now, how would the store register your demand for each of the different styles if the only information you give is khaki pants? What if some or all of those styles weren't in stock? What if the store had no idea when any of the styles would come in? What if the store wasn't sure of what the price for each would be? What if you were just looking? Given all these uncertainties, how is the store to estimate the sales of a given style of khaki pants? And what if you state a style that is not in stock and so you buy another? Should the store register demand for the pants you want or the pants you bought?

This problem of choice is plain with consumer goods like pants, shoes, shampoo, candy bars and things like that. But it is the same problem with answers. (The problem of choice exists for the parent as well but is not usually critical in a system without linked questions.)

We'll never perfectly solve the problem of estimating the sales of alternative choices. In a future application we will tackle the problem more fully though by introducing the notion of linked requests where a Requestor links requests for substitute answers, and possibly states an order of preference for those answers, and possibly states the total amount he will pay for the answers.

We do not address the issue of how to assign demand to alternative direct and indirect answers. Such rules are highly variable. Here we do say that the system needs to differentiate between Requestors who are just passing through a question, "just looking," and those who have an interest in buying an answer to that question. As in the parent, the system can register various kinds of demand information and can ask for this information and/or can gather it automatically. In a system with linked questions, the system registers demand information (in the demand record of a question) when a Requestor:

1. Enters a question that is not in the system.
2. Enters an MS-Q.

In this case, the system registers demand information in the MS-Q's demand record. The system also registers in this record whether the Requestor enters any other MS-Q's to be linked to the same current question. This registering would occur for each MSQ the Requestor entered for that common question.

3. Explicitly states he wants an answer.

In this case, the Requestor can show he wants an answer by selecting the Get Answer command. Of course, he may end up buying the answer for it might be there. If the system shows him, in advance of his asking for an answer, whether or not an answer is in the system for the current question, then the system needs a command so that the user can explicitly state that he wants an answer and is not "just passing through" the question. Thus the system can have a separate command for indicating that the user wants an answer even though the answer is not in the system. Rather than have an extra command, the Get Answer command can be used here as well. When an answer to the current question is not in the system, Get Answer would signal the system to register demand for the answer.

Combination POE's

Now if an answer is a direct answer to multiple questions (as shown in FIG. 30d), then the POE for such an answer would be some combination of the POE's for all the questions it corresponds directly to. That is not to say that determining the POE is simple. We use the term "some combination" of the POE's because there are no hard and fast rules. If the answer is a direct answer to multiple questions and if these questions have no indirect answers, no alternative answers, then the issue is more straightforward and the combined POE might be based on a simple sum. But when multiple alternatives are involved, no clear rules exist. Basically though, for the purpose of estimating the future sales of an answer, multiple question-labels should be treated like one label because they are just different ways to ask for the answer.

"Get the POE"

A system may show a POE for a question by default. Otherwise, the system must include a command for showing the POE. The system can include a separate "Get POE" option. When a user selects this option, the system enables him to see POE information about the current question including, possibly, information about the POE's of linked MS-Q's. The system can show the average POE and a maximum POE for linked MS-Q. The system might show the POE's of MS-Q's by default though, along with the MS-Q's themselves.

Another Reason AC Works

It may seem that letting people enter MS-Q's would only lead to a scattering of individual question throughout the data-base with no demand accumulating for individual answers. The situation would be like each buyer of pants wanting only his own personal style with no single style gaining enough sales interest for someone to supply the pants. Yet while users will state their personal preferences they will also settle for someone else's style if that is what is in the "department store" at the time. Further, users have an incentive to join in common choices so that an answer will be supplied. Thus, the system enables people to express their personal preferences and to agree with the preferences of others, which leads to the most popular styles, in general, being provided.

Section 3: Searching

The rules for entering MS-Q's and linking questions make it possible for a question to be linked to a great number of other questions. In fact, the number of links can potentially explode. The alternative paths thus created can cause confusion for a user who wants to find an answer, or find a good question. The situation is akin to getting too many "hits" when searching in a conventional data-base. So the system can include functions for making searching easier.

These functions can come in two broad types: those that restrain the linking of questions, and those that use extra selection criteria for choosing which linked questions to see and which answers to get from the linked questions.

Restraining Rules (Functions)

Some rules the system can include for restraining the linking of questions are:

a. Charging users for entering questions.
 b. Charging users for creating links.
 c. Treating questions and links as investments where a user is charged rent for storing a question and creating a link, but is also paid when other users use the questions or the links. "Use" can mean travelling through the question or on the link. In other words, questions and links can be treated like answers in the sense that storing an answer can cost a Supplier in rent but may garner royalties. Questions and links in general would have lower rents and royalties than answers.
 d. Forbidding automated linking, for example, by limiting a user to creating a maximum number of links per period of time.
 e. Forbidding plagiarism.

Extra Search Parameters

When a user is at a question and there are too many linked questions, particularly MS-Q's, to be shown at once, the system can include defaults for determining which MS-Q's to show. The system can also enable a user to enter additional search parameters to choose which MS-Q's and answers to see. These choices of parameters and of system defaults can be the same. So let us first discuss some possible parameters the system can enable a user to enter.

A User Selects "Get MS-Q's"

When a user selects the Get MS-Q's option and there are too many MS-Q's to output at once, the system can enable the user to enter some combination of the following selection criteria for choosing which MS-Q's to see:

a. More question information
 The user could enter additional information to the current question, rather than re-enter a whole new question. This information can then be best matched to the MS-Q's. (The system may also add the new information to the current question and treat the combined information as a new question and try that new question against the whole database.)
 b. Price
 The user could specify a price level for the answer he wants. Thus the MS-Q's shown would be those that correspond to answers under a certain price. The MS-Q's might correspond indirectly to answers at various price levels. In this case the system could still show an MSQ but only if it corresponded to some answer below the stated price threshold.
 c. Quality control
 The user could specify that he wants to see only answers that have passed certain quality control inspections. In this case the system would need ways for users to enter reviews of answers.
 d. Length of answer
 The user could specify the length of answer he wants.
 e. Most popular MS-Q's by answers bought.
 The user could specify that he wants to see the MSQ's that correspond to the most popular answers according to those answers that have actually been bought.
 f. Most popular MS-Q's by destination
 The user could specify that he wants to see the MS-Q's that other users have travelled to most from the current question.
 g. Most popular MS-Q's by answers wanted
 The user could specify that he wants to see the MS-Q's that correspond to the most popular answers according to those answers that have the highest demand (by highest POE or by highest request rate), though the answers may or may not be in the system.
 h. By direct answers that are in the system
 The user could specify that he wants to see the MS-Q's that have direct answers (MS-Q's may have no direct or indirect answers).

A User Selects "Get Other Questions"

A user who selects the Get Other Questions option can use the same selection criteria as those above except, of course, that the questions he is referring to are not MS-Q's. The user can decide whether he wants to see LS-Q's or questions he has been previously at. Hence the system can include an additional criteria, allowing the user to choose questions according to the type of linked questions he wants to see, for example, LS-Q's. (Later, when other types of links are introduced, this "select-a-link" feature becomes more important.)

A User Selects "Get Answer"

A user who selects the Get Answer option can also use the same criteria above, though in this case the user would not want questions but answers. If there were no answers, the system could show MS-Q's without answers and register demand for the corresponding answers. If there were answers, the system would show the answer that best fit the criteria that the user entered.

System Defaults

Having discussed search parameters that users can enter, we see that the system can use some combination of these same criteria as defaults. Of course, the combination depends on the particular system and the particular questions involved.

Voice Input and Output

In the discussion of the system for handling natural language, it may seem that the multiple choices created by linked questions are suited only for screen input and output. But often people would want to use the system by talking to it, and often users might not have a screen. For example, user might want to use a plain old telephone as a terminal. (In the grandparent, a self filling telephone directory was described using phones as terminals.) Yet there is no doubt that choices are much harder to present by voice because they take time to output.

That does not affect the entering of answers though. Answers, even long ones, can be entered voice if the system has voice recognition functions. An answer can be confirmed by the user or "cleaned up" at a later time.

More important and seemingly difficult is the problem of entering a question and then facing multiple MS-Q's. But this problem can be mitigated by using the search criteria described above. For example, a person can ask the computer, What time does the Louvre open on Tuesday?
 Please give me the most popular answer bought, under 25 cents.

With these criteria added to a question, the system can find an MS-Q to the original question and output an answer to the MS-Q that has satisfied the most people and should suffice for most users.

Though the answer may originally have been supplied by text, it can be outputted by text-to-speech functions, or it can be outputted on screen as well of course.

Where voice recognition and AC are concerned, questions have an inherent advantage. They are usually short. Thus a user can enter a question by voice in multiple ways and the system can look for a best match using the multiple phrasings. Normally, voice recognition suffers from problems of interpretation, but because questions are usually short messages, multiple phrasings can enable the system to find a good match (we will see the same principle involved in translating questions into other languages). Once the system arrives at a good match, additional selection criteria can be applied, espcially those concerning the most popular answers. Of course, using voice entails limitations, but the point is that people can find answers even in a system that has linked questions.

More Kinds of Questions and Links Between Questions

Let's recall the foundation task of the system: to count how many people seek the same answer.

Perhaps we should discuss what the same answer means to people. But we will not do this. Instead we will just note that different questions can correspond to the same answer. We have already noted and discussed this subject somewhat. Now let us discuss the subject more.

The general idea is that two questions can be related by whether they correspond to the same answer or whether they might correspond to the same answer.

We note four types of relationships. Before we explain these briefly we realize that problems of interpretation will always exist and so we discuss these relationships as they would exist in a given user's mind. This is reasonable because links between questions are created by individual users. Other users can then agree with those links or agree that the interpretations are valid or not.

Less Specific to More Specific

We have already discussed this relationship between questions.

Synonym to Synonym

Here two questions are meant to ask for the same answer.

Synonym: Who wrote "Can't Buy Me Love"?

Synonym: What group wrote the song "Can't Buy Me Love"?

Less Complete to More Complete

Here an answer to the more complete question will always answer the less complete question but not always vice versa.

Less Complete: Did Elvis write "Can't Buy Me Love"?

More Complete: Who wrote "Can't Buy Me Love"?

Less Complete: Is Johnny in the class?

More Complete: What's a list of all the students in the class?

Less Complete: How far is it to Chicago from Washington?

More Complete: Let me see a Rand McNally roadmap of the United States?

Less Complete: Is Paris, the City of Lights, in England?

More Complete: What does the Encyclopedia Brittanica say about Paris?

Related to Related

This is a poor name for the relationship between two questions where the answer to one question might answer the other question. The relationship can be one way in that the answer to one question might answer the other question but not vice versa. Or it can be two way in that the answer to one question might answer the other question and vice versa.

Related Question: What's the name of that restaurant on Willow?

Related Question: What kind of food does that restaurant on Willow serve?

Related Question: What's on the menu of John's Pizza?

Related Question: How much is a pizza at John's Pizza?

Related Question: Why should you correct your posture?

Related Question: What does bad posture do to you?

Related Question: Where can you get hologram stickers in the U.S.?

Related Question: Who sells high security stickers in the U.S.?

Related Question: How does a car engine work?

Related Question: How does an internal combustion engine work?

(Two questions might have multiple relationships above in common, for the relationships are not mutually exclusive.)

Rephrase Link

We point out one more general type link which we will call a Rephrase Link. A user searching for an answer might enter various questions that could correspond to that answer. He might not further specify the relationship between two such questions except to say that they are both entered in pursuit of the same answer. He does this by entering a rephrase command before entering a new question. This command signifies that the question is a rephrase of the previous question. The system can then create a link between the two questions. The user may further specify the relationship between the two questions later. Or he may not and the link would remain to identify the questions as rephrases of each other.

Just as a user can enter a new question and create a link between it and another question signifying that the new question is more specific than the other question, a user can create the links described above between questions. The links identify the relationship between two questions. Because the relationships have to do with whether the questions have the same answer, the links can help other users find answers or express interest in the same answers.

As shown in FIG. 31, in addition to enabling users to enter MS-Q's the system can include options for entering:

Less Specific Questions 3170

Synonymous Questions 3171

More Complete Questions 3172

Less Complete Questions 3173

Related Questions 3174.

When a user enters one of these he does it relative to the current question or another selected question. In other words, the process is directly analogous to entering an MS-Q. Likewise a user can move to (zip to) one linked question from another. All the other processes are analogous to those explained with MS-Q's.

The purpose of these new links is different though than the purpose of MS-Q's. MS-Q's are meant to solve the Endless Answers problem. The type of links described above are above all meant to solve the Matching Up Questions problem.

But we should realize that at bottom the problems can both be viewed as the same in the sense that the idea is to enable Requestors match up their intentions. (Suppliers may also need to do this when advertising an answer.) MS-Q's help Requestors match up their intentions by allowing Requestors to better explain their intentions. The links above enable Requestors to express related intentions. That is to say that they enable Requestors to express the answer they want in different ways. Thus the links above can help people find and match up related intentions. That can help people find answers and join together in expressing demand for answers.

TABLE OF CONTENTS

Introduction
Part I The Basic System
Chapter 1 Definitions of Necessary Functions
Chapter 2 Procedure and Physical Elements for a Basic AC Part II Adapting the System to Collect and Sell a Wide Range of Answers
Chapter 3 Core Design Principles
Chapter 4 Questions and Answers in the Minds of People
Chapter 5 Questions and Answers in AC
Chapter 6 Registering Demand Information
Chapter 7 Price Setting
Chapter 8 Registering People's Interest in Supplying Answers and Registering People's Rights to Supply Answers
Chapter 9 The Pay-off Meter
Chapter 10 Royalty Rules
Chapter 11 User Accounts (missing)
Chapter 12 Direct Mail
Chapter 13 Quality Control of Answers Through Labeling
Chapter 14 Property Rights
Chapter 15 Multi-lingual AC
Chapter 16 Form of the Invention Book II Enabling the System to Accommodate Natural Language
Book III Enabling the System to Handle a Wide Range of Jobs

I claim:

1. An answer collection and retrieval system comprising in combination the following elements and steps:
a computer and database having:
   input means for inputting questions and answers corresponding to said questions, along with user identification information,
   output means for outputting said corresponding answers, along with projected pay-off estimates,
   memory means for storing said questions and corresponding answers,
   processing means for comparing questions, finding corresponding answers, registering times of inputs, calculating formulas and registering charges and payments due to users,
said computer performing the following initial steps:
   a. registering said user's identification information in said database,
   b. registering user's preference in supplying or retrieving an answer,
said computer performing the following steps upon the inputting of a question,
   c. if the user prefers to supply said corresponding answer, looking for said corresponding answer in said database,
      c1. if corresponding answer is found, outputting a message telling the user that the answer is already in the database,
      c2. if no corresponding answer is found, allowing the user to input the answer, storing the corresponding answer and registering that royalties are due to the user when said answer is requested,
   d. if the user prefers to retrieve answer corresponding to said question,
      d1. registering time and date said question is inputted,
      d2. searching to find if the answer corresponding to said question is in the database,
         d2a. if corresponding answer is in the database, outputting the answer, registering a charge due by said user who inputted the question and a royalty due to the user who supplied the answer, adding one to the number of said questions, calculating a pay-off formula that projects the estimated royalties due to a user who inputs the correct answer corresponding to said question, and outputting the resulting pay-off estimate,
         d2b. if no corresponding answer is in the database, checking if said question is stored in the database,
            d2b1. if no, storing the question and setting the number of said questions to one, and calculating said pay-off formula,
            d2b2. if yes, adding one to the number of said questions, and calculating said pay-off formula,
            d2b3. outputting the resulting pay-off estimate,
said computer also performing the following steps:
   presenting a user who has found a first question with the option to enter a new, more specific question,
   and if the user selects the option to enter a more specific question,
      e. entering the second question,
      f. storing the second question,
      g. linking it in the database to the first question,
      h. labeling the second question as more specific than the first,
   and further,
   when a user has found a question, presenting a list of all the linked, more specific questions, and presenting the user with the option to select a more specific question from this list, and if the user selects a more specific question, presenting this question to the user.

2. An answer collection and retrieval system comprising in combination the following elements and steps:
a computer and database having:
   input means for inputting questions and answers corresponding to said questions, along with user identification information,
   output means for outputting said corresponding answers, along with projected pay-off estimates,
   memory means for storing said questions and corresponding answers,
   processing means for comparing questions, finding corresponding answers, registering times of inputs, calculating formulas and registering charges and payments due to users,
said computer performing the following initial steps:
   a. registering said user's identification information in said database,
   b. registering user's preference in supplying or retrieving an answer, said computer performing the following steps upon the inputting of a question,
- c. if the user prefers to supply said corresponding answer, looking for said corresponding answer in said database,
  - c1. if corresponding answer is found, outputting a message telling the user that the answer is already in the database,
  - c2. if no corresponding answer is found, allowing the user to input the answer, storing the corresponding answer and registering that royalties are due to the user when said answer is requested,
- d. if the user prefers to retrieve answer corresponding to said question,
  - d1. registering time and date said question is inputted,
  - d2. searching to find if the answer corresponding to said question is in the database,
    - d2a. if corresponding answer is in the database, outputting the answer, registering a charge due by said user who inputted the question and a royalty due to the user who supplied the answer, adding one to the number of said questions, calculating a pay-off formula that projects the estimated royalties due to a user who inputs the correct answer corresponding to said question, and outputting the resulting pay-off estimate,
    - d2b. if no corresponding answer is in the database, checking if said question is stored in the database,
      - d2b1. if no, storing the question and setting the number of said questions to one, and calculating said pay-off formula,
      - d2b2. if yes, adding one to the number of said questions, and calculating said pay-off formula,
      - d2b3. outputting the resulting pay-off estimate, said computer also performing the following steps:

presenting a user who has found a first question with the option to enter a new, synonym question, and if the user selects the option to enter a synonym question,
- e. entering the second question,
- f. storing the second question,
- g. linking it in the database to the first question,
- h. labeling the second question as a synonym to the first, and further, when a user has found a question, presenting a list of all the linked, synonym questions, and presenting the user with the option to select a synonym question from this list, and if the user selects a synonym question, presenting this question to the user.

* * * * *